US 9,092,545 B2

(12) United States Patent
Rivette et al.

(10) Patent No.: US 9,092,545 B2
(45) Date of Patent: Jul. 28, 2015

(54) INTELLECTUAL PROPERTY ASSET MANAGER (IPAM) FOR CONTEXT PROCESSING OF DATA OBJECTS

(75) Inventors: Kevin G. Rivette, Palo Alto, CA (US); Irving S. Rappaport, Palo Alto, CA (US); Luke Hohmann, Mountain View, CA (US); David Puglia, Los Gatos, CA (US); Andrew S. DeWolfe, Sunnyvale, CA (US); David Goretsky, Sunnyvale, CA (US); Adam Jackson, Sunnyvale, CA (US); Scott Kurowski, San Jose, CA (US); Brian Park, Belmont, CA (US); Charles Rabb, Jr., Sunnyvale, CA (US); Brent Rosenquist, Sunnyvale, CA (US); Matthew Schnitz, Mountain View, CA (US); David W. Smith, Mountain View, CA (US); Thierry Paradan, Sunnyvale, CA (US)

(73) Assignee: ROSE BLUSH SOFTWARE LLC, Los Altos, CA (US)

( * ) Notice: Subject to any disclaimer, the term of this patent is extended or adjusted under 35 U.S.C. 154(b) by 2054 days.

(21) Appl. No.: 11/513,420

(22) Filed: Aug. 31, 2006

(65) Prior Publication Data
US 2007/0078886 A1    Apr. 5, 2007

Related U.S. Application Data

(63) Continuation-in-part of application No. 11/178,367, filed on Jul. 12, 2005, now Pat. No. 7,437,471, which is a continuation of application No. 09/545,608, filed on Apr. 7, 2000, now Pat. No. 6,963,920, and a
(Continued)

(51) Int. Cl.
*G06F 17/00* (2006.01)
*G06F 17/30* (2006.01)
(Continued)

(52) U.S. Cl.
CPC ........ *G06F 17/30908* (2013.01); *G06F 3/0483* (2013.01); *G06F 17/218* (2013.01);
(Continued)

(58) Field of Classification Search
CPC ............ G06F 17/218; G06F 17/30253; G06F 3/0483; G06F 17/30011; G06F 2216/11; G06Q 50/184; G06Q 50/18
USPC ......... 715/733, 738, 764, 277; 707/10, 103 Y
See application file for complete search history.

(56) References Cited

U.S. PATENT DOCUMENTS

| 4,205,780 A | 6/1980 | Burns et al. |
| 4,270,182 A | 5/1981 | Asija |

(Continued)

FOREIGN PATENT DOCUMENTS

| EP | 0 239 884 A1 | 10/1987 |
| JP | 5-135109 | 6/1993 |

(Continued)

OTHER PUBLICATIONS

Lamping, J., Rao, R., and Pirolli, P. 1995. A focus+context technique based on hyperbolic geometry for visualizing large hierarchies. In Proceedings of the SIGCHI Conference on Human Factors in Computing Systems (Denver, Colorado, United States, May 7-11, 1995).*

(Continued)

*Primary Examiner* — Adam M Queler
(74) *Attorney, Agent, or Firm* — Sterne, Kessler, Goldstein & Fox P.L.L.C.

(57) ABSTRACT

Context data processing is described herein. One or more contexts are selected. Each context includes one or more attributes, and a plurality of data objects that satisfy the attributes. A list of data objects contained in the selected contexts is displayed. At least some of the data objects in the selected contexts are processed. Such processing may involve generating claim trees, citation trees, and data object families, which may be displayed using hyperbolic trees. In an embodiment, the contexts are groups. In other embodiment, the contexts are each associated with a data object type. In this latter embodiment, the contexts include data objects of their respective data object types.

47 Claims, 93 Drawing Sheets

Related U.S. Application Data continuation-in-part of application No. 08/921,369, filed on Aug. 29, 1997, now Pat. No. 6,339,767, which is a continuation-in-part of application No. 08/867,392, filed on Jun. 2, 1997, now Pat. No. 5,991,751, said application No. 09/545,608 is a continuation-in-part of application No. 09/138,368, filed on Aug. 21, 1998, now abandoned, which is a continuation-in-part of application No. 08/921,369, filed on Aug. 29, 1997, now Pat. No. 6,339,767, said application No. 09/545,608 is a continuation-in-part of application No. 09/260,079, filed on Mar. 2, 1999, now abandoned, which is a continuation-in-part of application No. 09/138,368, filed on Aug. 21, 1998, now abandoned, said application No. 09/545,608 is a continuation-in-part of application No. 09/057,557, filed on Apr. 9, 1998, now Pat. No. 6,389,434.

(60) Provisional application No. 60/128,405, filed on Apr. 8, 1999.

(51) Int. Cl.
*G06F 3/0483* (2013.01)
*G06Q 50/18* (2012.01)
*G06F 17/21* (2006.01)
*G06Q 10/10* (2012.01)

(52) U.S. Cl.
CPC .... *G06F17/30011* (2013.01); *G06F 17/30253* (2013.01); *G06Q 10/10* (2013.01); *G06Q 50/18* (2013.01); *G06Q 50/184* (2013.01); *G06F 2216/11* (2013.01)

(56) References Cited

U.S. PATENT DOCUMENTS

| | | | | |
|---|---|---|---|---|
| 4,486,857 | A | 12/1984 | Heckel | |
| 4,533,910 | A | 8/1985 | Sukonick et al. | |
| 4,555,775 | A | 11/1985 | Pike | |
| 4,622,545 | A | 11/1986 | Atkinson | |
| RE32,632 | E | 3/1988 | Atkinson | |
| 4,736,308 | A | 4/1988 | Heckel | |
| 4,748,618 | A | 5/1988 | Brown et al. | |
| 4,772,882 | A | 9/1988 | Mical | |
| 4,785,408 | A | 11/1988 | Britton et al. | |
| 4,788,538 | A | 11/1988 | Klein et al. | |
| 4,812,834 | A | 3/1989 | Wells | |
| 4,847,604 | A | 7/1989 | Doyle | |
| 4,873,623 | A | 10/1989 | Lane et al. | |
| 4,884,223 | A | 11/1989 | Ingle et al. | |
| 4,899,136 | A | 2/1990 | Beard et al. | |
| 4,914,732 | A | 4/1990 | Henderson et al. | |
| 4,931,783 | A | 6/1990 | Atkinson | |
| 4,935,865 | A | 6/1990 | Rowe et al. | |
| 4,939,507 | A | 7/1990 | Beard et al. | |
| 4,959,769 | A | 9/1990 | Cooper et al. | |
| 4,977,455 | A | 12/1990 | Young | |
| 4,985,863 | A | 1/1991 | Fujisawa et al. | |
| 4,991,087 | A | 2/1991 | Burkowski et al. | |
| 5,008,853 | A | 4/1991 | Bly et al. | |
| 5,062,060 | A | 10/1991 | Kolnick | |
| 5,072,412 | A | 12/1991 | Henderson, Jr. et al. | |
| 5,120,944 | A | 6/1992 | Kern et al. | |
| 5,142,674 | A | 8/1992 | Barker et al. | |
| 5,146,217 | A * | 9/1992 | Holmes et al. | 340/7.55 |
| 5,148,154 | A | 9/1992 | MacKay et al. | |
| 5,155,806 | A | 10/1992 | Hoeber et al. | |
| 5,157,768 | A | 10/1992 | Hoeber et al. | |
| 5,163,104 | A | 11/1992 | Ghosh et al. | |
| 5,222,160 | A | 6/1993 | Sakai et al. | |
| 5,228,123 | A | 7/1993 | Heckel | |
| 5,237,158 | A | 8/1993 | Kern et al. | |
| 5,237,679 | A * | 8/1993 | Wang et al. | 1/1 |
| 5,241,671 | A | 8/1993 | Reed et al. | |
| 5,253,362 | A | 10/1993 | Nolan et al. | |
| RE34,476 | E | 12/1993 | Norwood | |
| 5,276,616 | A | 1/1994 | Kuga et al. | |
| 5,283,894 | A | 2/1994 | Deran | |
| 5,319,745 | A | 6/1994 | Vinsonneau et al. | |
| 5,349,170 | A | 9/1994 | Kern | |
| 5,392,428 | A | 2/1995 | Robins | |
| 5,402,336 | A | 3/1995 | Spiegelhoff et al. | |
| 5,404,514 | A | 4/1995 | Kageneck et al. | |
| 5,428,778 | A | 6/1995 | Brookes | |
| 5,432,897 | A | 7/1995 | Tatsumi et al. | |
| 5,440,481 | A | 8/1995 | Kostoff et al. | |
| 5,442,778 | A | 8/1995 | Pedersen et al. | |
| 5,444,615 | A | 8/1995 | Bennett et al. | |
| 5,481,666 | A | 1/1996 | Nguyen et al. | |
| 5,511,186 | A | 4/1996 | Carhart et al. | |
| 5,519,857 | A | 5/1996 | Kato et al. | |
| 5,537,526 | A | 7/1996 | Anderson et al. | |
| 5,544,302 | A | 8/1996 | Nguyen | |
| 5,544,352 | A | 8/1996 | Egger | |
| 5,550,976 | A | 8/1996 | Henderson et al. | |
| 5,551,055 | A | 8/1996 | Matheny et al. | |
| 5,557,722 | A | 9/1996 | DeRose et al. | |
| 5,557,785 | A | 9/1996 | Lacquit et al. | |
| 5,559,942 | A | 9/1996 | Gough et al. | |
| 5,568,639 | A | 10/1996 | Wilcox et al. | |
| 5,576,954 | A | 11/1996 | Driscoll | |
| 5,581,686 | A | 12/1996 | Koppolu et al. | |
| 5,583,982 | A | 12/1996 | Matheny et al. | |
| 5,584,035 | A | 12/1996 | Duggan et al. | |
| 5,592,607 | A | 1/1997 | Weber et al. | |
| 5,592,608 | A | 1/1997 | Weber et al. | |
| 5,594,837 | A | 1/1997 | Noyes | |
| 5,596,700 | A * | 1/1997 | Darnell et al. | 715/205 |
| 5,604,901 | A | 2/1997 | Kelley et al. | |
| 5,615,112 | A | 3/1997 | Lui Sheng et al. | |
| 5,615,362 | A | 3/1997 | Jensen et al. | |
| 5,623,679 | A | 4/1997 | Rivette et al. | |
| 5,623,681 | A | 4/1997 | Rivette et al. | |
| 5,625,818 | A * | 4/1997 | Zarmer et al. | 1/1 |
| 5,625,833 | A | 4/1997 | Levine et al. | |
| 5,628,003 | A | 5/1997 | Fujisawa et al. | |
| 5,630,125 | A | 5/1997 | Zellweger | |
| 5,632,031 | A | 5/1997 | Velissaropoulos et al. | |
| 5,638,519 | A | 6/1997 | Haluska | |
| 5,642,502 | A | 6/1997 | Driscoll | |
| 5,696,963 | A | 12/1997 | Ahn | |
| 5,721,910 | A | 2/1998 | Unger et al. | |
| 5,748,956 | A | 5/1998 | Lafer et al. | |
| 5,754,840 | A | 5/1998 | Rivette et al. | |
| 5,757,983 | A | 5/1998 | Kawaguchi et al. | |
| 5,765,152 | A | 6/1998 | Erickson | |
| 5,774,833 | A * | 6/1998 | Newman | 704/9 |
| 5,794,257 | A | 8/1998 | Liu et al. | |
| 5,799,325 | A | 8/1998 | Rivette et al. | |
| 5,806,079 | A | 9/1998 | Rivette et al. | |
| 5,808,615 | A | 9/1998 | Hill et al. | |
| 5,809,318 | A | 9/1998 | Rivette et al. | |
| 5,813,009 | A * | 9/1998 | Johnson et al. | 707/100 |
| 5,832,476 | A * | 11/1998 | Tada et al. | 707/723 |
| 5,845,301 | A | 12/1998 | Rivette et al. | |
| 5,848,409 | A | 12/1998 | Ahn | |
| 5,860,073 | A | 1/1999 | Ferrel et al. | |
| 5,870,770 | A | 2/1999 | Wolfe | |
| 5,944,780 | A * | 8/1999 | Chase et al. | 709/201 |
| 5,953,528 | A | 9/1999 | Sullivan | |
| 5,960,448 | A * | 9/1999 | Reichek et al. | 715/236 |
| 5,991,751 | A | 11/1999 | Rivette et al. | |
| 5,999,907 | A | 12/1999 | Donner | |
| 6,003,033 | A | 12/1999 | Amano et al. | |
| 6,012,098 | A | 1/2000 | Bayeh et al. | |
| 6,021,426 | A | 2/2000 | Douglis et al. | |
| 6,041,335 | A * | 3/2000 | Merritt et al. | 715/203 |
| 6,112,201 | A * | 8/2000 | Wical | 1/1 |
| 6,125,391 | A | 9/2000 | Meltzer et al. | |
| 6,144,962 | A * | 11/2000 | Weinberg et al. | 1/1 |
| 6,202,061 | B1 * | 3/2001 | Khosla et al. | 1/1 |

(56) References Cited

U.S. PATENT DOCUMENTS

| | | | |
|---|---|---|---|
| 6,226,675 | B1 | 5/2001 | Meltzer et al. |
| 6,339,767 | B1 | 1/2002 | Rivette et al. |
| 6,343,297 | B1 | 1/2002 | D'Anjou et al. |
| 6,389,434 | B1 | 5/2002 | Rivette et al. |
| 6,401,118 | B1 | 6/2002 | Thomas |
| 6,408,316 | B1* | 6/2002 | Himmel et al. ............... 715/206 |
| 6,501,856 | B2 | 12/2002 | Kuwano et al. |
| 6,507,856 | B1 | 1/2003 | Chen et al. |
| 6,574,632 | B2* | 6/2003 | Fox et al. .............................. 1/1 |
| 6,584,466 | B1* | 6/2003 | Serbinis et al. ............... 715/209 |
| 6,912,561 | B1* | 6/2005 | Baer et al. ...................... 709/203 |
| 6,963,920 | B1 | 11/2005 | Hohmann et al. |
| 7,437,471 | B2 | 10/2008 | Hohmann et al. |
| 2005/0256965 | A1 | 11/2005 | Hohmann et al. |
| 2007/0208669 | A1 | 9/2007 | Rivette et al. |
| 2008/0177994 | A1* | 7/2008 | Mayer ............................... 713/2 |
| 2012/0265895 | A1* | 10/2012 | Chen et al. ..................... 709/231 |

FOREIGN PATENT DOCUMENTS

| | | |
|---|---|---|
| JP | 6-231141 | 8/1994 |
| JP | 8-221435 | 8/1996 |
| WO | WO 98/16890 A1 | 4/1998 |
| WO | WO 98/34179 A1 | 8/1998 |
| WO | WO 98/44430 A1 | 10/1998 |
| WO | WO 98/55945 A1 | 12/1998 |

OTHER PUBLICATIONS

Barth et al., "XML, patent information and the Web," Proceedings of the 1998 International Chemical Information Conference, Proceedings of the 10.sup.th International Chemical Conference, Nimes, France, Oct. 18-21, 1998, pp. 92-111.
Brewin, Paul, "SGML and Patent Document Processing, Part I: WIPO Standard ST.32," World Patent Information, Elsevier Science Publishing, vol. 18, No. 4, pp. 183-192, Dec. 1996.
Brewin, Paul, "SGML and Patent Document Processing. Part II: Experience in the EPO," World Patent Information, Elsevier Sciences Publishing, vol. 19, No. 1, pp. 3-10, Mar. 1997.
Dudeck, Joachim, "Aspects of implementing and harmonizing healthcare communication standards," International Journal of Medical Informatics, Elsevier Scientific Publishers, vol. 48, No. 1-3, pp. 163-171, Feb. 1998.
Kristensen, Anders, "Template resolution in XML/HTML," Computer Networks and ISDN Systems, vol. 30, No. 1-7, pp. 239-249, Apr. 1998, North Holland Publishing.
Information Dissemination Organizations—Office of Electronic Information Products, "U.S. Patent and Trademark Office Patent Date/SGML", Mar. 1998, pp. A1-A42.
International Search report issued Dec. 18, 2000 for PCT/US00/09427, 7 pages.
English Language Patent Abstract (JPO & Japio) for JP 06-231141, published Aug. 19, 1994, p. 1.
Aberdeen Group—Profile, Dataware Technologies, "BRS/Search", Sep. 1996.
"Agent Searching," Executive Technologies, Inc., Last Updated: Jan. 12, 1996.
Albert, M., "CD-ROM: The Next PC Revolution," Fortune Magazine, Jun. 29, 1992.
Albert, M., "Ease Access to Patents," Fortune Magazine, Jun. 29, 1992.
Alexander, "Visualizing Cleared-Off Desktops," Computerworld, May 6, 1991, p. 20.
Banet, "Creating a CD-ROM: overview of the product field," The Seybold Report on Desktop Publishing, vol. 7, No. 6, p. 3(29), Feb. 1993.
Becker, "Voyager kit: Ticket to books on-line," MacWeek, vol. 7, No. 8, Feb. 22, 1993, p. 57.
Berk et al. (eds.), Hypertext/Hypermedia Handbook, pp. 209-224, 285-297, 329-355, 529-533, Jan. 1991.
Bermant, "Finding It Fast: New Software Features That Search Your System," Personal Computing, vol. 11, No. 11, Nov. 1987, pp. 125-131.
Bish, "An Essential ingredient: Post recognition processing," Imaging World, vol. 5, Issue 3, Mar. 1996.
Blatt, J., "A Primer on User Interface Software Patents," The Computer Lawyer, vol. 9, No. 4, Apr. 1992.
Boedeker et al., "Choosing Imaging Software," Law Office Computing, vol. 5, Issue 3, Jun./Jul. 1995, pp. 50-55.
"Boolean Searching," Executive Technologies, Inc., Last Updated: Jan. 12, 1996.
Bradbury, "Expanded Book Toolkit," MacUser, vol. 9, No. 3, Mar. 1993, p. 85.
Briggs, "CD-ROM publishing boom is Dataware's delight," MIS Week, vol. 10, No. 38, Sep. 25, 1989, pp. 40-41.
Briggs, "Dataware Comes to U.S. With CD-ROM Publishing," MIS Week, vol. 10, No. 5, Jan. 30, 1989, p. 21.
Brockschmidt, Inside OLE 2, Microsoft Press, Redmond, WA, Copyright 1994.
Brockschmidt, "What OLE Is Really About," OLE Development, Microsoft Corporation, Copyright 1997, pp. 1-59.
"BRS/Search: An Industrial Strength Document Warehouse Solution—Profile," Dataware Technologies, Copyright May 1996, pp. 1-12.
"BRS/Search," Dataware Technolgies, Inc., date unclear.
Catchings et al., "Price Delineats Text-Retrieval Software," PC Week, vol. 8, No. 20, May 20, 1991, pp. 120-123.
Catchings et al., "Retrieval Technologies Inc.:re:Search 2.0" PC Week, vol. 8, No. 20, p. 121(2), May/1991.
Catlin et al., "InterNote: Extending a Hypermedia Framework to Support Annotative Collaboration," Hypertext '89 Proceedings, pp. 365 to 378, Nov. 1989.
"CD Author/CD Answer," Dataware Technologies, date unclear.
Chan, Patrick P., Learning Considerations in User Interface Design: The Room Model, Software Protability Laboratory, University of Waterloo, Waterloo, Ontario, Canada, Jul. 1984.
"Chapter 1: Component Object Model Introduction," OLE Development, Microsoft Corporation, Copyright 1997, pp. 1-37.
Christodoulakis, S., et al., Browsing Within Time-Driven Multimedia Documents, Institute for Computer Research, University of Waterloo, Waterloo, Ontario, Canada, pp. 219-227, Jul. 1988.
Classified Search and Image Retrieval Student Manual, U.S. Patent and Trademark Office, May 1991.
Cohen, "Browsers get BookWorm for Mac," MacWeek, vol. 7, No. 39, Oct. 4, 1993, p. 4.
Commands and Settings, OmniPage Professional Windows Version 5, Caere Corporation, Chapter 1, pp. 1-1 to 1-70, 1988-1993.
The Complete Document Profiling and Retrieval System for Windows, World Software Corporation, WORLDOX, Copyright World Software Corp., 1992.
Conklin, "Hypertext: An Introduction and Survey," Computer, pp. 17-41, Sep. 1987.
Cooper et al., "Oh! Pascal!," pp. 389-399, Jan. 1982.
Cote et al., "Searching for Common Threads," Byte, vol. 17, No. 6, Jun. 1992, pp. 290-305.
Creation/Modification of the Audio Signal Processor Setup for a PC Audio Editor, IBM Technical Disclosure Bulletin, vol. 30, No. 10, Mar. 1988.
Curran, "Growing company changes data entry," ImagingWorld, vol. 4, Issue 3, Mar. 1995.
"Dataware Technologies: Products and Services," Dataware Technologies, Copyright 1996.
Dintzer, J.P. and J. Van Thielen, "Image Handling at the European Patent Office: BACON and First Page," World Patent Information, vol. 13, No. 3, pp. 152-154, 1991.
Doherty, "New Op-Disk Peripherals Displayed at Conference," Electronic Engineering Times, No. 339, Jul. 22, 1985, p. 15.
Duncan, "ZyIMAGE's Use of Windows Interface Falls Short of Mark," LAN Times, vol. 10, Issue 10 May 24, 1993, pp. 70 and 79.
"Eastern Electricity: BRS/Search Customer Profile," Dataware Technologies, Copyright 1995.
Editing Recognized Documents, OmniPage Profession Windows Version 5, Caere Corporation, Chapter 3, pp. 3-1, to 3-20, 1988-1993.

(56) References Cited

OTHER PUBLICATIONS

"EZ-C + DE2 Images: The New Standard in Data Capture," Textware Corporation, Copyright 1994, pp. 1-8.
The Fastest, Most Powerful Full Text Retrieval System, ZyINDEX 5.2 for Windows, Zylab, 1994.
Fersko-Weiss, "3-D Reading with the Hypertext Edge," PC Magazine, vol. 10, No. 10, May 28, 1991, pp. 241-282.
Fish et al., "Quilt: a collaborative tool for coopertive writing," Conf. on Information Systems '88, pp. 30 to 37, Jan. 1988.
"Forms Processing Products & Services," TextWare Corporation, Copyright 1996.
"FormWare for Windows 95/NT," TexcWare Corporation, Copyright 1996.
"Fuzzy Searching," Executive Technolgies, Inc., Last Updated: Jan. 12, 1996.
Gerber, "Lotus rolls out gateway for Notes, cc: Mail," InfoWorld, vol. 14, No. 46, p. 1(2), Nov. 1992.
Halasz et al., "Issues in the Design of Hypermedia Systems," CHI '90 Tutorial, Jan. 1990.
Harney, "TextWare's FormWare—Complex Data Capture that Puts Simpicity First," Imaging Magazine, Apr. 1996.
Haskin, "Textware 4.0: Text Retrieval for Electronic Documents," Computer Shopper, vol. 13, No. 8, Aug. 1993, p. 334-335.
Haskin, "Zylmage Finds Images and Text," PC-Computing, vol. 6, No. 5, May 1993, p. 60.
Help Yourself! With PCT Patent Search on CD-ROM, MicroPatent, New Haven, CT, appears to be before Jul. 1, 1993.
"Hip Products," ZyLab Europe BV, Copyright 1996.
Holtz, Mastering Ventura; Second Edition, pp. 360-375, Jan. 1989.
How to Install and Use the USAPat Demonstration Disc, USPTO Office of Information Products Development, 1994(?).
HyperCard Basics, Apple Computer, Inc., 1990.
"IDI brings Basis plus down to workgroups," The Seybold Report on Publishing Systems, vol. 22, No. 14, p. 16(2), Apr. 1993.
"InnerView for Windows 3.0, for Evaluation Only, Version 2.2 Pre-Release #6," TMS, Inc. Copyright 1991-1992.
Ishii, H., et al., "Clearface: Translucent Multiuser Interface for Team Work Station," ECSCW, Sep. 1991, pp. 6-10.
Ishii, H., et al., "Toward an Open Shared Workspace," Communications of the ACM, Dec. 1991, vol. 34, No. 12, pp. 37-50.
Jonckheere, C., "EPOQUE (EPO Query service) the Inhouse Host Computer of the European Patent Office," World Patent Information, vol. 12, No. 3, pp. 155-157, 1990.
Karraker, "Voyager Toolkit stretches Expanded Book concept to let users pen their own," MacWeek, vol. 6, No. 11, Mar. 16, 1992, p. 9.
Knibbe, "Zylmage 2 boosts OCR, batch duties," InfoWorld, vol. 15, Issue 51, Dec. 20, 1993, p. 20.
Knibbe, "Zylmage 3.0 will facillitate distribution on CD-ROMs; Boasts integration with WordScan OCR software," InfoWorld, vol. 16, No. 38, Sep. 19, 1994, p. 22.
Lexis-Nexis Printout of a Business Wire Article Entitled: TMS Announces Contract With Major Insurance Information Provider, Business Wire Inc., Feb. 11, 1991.
Lexis-Nexis Printout of a Business Wire Article Entitled: TMS Announces Easy View Available for CD-ROM Publishers, Business Wire Inc., Mar. 9, 1992.
Lexis-Nexis Printout of a Business Wire Article Entitled: TMS Announces Release of Inner View 2.1 Software, Business Wire Inc., Mar. 18, 1991.
Lougher et al., "Supporting long-term collaboration in software maintenance," Conf. on Organizational Computing Systems, pp. 228-238, 1993.
Lucas, Jay, "The Progress of Automation at the U.S. Patent and Trademark Office," World Patent Information, vol. 14, No. 3, pp. 167-172, 1992.
McEvoy, Ed., Object Linking and Embedding: Programmer's Reference, Version 1, Microsoft Press, Redmond, WA, Copyright 1992.
Mallory, "New for Mac: text/graphics retrieval software from TMS," Newsbytes,Jul. 1992.
Marshall, "Text retrieval alternatives: 10 more ways to pinpoint important information,"Infoworld, vol. 14, No. 12, Mar. 23, 1992, pp. 88-89.
Marshall, "ZyImage adds scanning access to ZyIndex," InfoWorld, vol. 16, No. 15, Apr. 11, 1994, pp. 73, 76, and 77.
Marshall, "ZyImage is ZyIndex plus a scan interface integrated," InfoWorld, vol. 15, Issue 10, Mar. 8, 1993, p. 100.
Marshall et al., "ZyIndex for Windows, Version 5.0" InfoWorld, vol. 15, No. 21, May 1993, pp. 127, 129, 133 and 137.
"MasterView for Microsoft Windows," TMS Inc., Copyright 1993.
Matazzoni, "Expanded Book Toolkit 1.0.1," Macworld, vol. 10, No. 6, Jun. 1993, p. 158.
Mendelson, "HyperWriter for Windows," PC Magazine, vol. 14, No. 3, Feb. 7, 1995, pp. 140, 142, and 143.
Moore, "Detaware lands $6.6M GPO pact," Federal Computer Week, vol. 9, No. 27, Sep. 11, 1995, pp. 84 and 86.
Moore, "The Forms Processing Paradigm Shift," Imaging Magazine, Mar. 1995.
"NetAnswer Hosting Service," Dataware Technologies, Inc., Copyright 1995.
"NetAnswer: Information Super Server for the World Wide Web," Dataware Technolgies, Inc., Copyright 1995.
"NetAnswers: Organizations Worldwide Take Content Onto the Web with NetAnswer," Dataware Technolgies, Spring 1996.
OmniPage Professional Tutorials, Windows Version 5, Caere Corp., Jan. 1993.
Ores, "Hypertext Publishing: Edit Trail," PC Magazine, vol. 14, No. 3, Feb. 7, 1995, pp. 132, 134, 136, and 138.
Patents on CD-ROM, Track Technology, Focus R& D, Watch Competitors, Speed Products to Market, Cut Online/Copy Costs, A World of Opportunities, from MicroPatent, MicroPatent USA, New Haven, CT, appears to be before Sep. 1, 1992.
"PatenImages, User Profile European Patents, Search & Tech Tips, Conference Calendar," MicroPatent World Newsletter, Spring 1991, New Haven, CT.
Pelham, A., "A Wave of the Wand for Litigators. Tools of the Trade Go High-Tech, Focus on Technology," Legal Times, Jan. 24, 1994.
Perenson, "Retrieving Text on the Net," PC Magazine, vol. 14, No. 20, Nov. 21, 1995, p. 61.
Previewing the Letter, WordPerfect Workbook for IBM Personal Computers, WordPerfect Corporation, Version 5.0, Lesson 4, p. 24 and Lesson 13, pp. 108-109, 1988.
Quattro Pro User's Guide, Borland Int'l Inc., p. 245, Jan. 1989.
"Re:Search V.2.6," Software Product Specification, Computer Select, Nov. 1993.
Rooney, "Text-retrieval veterans prepare Windows attack," PC Week, vol. 9, No. 24, p. 46, Jun. 1992.
Rooney, "ZyLab partners with Calera: films roll out document-image system," PC Week, vol. 10, No. 3, Jan. 25, 1993, p. 22.
Schroeder, "Low Price Point Is Key for Buyers of Text Databases," PC Week, vol. 8, No. 20, May 20, 1991, pp. 120 and 122.
Schroeder, "Multimedia offerings target expanded platform support," PC Week, vol. 10, No. 13, Apr. 5, 1993, pp. 59 and 73.
Schwartz, "Dataware Plants CD-ROM Seeds," Computer Systems News, No. 403, Feb. 6, 1989, p. 33.
Search Results from Dialog Search for MicroPatent for News Releases and Corporate Announcements Relating to APS, FullText, PatenImages, Espace, Dialog Files: 148, 479 and 648, 1989-1991.
Simon, "ZyImage: A Winning Combination of OCR and Text Indexing," PC Magazine, vol. 12, No. 6, Mar. 30, 1993, p. 56.
Simpson, Mastering WordPerfect 5.1 & 5.2 for Windows, p. 58, Jan. 1993.
Somers, "Personal Text-Retrieval Software Works with Calera's WordScan," PC Magazine, vol. 14, No. 2, Jan. 24, 1995, p. 68.
Spencer, "Tijuana data entry shop logs 500K forms/day," ImagingWorld, vol. 4, Issue 4, Apr. 1995.
Spitzer, "Needles in Document Haystacks" DBMS, vol. 9, No. 1, Jan. 1996, pp. 84-87.
Sullivan, "Dataware's CD Author System to Boast Hypertext Capability," PC Week, vol. 8, No. 31, Aug. 5, 1991, pp. 31-32.
"Text Retrieval Products & Services," TextWare Corporation, Copyright 1996.

(56) References Cited

OTHER PUBLICATIONS

"TextWare: Instant Information Access," TextWare Corporation, Copyright 1995.
"TextWare Pricing," TextWare Corporation, Effective Mar. 26, 1996.
Thompson et al., Full Write Professional—A User's Guide, pp. 99-122, 1988.
Torgan, "ZyImage: Document Imaging and Retrieval System," PC Magazine, vol. 12, No. 3, Feb. 9, 1993, p. 62.
"Toshiba America Information Systems: CD-ROM Customer Profile," Dataware Technologies, Copyright 1995.
"Total Recall," Dataware Technologies, Copyright 1995.
Tredennick, Jr., C., "Full-Text Search and Retrieval Winning Big With Computers," Law Practice Management, vol. 19, No. 8, Nov./Dec. 1993.
Tribute, "Searching CeBit for publishing products; Power Mac draws the crowds at Hannover show," Seybold Report on Publishing Systems, vol. 23, No. 15, Apr. 22, 1994, pp. 5-8.
Ueda, H., et al., "An Interactive Natural-Motion-Picture Dedicated Multi-Media Authoring System," Mar. 1991, pp. 343-350.
Understanding OCR, OmniPage Professional Windows Version 5, Caere Corporation, Chapter 6, pp. 6-1 to 6-8 and Glossary pp. 1-8, 1988-1993.
"Voyager cd-roms," Voyager, Spring, 1996.
"Voyager: cd-rom catalog," Voyager, 1996-1997.
Wiggins, R.W., Networked Hypermedia: The World-Wide Web and NCSA Mosaic, The Internet for Everyone—A Guide for Users and Providers, Chapter 13, pp. 245-290, McGraw-Hill, Inc., 1995.
"WorldView V. 1.1 and WorldView Press V. 1.0.2," Software Product Specification, Computer Select, Nov. 1993.
Young, "UK Police Put Criminals On-Line With New National Computer," Imaging Magazine, Aug. 1995.
"ZyImage," ZyLab International, Inc., Copyright 1996.
"ZyImage: Common Questions Asked About ZyImage," ZyLab Europe BV, Copyright 1996.
"ZyImage Web Server," ZyLab Europe, BV, Copyright 1996.
ZyIndex Developer's Toolkit Version 5.0 for Windows, Programmers Guide, Information Dimensions, 1992.
"ZyIndex for Windows User's Guide," ZyLab Division, Copyright 1992, pp. 1-262.
"ZyLab: The Full Text Retrieval & Publishing Experts," ZyLab Europe BV, Copyright 1996.
"ZyLab retrieval engine optimized for CD-ROM; ZyLab, Progressive Technologies merge," Seybold Report on Desktop Publishing, vol. 8, No. 10, Jun. 6, 1994, p. 40.
Ishii, H. "TeamWorkStation: Towards a seamless shared workspace", Proceedings of CSCW '90, Oct. 1990, pp. 13-26.
Canzil, G. et al., "SDDS: Scientific Document Delivery System", TEX for Scientific Documentation, ed. By D. Lucarella, pp. 15-25, (1985).
Cefriel, S. P. et al., "ALIVE: A distributed live-link documentation", Electronic Publishing, vol. 5(3), pp. 131-142, (Sep. 1992).
Chamberlain, D.D. et al., "JANUS: An interactive document formatter based on declarative tags", IBM Systems Journal, vol. 21, No. 3, pp. 250-271, (1982).
Croft, W. Bruce, et al., "A Loosely-Coupled Integration of a Text Retrieval System and an Object-Oriented Database System", 15.sup.th Annual International SIGIR '92, pp. 223-232.
Dengel, Andreas et al., "From Paper to Office Document Representation", Computer, Jul. 1992, pp. 63-67.
Ferguson, Michael J., "TEX is Multilingual", 1988 Conference Proceedings of the TEX Users Group, pp. 179-187.
Using FrameMaker: FrameMaker 4 X/Motif Version, pp. 27-1 thru 27-30, Copyright 1986-1993 Frame Technology Corporation.
Furuta, Richard, "Important papers in the history of document preparation systems: basic sources", Electronic Publishing, vol. 5(1), pp. 19-44, (Mar. 1992).
Haan, Bernard J. et al., "IRIS: Hypermedia Services", Communications of the ACM, vol. 35, No. 1, pp. 36 and 38-51, (Jan. 1992).

Kahn, Paul, "Linking Together Books: Experimental in Adapting Published Material into Intermedia Documents", Hypermedia, vol. 1, No. 2, pp. 111-145, (1989).
Knuth, Donald E., The TEXbook, Addison-Wesley Publishing Company, 1986.
Knuth, Donald E. and Michael F. Plass, "Breaking Paragraphs into Lines", Software-Practice and Experience, vol. 11, pp. 1119-1184, (1981).
Koons, W. Randall et al., "The Computer Sciences Electronic Magazine: Translating From Paper to Multimedia", CHI '92 Conference Proceedings, pp. 11-18, (May 3-7, 1992).
Lesk, Michael, "The Core Electronic Chemistry Library", SIGIR '91 Proceedings of the Fourteenth Annual International ACM/SIGR Conference on Research and Development in Information Retrieval, 93-112, (Oct. 13-16, 1991).
Meyrowitz, Norman, "Intermedia: The Architecture and Construction of an Object-Oriented Hypermedia System and Application Framework", OOPSLA '86 Proceedings, pp. 186-201, (Sep. 1996).
Miyazawa, M. et al., "An Electronic Book: APTBook" Proceedings of the IFIP TC 13 Third International Conference on Human-Computer Interaction, pp. 513-519, (1990).
Myers, Brad A., "Text Formating by Demonstration", Human factors in Computing Systems: Reaching Through Technology, CHI '91 Conference Proceedings, pp. 251-256, (1991).
Nelson, Theodor H., "Replacing the Printed Word: A Complete Literary System", Information Processing 80: Proceedings of IFIP Congress 80, pp. 1013-1021, (1980).
Raymond, Darrell R. and Frank Wm. Tompa, "Hypertext and the Oxford English Dictionary", Communications of the ACM, vol. 31, No. 7, pp. 871-879, (Jul. 1988).
Rubinstein, Richard, Digital Typography: An Introduction to Type and Composition for Computer System Design, pp. 195-233, (Addison-Wesley Publishing Company 1988).
Savoy, Jacques, "The electronic book Ebook3", International Journal of Man-machine Studies, vol. 30, pp. 505-523, (1989).
Story, Guy A., "The RightPages Image-Based Electronic Library for Alerting and Browsing", Computer, pp. 17-25, (Sep. 1992).
Text Search and Retrieval Reference Manual for the Automated Patent System, by the U.S. Department of Commerce and the U.S. Patent and Trademark Office, Section 4, pp. 1-6, (Oct. 1992).
Yankelovich, N. et al., "Reading and Writing the Electronic Book", Computer, pp. 15-29, (Oct. 1985).
Yankelovich, N. et al., "Intermedia: The Concept and the Construction of a Seamless Information Environment", Computer, pp. 81-96, (Jan. 1988).
Lamping et al., A Focus+Context Technique Based on Hyperbolic Geometry for Visualizing Large Hierarchies, obtained via the Internet at http://www.acm.org/sigchi/chi95/electronic/documents/papers/jl.sub.13 bdy.html, Jan. 1995.
"IBM Selects RSS's Royalties Payable Solution: Real Software Systems Provides IBM with Worldwide Software Royalty Payments Solution", from http://www.elcamino.com/rss/7b.htm, Nov. 18, 1996, (2Pages).
"Intellectual Property Management Issues", from http://ww.elcamino.com/rss/2.htm, Copyright 1995, 1997, (2 Pages).
"Real Software Systems, Inc.", from http://ww.elcamino.com/rss/, Copyright 1995, 1997, (2Pages).
"Real Software Systems, Inc.: Alliant Participation Management & Accounting", from http://www.elcamino.com/rss/3b.htm, Copyright 1995, 1997, (4 Pages).
"Real Software Systems, Inc.: Home Video & Title Based Distribution", from http://www.elcamino.com/rss/3d.htm, Copyright 1995, 1997, (3 Pages).
"Real Software Systems, Inc.: Rights Licensing", from http://www.elcamino.com/rss/3c.htm, Copyright 1995, 1997, (3 Pages).
"Real Software Systems, Inc.: Royalties Payable", from http://www.elcamino.com/rss/3a.htm, Copyright 1995, 1997, (4 Pages).
Samtani, Rajan, "Following the Money: Managing Intellectual Property in the Digital Managing Age", from http://www.elcamino.com/rss/7a.htm, Copyright 1995, 1997, (5 Pages).
"Solutions for managing Intellectual Property", from http://www.elcamino.com/rss/3.htm, Copyright 1995, 1997, (2 Pages).

(56) References Cited

OTHER PUBLICATIONS

"Specialized Services", from http://www.elcamino.com/rss/4.htm, Copyright 1995, 1997, (2 pages).
"Universal Selects RSS to Provide Worldwide television Licensing Solution", from http://www.elcamino.com/rss/7c.htm, Apr. 30, 1997, (2 Pages).
"What our customers say about us.", from http://www.elcamino.com/rss/5.htm, Copyright 1995, 1997, (2 Pages).
Dialog Pocket Guide, by Knight-Ridder Information, Inc., Copyright 1995.
Kramer, J., "An Evaluation of the Internet as a Searching Tool for Patents and Intellectual Property: Alternative or Complementary?", from http://www.fplc.edu/ipmall/ipcorner/evals97/ipsi97/internetpatsearch.htm, Publication date appears to be before Jun. 2, 1997, Downloaded May 8, 1998.
"IBM Announces Free On-Line Patent Info Service", Communications Media Center at New York Law School Web Page, Mar. 9, 1997.
"Asian MicroPatent.RTM. Representatives", from http:www.micropat.com/info.asreps.htm, Printed Dec. 6, 1996.
Alexander, S., "Users find tangible rewards digging into data mines", INFOWORLD, vol. 19, Issue 27, pp. 61-62, (Jul. 1997).
"Bertelsmann Portrait", from http://www.bertelmann.de/bag/englisch/prtrait, Date Unknown.
"CHI Research, Inc.: Tracking the World's Technology", from http://www.chiresearch.com, Date Unknown.
"CHI Research, Inc.: Technology Indicators Consulting Services and Products", from http://www.chiresearch.com/services.html, Copyright 1996.
"Derwent Patents Citation Index", from http://www.derwent.com/products/database/pcidesc.html, Date Unknown.
"The Digital Patent Office", Smartpatents, Inc., Date Unknown.
"Essentials for Mapping Your Intellectual Property: Annuities Master Data Center", Prentice Hall Legal Practice Management, 1993.
"Manning & Napier Information Services HomePage", from http://www.mnis.net, Date Unknown.
"Manning & Napier Information Services: Competitive Intelligence", from http://www.mnis.net/compete.shtml. Date Available on Internet Unknown.
"Manning & Napier Information Services: Intellectual Property", from http://www.mnis.net/intellect.shtml, Date Available on Internet Unknown.
"MAPit: Prevent Patent Infringement with the Virtual Patent Advisor", from http://www.mnis.net/mapitdemo, Date Available on Internet Unknown.
"Manning & Napier Information Services: Crawler Technology (Trygon)", from http://www.mnis.net/trygon.shtml, Date Available on Internet Unknown.
"Manning & Napier Information Services: AFCEA Intelligence Professionals Adopt New Paradigm for Information Analysis", from http://www.mnis.net/press10.shtml, Jun. 11, 1997.
"Manning & Napier Information Services: Manning & Napier and RTI announce alliance for corporate information market", from http://www.mnis.net/press9.shtml, May 15, 1997.
"Manning & Napier Information Serivces: Competitive Intelligence Tools Migrating from Government Labs to Corporations", from http://www.mnis.net/press8.shtml, May 15, 1997.
"Manning & Napier: Manning & Napier Information Services", from http://www.mnis.net/press7.shtml, Apr. 25, 1997.
"Manning & Napier Information Services: Patent Licensing Made Easier With MNIS Data Mining Tools", from http://www.mnis.net/press6.shtml, Jan. 30, 1997.
"Manning & Napier Information Services: Manning & Napier Offers Broad Coverage of Computer and Software Technology Databases", from http://www.mnis.net/press5.shtml, Dec. 3, 1996.
"Manning & Napier Information Services: Innovative Technology Tool Unveiled", from http://www.mnis.net/press4.shtml, Dec. 3, 1996.
"Manning & Napier Information Services: Zolowicz to Head Intellectual Property Unit at Manning & Napier Information Services", from http://www.mnis.net/press3.shtml, Nov. 18, 1996.
"Manning & Napier Information Services: Breakthrough in Intelligent Information Analysis From Software That Thinks Like Humans", from http://www.mnis.net/press2.shtml, Sep. 16, 1996.
"Manning & Napier Information Services: MNIS Announces System for Improving Software Patents—At ABA Conference", from http://www.mnis.net/press.shtml, Jun. 28, 1996.
"Master Data Center: PC Master Patent Lite for Windows", Master Data Center, Date Unknown.
"Master Data Center: PC Master Trademark Lite for Windows", Master Data Center, Date Unknown.
MDC Patent Rules Update, May 1996.
MDC Trademark Rules Update, Apr. 1996.
Mogee Research & Analysis Associates, Homepage URL:http://www.mogee.com, (What We Do) and Hyperlinks (Who We Are(1); Who We Are(2); Competitive Technology Reports; Competitive Technology Report:GPS; Competitive Technology Report:Medical Implants; Data resources; Consulting Services), 1996.
Lucena, John J., "Merlot Design Specification", Version 1.0—D2, Last modified Jun. 24, 1996.
"'New Wave' MetricsWare—Metrics Software You Just Gotta Have", IT Metrics Strategies (Reprint), vol. II, No. 10, Cutter Information Corp.TM., 1996.
"Patent Abstracts of Japan—Now on CDROM", from http://www.netaxs.com/.about.aengel/PAJ/PAJInfo.html, Last Updated Dec. 22, 1995.
PC Master Lite Booklet, Master Data Center Intellectual Property Software and Services, 1996.
"Performance Management: The Way It Should Be . . . ", Panorama Business Views, Inc., Date Unknown.
"Platinum technology and Sybase Inc. Expand Partnership to Deliver Wider Selection of Data Warehouse Solutions", from http:www.platinum.com/press/1996/dw_sybas.htm, Jun. 11, 1996.
Rappaport, I., "Time to Count Your Patents the Way You Would Beans", PCWeek, vol. 14, No. 2, Jan. 13, 1997.
SmartPatent Quarterly Newsletter, vol. 2, No. 3, Winter 1996-1997.
SmartPatent Quarterly Newsletter, vol. 2, No. 4, Spring/Summer 1997.
Stewart, T.A., "Getting Real About Brainpower", Fortune, Nov. 27, 1995, (pp. 201-203).
Stewart, T.A., "Mapping Corporate Brainpower", Fortune, Oct. 30, 1995, (pp. 209-211).
Vantive Corporation Home Page (Delivering TRUE Customer Asset Management) and Various Hyperlinks (Vantive Products and Services; Solution Partners; Vantive HelpDesk; Vantive Sales; Free White Paper), Vantive, 1996.
"Welcome to MicroPatent's PatentWEB.TM. . . . for Patent Information", from http:www.micropat.com/info/welcome.htm, Printed Dec. 6, 1996.
"The History of MicroPatent", from http:www.micropat.com/info/history.htm, Printed Dec. 6, 1996.
"A Few Facts About MicroPatent", from http:www.micropat.com/info/facts.htm, Printed Dec. 6, 1996.
"MicroPatent: Providers of Patent and Trademark Information", from http:www.micropat.com/info/mission.htm, Printed Dec. 6, 1996.
"Patent Searching and Document Delivery Resources", from http:www.micropat.com/info/websrch.htm, 1996.
"MicroPatent's CD-ROM Products", from http:www.micropat.com/info/about.htm, 1996.
"PatentQuery: Search & Deliver", from http:www.micropat.com/info/prelegal.htm, Printed Dec. 6, 1996.
"MicroPatent PatentWEB and Trademark WEB Service Agreement", from http:www.micropat.com/cgi-bin/servagree, Printed Dec. 6, 1996.
"Advanced Patent Data Mining and Visualization Capabilities for Information Users," Apparent Press Release, London, apparent publication date of Dec. 3, 1996 (printed from Manning & Napier Information Services web page at www.mnis.net).
"CHI Research Competitor Assessments," printed from the CHI Research web page at www.chiresearch.com, pp. 1-2, 1996.
"CHI Research Corporate Brain Mapping," printed from the CHI Research web page at www.chiresearch.com, pp. 1-2, 1996.

(56) References Cited

OTHER PUBLICATIONS

"CHI Research Merger & Acquisition Technology Due Diligence," printed from the CHI Research web page at www.chiresearch.com, pp. 1-2, 1996.
"CHI Research Tracking the World's Technology (About CHI Research, Consulting Services and Information Products, History of CHI Research, Science and Technology Indicators, Patent Citation Analysis, and Key Technology Indicators: Number of Patents, Current Impact Index, Technological Strength, Technology Cycle Time, Science Linkage)," printed from the CHI Research web page at www.chiresearch.com, pp. 1-6, 1996.
Edvinsson, Leif et al., Intellectual Capital: Realizing Your Company's True Value By Finding Its Hidden Brainpower, HarperBusiness, New York, NY, 1997.
Kahaner, Larry, Competitive Intelligence: From Black Ops to Boardrooms—How Businesses Gather. Analyze. and Use Information to Succeed in the Global Marketplace, Simon & Schuster, New York, NY, 1996.
Stewart, Thomas, Intellectual Capital: The New Wealth of Organizations, Doubleday, 1997.
Stewart, Thomas A., "Your Company's Most Valuable Asset: Intellectual Capital," Fortune, vol. 130, No. 7, Oct. 3, 1994, pp. 68-74.
"Tech-Line CD User Manual Part 1 Abridged Version for the World Wide Web," printed from the CHI Research web page at www.chiresearch.com, pp. 1-3, 1996.
"Turning Information Into Insight," Press Release, The Business Wire, Apr. 25, 1997 (printed from Manning & Napier Information Services web page at www.mnis.net).
Sibley, J.F., "The EPOQUE Suite of Applications," World Patent Information, Elsevier Science Ltd., 1996, vol. 18, No. 3, pp. 141-148.
Sibley, J.F., "STN Express 4.0, a professional software for successful online searches," World Patent Information, Elsevier Publishing, Mar. 1, 1997, vol. 19, No. 1, pp. 73-75.
Williams, J. et al., "STN Easy: point-and-click patent searching on the World Wide Web," World Patent Information, Elsevier Science Ltd., 1997, vol. 19, No. 3, pp. 161-166.
Iandiorio, Joseph S., "From Start to Finish: Protecting Ideas and Inventions wit Intellectual Property ," Electro/95 International Professional Program Proceedings, Jun. 21-23, 1995, Hynes Convention Center, Boston, MA, pp. 141-149.
International Search Report from PCT Appl. No. PCT/US00/05080, 6 pages, mailed Dec. 18, 2000.
"Where will we be?", from http:www.micropat.com/info/shows.htm, 1996.
"Why should you be interested in Patent Information?", from http:www.micropat.com/info/interested.htm, Printed Dec. 6, 1996.
"United States MicroPatent.RTM. Representatives", from http:www.micropat.com/info.usreps.htm, Printed Dec. 6, 1996.
"Canadian MicroPatent.RTM. Representatives", from http:www.micropat.com/info/canreps.htm, Printed Dec. 6, 1996.
"European MicroPatent.RTM. Representatives", from http:www.micropat.com/info/epreps.htm, Printed Dec. 6, 1996.
"Business Objects Announces Data Mining Partnership With DataMind Corporation," Apparent Press Release, Cupertino, CA, apparent publication date of May 20, 1996 (printed from DataMind web page at www.datamindcorp.com).
"Business Objects to Offer Data Mining for the Masses," Apparent Press Release, San Jose, CA, apparent publication date of Nov. 18, 1996 (printed from Business Objects web page at wwww.businessobjects.com).
Creating Value Through Knowledge Management Conference, Conference handouts, San Francisco, CA, Feb. 20 and 21, 1997.
Kim et al., "Patent Technology Portfolio for SAW Filters," Proceedings 1994 IEEE Ultrasonics Symposium, vol. 1, pp. 139-142, 1994.
Kumamoto, K., "Commercial Databases: The Keypoints and Practical Use. 10. Patent and Trademark," Joho Kanri, vol. 36, No. 10, pp. 914-938, Jan. 1994 (article in Japanese and English abstract submitted herewith).
Narin, Francis, Presentation Figures, "In the Realm of Technology, Asia Looms Ever Larger: Patent Citation as Measures of Corporate and National Strength, Presented at: Stanford University, Asia/Pacific Research Center, Stanford, California," Oct. 29, 1992.
Otake, Y., "Information Each Department in Corporate Needs from the Standpoint of R&D Department," Joho Kanri, vol. 34, No. 7, pp. 635-646, Oct. 1991 (article in Japanese and English abstract submitted herewith).
Stewart, Thomas A., "Trying to Grasp the Intangible," Fortune, vol. 132, No. 7, Oct. 2, 1995, pp. 157-159.
Tech-Line CD Indicators of Technological Excellence Manual Including Introduction to Company Evaluation Using Technology Indicators, Bertelsmann Informations Service, CHI Research Inc., TT-Technologie-Transfer GmbH, 1994.
Warshofsky, Fred, The Patent Wars: The Battle to Own the World's Technology, John Wiley & Sons, Inc., 1994.
"Patent-Monitor", from http:www.fachinformation.bertelsmann.de/verlag/wb/profil.htm, Date Unknown.
"Welcome to ISTA", from http://www.netaxs.com/.about.aengel/ista.htm, Date Unknown.
"Welcome to the MicroPatent PatentWeb", from http:www.micropat.com/patentwebindex.htm, 1996.
Tsugaru, Ryosuke, A Japanese Patent Information Retrieval System in the Internet, Using Dual Database of SGML/HTML and Special Gazette Viewer, Information Processing, Japan, Information Processing Society of Japan, 1998, Apr. 15, vol. 39, No. 4, p. 352-357.
Lawton et al., "The Knowledge Weasel Hypermedia Annotation System," Proceedings of the Fifth ACM conference on Hypertext, 1993.
Leland et al., "Collaborative Document Production Using Quilt," Proceedings of the 1988 ACM Conference on Computer-Supported Cooperative Work, 1988.
Akscyn et al., "KMS: A Distributed Hypermedia System for Managing Knowledge in Organizations," Communications of the ACM, 1988.
L. DeYoung, "Hypertext Challenges in the Auditing Domain," Proceedings of the Second Annual ACM Conference on Hypertext, 1989.
B. N. Reeves "Supporting Collaborative Design by Embedding Communication and History in Design Artifacts," PhD Dissertation Submitted to the Department of Computer Science at the University of Colorado at Boulder, 1993.
Quint et al., "A Structured Authoring Environment for the World-Wide Web," Computer Networks and ISDN Systems, 1995.
Catlin et al., "InterNote: Extending a Hypermedia Framework to Support Annotative Collaboration," Proceedings of the Second Annual ACM Conference on Hypertext, 1989.

\* cited by examiner

| TYPE_ID | NAME | ... |
|---------|------|-----|
| | • • • | |
| T1 | AUTOMATION | |
| T2 | LICENSE AGREEMENT | |
| | • • • | |

TYPE TABLE 1902

FIG. 19

| DOCUMENT_ID | TYPE_ID | ... |
|-------------|---------|-----|
| CONTRACT 1 | T1 | |
| CONTRACT 1 | T2 | |
| CONTRACT 2 | T2 | |
| CONTRACT 3 | T1 | |
| • • • | | |

TYPE DOCUMENT XREF TABLE 2002

FIG. 20

| ANNOTATION TYPE | ATTACHED TO A DATA OBJECT? | SCOPE OF ANNOTATION | | | |
|---|---|---|---|---|---|
| | | DATA OBJECT | CASE | GROUP | TYPE |
| DOCUMENT | YES | | | X | |
| CASE | YES | | X | | |
| GROUP | NO | | | X | |
| TYPE | NO | | | | X |
| ENTERPRISE | YES | X | | | |

235. A COMPUTER PROGRAM PRODUCT, COMPRISING A COMPUTER USEABLE MEDIUM HAVING COMPUTER PROGRAM LOGIC STORED THEREIN, WHEREIN SAID COMPUTER PROGRAM LOGIC ENABLES A COMPUTER TO ANNOTATE AN ELECTRONIC DOCUMENT, SAID COMPUTER PROGRAM LOGIC COMPRISING:

DOCUMENT DISPLAYING MEANS FOR ENABLING THE COMPUTER TO DISPLAY AT LEAST A PART OF SAID ELECTRONIC DOCUMENT;

NOTE DISPLAYING MEANS FOR ENABLING THE COMPUTER TO DISPLAY AT LEAST ONE NOTE HAVING AT LEAST ONE NOTE SEGMENT LINKED TO AT LEAST ONE PORTION OF SAID AT LEAST A PART OF SAID ELECTRONIC DOCUMENT;

LOCATION IDENTIFICATION INFORMATION DISPLAYING MEANS FOR ENABLING THE COMPUTER TO DISPLAY IN SAID AT LEAST ONE NOTE, PROXIMATE TO SAID AT LEAST ONE NOTE SEGMENT, LOCATION IDENTIFICATION INFORMATION IDENTIFYING A LOCATION OF SAID AT LEAST ONE PORTION IN SAID AT LEAST A PART OF SAID ELECTRONIC DOCUMENT; AND

MEANS FOR ENABLING THE COMPUTER TO ENABLE A USER TO CREATE A NEW NOTE SEGMENT IN SAID AT LEAST ONE NOTE, SAID NEW NOTE SEGMENT BEING LINKED TO AT LEAST A PORTION OF SAID AT LEAST ONE PORTION OF SAID AT LEAST A PART OF SAID ELECTRONIC DOCUMENT,

WHEREIN SAID NEW NOTE SEGMENT AND SAID AT LEAST ONE NOTE SEGMENT ARE NESTED NOTE SEGMENTS.

270. THE COMPUTER PROGRAM PRODUCT OF CLAIM 235, WHEREIN SAID COMPUTER PROGRAM LOGIC FURTHER COMPRISES:
    MEANS FOR ENABLING THE COMPUTER TO ENABLE A USER TO INSERT INTO SAID AT LEAST ONE NOTE SEGMENT AT LEAST ONE OF
        (A) A USER-SELECTED PORTION OF SAID ELECTRONIC DOCUMENT,
        (B) A USER-SELECTED PORTION FROM ANOTHER ELECTRONIC DOCUMENT, AND
        (C) USER-CREATED WORK PRODUCT

4104: 235+270. A COMPUTER PROGRAM PRODUCT, COMPRISING A COMPUTER USEABLE MEDIUM HAVING COMPUTER PROGRAM LOGIC STORED THEREIN, WHEREIN SAID COMPUTER PROGRAM LOGIC ENABLES A COMPUTER TO ANNOTATE AN ELECTRONIC DOCUMENT, SAID COMPUTER PROGRAM LOGIC COMPRISING:

DOCUMENT DISPLAYING MEANS FOR ENABLING THE COMPUTER TO DISPLAY AT LEAST A PART OF SAID ELECTRONIC DOCUMENT;

NOTE DISPLAYING MEANS FOR ENABLING THE COMPUTER TO DISPLAY AT LEAST ONE NOTE HAVING AT LEAST ONE NOTE SEGMENT LINKED TO AT LEAST ONE PORTION OF SAID AT LEAST A PART OF SAID ELECTRONIC DOCUMENT;

LOCATION IDENTIFICATION INFORMATION DISPLAYING MEANS FOR ENABLING THE COMPUTER TO DISPLAY IN SAID AT LEAST ONE NOTE, PROXIMATE TO SAID AT LEAST ONE NOTE SEGMENT, LOCATION IDENTIFICATION INFORMATION IDENTIFYING A LOCATION OF SAID AT LEAST ONE PORTION IN SAID AT LEAST A PART OF SAID ELECTRONIC DOCUMENT; AND

MEANS FOR ENABLING THE COMPUTER TO ENABLE A USER TO CREATE A NEW NOTE SEGMENT IN SAID AT LEAST ONE NOTE, SAID NEW NOTE SEGMENT BEING LINKED TO AT LEAST A PORTION OF SAID AT LEAST ONE PORTION OF SAID AT LEAST A PART OF SAID ELECTRONIC DOCUMENT;

WHEREIN SAID NEW NOTE SEGMENT AND SAID AT LEAST ONE NOTE SEGMENT ARE NESTED NOTE SEGMENTS;

4106: WHEREIN SAID COMPUTER PROGRAM LOGIC FURTHER COMPRISES:

MEANS FOR ENABLING THE COMPUTER TO ENABLE A USER TO INSERT INTO SAID AT LEAST ONE NOTE SEGMENT AT LEAST ONE OF (A) A USER-SELECTED PORTION OF SAID ELECTRONIC DOCUMENT, (B) A USER-SELECTED PORTION FROM ANOTHER ELECTRONIC DOCUMENT, AND (C) USER-CREATED WORK PRODUCT.

PATENT REF
TABLE 4402

| REF PATENT NO |
| DOCUMENT_ID |

FIG. 44

PATENT REF
TABLE 4602

| REF PATENT NO | DOCUMENT_ID |
|---|---|
| PATENT B | PATENT A |
| PATENT C | PATENT A |
| PATENT D | PATENT B |

FIG. 46

NON PATENT REF
TABLE 4404

| REF NO |
| DOCUMENT_ID |

FIG. 45

NON PATENT REF
TABLE 4702

| REF NO | DOCUMENT_ID |
|---|---|
| NON-PATENT OBJECT C | PATENT A |
| NON-PATENT OBJECT D | PATENT A |
| NON-PATENT OBJECT A | PATENT B |
| NON-PATENT OBJECT D | PATENT C |

FIG. 47

| REL_TYPE_ID | RELATIONSHIP TYPE NAME | GROUPING |
|---|---|---|
| REL_TYPE_001 | BACKWARD CITATION | |
| REL_TYPE_002 | FORWARD CITATION | |
| REL_TYPE_003 | ORIGINAL (PARENT) | G1 |
| REL_TYPE_004 | CONTINUATION | G1 |
| REL_TYPE_005 | CONTINUATION-IN-PART | G1 |
| REL_TYPE_006 | DIVISIONAL | G1 |
| REL_TYPE_007 | REISSUE | G1 |
| REL_TYPE_008 | REEXAMINATION | G1 |
| REL_TYPE_009 | DESIGN | G1 |
| REL_TYPE_010 | UTILITY | G1 |
| REL_TYPE_011 | SIR (STATUTORY INVENTION REGISTRATION) | G1 |
| REL_TYPE_012 | DEFENSIVE PUBLICATION | G1 |
| REL_TYPE_013 | INVENTION DISCLOSURE MATERIALS | G1 |
| REL_TYPE_014 | PRIORITY DOCUMENT | G1,G2 |
| REL_TYPE_015 | PCT | G1,G2 |
| REL_TYPE_016 | FOREIGN NATIONAL APPLICATION – CANADA | G1,G2 |
| REL_TYPE_017 | FOREIGN NATIONAL APPLICATION – AUSTRALIA | G1,G2 |
| REL_TYPE_018 | FOREIGN NATIONAL APPLICATION – UNITED KINGDOM | G1,G2 |
| REL_TYPE_019 | FOREIGN NATIONAL APPLICATION – TAIWAN | G1,G2 |

RELATIONSHIP TYPE TABLE 5002

FIG. 50A

| | | |
|---|---|---|
| REL_TYPE_020 | FOREIGN NATIONAL APPLICATION-JAPAN | G1,G2 |
| REL_TYPE_021 | FOREIGN NATIONAL APPLICATION-MEXICO | G1,G2 |
| REL_TYPE_022 | FOREIGN NATIONAL APPLICATION-BRAZIL | G1,G2 |
| REL_TYPE_023 | A1 | G1,G2 |
| REL_TYPE_024 | A2 | G1,G2 |
| REL_TYPE_025 | A3 | G1,G2 |
| REL_TYPE_026 | A4 | G1,G2 |
| REL_TYPE_027 | TECHNICALLY RELATED-BASE | G3 |
| REL_TYPE_028 | TECHNICALLY RELATED-IMPROVEMENT | G3 |
| REL_TYPE_029 | CLAIM-DOMINANT | |
| REL_TYPE_030 | CLAIM-SUBSERVIENT | |
| REL_TYPE_031 | CLAIM-IMPROVEMENT | |
| REL_TYPE_032 | CLAIM-INDEPENDENT | |
| REL_TYPE_033 | CLAIM-DEPENDENT | |
| REL_TYPE_034 | TRADEMARK | G1 |
| REL_TYPE_035 | COPYRIGHT | G1 |
| REL_TYPE_036 | TRADE SECRET | G1 |

FIG.50B

DATA OBJECT FAMILY TABLE 5202

| FROM | TO | RELATIONSHIP TYPE |
|---|---|---|
| APPLICATION 1 | LAB NOTEBOOK 1 | INVENTION DISCLOSURE MATERIALS |
| APPLICATION 1 | CONTINUATION 1 | CONTINUATION |
| CONTINUATION 1 | CIP 1 | CONTINUATION-IN-PART |
| CIP 1 | COPYRIGHT 1 | COPYRIGHT |
| CONTINUATION 1 | TRADEMARK 1 | TRADEMARK |
| APPLICATION 1 | PCT 1 | PCT |
| PCT 1 | JAPAN 1 | FOREIGN NATIONAL APPLICATION -JAPAN |
| PCT 1 | CANADA 1 | FOREIGN NATIONAL APPLICATION -CANADA |

FIG. 52

DATA OBJECT FAMILY TABLE 5402

| FROM | TO | RELATIONSHIP TYPE |
|---|---|---|
| BIKE PATENT 1 | BIKE PATENT 2 | TECHNICALLY RELATED–IMPROVEMENT |
| BIKE PATENT 2 | BIKE PATENT 1 | TECHNICALLY RELATED–BASE |
| BIKE PATENT 2 | BIKE PATENT 3 | TECHNICALLY RELATED–IMPROVEMENT |
| BIKE PATENT 1 | BIKE PATENT 2 | CLAIM–SUBSERVIENT |
| BIKE PATENT 1 | BIKE PATENT 2 | CLAIM–IMPROVEMENT |
| BIKE PATENT 2 | BIKE PATENT 1 | CLAIM–DOMINANT |

FIG.54

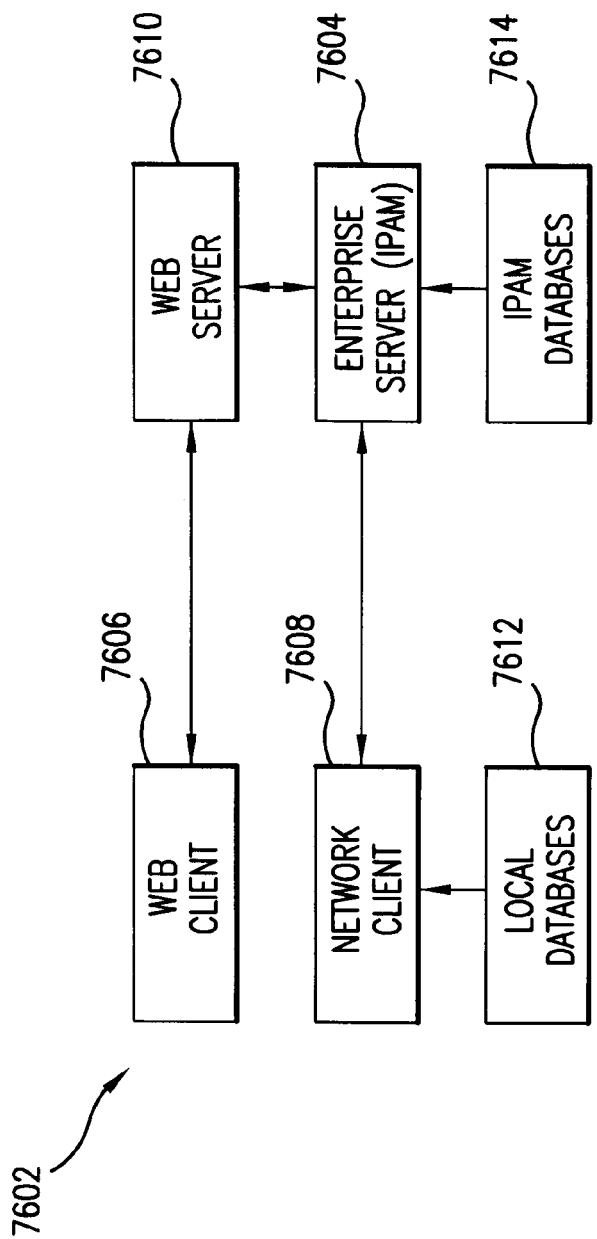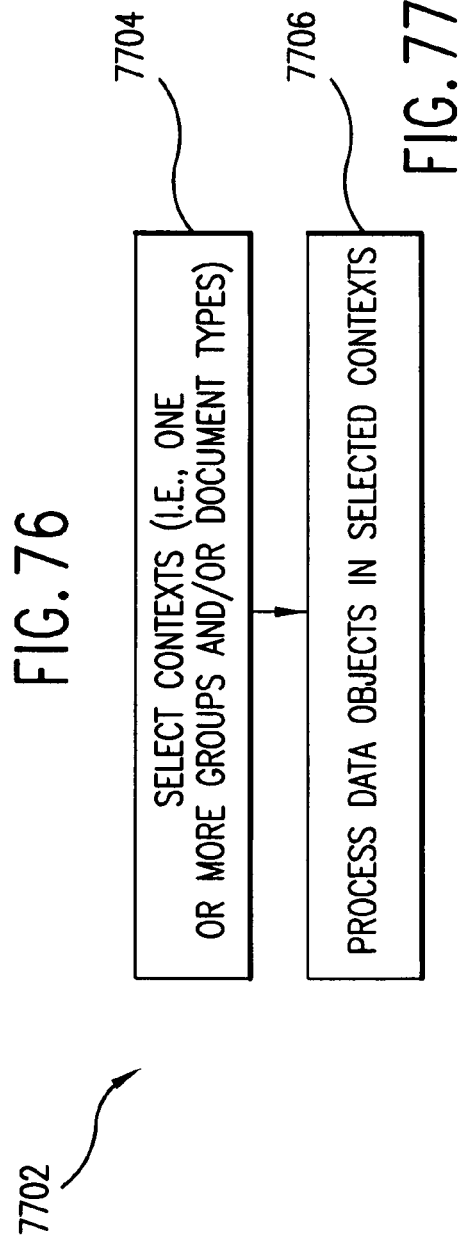

WINDOW 7802

ANNOTATION PENS 7804

[X] 4,826,191X BLOCK 1 OF 5, LINE 66

DETAILED DESCRIPTION

DETAILED DESCRIPTION OF THE PREFERRED EMBODIMENT

THE BICYCLE 10 SHOWN IN FIG.1 INCLUDES A FRAME 12 COMPOSED OF TUBULAR SECTIONS AND HAVING A FRONT FORK 13 FOR ROTATABLY SUPPORTING A FRONT WHEEL 14 AND REAR STRUTS 16 AND 17 WHICH SUPPORT AXLE PLATES 18 FOR ROTATABLY MOUNTING A REAR WHEEL 19. THE WHEELS 14 AND 19 MAY BE THE SAME SIZE, OR THE FRONT WHEEL MAY BE LARGER, AS SHOWN. THE FRAME 12 ALSO INCLUDES AN UPPER BAR 20 FIXED AT ITS FRONT END ADJACENT THE UPPER END OF THE FORK 13 AND AT ITS OTHER END TO THE UPPER END OF A VERTICALLY EXTENDING POST 21. IN ADDITION, THE FRAME HAS A DOWN TUBE 22 FIXED AT ITS FRONT END TO A STEERING HEAD 24 AND EXTENDS DOWNWARDLY AND REARWARDLY THEREFROM WHERE ITS OPPOSITE END IS COUPLED TO THE LOWER END OF THE POST 21. HANDLE BARS 26 ARE CONVENTIONALLY MOUNTED IN THE STEERING HEAD 24 AND A SEAT 25 IS MOUNTED AT THE UPPER END OF THE POST 21.
THE BICYCLE 10 ALSO INCLUDES A DRIVE 30 CONSISTING OF A PRIMARY DRIVE SPROCKET 32 MOUNTED ON A CRANK 33 WHICH IS RECEIVED IN A BEARING 34. THE PRIMARY DRIVE SPROCKET 32 IS MOUNTED FOR ARCUATE MOVEMENT ON THE FRAME 12 BY MEANS OF AN ARM 36 PIVOTALLY MOUNTED AT ONE END ABOUT A SHAFT 38 EXTENDING BETWEEN BEARINGS 39 SECURED TO THE FRAME PART 22. IN PARTICULAR, THE BEARING 34 IS SECURED ADJACENT THE OTHER END OF THE ARM 36 FOR MOVEMENT THEREWITH. A PAIR OF PEDALS 39 ARE ROTATABLY MOUNTED ON THE

┌─────────────────────────────────────────────┐
│ THE SYSTEM ADMINISTRATOR AUTHORIZES A GIVEN USER TO CREATE FORMS. IN OTHER WORDS, THE ABILITY TO CREATE, MODIFY, EDIT, AND OTHERWISE MANAGE FORMS IS PREFERABLY A SECURED OPERATION. THIS IS BECAUSE THE CREATION OF A FORM WILL INCLUDE APPROPRIATE PROVISIONS FOR STORING THE DATA ACQUIRED THROUGH THE USE OF A FORM IN A RELATIONAL DATABASE FOR BACK-END STATISTICAL PROCESSING. │
└─────────────────────────────────────────────┘
                                           ↘ 8304
                        ↓
┌─────────────────────────────────────────────┐
│ THE FORM-CREATOR LOGS INTO THE SYSTEM AND CREATES A FORM TO CAPTURE THE DATA THEY ARE INTERESTED IN CAPTURING. THE INVENTION SUPPORTS SEVERAL DIFFERENT TYPES OF FORM INPUT WIDGETS, INCLUDING RADIO BUTTONS (CHOOSE ONE FROM MANY ITEMS), TEXT INPUT FIELDS, CHECK BOXES (REPRESENTS "YES/NO" OR "TRUE/FALSE") AND SO FORTH. THE FORM-CREATOR EXPLICITLY OR IMPLICITLY ASSOCIATES INPUT WIDGETS WITH THE BACK-END DATABASE TABLES STORED ON THE SERVER. EVEN THE META-CONTENT OF THE TABLES MAY BE STORED WITH THE FORM, ALLOWING FOR THE USE OF SOPHISTICATED DATA MINING APPLICATIONS OF THE FORM AND THE DATA. IT IS ALSO POSSIBLE TO ASSOCIATE PROGRAMMATIC OPERATIONS WITH THE FORM, THEREBY ALLOWING THE FORM-CREATOR TO CONTROL WHAT THE ANNOTATION-CREATOR SEES WHILE THE ANNOTATION CREATOR IS USING THE FORM. EXAMPLES OF SUCH OPERATIONS WOULD INCLUDE "EDIT CHECKS" ON INPUT FIELDS (E.G., THE FORM-CREATOR COULD SPECIFY THAT AN ANNOTATION-CREATOR MUST ENTER IN A NUMBER BETWEEN 0 AND 100 WHEN ENTERING DATA INTO THE FORM). │
└─────────────────────────────────────────────┘
                                           ↘ 8306
                        ↓

FIG. 83A

THE FORM-CREATOR ASSOCIATES THE FORM WITH A PEN OR OTHER ANNOTATION MECHANISM. THIS IS PART OF A "PUBLISHING" PROCESS IN WHICH THE FORM-CREATOR WOULD ALSO SPECIFY APPROPRIATE IDENTIFYING CHARACTERISTICS (SUCH AS THE FORM NAME) AND THE ULTIMATE LOCATION OF THE DATA THAT IS CAPTURED BY THE FORM (SUCH AS A RELATIONAL DATABASE). THE PUBLISHING PROCESS ALSO ALLOWS THE FORM-CREATOR TO SPECIFY WHICH USER OR GROUPS OF USERS SHOULD BE SHOWN THE FORM. USERS ARE IDENTIFIED BY EITHER THEIR LOGIN ID OR BY A "ROLE" ID THAT SPECIFIES THE ROLE THEY ARE ASSUMING WITH RESPECT TO THE OPERATION OF THE SYSTEM. IN THIS WAY THE FORM-CREATOR CAN SPECIFY THE CREATION OF A FORM TO BE USED BY A "MARKETING" PERSON THAT WOULD BE DIFFERENT THAN A FORM USED BY AN "ENGINEERING" PERSON. THE FORM-CREATOR MAY ALSO USE THIS INFORMATION TO CONTROL THE SPECIFIC PRESENTATION OF INFORMATION WITHIN A GIVEN FORM. THE FORM-CREATOR CAN ALSO ASSOCIATE MULTIPLE FORMS WITH AN ANNOTATION MECHANISM. THE FORM-CREATOR DECIDES IF THEY WANT THE SYSTEM TO "ROUTE" THE FORM TO SPECIFIC USERS, AND, IF SO, MANNER OF ROUTING.

8308

THE ANNOTATION-CREATOR CREATES AN ANNOTATION (POSSIBLY THROUGH A PEN). THE SYSTEM INVOKES THE FORM ASSOCIATED WITH THE PEN AND PRESENTS IT TO THE USER. IN THE CASE THAT MULTIPLE FORMS HAVE BEEN ASSOCIATED WITH A SINGLE ANNOTATION MECHANISM, THE SYSTEM WILL PRESENT A CHOICE OF FORMS (E.G., THROUGH A PULL-DOWN MENU OR PICK-LIST). THE USER ENTERS THE APPROPRIATE INFORMATION AND THE SYSTEM STORES THIS INFORMATION IN THE APPROPRIATE LOCATION. THE INFORMATION IS STORED AS SPECIFIED BY THE FORM, SUCH AS IN FIELDS OF ROWS OF DATABASE TABLES.

FIG. 83B  8310

INTELLECTUAL PROPERTY ASSET MANAGER (IPAM) FOR CONTEXT PROCESSING OF DATA OBJECTS

CROSS REFERENCE TO RELATED APPLICATIONS

This application is a continuation-in-part of U.S. application Ser. No. 11/178,367, filed Jul. 12, 2005, now U.S. Pat. No. 7,437,471, which is a continuation of U.S. application Ser. No. 09/545,608, filed Apr. 7, 2000, now U.S. Pat. No. 6,963,920, issued Nov. 8, 2005, which is a non-provisional of Provisional Application No. 60/128,405, filed Apr. 8, 1999, each of which is incorporated herein by reference in its entirety.

U.S. application Ser. No. 09/545,608, filed Apr. 7, 2000 is a continuation-in-part of U.S. application Ser. No. 08/921,369, filed Aug. 29, 1997, now U.S. Pat. No. 6,339,767, issued Jan. 15, 2002, which is a continuation-in-part of U.S. application Ser. No. 08/867,392, filed Jun. 2, 1997, now U.S. Pat. No. 5,991,751, issued Nov. 23, 1999, each of which is incorporated herein by reference in its entirety.

U.S. application Ser. No. 09/545,608, filed Apr. 7, 2000, is a continuation-in-part of U.S. application Ser. No. 09/138,368, filed Aug. 21, 1998, now abandoned, which is a continuation-in-part of U.S. application Ser. No. 08/921,369, filed Aug. 29, 1997, now U.S. Pat. No. 6,339,767, issued Jan. 15, 2002, each of which is incorporated herein by reference in its entirety.

U.S. application Ser. No 09/545,608, filed Apr. 7, 2000, is a continuation-in-part of U.S. application Ser. No. 09/260,079, filed Mar. 2, 1999, now abandoned, which is a continuation-in-part of U.S. application Ser. No. 09/138,368, filed Aug. 21, 1998, now abandoned, which is a continuation-in-part of U.S. application Ser. No. 08/921,369, filed Aug. 29, 1997, now U.S. Pat. No. 6,339,767, issued Jan. 15, 2002, each of which is incorporated herein by reference in its entirety.

U.S. application Ser. No. 09/545,608, filed Apr. 7, 2000, is a continuation-in-part of U.S. application Ser. No. 09/057,557, filed Apr. 9, 1998, now U.S. Pat. No. 6,389,434, issued May 14, 2002, which is incorporated by reference herein in its entirety.

The present application is related to the following applications and patents, each of which is incorporated herein by reference in its entirety: U.S. application Ser. No. 08/832,971, filed Apr. 4, 1997, now U.S. Pat. No. 5,809,318, issued Sept. 15, 1998; U.S. application Ser. No. 09/058,275, filed Apr. 10, 1998, now U.S. Pat. No. 5,950,214, issued Sept. 7, 1999; U.S. application Ser. No. 08/590,082, filed Jan. 23, 1996, now U.S. Pat. No. 5,754,840, issued May 19, 1998; U.S. application Ser. No. 08/662,377, filed Jun. 12, 1996, now U.S. Pat. No. 5,799,325, issued Aug. 25, 1998, U.S. application Ser. No. 08/632,801, filed Apr. 17, 1996, now U.S. Pat. No. 5,806,079, issued Sept. 8, 1998; U.S. application Ser. No. 08/423,676, filed Apr. 18, 1995, now U.S. Pat. No. 5,623,679, issued Apr. 22, 1997; and U.S. application Ser. No. 08/155,752, filed Nov. 19, 1993, now U.S. Pat. No. 5,623,681, issued Apr. 22, 1997.

BACKGROUND OF THE INVENTION

1. Field of the Invention

The present invention is generally related to data processing, and more particularly related to, inter alia, processing data objects in a variety of contexts.

2. Related Art

Patents are becoming more and more important to a business's success, especially in today's global economy. Patents can be viewed as a new type of currency in this global economy because they grant the holder with a right to exclude others from making, using, or selling the patented technology. In some industries, product turnover is fairly rapid. However, core technology, product features, and markets change at a much slower rate. Accordingly, even in fast-moving industries, patents which cover core technology are very valuable at protecting a company's research and development investment for an extended period of time.

Patents are also valuable as revenue generators. In 1993, for example, the revenue generated from patents by U.S. companies was over $60 billion. Fred Warshofsky, *The Patent Wars*, John Wiley & Sons, Inc., New York, 1994. These patent revenue dollars are rising each year.

Patents are further valuable because they collectively represent a vast technological database. According to Larry Kahaner's book, *Competitive Intelligence*, Simon & Schuster, 1996, "More than 75 percent of the information contained in U.S. patents is never released anywhere else."

More and more corporations are recognizing the value of patents. The number of patents applied for and issued to U.S. companies is increasing every year, especially in fast moving industries such as computer software, telecommunications, and biotechnology. Many international companies have also recognized the value of patents. In fact, foreign companies regularly rank among the leaders in issued U.S. patents.

Yet, for all the heightened awareness being paid to patents in some quarters, patents remain one of the most underutilized assets in a company's portfolio. This is due, at least in significant part, to the fact that patent analysis, whether for purposes of licensing, infringements enforcement, freedom to operate, technical research, product development, etc., is a very difficult, tedious, time consuming, and expensive task, particularly when performed with paper copies of patents. Often times, it is a difficult or even impossible task to simply identify relevant patents. Accordingly, detailed patent related analysis is usually not done, or it is done in an ad hoc, unorganized, incomplete, inefficient, and/or ineffective manner.

It would be very beneficial to have automated tools that aid users in processing and analyzing patent-related information and non-patent related information for making corporate business decisions.

SUMMARY OF THE INVENTION

Briefly stated, an embodiment of the invention is directed to systems, methods, computer program products, and combinations thereof, of context data processing. The embodiment operates by selecting one or more contexts. Each context includes one or more attributes, and a plurality of data objects that satisfy the attributes. A list of data objects contained in the selected contexts is displayed. At least some of the data objects in the selected contexts are processed. Such processing may involve generating hierarchical and or directed acyclic graph data structures to represent relationships among the data objects. These data structures can then be displayed in a variety of well-known techniques including but not limited to hyperbolic trees. Examples of such hierarchical or directed acyclic graph structures include claim trees, citation trees, and data object families, which may be displayed using hyperbolic trees.

In an embodiment, the contexts are groups. In other embodiment, the contexts are each associated with a data object type. In this latter embodiment, the contexts include data objects of their respective data object types. The invention is not limited to these embodiments.

The invention supports the generation of annotations. The invention supports a plurality of annotation types, including document annotations, group annotations, data object type annotations, case annotations, and enterprise annotations. The invention also supports form-based annotations.

In an embodiment, the invention is directed to a system having an intellectual property asset manager (IPAM) and a plug-in manager coupled to the IPAM. The system also includes at least one plug-in coupled to the plug-in manager, and at least one external data processing component coupled to the plug-in. In an embodiment, the external data processing component displays data using at least graphs. In another embodiment, the external data processing component displays data using at least maps. The plug-in manager has a first application programming interface (API), and the external data processing component each has a second API. The plug-in translates messages from the plug-in manager to the external data processing component to a format conforming to the second API, and translates messages from the external data processing component to the plug-in manager to a format conforming to the first API.

The invention is also directed to assignee name processing. Such processing operates by selecting a normalized assignee name for an entity, identifying name representations of the entity in a data set, and linking the name representations to the normalized assignee name.

Further features and advantages of the invention, as well as various embodiments of the invention, are described in detail below with reference to the accompanying drawings.

BRIEF DESCRIPTION OF THE FIGURES

The present invention will be described with reference to the accompanying drawings, wherein:

FIG. 9 illustrates a new corporate document kind dialog according to an embodiment of the invention;

FIGS. 10 and 11 illustrate a new security class dialog according to an embodiment of the invention;

FIG. 19 illustrates an example type table;

FIG. 20 illustrates an example type document xref table;

FIG. 23 is a table illustrating the differences between different annotation types;

FIGS. 24-30 illustrate various types of document annotations according to embodiments of the invention;

FIGS. 34-36 illustrate search GUIs according to embodiments of the invention;

FIGS. 39-41 are used to describe a display claim branch function of the present invention;

FIG. 44 depicts a patent ref table according to an embodiment of the invention;

FIG. 45 illustrates a non-patent ref table according to an embodiment of the invention;

FIG. 46 illustrates an example patent ref table;

FIG. 47 illustrates an example non-patent ref table;

FIGS. 50A and 50B depict a table related to relationship types supported by embodiments of the present invention;

FIG. 52 illustrates an example data object family table corresponding to the patent family chronology of FIG. 51;

FIG. 54 illustrates an example data object family table corresponding to the assignee technology patent family of FIG. 53;

FIG. 76 is a block diagram of the enterprise server according to embodiments of the invention;

FIG. 77 is a flowchart representing the operation of the invention when performing context processing according to embodiments of the invention.

FIGS. 78A and 78B illustrate free text annotations according to an embodiment of the invention;

FIGS. 82, 83A, and 83B are flow charts representing the operation of form-based annotations according to embodiments of the invention;

Figure 1:
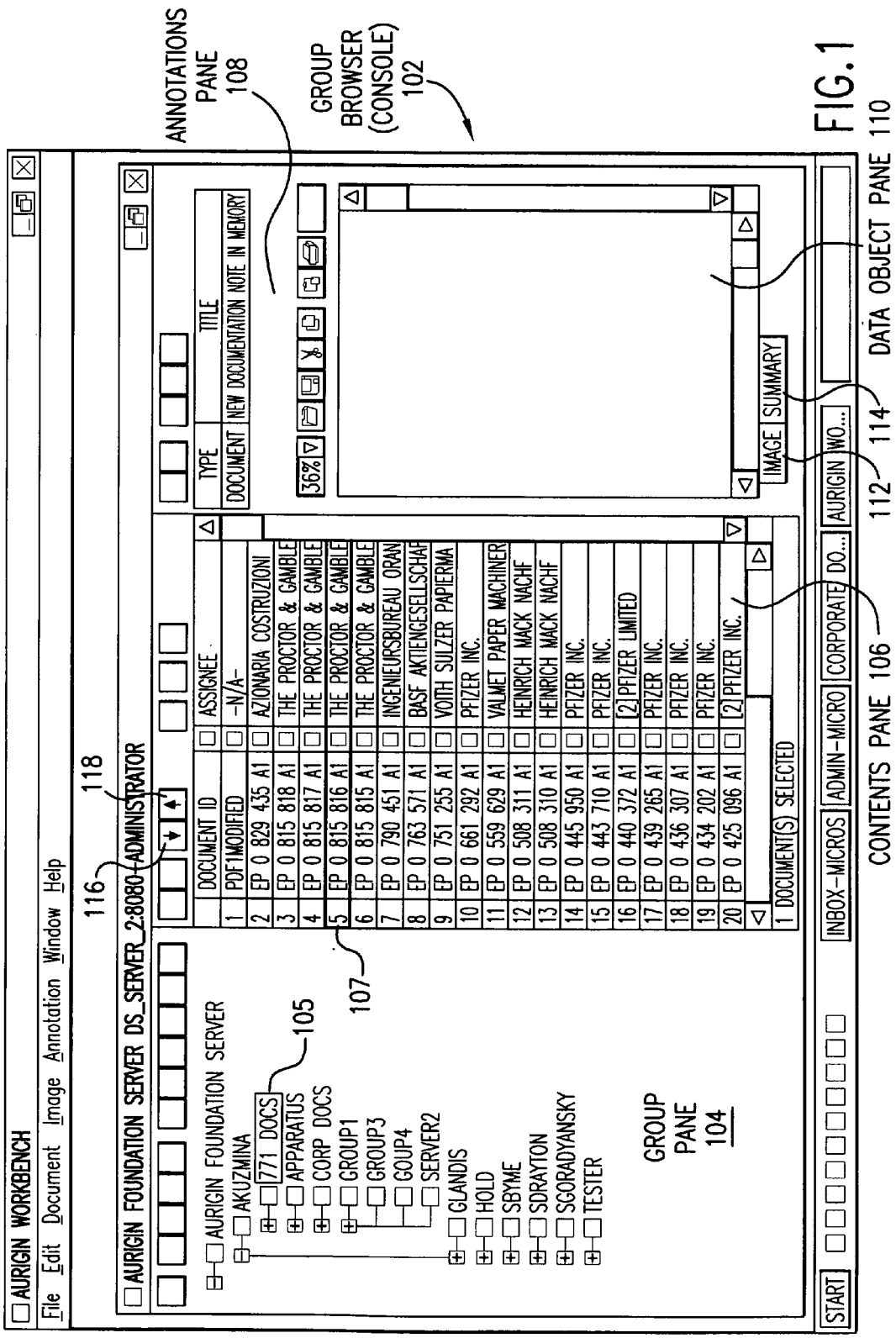
FIG. 1 illustrates an example group browser.

In the following text, reference is sometimes made to existing patents. Also, some of the figures reference or illustrate existing patents. For illustrative purposes, information from and/or about these patents has sometimes been modified or created in order to support the particular examples being discussed. Accordingly, the information provided herein about these existing patents should be considered to be fictional unless verified through comparison with copies of the actual patents that are available from national patent offices.

DETAILED DESCRIPTION OF THE PREFERRED EMBODIMENTS

Table of Contents

Overview of the Invention
Image Skimming
Context Processing
  Group-Centric Processing
  Non-Group-Centric Processing
    Data Object Type Processing
      Corporate Document Browser
      Data Object Kinds
      Security Classes
      Corporate Documents
      Data Object Type Databases
    Context Browser
    Operation of Context Processing
Data Object Preview
Annotation
  Document Annotations
    Patent Annotations
    Corporate Document Annotations
    Image Annotations
  Group Annotations
  Data Object Type Annotations
  Case Annotations
  Enterprise Annotations
  User Interface and Note Processing
  Form-based Annotations
    Medical Example
    Legal Example
    Product Development Example
    Additional Product Development Example
    Medical Teaching Example
Searching
Data Presenting and Processing Using Visualization Technologies, Such as
  Hyperbolic Trees
    Patent Claim Trees
    Patent Citation Trees (patent and non-patent citations)
      Example Databases
    Data Object Family Trees
      Examples of Data Object Families
        Patent Related Families
          Assignee Patent Family Chronology (APFC)
          Assignee Technology Patent Family (ATPF)
          Technology Patent Family (TPF)
        Claim Trees
          Patent Claim Tree (PCT) and Application Claim Tree (ACT)
          Assignee Patent Family Chronology Claim Tree (APFCCT)
          Assignee Technology Patent Family Claim Tree (ATPFCT)
          Technology Patent Family Claim Tree (TPFCT)
      Patent-Trademark Relationship Trees
      Example Databases
      Operational Description
Plug-In Architecture
  Plug-In Architecture
  Plug-In Operation
    Loose Integration
    Tight Integration
  Query Creation and Retention
  Enterprise Server API
  Plug-In Manager API
  Example Third Party Components
    Graph-Based Visualization Tools
    Landscape-Based Visualization Tools
    Data Object Searching Tools
    Other
  Hybrid Models
Assignee Processing
Input of Arbitrary and Potentially Diverse Data Objects
Tool Box Embodiments
Example Implementation
Conclusion
Overview of the Invention The present invention is directed to systems, methods, computer program products, and components and combinations thereof, for processing data objects. Such processing includes, but is not limited to, acquiring data objects, organizing data objects, storing data objects, visualizing data objects, displaying data objects, manipulating data objects, annotating data objects, processing data contained in data objects, etc. The invention is also directed to combinations of the modules and functions described herein, and also described in U.S. patent applications "System, Method, and Computer Program Product for Patent-Centric and Group-Oriented Data Processing," Ser. No. 08/867,392, "Using Hyperbolic Trees to Visualize Data Generated by Patent-Centric and Group-Oriented Data Processing," Ser. No. 08/921,369, "System, Method and Computer Program Product for Managing and Analyzing Intellectual Property (IP) Related Transactions," Ser. No. 09/138,368, herein incorporated by reference in their entireties.

In embodiments of the invention, the data objects include, but are not limited to, patents and patent-related data objects. More generally, the data objects include, but are not limited to, intellectual property related data objects. The data objects also include, but are not limited to, data objects of past, present, or potentially future interest to corporate entities. For illustrative purposes, the invention is sometimes described in terms of these embodiments. However, the invention is not limited to these embodiments. The invention is applicable to data objects of any type and subject matter. Accordingly, description of the invention in terms of these embodiments is provided for illustrative purposes only, and is not limiting.

The invention may be used with immutable data objects (i.e., data objects that cannot be modified), such as but not limited to data objects produced by government agencies and similar institutions. For example, an issued patent is generally considered an immutable data object since it is preferred that it not be modified. An executed contract is another example of a document that can be immutable. However, the invention is not limited to these embodiments. The invention can operate with mutable data objects, and/or data objects produced by private entities.

In embodiments of the invention, the data objects include documents, such as textual documents, image documents, and combinations thereof. For illustrative purposes, the invention is sometimes described in terms of these embodiments. However, the invention is not limited to these embodiments. The invention is applicable to data objects of any type and form, including but not limited to video, audio, sensory, multimedia, tactile, computer programs, links, etc., and combinations thereof. Accordingly, description of the invention in terms of these embodiments is provided for illustrative purposes only, and is not limiting.

In some embodiments, the present invention is intended to aid a corporate entity with planning over its entire enterprise. Accordingly, the present invention is sometimes referred to as an enterprise system and method (or an enterprise server). In some embodiments, the present invention is intended to aid a corporate entity in developing business-related strategies, plans, and actions. Accordingly, the present invention is sometimes referred to as a business decision system (BDS). In some embodiments, the present invention is intended to aid a corporate entity with managing intellectual property assets. Accordingly, the present invention is sometimes referred to as an intellectual property asset manager (IPAM). In any of these embodiments, the invention can run in a single user or a multi-user mode of operation.

Image Skimming

The invention supports an image skimming function. In accordance with the image skimming function, preferably, the first image page of each document in a collection of documents is displayed in succession pursuant to appropriate. user command.

The invention is not limited to this embodiment. In particular, the skimming feature of the invention is not limited to document images. The skimming feature enables one to view or otherwise obtain information about a data object in a form that is consistent with that data object. For example, and without limitation, if a group contained a set of video clips, the skimming pane might allow for a video clip to be displayed/played directly from that window.

FIG. 1 illustrates an example user interface 102 according to embodiments of the invention. The user interface 102 is called a console or a browser.

A group hierarchy is shown in a group pane 104 of the browser 102. A group is a data structure that includes a collection of data objects, such as documents. The data objects in a group typically follow a common theme or characteristic. For example, a first group may include patents and other documents that map to a product being manufactured and sold by a company. A second group may include patents and other documents that map to a product being considered for future manufacture and sale by a company. A third group may include patents and other documents related to a research product. A group may contain other groups, or may be included in one or more groups. Accordingly, in embodiments of the invention, groups are hierarchically organized. Groups are further described in U.S. Patent Application "System, Method, and Computer Program Product for Patent-Centric and Group-Oriented Data Processing," Ser. No. 08/867,392, herein incorporated by reference in its entirety.

As noted above, a group hierarchy is shown in a group pane 104 of the browser 102. In the example of FIG. 1, a group "771 docs" is selected, as indicated as 105. A list of data objects contained in the selected group 105 is displayed in a contents pane 106. In the example of FIG. 1, a document "EP 0815816A1" is selected, as indicated as 107. Information pertaining to the selected data object 107 is displayed in a data object pane 110. Such information, for example, can include a summary and/or bibliographic information of the selected data object 107 (see the summary tab 114 in the data object pane 110), the text of the selected data object 107, and/or image data relating to the selected data object 107 (see the image tab 112 in the data object pane 110). Other information pertaining to the selected data object 107 is also accessible via the data object pane 110, as further described below.

The contents pane 106 includes navigational buttons 116, 118 which preferably operate relative to the selected data object 107 in the contents pane 106. When selected, button 116 (represented as a down arrow) preferably causes information corresponding to at least the first image page of the next data object in the list of data objects in the contents pane 106 to be retrieved and displayed in the image tab 112 of the data object pane 110. The button 118 (preferably represented as an up arrow), when selected, preferably causes data pertaining to at least the first image page of the prior data object in the list of data objects in the contents pane 106 to be retrieved and displayed in the image tab 112 of the data object pane 110.

According to the image skimming function of the present invention, the first image page of successive documents listed in the contents pane 106 is displayed by repeatedly clicking the navigation buttons 116 and 118. Specifically, to move down the list of data objects displayed in the contents pane 106, the down arrow button 116 is pressed by the user. To move up the list of data objects listed in the contents pane 106, the up arrow 118 is repeatedly pressed by the user.

In an embodiment of the invention, the data objects listed in the contents pane 106 represent patents or documents related to patents (including, but not limited to, post-issuance documents). In this embodiment, the image skimming feature of the present invention is analogous to a manual search of patents in the shoes of the patent search room, and the collection of documents being searched is analogous to one or more electronic patent shoes. The collection may be one or more groups, for example. During such manual searches, sometimes called "patent shoe searching," practitioners often quickly thumb through the patents in a patent shoe by looking at the first pages of the patents. The image skimming feature of the present invention enables an operator to quickly electronically scan over the first image pages of the patents listed in the contents pane 106, thereby emulating a manual search through the shoes in the patent office search room.

The present invention, however, represents a significant improvement over a manual patent shoe search. These advantages generally pertain to perspective and scope. Specifically, the present invention provides both a global view of the subject matter being searched, and a detailed view of the subject matter being searched. The global view is represented by the list of patents and related patent data objects listed in the contents pane 106. In particular, the contents pane 106 provides the user with an overview of the data objects that is the subject of the analysis.

The detailed view is represented by the data object pane 110, which provides the user with detailed information regarding the currently selected patent from the contents pane 106.

The global view (i.e., the contents pane 106) and the detailed view (i.e., the data object pane 110) are simultaneously displayed for review by the user. Thus, the user can simultaneously electronically view the list of the patents being searched, and the first page of the currently selected patent. Also, the user can immediately modify the focus of the search by selecting any patent listed in the contents pane 106. Such "random access" is not possible with manual patent shoe searching.

Also, the group pane 104 provides an even higher level view of the subject matter being searched.

Further, while conducting the search, the user can easily and effectively create electronic annotations to capture his or her analysis. The annotation features of the present invention are further described below.

Figure 2:
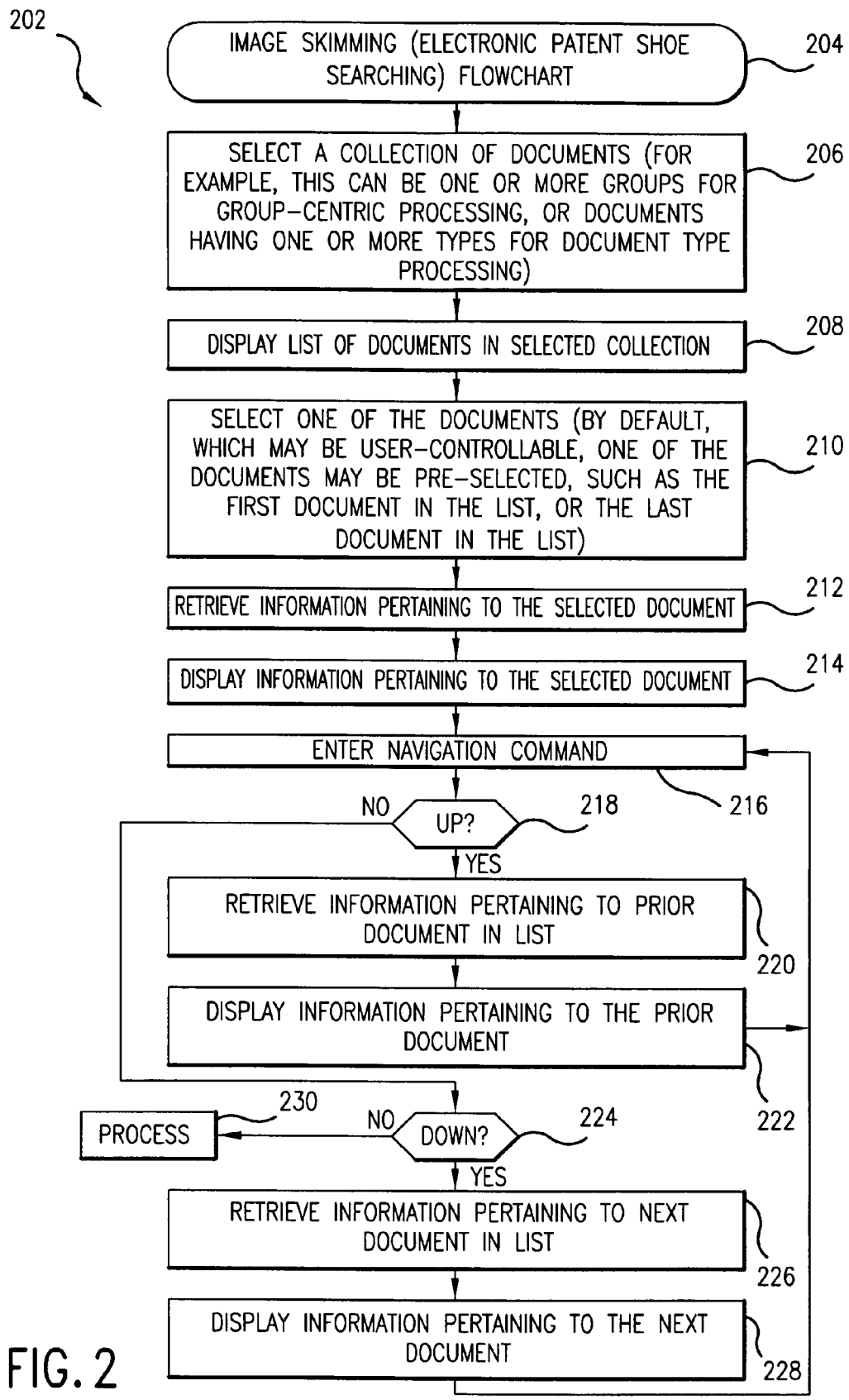
FIG. 2 illustrates a flowchart of image skimming according to an embodiment of the invention.

FIG. 2 illustrates a flowchart 202 representing the operation of the present invention when performing the image skimming function.

In step 206, the user selects a collection of data objects. The collection of data objects can be selected using any of the features and functions of the present invention described herein. For example, the user can conduct a search wherein the data objects identified by the search represents the collection of step 206. Alternatively, the user can select one or more groups, wherein the data objects contained in the selected groups correspond to the collection of step 206. Still alternatively, the user can select one or more document types, wherein all data objects of the selected document types correspond to the collection of data objects of step 206. A document collection/group can be selected through any combination of searches, attributes, document types, etc., all working together (e.g., "Create a group that consists only of license agreements (document type) containing the text "digital video" (keyword search) whose expiration date is between Jan. 1, 1999 and Dec. 31, 1999 (document attribute)).

In step 208, the data objects in the selected collection are displayed in the contents pane 106.

In step 210, one of the data objects listed in the contents pane 106 is selected. Such selection may be manually performed by the user. Alternatively, by default, one of the documents may be preselected, such as the first document in the list, or the last document in the list. This default operation may be user controllable/adjustable.

In step 212, information pertaining to the selected data object is retrieved. Referring to FIG. 76, an attempt to retrieve such information is first made to local databases 7612. If image information of the selected document is not contained in the local databases 7612, then the network client 7608 interacts with the enterprise server 7604 to retrieve the image data from the remote databases 7614. Additional details pertaining to the enterprise server 7604 and the network client 7608, as well as other component shown in FIG. 76, is contained in U.S. Patent Application "System, Method, and Computer Program Product for Patent-centric and Group-oriented Data Processing," Ser. No. 08/867,392, incorporated herein by reference in its entirety.

In step 214, information pertaining to the selected document is displayed in the data object pane 110. Preferably, information corresponding to at least the first image page of the selected document is displayed in the image tab 112 of the data object pane 110.

In step 216, the user enters a navigational command. Specifically, the user either presses the down arrow button 116 or the up arrow button 118.

If the user pressed the up arrow button 118, then information pertaining to at least the first image page of the prior document listed in the contents pane 106 is retrieved and displayed, as indicated by steps 218, 220, and 222. If, instead, the user selected the down arrow button 116, then information pertaining to at least the first image page of the next data object listed in the contents pane 106 is retrieved and displayed. This is represented by steps 224, 226, and 228. If neither the up arrow button 118 nor the down arrow button 116 was pressed by the user, then the system processes the command that was issued as appropriate, as represented by step 230.

Image skimming is further described in U.S. Patent Application "System, Method, and Computer Program Product for Patent-centric and Group-oriented Data Processing," Ser. No. 08/867,392, incorporated herein by reference in its entirety.

Context Processing

The present invention supports context processing. A context is a data structure comprising one or more attributes. The context also comprises data objects that satisfy, follow, relate to, and/or have the context's attributes. Contexts are further described below.

Group-Centric Processing

The invention supports a variety of contexts. For example, a group is a context.

As noted above, a group is a data structure that includes a collection of data objects, such as documents. The documents in a group typically (but not exclusively) follow a common theme or characteristic. Groups are typically (but not exclusively based on subject matter. The data objects in a group relate to (or map to) the subject matter associated with the group. For example, a first group may include patents and other documents that map to a product being manufactured and sold by a company. A second group may include patents and other documents that map to a product being considered for future manufacture and sale by a company. A third group may include patents -and other documents related to a research product.

Accordingly, groups are a context for organization, visualization, analysis, and other processing.

Groups are further described in U.S. Patent Application "System, Method, and Computer Program Product for Patent-centric and Group-oriented Data Processing," Ser. No. 08/867,392, incorporated herein by reference in its entirety.

Non-Group-Centric Processing

The invention supports contexts other than groups. Context processing performed by the present invention that does not involve groups is herein referred to as non-group-centric processing.

The invention supports a variety of non-group-centric contexts. For example, a context can be created as a result of processing performed by the system. A context can be created from documents identified by a forward citation tree operation. Similarly, a context can be created from a backward citation tree operation. Another context can be created by searching all groups and/or data object types in the system containing a given document, or having some attribute. In that instance, the context would include all hits from that search.

A particular context supported by the invention is a data object type context. This context is described below.

Data Object Type Processing

According to the invention, each data object has one or more data object kinds. A data object kind represents a classification of a data object. For example, data object kinds include license agreements, non-disclosure agreements, patents, tax forms, personnel evaluations, software programs, user manuals, technical manuals, copyright registration forms, audio clips, movies, multimedia clips, data object links, annotations, and any other data object or document classification of interest to the user.

Data object kinds represent contexts for organization, visualization, analysis, and other processing. For example, it may be useful to analyze all license agreements in which a corporate entity is a party. In this example, the user selects the data object kind "license agreements." All license agreements associated with the corporate entity are selected and may be analyzed by the user. All other information perhaps pertaining to the corporate entity, but not representing license agreements, are excluded from analysis. Thus, the present invention facilitates the organization, visualization, analysis, and other processing of information of interest to the user.

It is illustrative to note the differences between a group and a data object kind. A group is defined by its attributes, and the documents and other data objects in the group share or follow such attributes. In contrast, a data object kind represents a classification of a data object. The data objects associated with the data object kind may have nothing in common with each other except that they are the same kind of data object.

Figure 4:
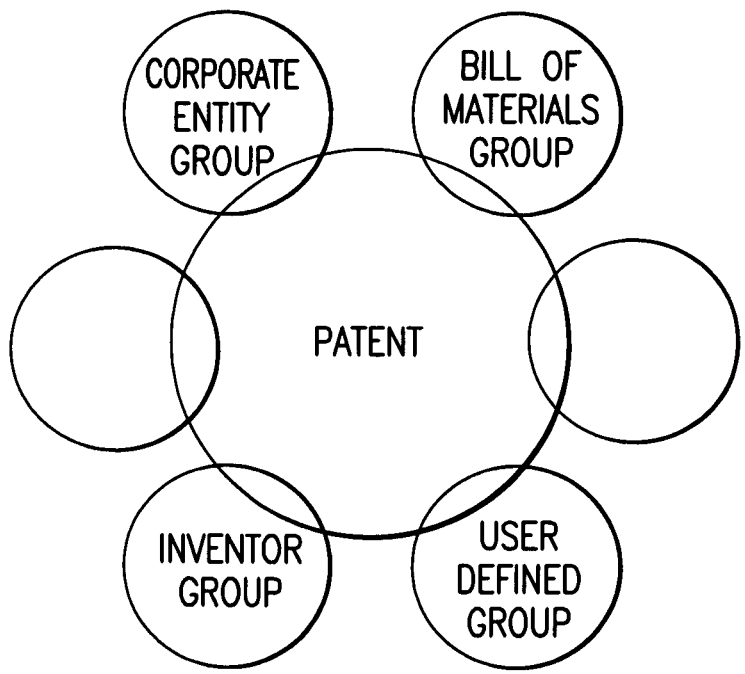
FIG. 4 illustrates a patent being a member of a plurality of groups.
Figure 5:
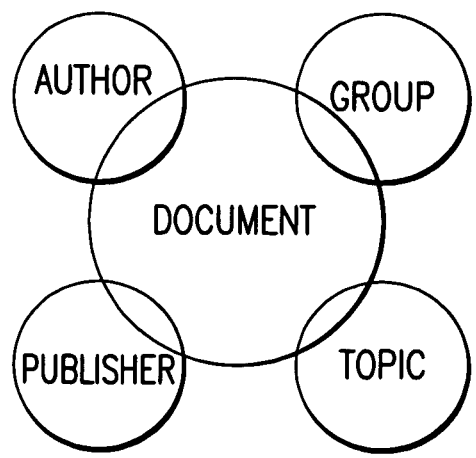
FIG. 5 illustrates a data object, such as a document, being a member of a plurality of contexts.

A given data object, such as a patent, may exist in a plurality of groups. This is illustrated in FIG. 4, where a given patent is contained in a bill of materials group, a user find group, an inventor group, a corporate entity group, etc. Similarly, a data object may exist in a plurality of contexts. This is illustrated in FIG. 5, for example, where a given data object is included in a group context, an author context, a publisher context, and a topic context.

Corporate Document Browser

Figure 6:
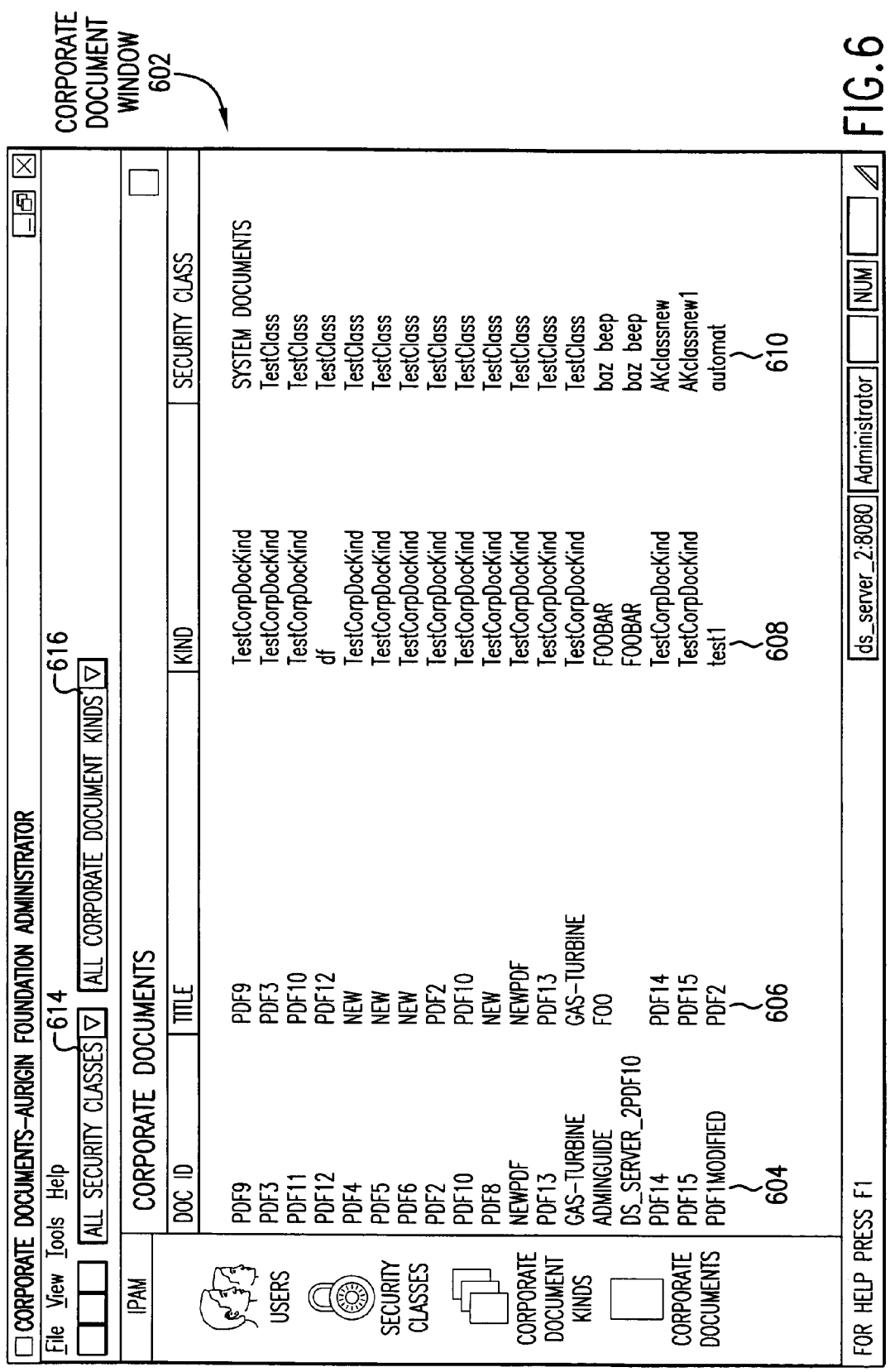
FIG. 6 illustrates a corporate document window according to an embodiment of the invention.

FIG. 6 illustrates an example corporate document window or browser 602. Corporate documents are listed in the corporate document window 602. Preferably, corporate documents are defined as non-patent documents. In alternative embodiments, however, corporate documents may include both patents and non-patent documents.

Each corporate document includes a document ID, a title, a data object kind, and a security class. This information is listed in columns 604, 606, 608, and 610, respectively, of the corporate document window 602.

Figure 7:
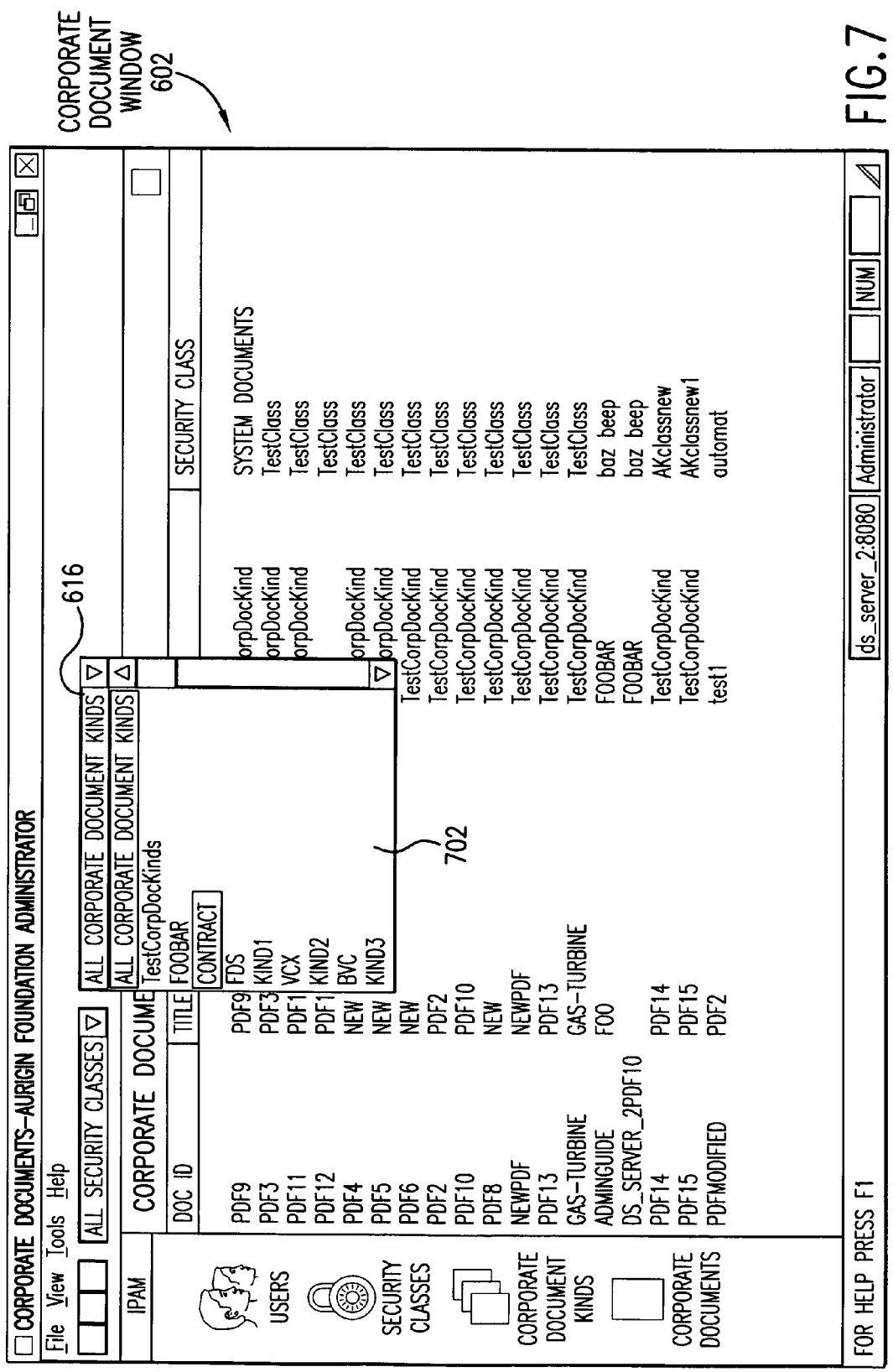
FIG. 7 illustrates filtering in a corporate document window according to document kind.

The invention preferably includes various filters to enable users to limit the documents that are listed in the corporate document window 602. The example corporate document window 602 shown in FIG. 6 includes a security class filter 614 and a data object kinds filter 616. As shown in FIG. 7, the user can select one or more data object kinds for viewing. If, for example, the user selects "contract" in the data object kind filter 616, then only documents having the data object kind of "contract" are listed in the corporate document window 602.

Figure 8:
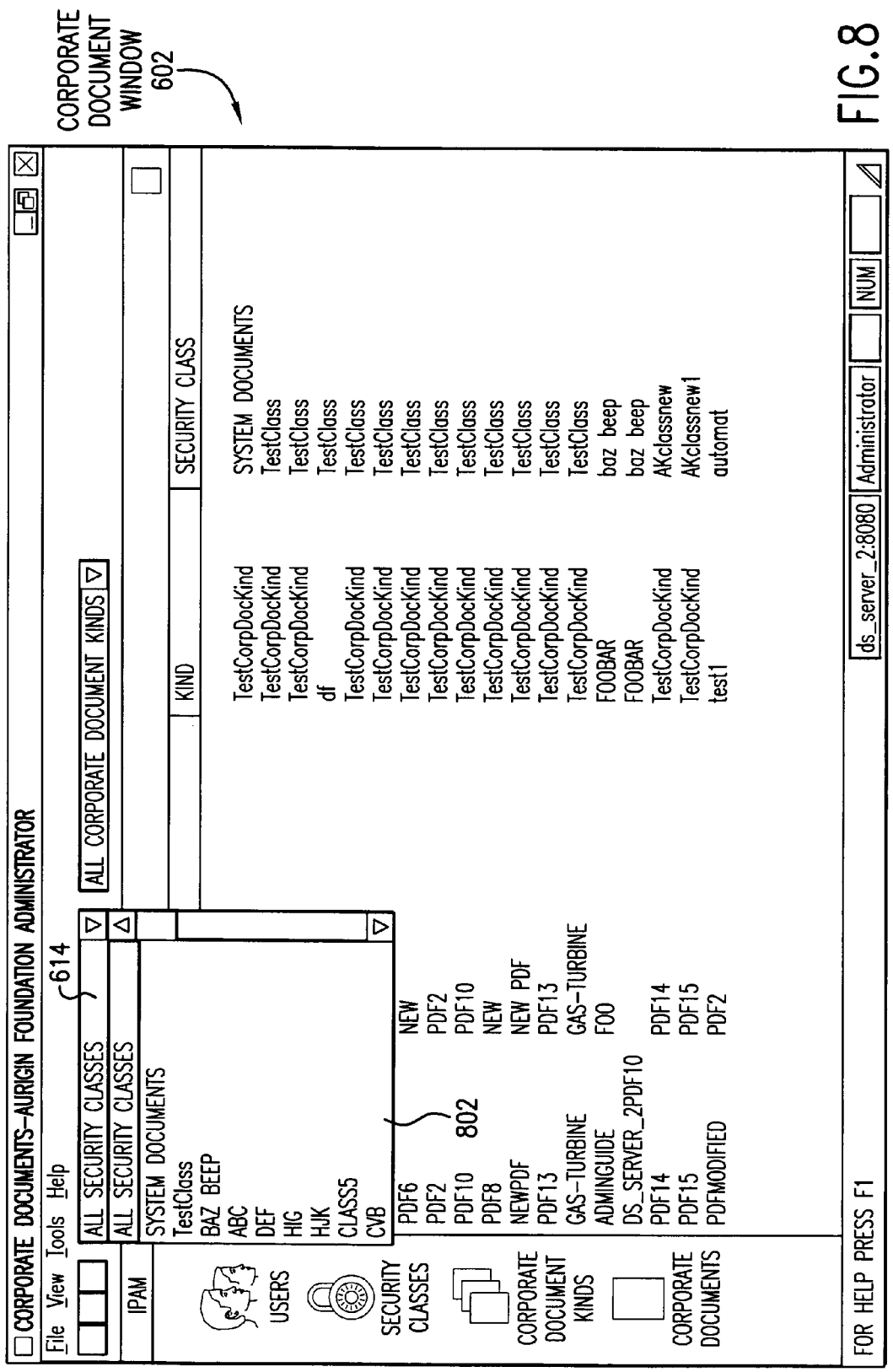
FIG. 8 illustrates filtering in a corporate document window according to security class.

The security class filter 614 allows the user to select one or more security classes. Only documents of the selected security classes are listed in the corporate document window 602. As shown in FIG. 8, for example, if the user selected in the security class filter 614 the class "class 5," then only documents of security class "class 5" are listed in the corporate document window 602.

Preferably, access to documents are restricted/managed/maintained by security information. A user can only access/browse those documents that are consistent with his security information.

The browsers of the invention support inverse functions. An inverse function is one that performs an operation that is the inverse of another operation. For example, browsing a group displays all of the documents in the group. The inverse is browsing all of the groups that contain the document. Many of the browser functions described herein include inverse functions. The inverse functions available for any given browser varies and is implementation dependent.

Data Object Kinds

As noted above, a data object kind is a classification of a document. For example, all license agreements preferably have a data object kind of "license agreement." All non-disclosure agreements preferably have a data object kind of "non-disclosure agreement." All patents preferably have a data object kind of "patent." The level of granularity of the data object kinds is implementation and application dependent. For example, there may be data object kinds for "U.S. patent," "Japanese patent," "Canadian patents," etc.

A data object may have more than one data object kind. For example, a license agreement may have the data object kind of "license agreement" and "contract."

Typically, the data object kind supported by a system varies over time. Also, typically, different systems will have different data object kinds. Generally, the data object kinds defined and supported by a system correspond to the needs of the users of the system. For example, the data object kinds associated with a patent department may include patent, patent application, license agreement, non-disclosure agreement, and patentability opinion. The data object kinds associated with an accounting department may include payroll statement, invoice, account receivable, license agreement, and budget.

Generally, data object kinds can be created for any criteria or attribute of past, present, or future interest. Data object kinds can be arbitrarily created.

Figure 9:
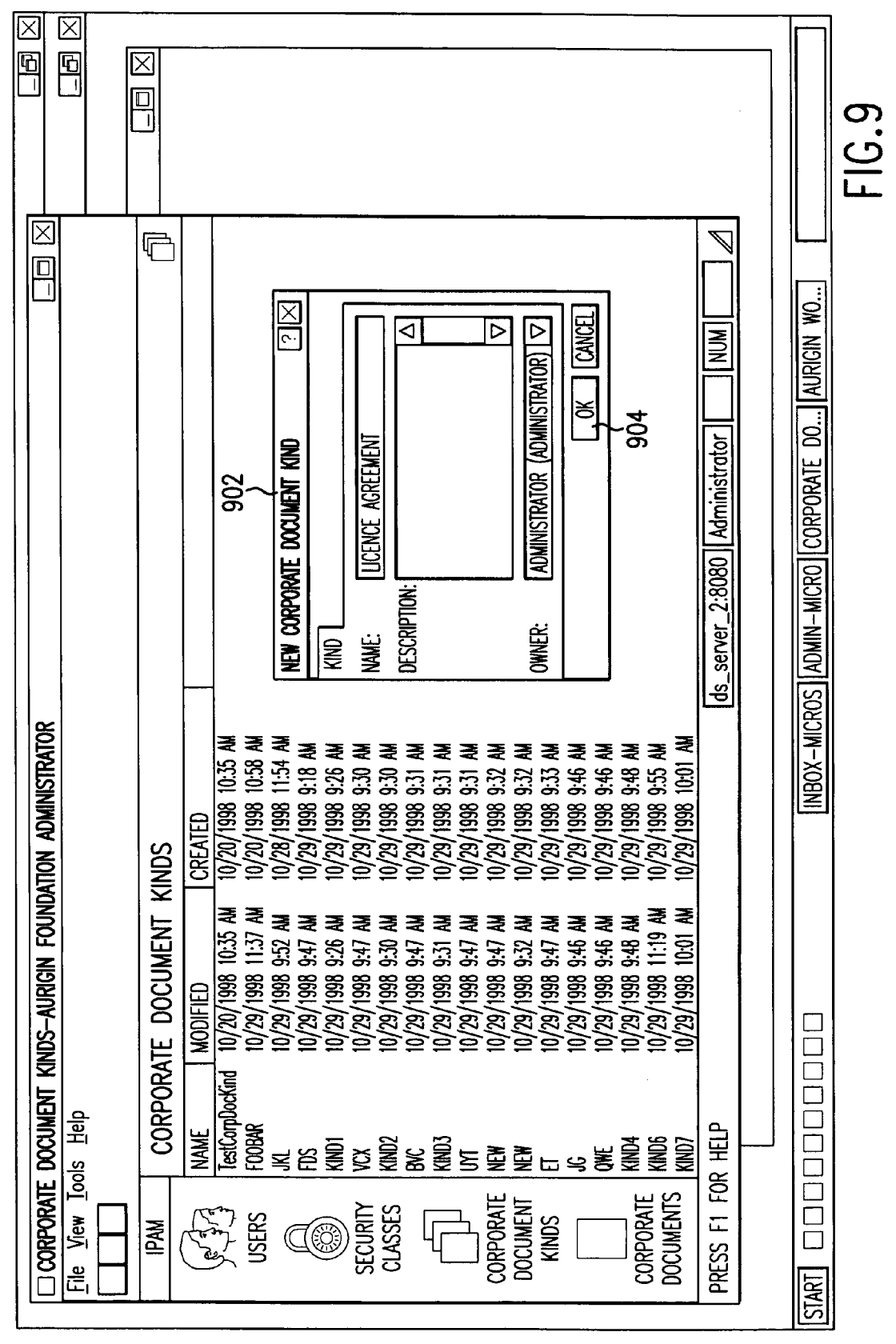

FIG. 9 illustrates a new corporate data object kind window 902, which is displayed when the user elects to create a new data object kind. Preferably, the user enters a name of the data object kind, a description of the data object kind, and an owner of the data object kind. A new data object kind having such name, description, and owner information is created upon pressing the OK button 904.

Security Classes

Preferably, each data object has a security class. Many data objects can have the same security class.

A security class specifies the rights that users have. In other words, a security class specifies user access rights. When a security class is assigned to a document, then access to that document is controlled by the user access rights specified in the security class. Access to the document can be modified by either changing the access rights associated with the security class, or assigning a new security class to the document. For example, suppose that a security class A gives read and write privileges to a user 1. If document X is assigned security class A, then user 1 has read and write privileges to document X.

Figure 10:
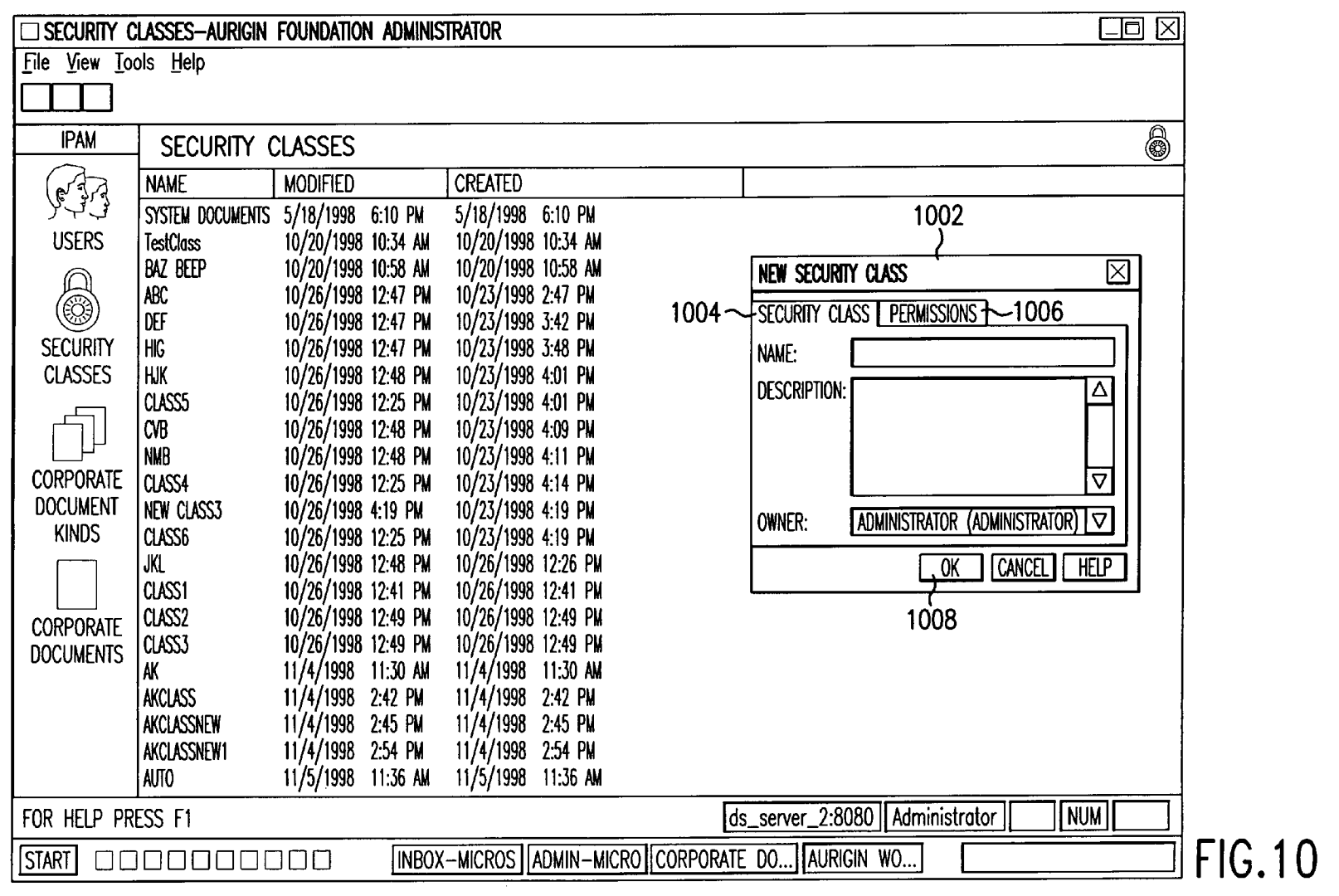
Figure 11:
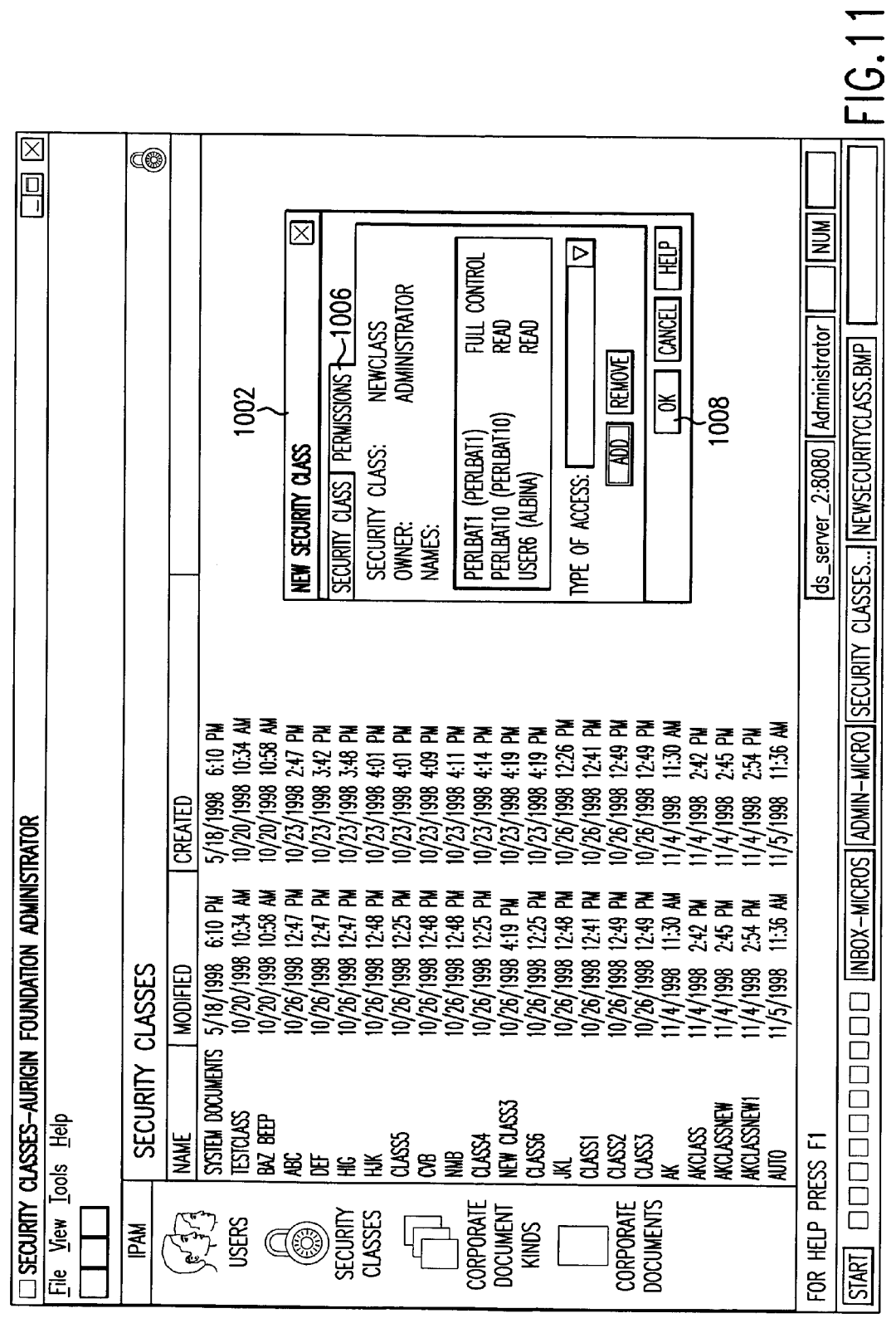

FIG. 10 illustrates a new security class window 1002, which is displayed when the user wishes to create a new security class. Preferably, as indicated by the security class tab 1004 in the new security class window 1002, a security class has a name, description, and owner. Referring to FIG. 11, as indicated by the permissions tab 1006, a security class specifies the access privileges of users. A new security class is created when the name, description, owner, and user access information is entered and the OK button 1008 is pressed.

Corporate Documents

In an embodiment of the invention, a corporate document is a data object in the system. It is noted that the following description is applicable to any type of data object (document or otherwise).

Figure 12:
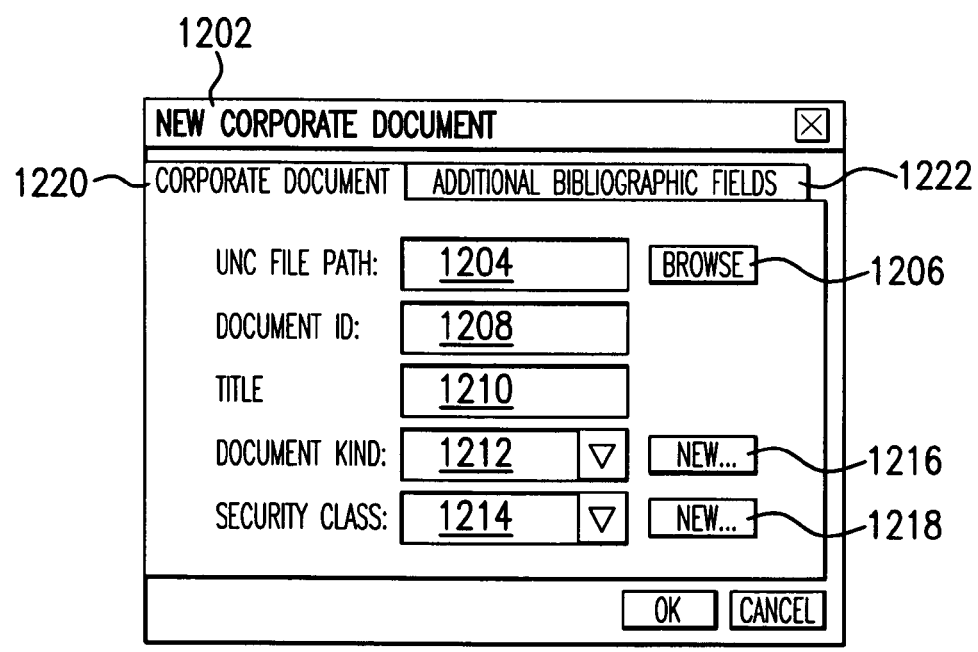
FIG. 12 illustrates a new corporate document dialog according to an embodiment of the invention.

FIG. 12 illustrates a new corporate document window 1202 which is used to create anew corporate document. The new corporate document window 1202 includes a file path field. The path to electronic information representative of the document or other data object that is being added to the system as a corporate document is specified in the file path -field. This path can be specified via well known browsing techniques, which is initiated by pressing the browse button 1206. This is just one mechanism that serves to identify the location of a document. The invention is not limited to this embodiment. Other mechanisms could be used, such as but not limited to the use of a URL (Universal Resource Locator).

The new corporate document window 1202 also includes a document ID field in which the document ID of the new corporate document is displayed. Preferably, the document ID is unique among all corporate documents and data objects, and is manually inputted. Alternatively, it is automatically generated by the system.

The new corporate document window 1202 also includes a title field, in which the user can enter a title of the new corporate document. A data object kind and a security class for the new corporate document can be entered in fields 1212 and 1214. If the user wishes to create a new data object kind, the user can press the new button 1216, in which case the new corporate data object kind window 902 (FIG. 9) is displayed. If the user wishes to create a new security class, the user presses the new button 1218, in which case the new security class window 1002 (FIGS. 10 and 11) is displayed. The user can also enter additional bibliographic information pertaining to the corporate document, such as author, source, disclosure date, and publication date. These fields are available in the additional bibliographic fields tab 1222 (See FIG. 14).

Figure 13:
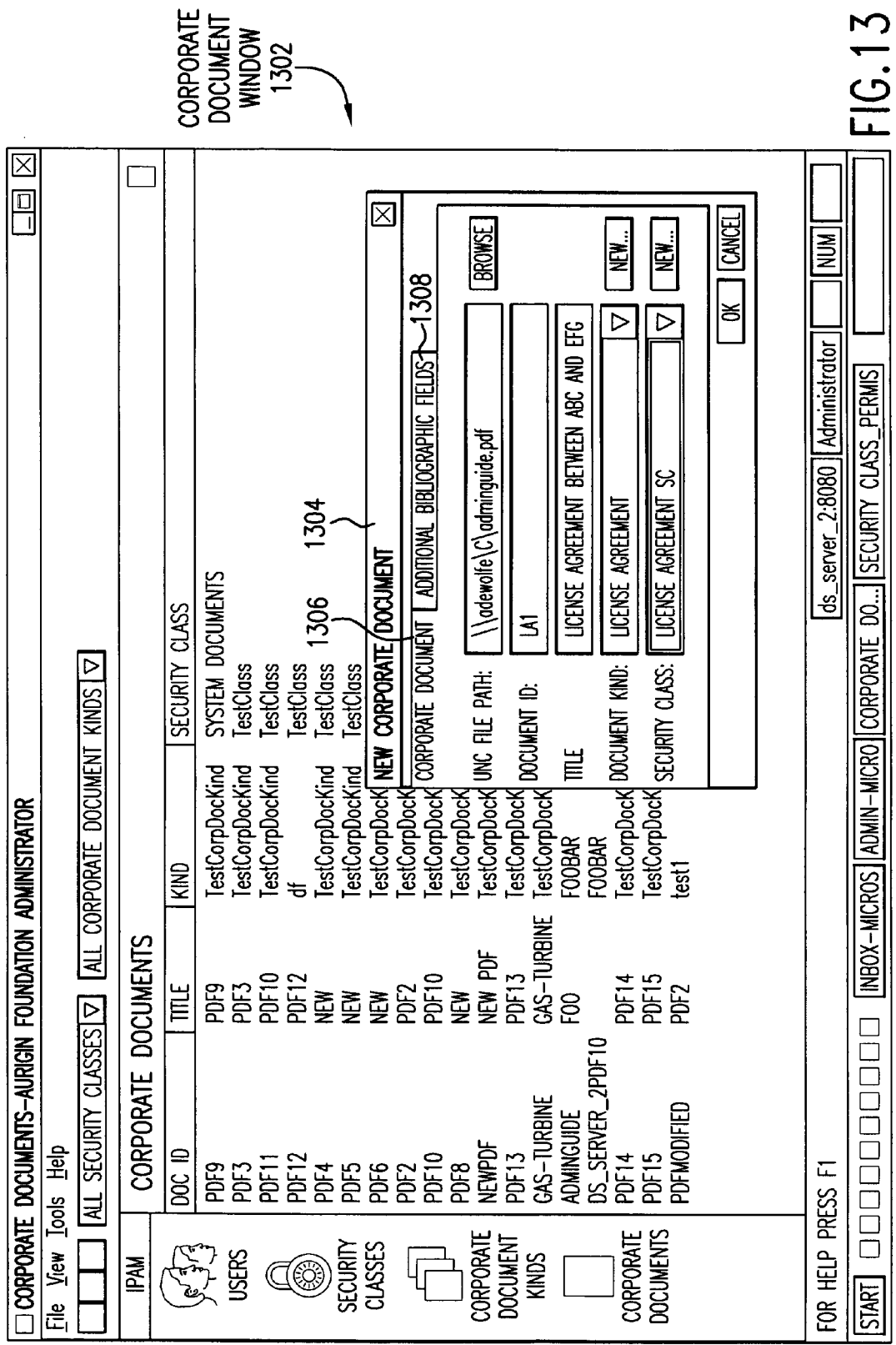
FIGS. 13-15 illustrate the addition of a corporate document to the IPAM system according to an embodiment of the invention.
Figure 14:
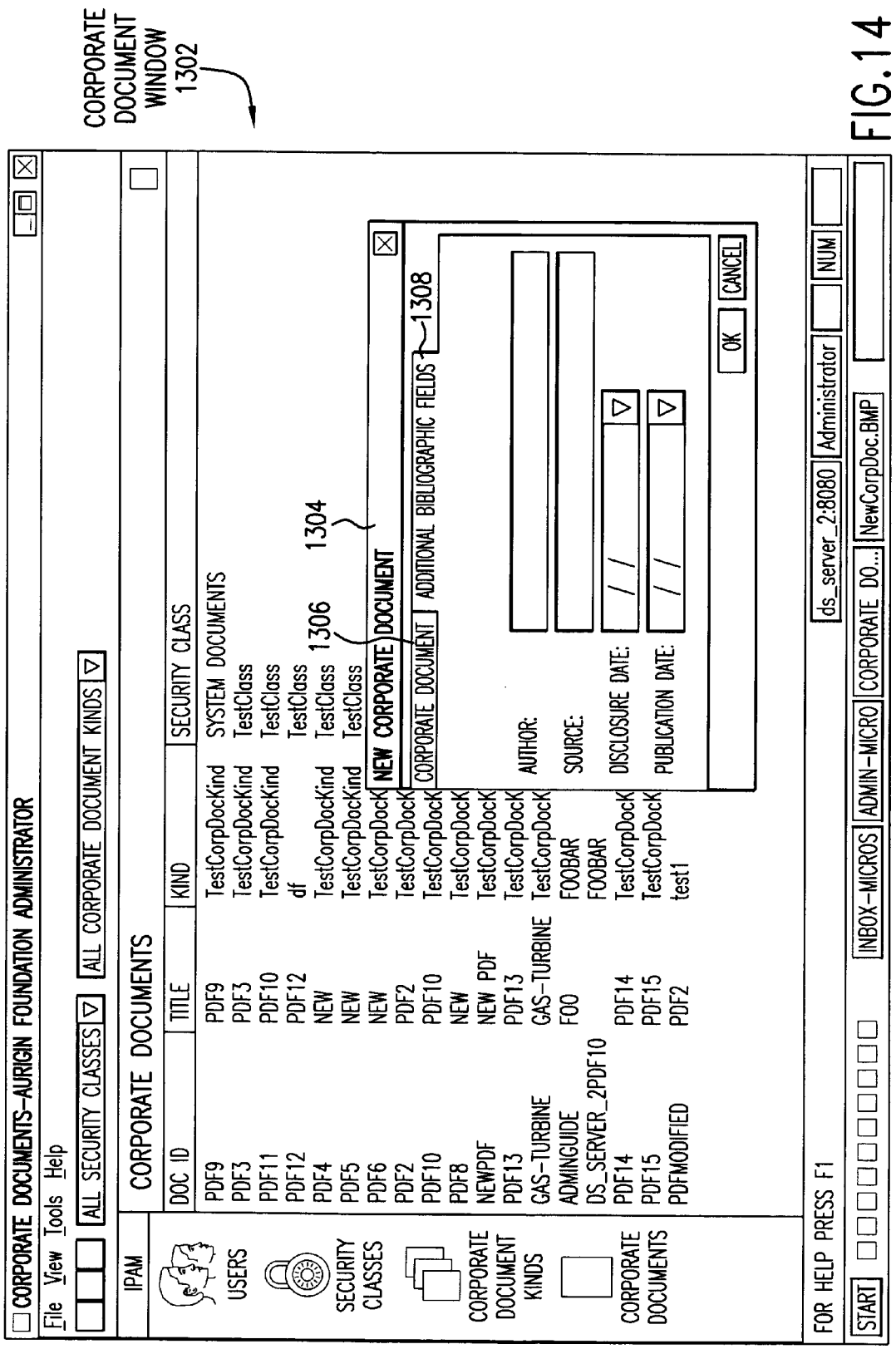
Figure 15:
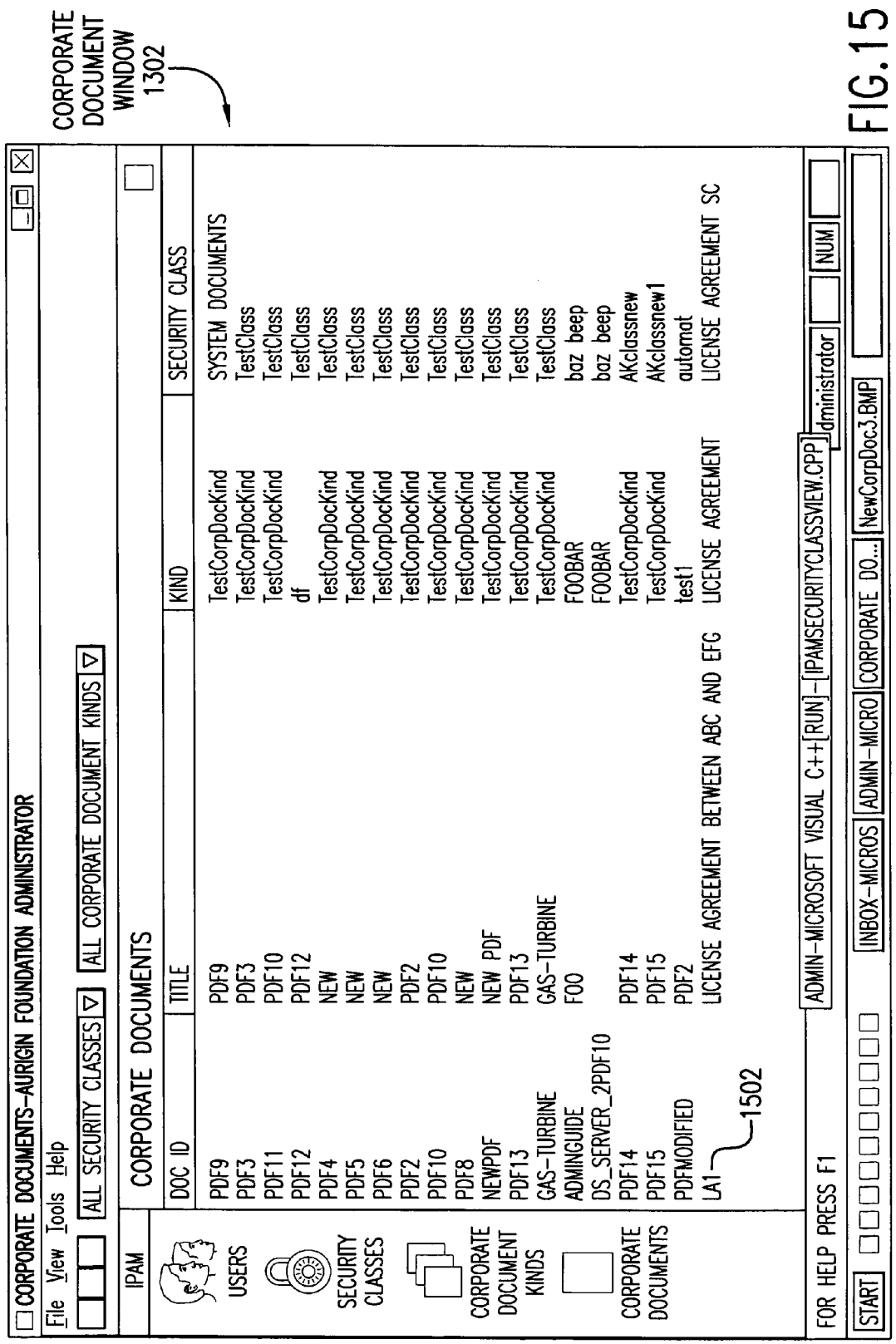

FIGS. 13 and 14 illustrate an example where a new corporate document titled "License Agreement Between ABC and EFG" is being created. FIG. 15 illustrates the corporate document window 1302, which displays corporate documents in the system. Note that the new corporate document titled "License Agreement Between ABC and EFG" is listed at 1502.

Data Object Type Databases

Example database tables usefull for implementing data object kinds as described above are considered in this section.

Figure 17:
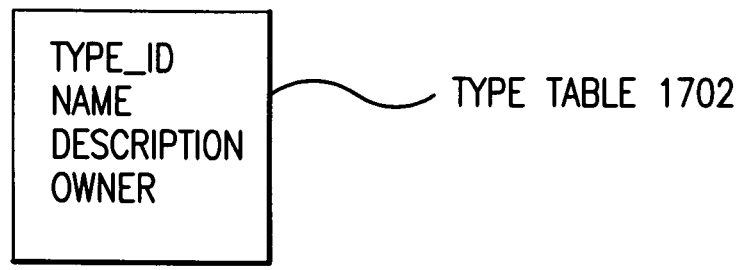
FIG. 17 illustrates a type table according to an embodiment of the invention.

FIG. 17 illustrates a type table 1702. The type table 1702 stores information for data object types supported by the system. The type table 1702 includes a record for each data object type defined and supported in the system. Each record of the type table 1702 includes a type_ID attribute corresponding to the unique identifier of the data object type, a name attribute containing the name of the data object type, a description attribute containing a description of the data object type, and an owner attribute specifying an owner of the data object type.

Figure 18:
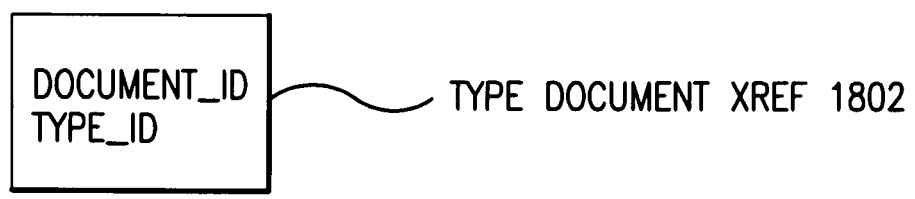
FIG. 18 illustrates a type document xref table according to an embodiment of the invention.

FIG. 18 illustrates a type document xref table 1802. The type document xref table 1802 stores information that identifies the data objects in each data object type supported by the system. The type document xref table 1802 includes a record for each data object in each data object type supported by the system. Each record of the type document xref table 1802 includes a type_ID attribute that identifies a data object type, and a document_ID attribute that identifies a data object that is in the data object type.

An example of the type table 1702 and the type document xref table 1802 is illustrated in FIGS. 19 and 20. FIG. 19 illustrates an example type table 1902. The type table 1902 includes a data object type called "automation" that has a type_ID of T1. The type table 1902 also includes information pertaining to a data object type called "license agreement" that has a type_ID of T2. FIG. 20 illustrates an example type document xref table 2002. This example type document cross ref table 2002 indicates that contract 1 and contract 3 are of data object type "automation," and contract 1 and contract 2 are of data object type "license agreement."

Context Browser

Figure 16:
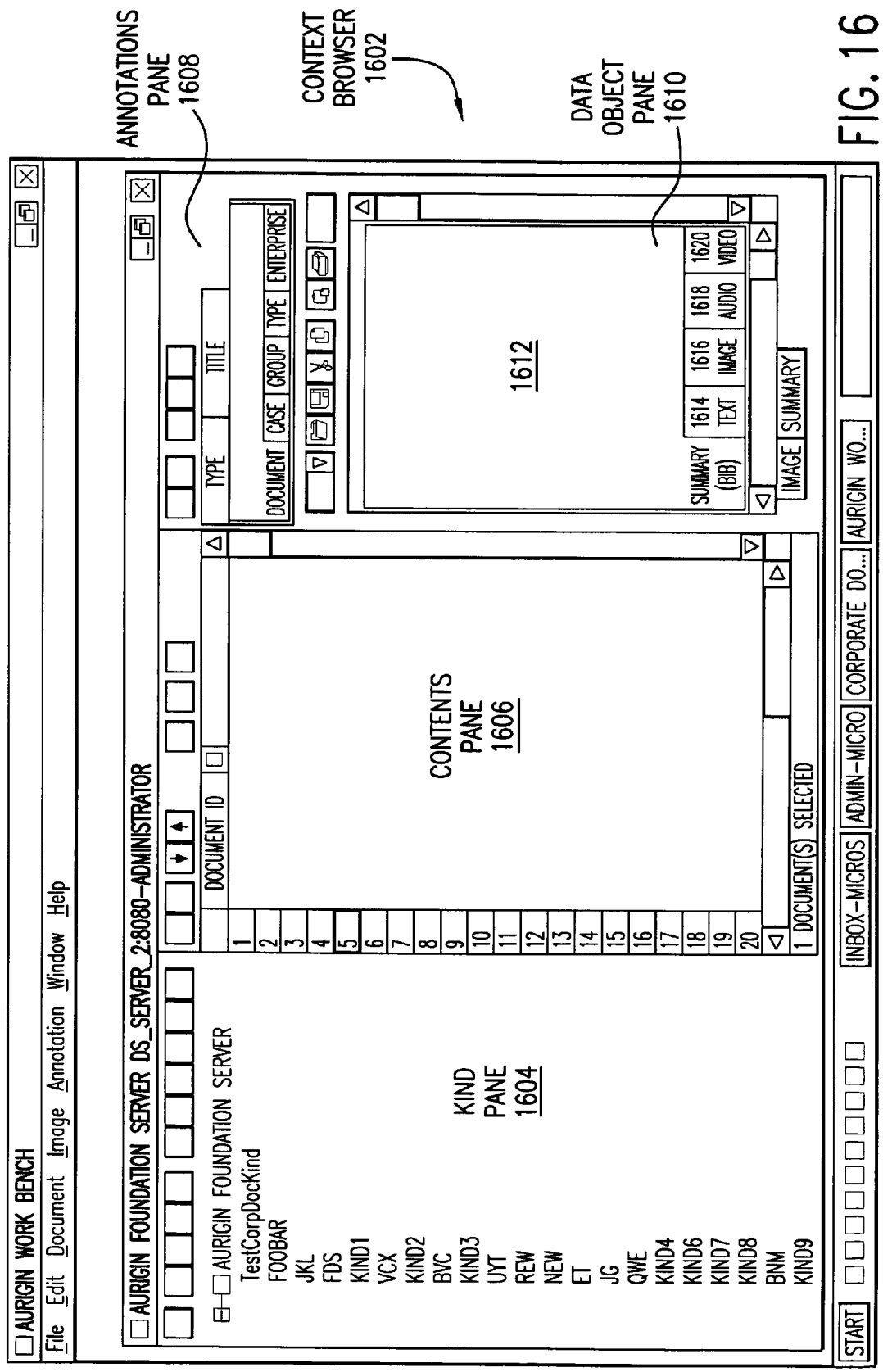
FIG. 16 illustrates a context browser according to an embodiment of the invention.

FIG. 16 illustrates an example context browser 1602, which is similar to the group browser 102 shown in FIG. 1. The context browser 1602 includes a kind pane 1604 in which the data object kinds supported by the system are listed. In some embodiments, the data object kinds are hierarchically organized. For example, a license agreement kind and a non-disclosure agreement kind may be children of a contracts kind. A U.S. patents kind and an Australian patents kind may be children of a patents kind. The hierarchical organization of data object kinds is indicated in the kind pane 1604.

A content pane 1606 list the data objects contained in a data object kind selected in the kind pane 1604. Annotations are listed in an annotations pane 1608 (annotations are further described below). Information pertaining to a data object selected in the contents pane 1606 is displayed in a data object pane 1610. Such information includes any information pertaining to the selected data object, such as summary or bibliographic information in the summary tab 1612, text information pertaining to the selected document in the text tab 1614, image information pertaining to the selected data object in the image tab 1616, audio information associated with the selected document in the audio tab 1618, and video information associated with the selected document in the video tab 1620. Other information pertaining to the selected data object, if any, is also accessible via the data object pane 1610 via additional tabs (not shown in FIG. 16).

Figure 75:
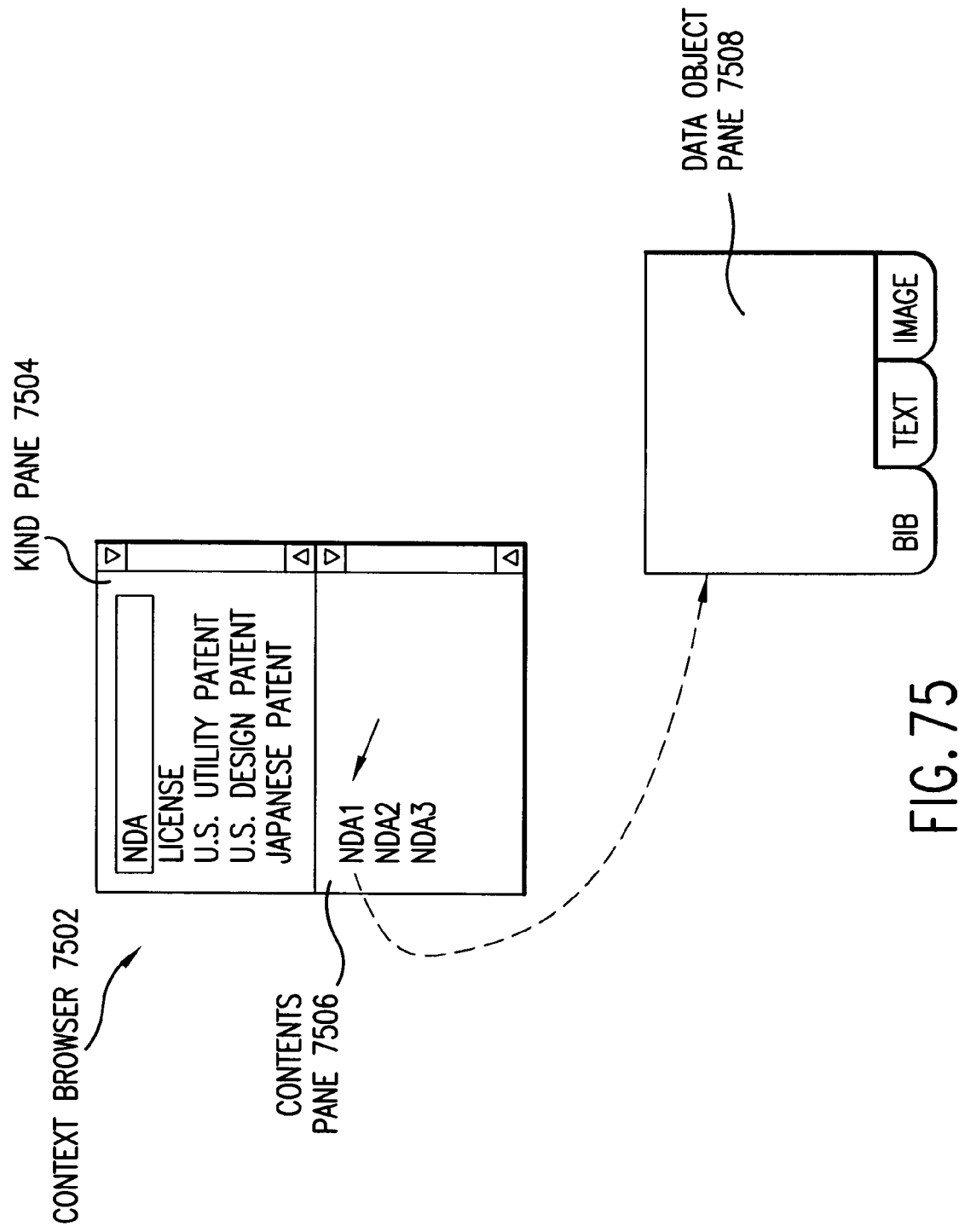
FIG. 75 illustrates another context browser according to embodiments of the invention.

FIG. 75 illustrates another example context browser 7502. The context browser 7502 includes a kind pane 7504, a contents pane 7506, and a data object pane 7508. These panes are similar to those shown in FIG. 16.

Operation of Context Processing

Context processing according to embodiments of the invention is illustrated in a flowchart 7702 in FIG. 77. In step 7704, one or more contexts are selected. For example, one or more groups and/or one or more data object types are selected. Each of the selected contexts include any number of data objects.

In step 7706, the data objects in the selected contexts are processed. Such processing includes any combination of the functions described herein, and/or the functions described in U.S. Patent Applications titled "System, Method,. and Computer Program Product for Patent-centric and Group-oriented Data Processing," Ser. No. 08/867,392, "Using Hyperbolic Trees to Visualize Data Generated by Patent-centric and Group-oriented Data Processing," Ser. No. 08/921,369, and/or "System, Method, and Computer Program Product for Managing and Analyzing Intellectual Property (IP) Related Transactions," Ser. No. 09/138,368, all of which are herein incorporated by reference in their entireties. Such processing may be automatic, manual, or combinations thereof.

Data Object Preview

FIG. 76 illustrates a block diagram of an embodiment of the present invention. An enterprise server 7604, which is also referred to as an intellectual property asset manager (IPAM) and a business decision system (BDS), performs processing on data objects as described herein. Information on such data objects is stored in IPAM databases 7614. Such information includes bibliographic information, textual information, image information, video information, audio information, and other information associated with the data objects.

Preferably, users interact with the enterprise server 7604 and the IPAM databases 7614 via network clients 7608 and web clients 7606. Network clients 7608 interact directly with the enterprise server 7604 (although there may be networks between the network clients 7608 and the enterprise server 7604). Web clients 7606 interact with the enterprise server 7604 via web server 7610.

Preferably, network clients 7608 include local databases 7612. Web clients 7606 may also include local databases. The local databases 7612 store information on data objects. Preferably, the information contained in the local database 7612 is a subset of the information contained in IPAM databases 7614. For example, the local database 7612 may only include information on a limited number of data objects. Also, for any given data object, the local database 7612 may only store some information pertaining to the data object. For example, the database 7612 may only store bibliographic or summary information pertaining to the data object. The database 7612 may not store more detailed information pertaining to the data object, such as textual information, image information, video information, audio information, etc.

Further information pertaining to the enterprise server 7604, the network client 7608, the web client 7606, the web server 7610, and databases 7614 and 7612 are found in U.S. Patent Application "System, Method, and Computer Program Product for Patent-centric and Group-oriented Data Processing," Ser. No. 08/867,392, incorporated herein by reference in its entirety.

Figure 21:
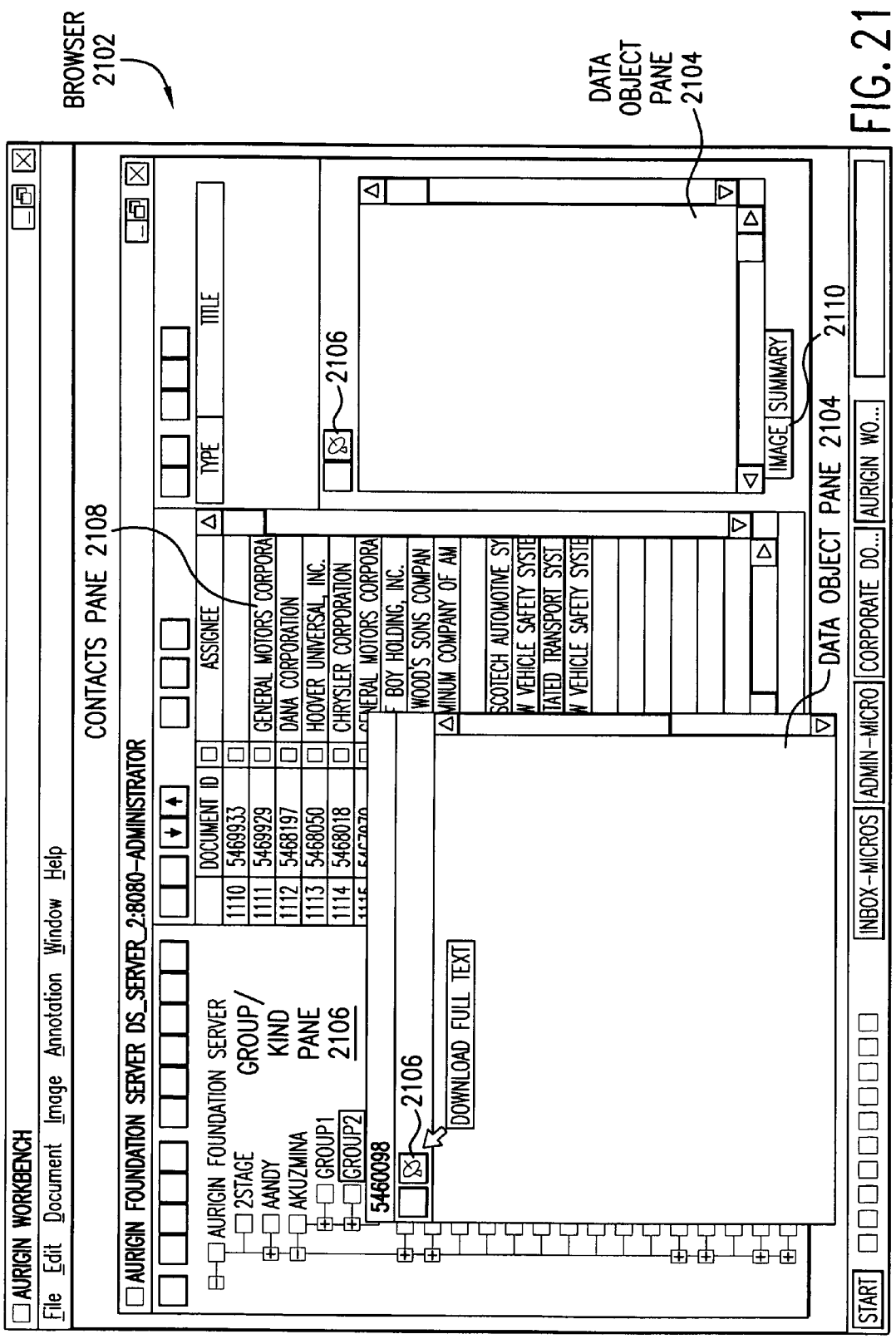
FIGS. 21 and 22 are used to describe a data object preview function according to an embodiment of the invention.

FIG. 21 illustrates a browser 2102 (also called a console), which may be a group browser or a context browser. As described above, the contents pane 2108 lists documents that are contained in the group or kind selected in the group/kind pane 2106.

The data object pane 2104 illustrates information pertaining to the document selected in the contents pane 2108. Preferably, the data object pane 2104 displays summary or bibliographic information pertaining to the document selected in the contents pane 2108. This is the case in the example FIG. 21.

The user can elect to display other information pertaining to the selected document by selecting another tab in the data object pane 2104, such as the image tab 2110 shown in FIG. 21. However, such additional information pertaining to the selected document may not be present in the local database 7612. The invention supports a document or data object preview function for addressing such instances.

Specifically, in cases where requested information pertaining to a document or other data object selected in the contents pane 2108 is not present in the local databases 7612, the invention displays a preview button 2106. When the user presses the preview button 2106, the network client 7608 or the web client 7606 interacts with the enterprise server 7604 to retrieve at least a portion of the additional information pertaining to the selected data object. Preferably, the text of the selected document is transferred from the IPAM databases 7614 to the network client 7608 or the web client 7606. This text is then displayed in a preview window 2202 for review by the user (see FIG. 22).

Figure 22:
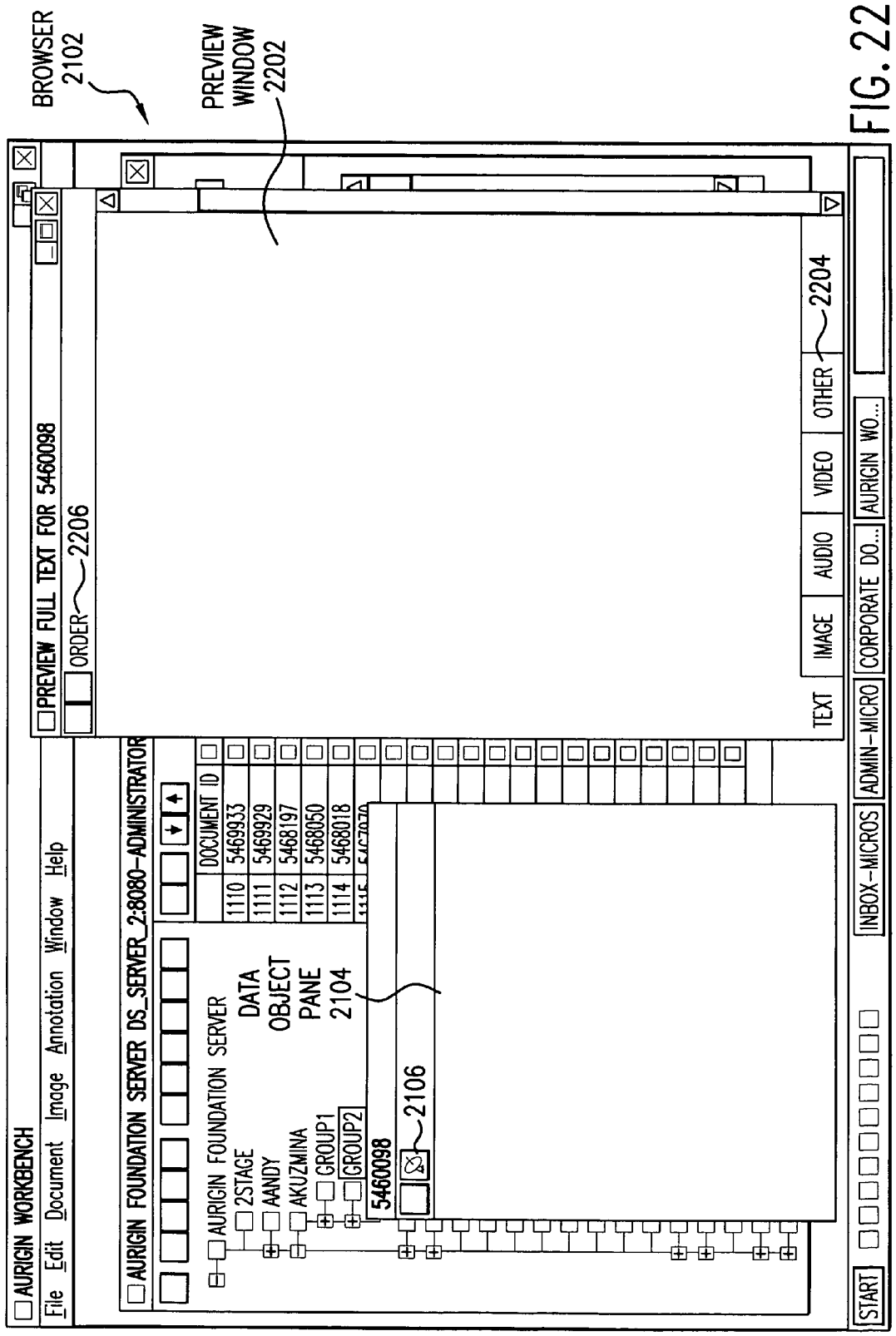

In other embodiments, additional information is transferred from the IPAM databases 7614 to the network client 7608 or the web client 7606. Such information may include image information, audio information, video information, or any other information pertaining to the selected data object that is stored in the IPAM databases 7614. As shown in FIG. 22, such information can be displayed by selecting the appropriate tab in the preview window 2202.

In some embodiments, if the requested information on the selected document is not present in the IPAM databases 7614, the enterprise server 7604 operates to obtain the information from an external source. For example, the enterprise server may interact with a third party information provider, such as Lexis-Nexis, or may interact with some other source, such as a human operator, a company database (such as a personnel database, a finance database, etc.), etc.

The user reviews the information in the preview window 2202. Preferably, this information is available only on a temporary basis, and it is not stored in the local databases 7612. If the user wishes to store the information in the local databases 7612, then the user presses an order button 2206 or issues a similar command. In response to the selection of the order button 2206, the enterprise server 7604 retrieves any additional information pertaining to the selected document from the IPAM databases 7614 or from some other source, and transfers such information to the network client 7608 or the web client 7606. This information, as well as information previously provided, is stored in the local databases 7612.

Figure 3:
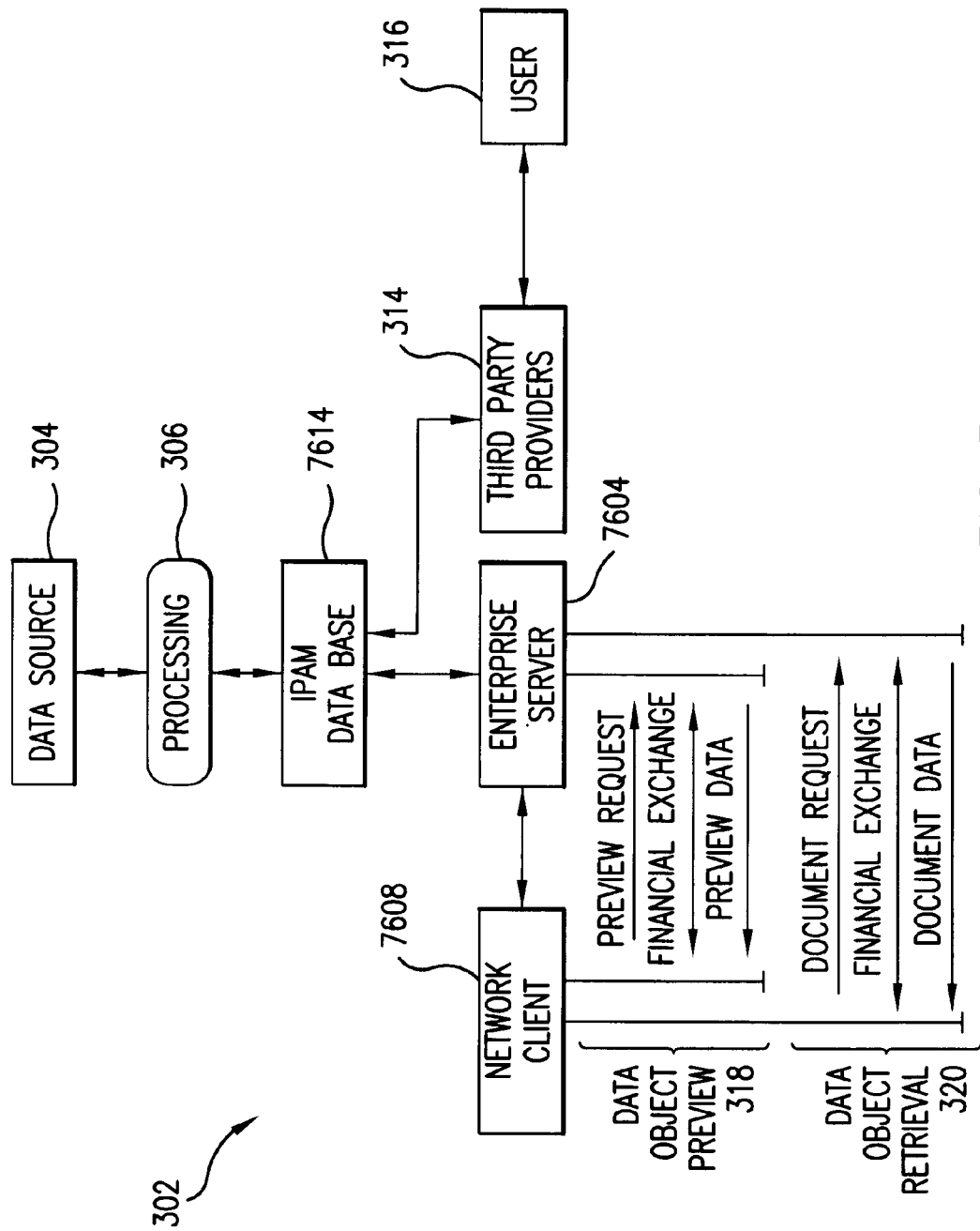
FIG. 3 depicts an event trace corresponding to a preview data object function according to an embodiment of the invention.

The processing pertaining to the data object preview function of the present invention is illustrated in FIG. 3. Specifically, FIG. 3 illustrates the interaction between the network client 7608 and the enterprise server 7604 when performing the data object preview function 318. The network client 7608 sends a preview request message to the enterprise server 7604. The preview request message is sent by the network client 7608 to the enterprise server 7604 when the user pressed the preview button 2106. The preview request message includes information that identifies the data object selected in the contents pane 2108. The preview request message also indicates the type of data that is requested. For example, in some embodiments, only text data pertaining to the selected data object is requested. In other embodiments, other types of data is requested, such as image data, audio data, video data, or any other or all data pertaining to the selected data object. In other embodiments, a given type of data is always requested and provided, such as textual data, in which case a preview request message does not include an indication of the type of data that is requested.

Optionally, the network client 7608 and the enterprise server 7604 perform a financial exchange whereby funds are transferred from the network client 7608 to the enterprise server 7604. The financial exchange is performed in those cases where the preview function is available only as a pay-for-used service. In the financial exchange, the funds are electronically or otherwise transferred from the network client 7608 to the enterprise server 7604. The invention also includes other economic models, such as but not limited to an unlimited service plan, where for a given fee the user can download any number of documents, and a hybrid plan where for a fee the user can download a given number of documents. Once this limit is exceeded, the user pays on a per-document rate.

The enterprise server 7604 retrieves from the IPAM database 7614 the requested data pertaining to the selected data object, and transfers this data to the network client 7608. The IPAM database 7614, in one embodiment, obtains such data from a data source 304. The data is then processed (indicated by oval 306), as necessary, and then stored in the IPAM database 7614. The data source 304, for example, may be a Patent Office, departments of a corporate entity, third party information providers (as discussed above), etc., and/or may result from data processing performed by automatic means, manual means, or combinations thereof.

Upon receipt of the preview data by the network client 7608, the network client 7608 displays the preview data in the preview window 2202, as described above.

The operations performed by the present invention when the user requests the retrieval of a data object is also represented in FIG. 3 as a data object retrieval function 320. In accordance with such processing, the network client 7608 transfers a document request to the enterprise server 7604. The document request was generated by the network client 7608 when the user pressed the order button 2206 in the preview window 2202 (FIG. 22). The document requests includes information that identifies the selected data object in the contents pane 2108 and also identifies the type of data that is requested (i.e., text, image, audio, video, etc.). In cases where the data object request functionality is offered only as a pay-per-use service, the network client 7608 and the enterprise server 7604 perform a financial exchange operation in which funds are electronically or otherwise transferred from the network client 7608 to the enterprise server 7604. The enterprise server 7604 retrieves the requested information from the IPAM database 7614 or other source, and transfers such information to the network client 7608. The network client 7608 then preferably stores this information in its local databases 7612 (FIG. 76) for later access by the user.

Annotation

The present invention supports a variety of annotation types. An annotation type is defined by two attributes. First, by whether annotations of the annotation type are attached or linked to data objects, or portions of data objects. Second, by the scope of annotations of the annotation type. The scope defines the extent to which the annotations are visible or accessible. FIG. 23 is a table 2302 that summarizes the attributes of the annotation types of the present invention.

Annotations are further described in U.S. Pat. Nos. 5,623,681; 5,623,679; and 5,806,079, all of which are herein incorporated by reference in their entireties.

Document Annotations

A document annotation is attached or linked to a selected portion of a data object contained in a group. The scope of a document annotation is the group in which the linked data object is contained, and that was active or selected at the time that the document annotation was created. Document annotations are accessible only when their respective groups are active.

A document annotation may be linked to multiple data objects. Also, a document annotation may be unlinked from any or all linked data objects. When a document annotation is unlinked from all linked data objects, it is called a floating, free, or unlinked annotation (as opposed to a linked annotation). Unlinked annotations maintain their original scope, and operate just like linked annotations, except that they have no links to data objects to follow. Unlinked annotations can be linked to data object portions through appropriate user command. It is noted that this description pertaining to document annotations is also applicable to other linkable annotation types described herein.

For example, assume that a document annotation is linked to a document D1. Document D1 is contained in groups G1 and G2. However, at the time that the document annotation was created, group G1 was active. That is, group G1 was selected in the group pane 104 of the group browser 102 (see FIG. 1) at the time that the annotation was created. In this case, the document annotation is linked to document D1, and has a scope of group G1. The document annotation is only accessible when group G1 is active. The document annotation is not accessible when group G2 is active, even though document D1 is in G2.

Patent Annotations

Figure 24:
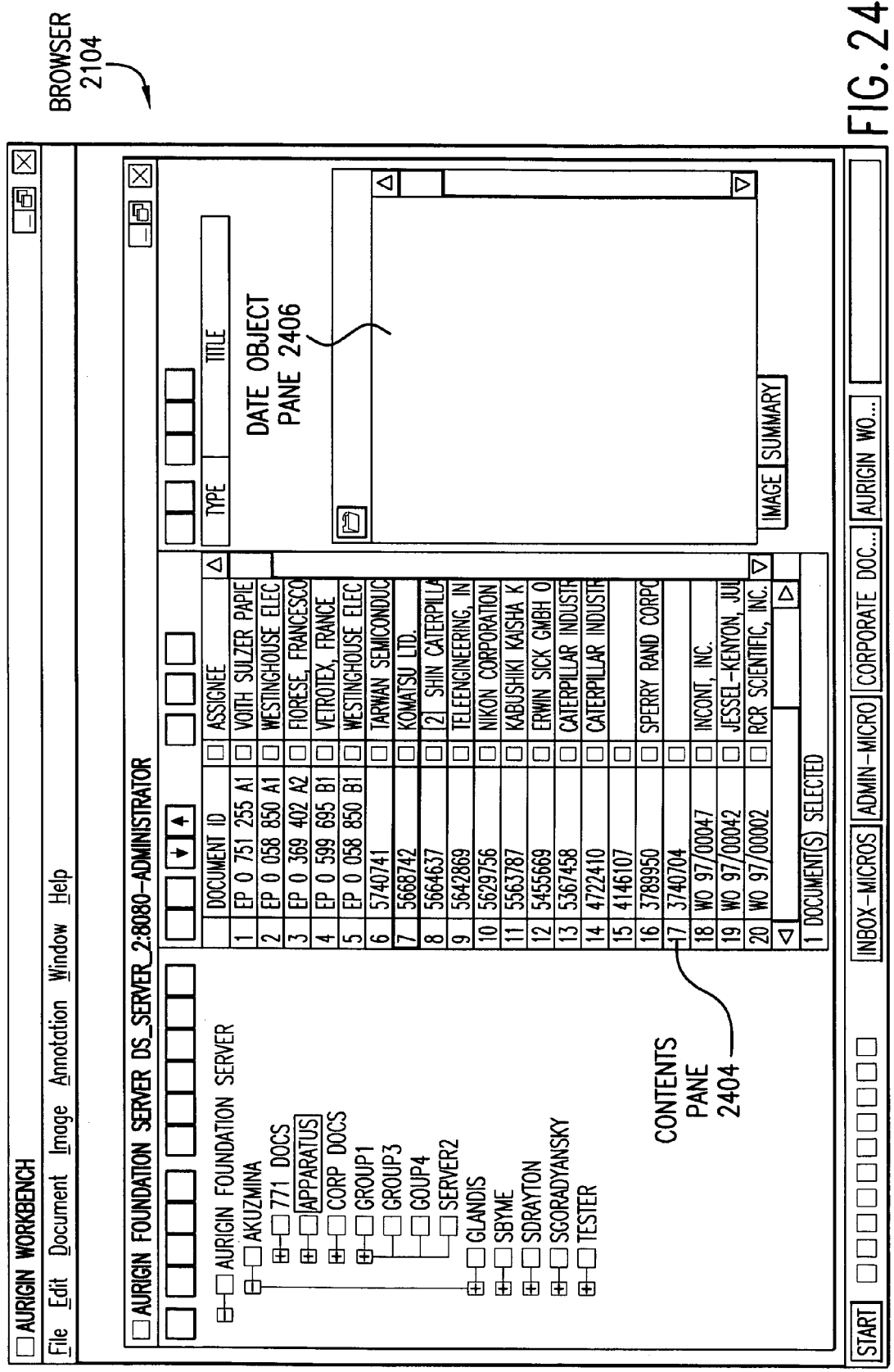
Figure 25:
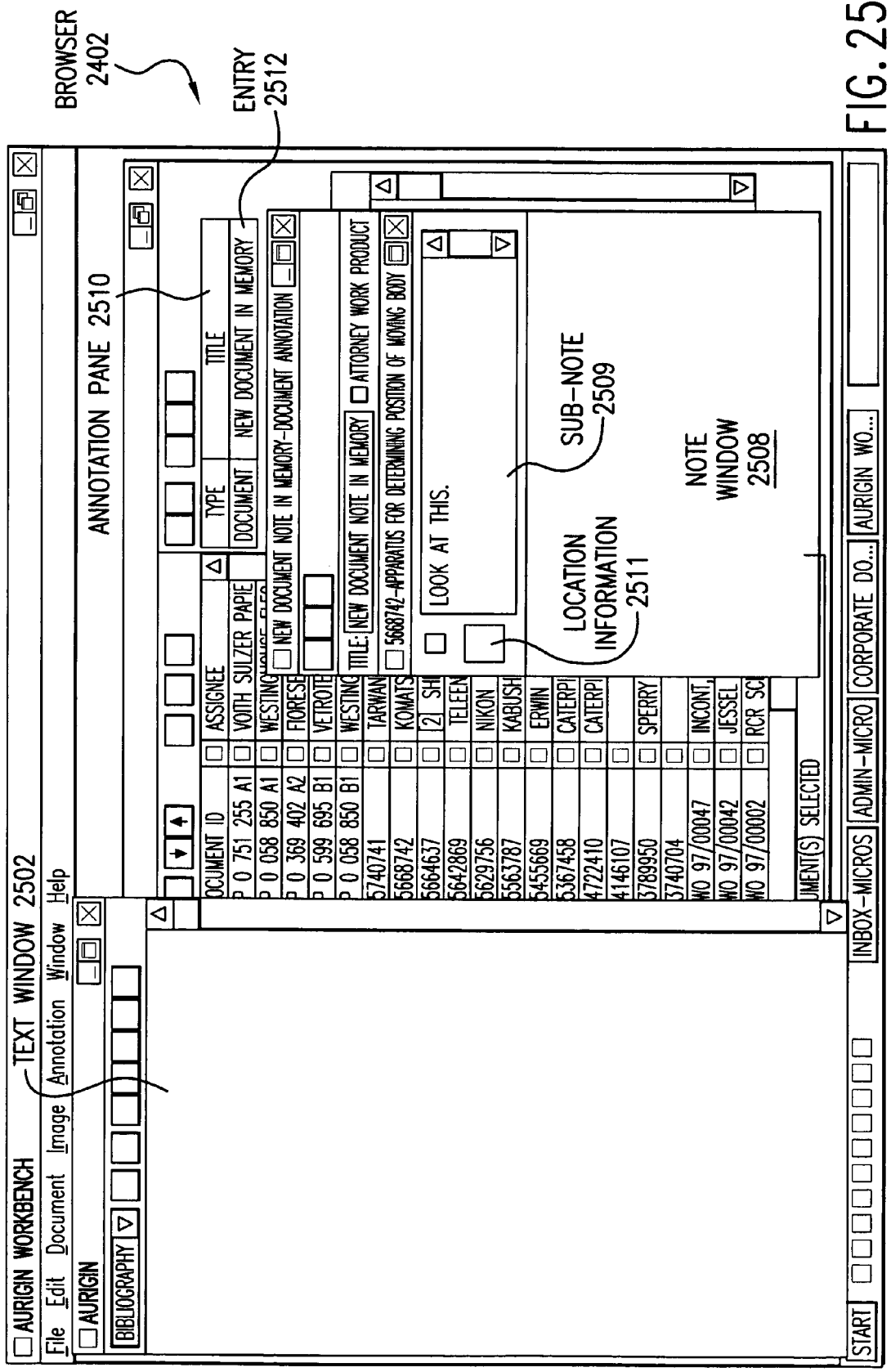

The invention supports a variety of types of document annotations. For example, the invention supports patent annotations. Consider FIG. 24, which displays a summary of U.S. Patent No. 5,668,742 in a data object pane 2406 of browser 2402. Upon appropriate user command, the text of U.S. Pat. No. 5,668,742 is displayed in a text window 2502 shown in FIG. 25. According to the invention, a patent annotation is created by selecting a portion of a patent, such as the selected portion 2504 shown in FIG. 25. Such operation results in creating a subnote 2509 in a note window 2508 that is linked to the selected portion 2504 of U.S. Pat. No. 5,668,742.

User comments can be entered into the subnote 2509. In an embodiment, location information 2511 is stored and displayed proximate to the subnote 2509 (this is applicable for all annotation types described herein). Such location information 2511 indicates the location of the selected portion 2504 in the data object, i.e., U.S. Pat. No. 5,668,742.

Notes are listed in the annotation pane 2510. For example, in the current example, the newly created note is listed in the annotation pane 2510 as entry 2512.

Corporate Document Annotations

Figure 28:
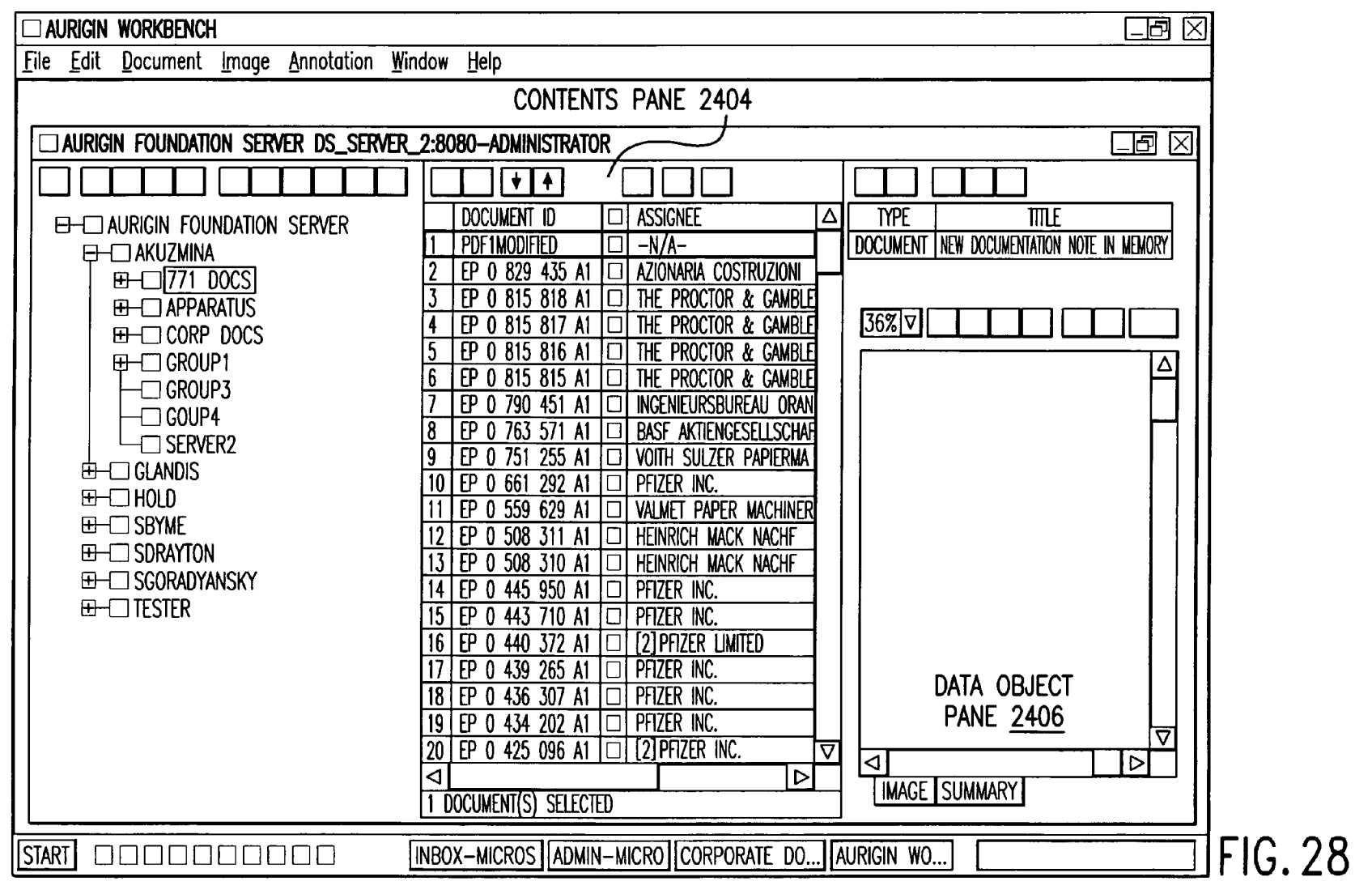
Figure 29:
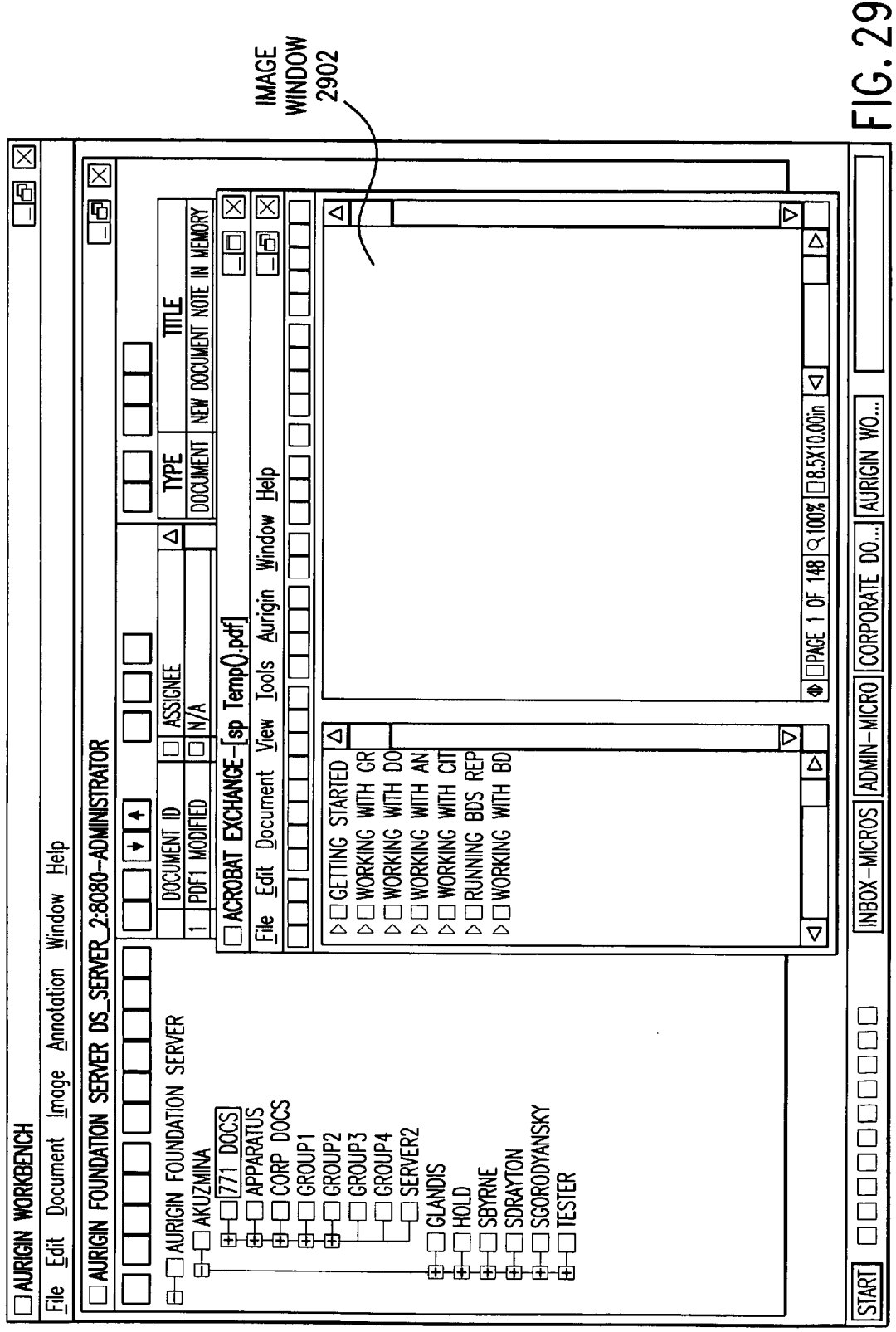
Figure 30:
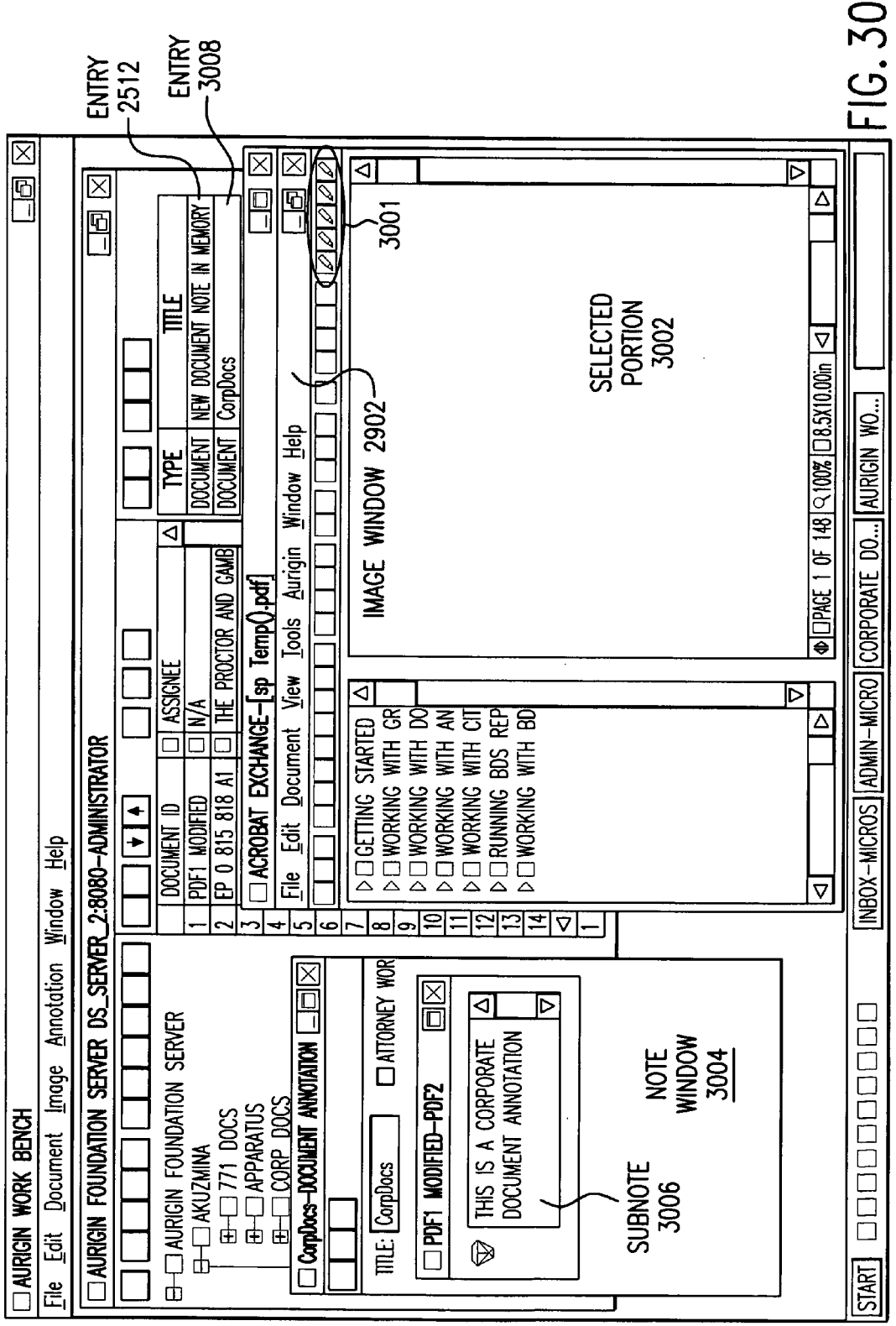

The invention also supports corporate document annotations, in which any type of document can be annotated. For example, in FIG. 28, summary information pertaining to a corporate document selected in a contents pane 2404 is displayed in the data object pane 2406. Image information pertaining to the selected document is displayed in an image window 2902 upon execution of appropriate user commands, as shown in FIG. 29. As indicated in FIG. 30, a portion 3002 of the image in image window 2902 has been selected. This operation causes a subnote 3006 to be created in a note window 3004. The subnote 3006 is linked to the selected portion 3002. The user can enter information or comments pertaining to the selected portion 3002 in the subnote 3006 (that is, the user can annotate the selected corporate document).

Image Annotations

Figure 26:
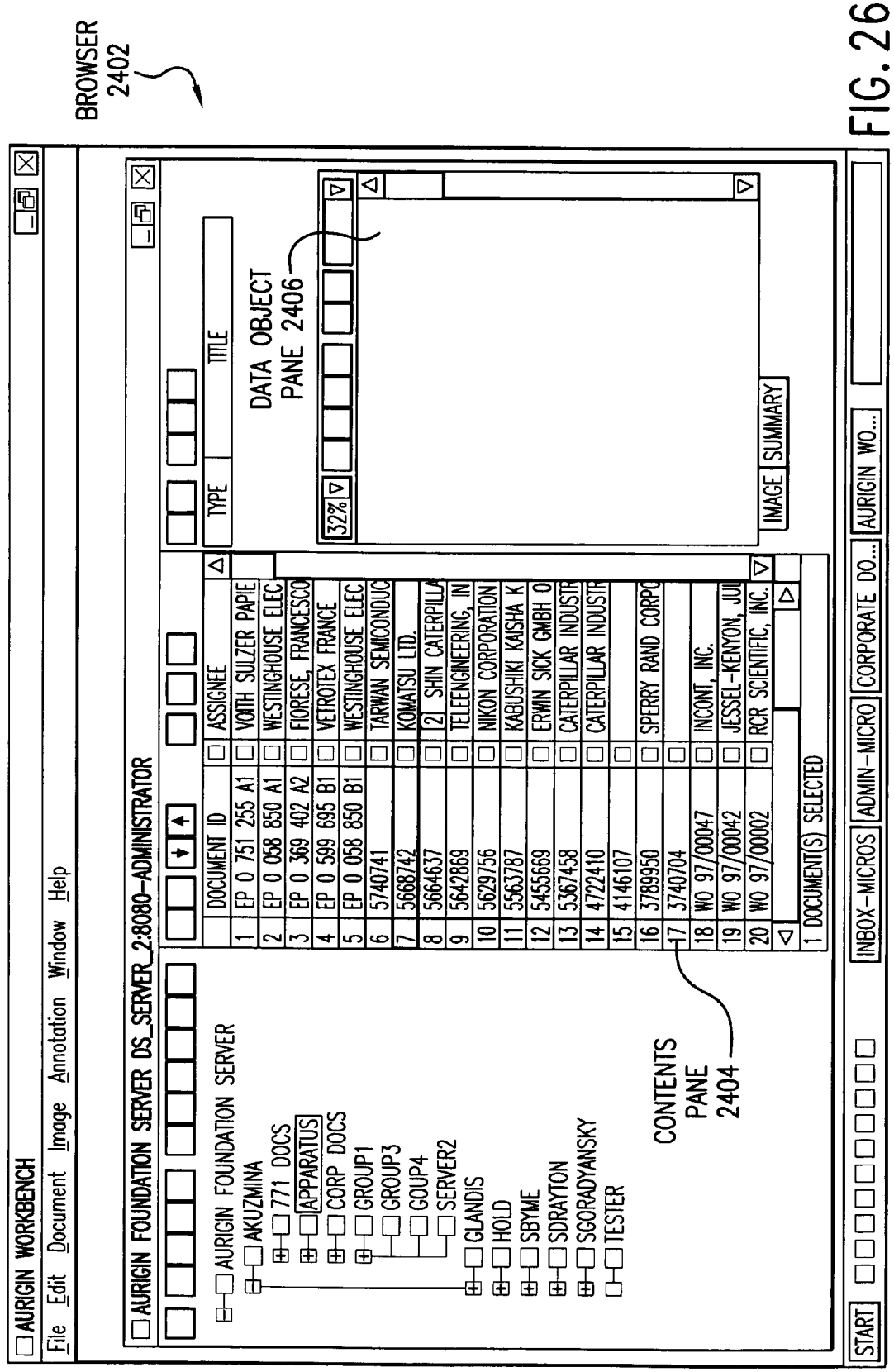
Figure 27:
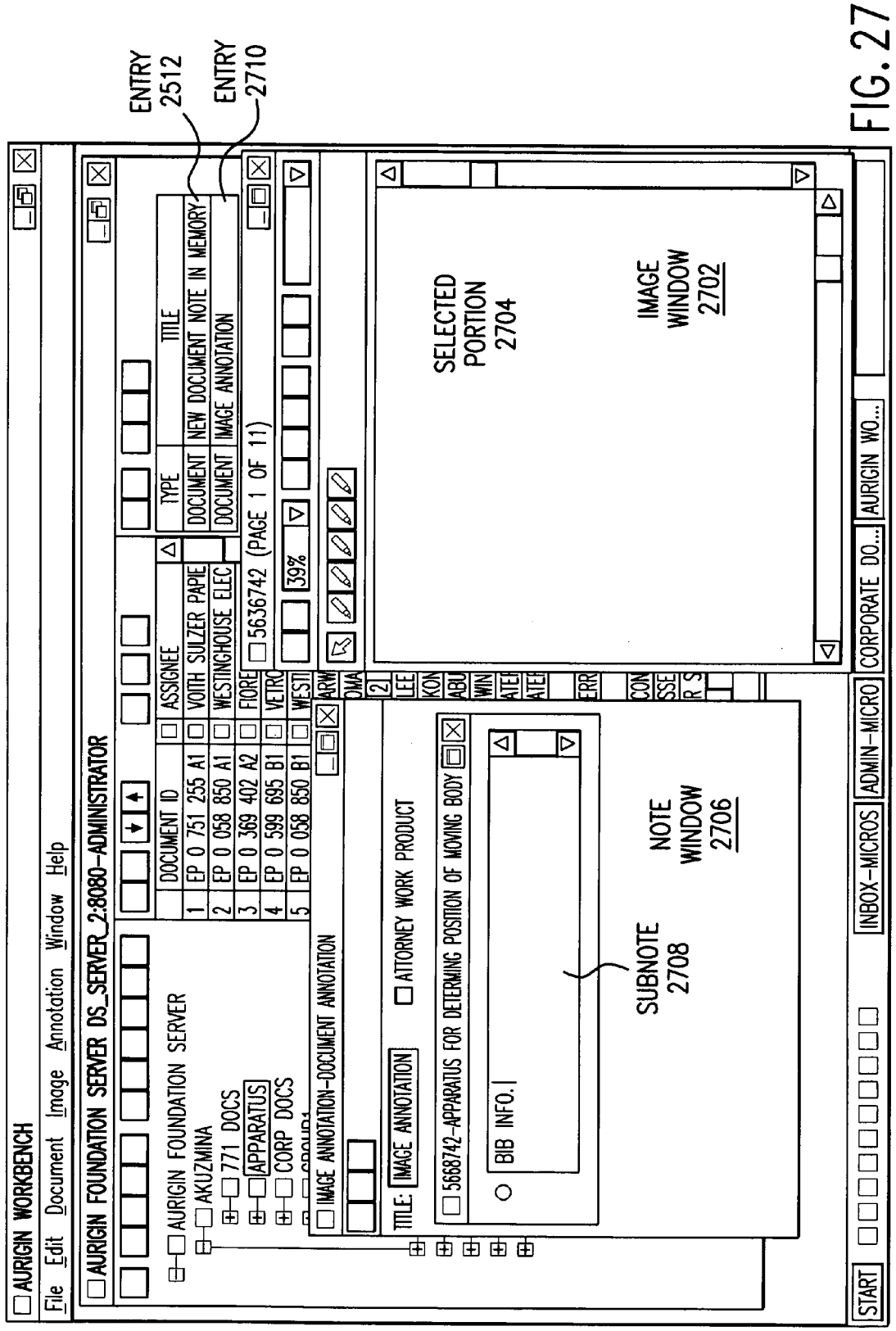

The invention supports image annotations, wherein images can be annotated. For example, in FIG. 26, image information pertaining to U.S. Pat. No. 5,668,742 is displayed in the data object pane 2406 of the browser 2402. Upon appropriate user command, such image information is displayed in larger form in an image window 2702 shown in FIG. 27. As indicated in FIG. 27, the user has selected a portion of the image. This selected portion is indicated as 2704. Upon such selection, a subnote 2708 is created in a note window 2706. This subnote 2708 is linked to the selected portion 2704. The user can enter comments pertaining to the selected portion 2704 in the subnote 2708 (that is, the user can annotate the selected portion 2704).

Group Annotations

A group annotation is not attached to a data object or a portion of a data object. The scope of a group annotation is the group that was selected or active at the time that it was created, and the group annotation is linked to the group. A group annotation is visible only when its associated group is selected or active. Preferably, any user with access to a group has access to the group annotations associated with the group.

Data Object Type Annotations

Data object type annotations are similar to group annotations. Data object type annotations are not attached to data objects. Instead, data object type annotations are linked to data object types. The scope of data object type annotations is the associated data object type that was specified when the annotation was created. Data object type annotations are only accessible when their associated data object types are selected or active. Like group annotations, access to data object type annotations is generally open to any user who has access to the associated data object type.

Case Annotations

A case is a data structure that includes a plurality of data objects. Such data objects may be in one or more groups, one or more data object types, and/or one or more other cases. A case may span multiple groups, data object types, other cases, etc. That is, a case can be set to include a given set of groups, data object types, cases, etc. A case is a type of context.

A case annotation is attached or linked to a portion of a data object contained in a case. The scope of the case annotation is the case that was active or selected when the case annotation was created. Case annotations are only visible if the associated case is selected or active. Access to case annotations is preferably under the control of the case owner. In an embodiment, a document that is being annotated is added to the active case automatically.

Enterprise Annotations

Enterprise annotations are attached and linked to data objects. The scope of an enterprise application is the data object to which it is linked. Accordingly, an enterprise annotation is accessible whenever the data object is accessible. Therefore, whenever a data object is contained in the active context, the enterprise annotations linked to that data object are accessible. In an embodiment, access to enterprise annotations is limited to trusted individuals, such as administrators or administrator designees, given the wide scope of enterprise annotation In an embodiment, the ability to create an enterprise annotation is granted to the user by the system administrator. The administrator would specify the types of data objects that can be annotated by a user (e.g., NDAs, patents, license agreements, and so forth).

In an embodiment, enterprise annotations are only visible to a given user if the creator of the enterprise annotations exported his or her annotations to the given user, and the given user subscribed to the enterprise annotations of the creator. For example, if user 1 created an enterprising annotation 1 linked to data object 1, then user 2 when viewing data object 1 would only have access to enterprise annotation 1 if user 1 exported his enterprise annotations to user 2, and user 2 subscribed to the enterprise annotations of user 1. This exporting/subscription feature of the invention operates as both a security feature (enabling a creator to limit access to only those people to which his enterprise annotations have been exported to), and a filtering tool (enabling a user to display only those enterprise annotations generated by creators to which the user has subscribed).

User Interface and Note Processing

As noted above, the annotations pane contained in the browser or console window lists the currently active annotations. An annotation is active if its context is active. For example, a document annotation is active if it is linked to a data object contained in the active group (i.e., the group selected in the group pane of the browser). A case annotation is active if its associated case is active (that is, its associated case is selected). A group annotation is active if its associated group is active (that is, its associated group is selected in the group pane of the browser). A type annotation is active if its associated type is active (that is, its associated type is selected in the type pane of the context browser). An enterprise annotation is active if the data object to which it is linked is contained in the active context (that is, it is contained in the active group or the active data object type).

Figure 31:
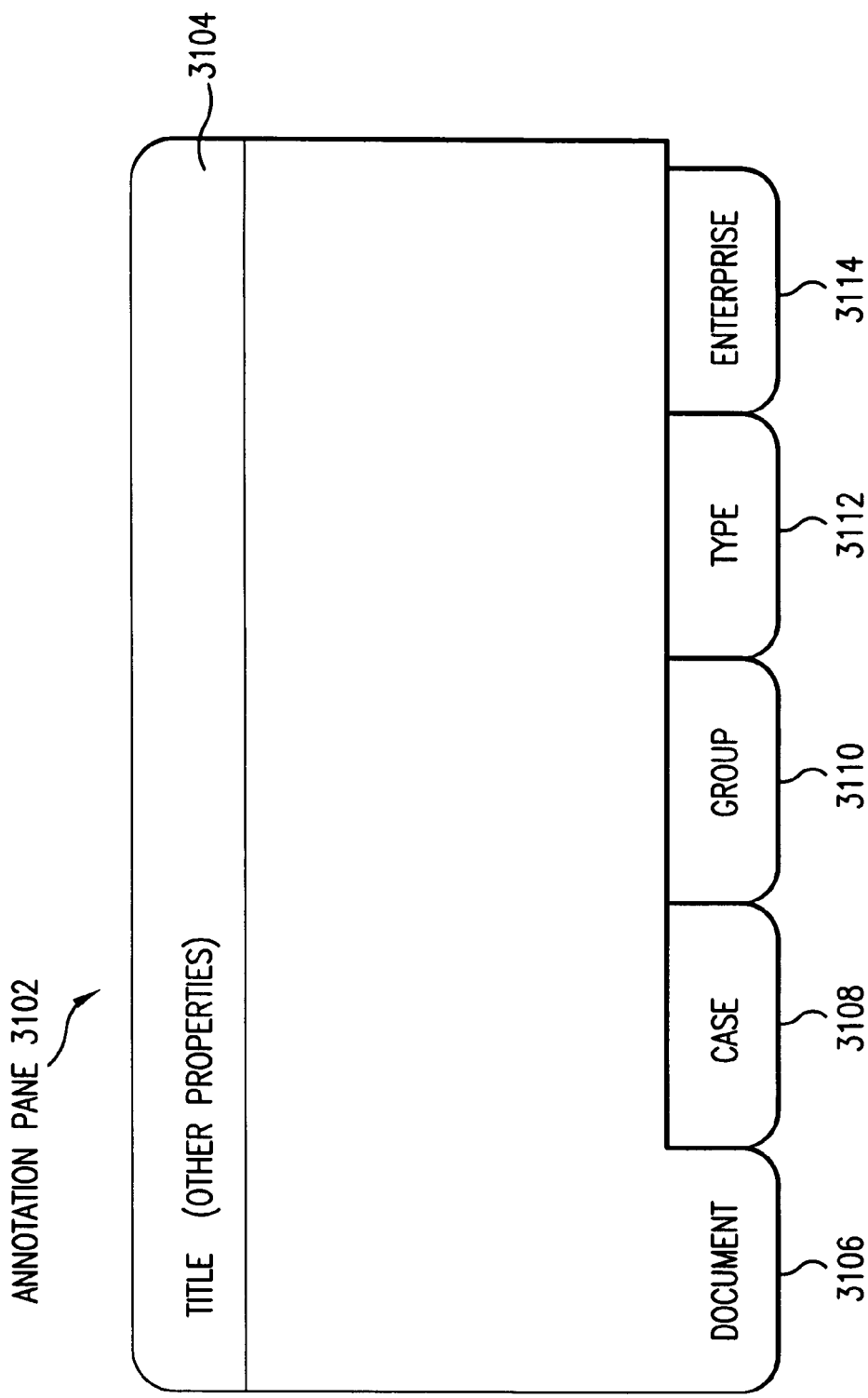
FIG. 31 illustrates an annotation pane according to an embodiment of the invention.

Embodiments of the invention support a variety of formats for the annotation pane. Such formats are presented in the figures. For example, FIG. 31 illustrates an annotation pane 3102 having a tab for each annotation type. Specifically, there is a tab 3106 for document annotations, a tab 3108 for case annotations, a tab 3110 for group annotations, a tab 3112 for type annotations, and a tab 3114 for enterprise annotations. To view the active annotations of any given type, the user selects the tab associated with the type. For example, to view the currently active enterprise annotations, the user selects the enterprise tab 3114.

In embodiments of the invention, different types of annotations are denoted by different types of attributes. For example, different annotations may be displayed using different display attributes, such as font, color, size, underlining, icons, etc.

It is noted that the annotation type supported by the invention represent additional types of contexts. For example, enterprise annotations represent a type of context that include either the active enterprise annotations, and/or the data objects linked to the active enterprise annotations.

Figure 32:
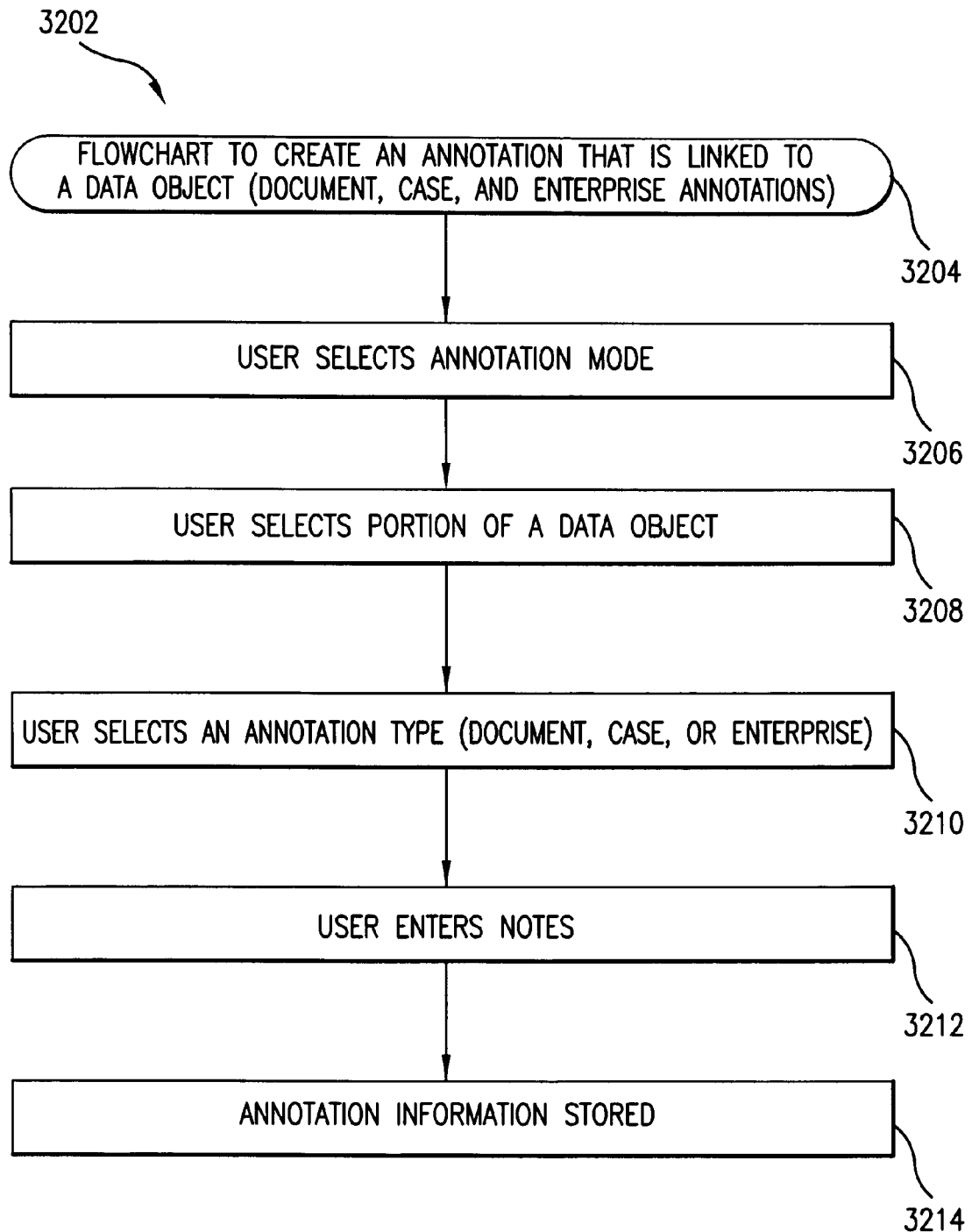
FIG. 32 illustrates a flowchart representing the operation of the invention when creating an annotation that is linked to a data object.

FIG. 32 illustrates a flowchart 3202 illustrating the operation of the invention when creating an annotation that linked to a data object (that is, when creating a document annotation, a case annotation, or an enterprise annotation).

In step 3206, the user selects an annotation mode. This can be done, for example, by selecting an annotation pen 3001 (see, for example, pens 3001 in FIG. 30). It is noted that pens can be assigned to different types of annotation types such that the type of annotation to be created depends on the pen that is selected. Alternatively, this can be done by selecting an appropriate menu command, such as a drop down menu or a menu that it appears upon pressing the right mouse button.

In step 3208, the user selects a portion of a data object using the selected annotation pen, if any.

In step 3210, the user selects an annotation type (i.e., a document, case, or enterprise annotation). Its noted that step 3210 is performed only when the user has not previously selected an annotation type. For example, as noted above, the user may have previously selected an annotation type when he selected the annotation pen 3001.

In step 3212, the system creates a new annotation of the type selected in step 3210, and links the annotation to the portion of the data object selected in 3208. Further in step 3212, the user enters comments or notes to annotate the selected data object portion.

In step 3214, information pertaining to the new annotation, including the user entered comments, the linking information, etc., is stored in an annotation database.

Figure 33:
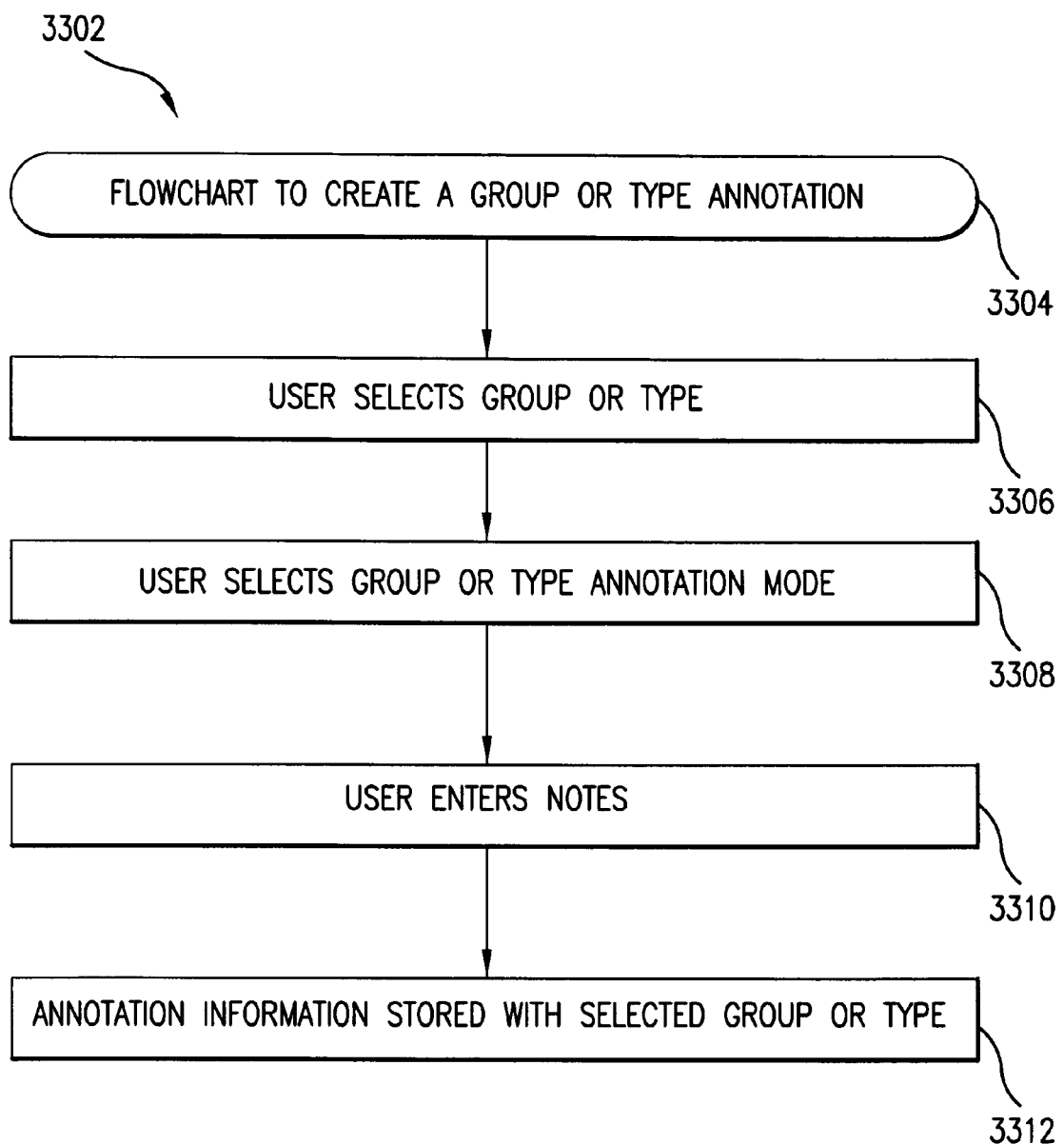
FIG. 33 illustrates a flowchart representing the operation of the invention when creating a group or type annotation.

FIG. 33 illustrates a flowchart 3302 that represents the operation of the invention when creating a group or a data object type annotation (that is, when creating an annotation that is not linked to a data object).

In step 3306, the user selects a group or a data object type. The selected group or data object type becomes the active group or data object type.

In step 3308, the user selects a group or type annotation mode. This can be done, for example, by selecting an appropriate menu command, or by selecting an appropriate annotation pen 3001.

In step 3310, the system creates a new annotation of the selected type. The new annotation is linked to the active or selected group or data object type. Also in step 3310, the user enters notes or comments to thereby annotate the active group or data object type.

In step 3312, information pertaining to the annotation, such as the user's comments, the linking information, etc., are stored in an annotation database.

Form-based Annotations

As noted elsewhere, the present invention supports annotation of data objects. For example, FIG. 78A illustrates an example window 7802 wherein a data object 7803 is being displayed. The present invention enables annotation of any portion of the data object 7803.

Figure 78B:
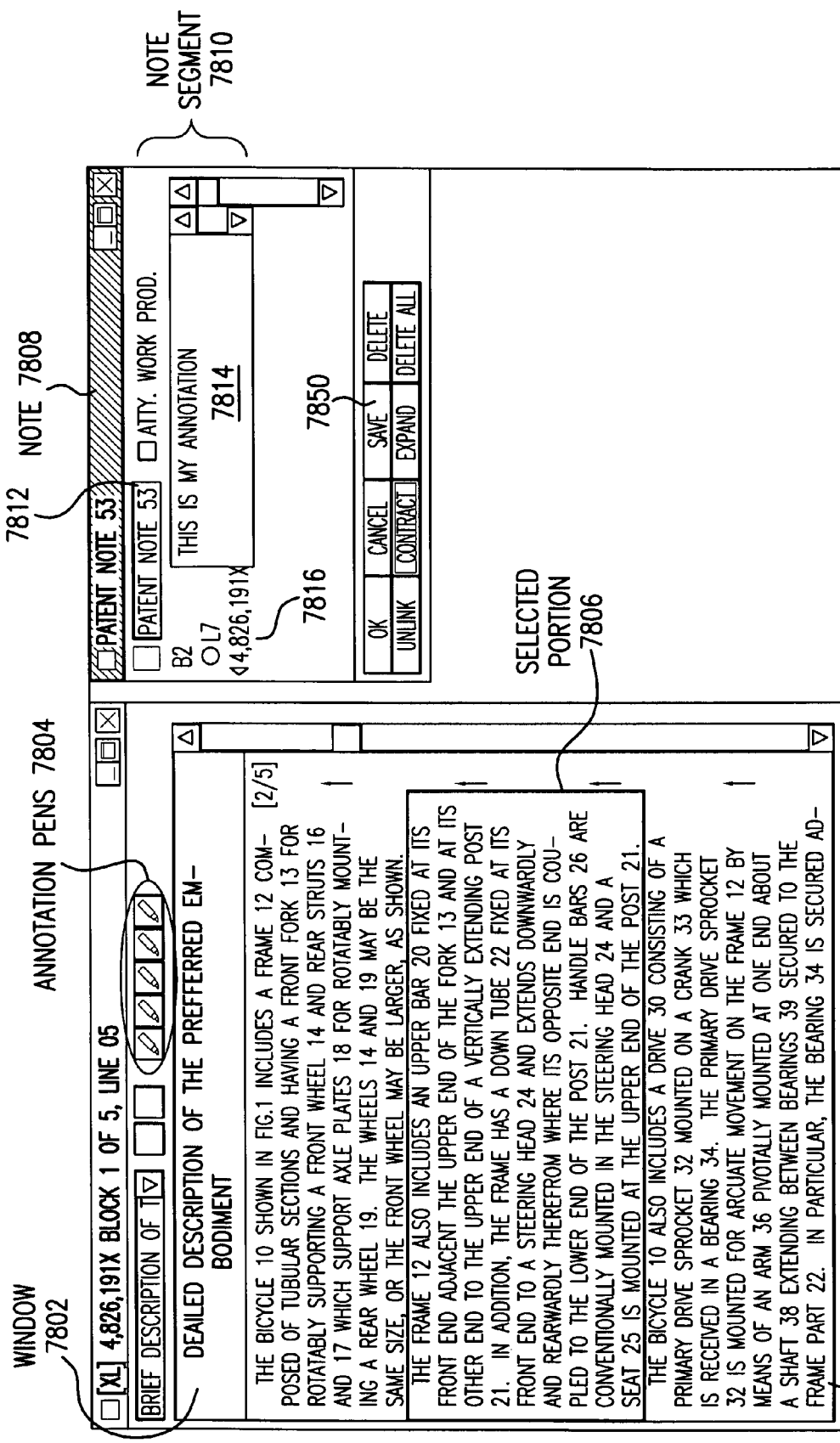

The window 7802 includes a plurality of annotation pens 7804. The user places the system in an annotation mode by selecting one of the annotation pens 7804 (the invention includes other ways of placing the system in the annotation mode, such as selecting an appropriate command from a menu or dialog). The user utilizes the selected annotation pen to select a portion of the data object 7803. For example, FIG. 78B illustrates a selected portion 7806 of the data object 7803 that has been selected using the selected annotation pen. Upon selecting the selected portion 7806, the system automatically creates a new annotation, which is illustrated as note segment 7810 in note 7808. The note segment 7810 is automatically linked to the selected portion 7806.

Preferably, the cursor is automatically positioned in an annotation field 7814 of the note segment 7810 so the user can record his observations. When finished, the user presses the save button 7850. Upon pressing the save button 7850, information pertaining to the annotation, such as the user's comments in the annotation window 7814, linking information, location information, the name of the annotation, whether the annotation includes privileged information, etc., are stored in an appropriate data format. Preferably, in a single user system, such annotation information is stored on the local computer. In a multi-user system, the annotation information is preferably stored in a database in such a way that the information can be securely shared with other users.

In the embodiment being described, the system does not provide any guidelines or place any restrictions on the scope and content of the comments. Accordingly, comments entered by the user may be of no value to himself or others. In some cases, the user's comments may be inappropriate given the circumstances under which the comments were solicited.

The user's comments comprise free form text which is entered in the annotation field 7814. In the embodiment being described, the comments are stored in an unstructured data format that is appropriate for storing free text, such as but not limited to a flat file database or a binary large object (BLOB) in a relational database. This data format is not structured in any way and is therefore not appropriate for storing in a standard relational database format.

According to an embodiment, the invention supports form-based annotations. Form-based annotations extend the operation of the annotation system described above to allow an expert user to create a specific form that is directed and limited to the information that one wishes the user to provide. Herein, for reference purposes, the person who creates a form is referred to as the form creator and the person who uses the form in the process of making an annotation is the annotation creator. Preferably, the form-based annotation system operates in a secure, multi-user, client/server system.

Figure 79:
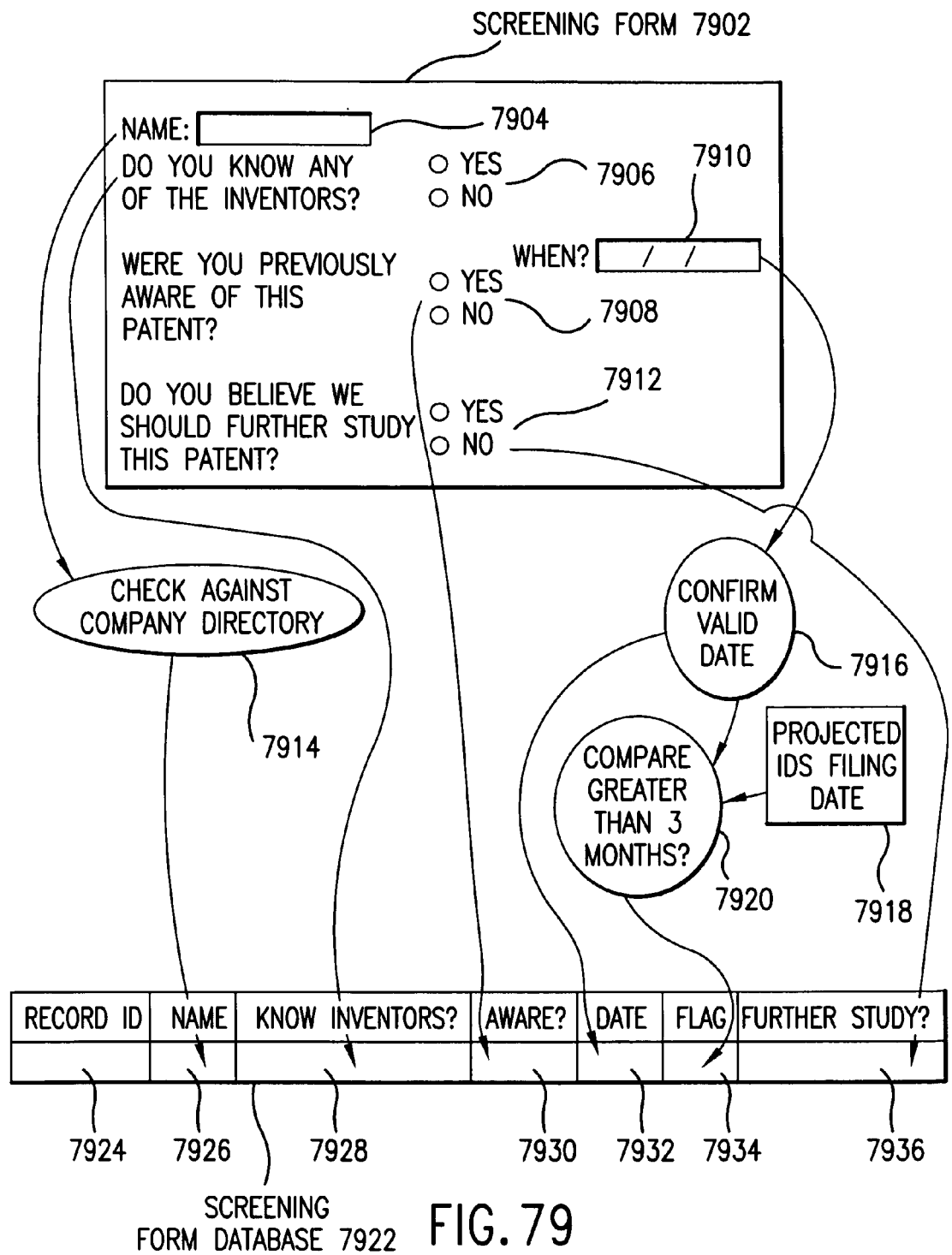
FIG. 79 illustrates an example form-based annotation.

FIG. 79 illustrates an example annotation form, which is called the screening form 7902. According to the invention, annotation forms include any well known input widgets, such as radio buttons (choose one from many items), check boxes (which represents, for example, yes/no or true/false), text input fields (that may include edit checks), etc. For example, the annotation form 7902 includes radio button fields 7906, 7908, 7912, a structured date field 7910, and a name field 7904 which includes an edit check 7914 to ensure that proper data is entered.

According to the invention, data entered into one or more fields of an annotation form are stored in relational database fields. The number of annotation form fields that are stored in relational database fields vary from form to form, depending on the specific implementation of the form creator.

In the example of the annotation form 7902 of FIG. 79, information entered into the name annotation form field 7904 is stored in a name field 7926 of a relational database table 7922. Information from the radio button fields 7906, 7908, and 7912 are stored in fields 7928, 7930, and 7936, respectively, of the relational database table 7922. Date information entered into the when annotation form field 7910 is stored in a date field 7932 of the relational database table 7922.

Figure 80:
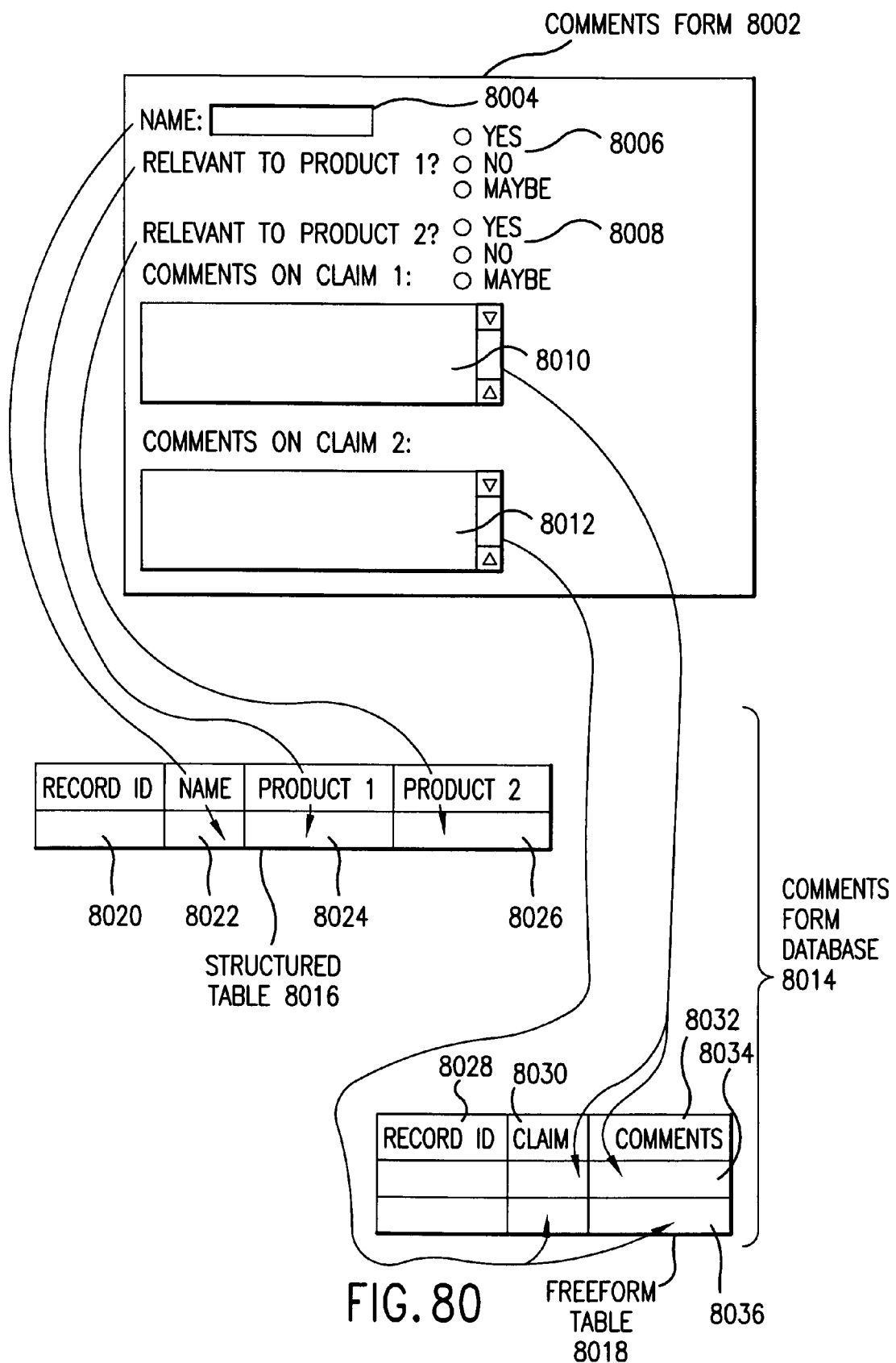
FIG. 80 illustrates another example formed based annotation.

FIG. 80 illustrates another example annotation form, called the comments form 8002. In the example embodiment of FIG. 80, information entered in the comments form 8002 is stored in either a structured table 8016 or a free form table 8018. The structured table 8016 and the free form table 8018 collectively comprise a comments form database 8014. In particular, name information entered into a name annotation field 8004 is stored in a name field 8022 of the structured table 8016. Information from radio button fields 8006 and 8008 are stored in a product 1 field 8024 and a product 2 field 8026, respectively, of the structured table 8016. Free text information entered into a comments on claim 1 field 8010 and a comments on claim 2 field 8012 are stored in rows of the free form table 8018.

It should be understood that the particular database table implementations of the screening form 7902 and the comments form 8002 shown in FIGS. 79 and 80 are provided for purposes of illustration only, and not limitation. Other database and table implementations will be apparent to persons skilled in the relevant arts based on the teachings contained herein. Also, the particular configurations and arrangements of the screening form 7902 and the comments form 8002 are provided for illustrative purposes only, and are not limiting. Other forms will be apparent to persons skilled in the relevant arts based on the teachings contained herein.

Figure 82:
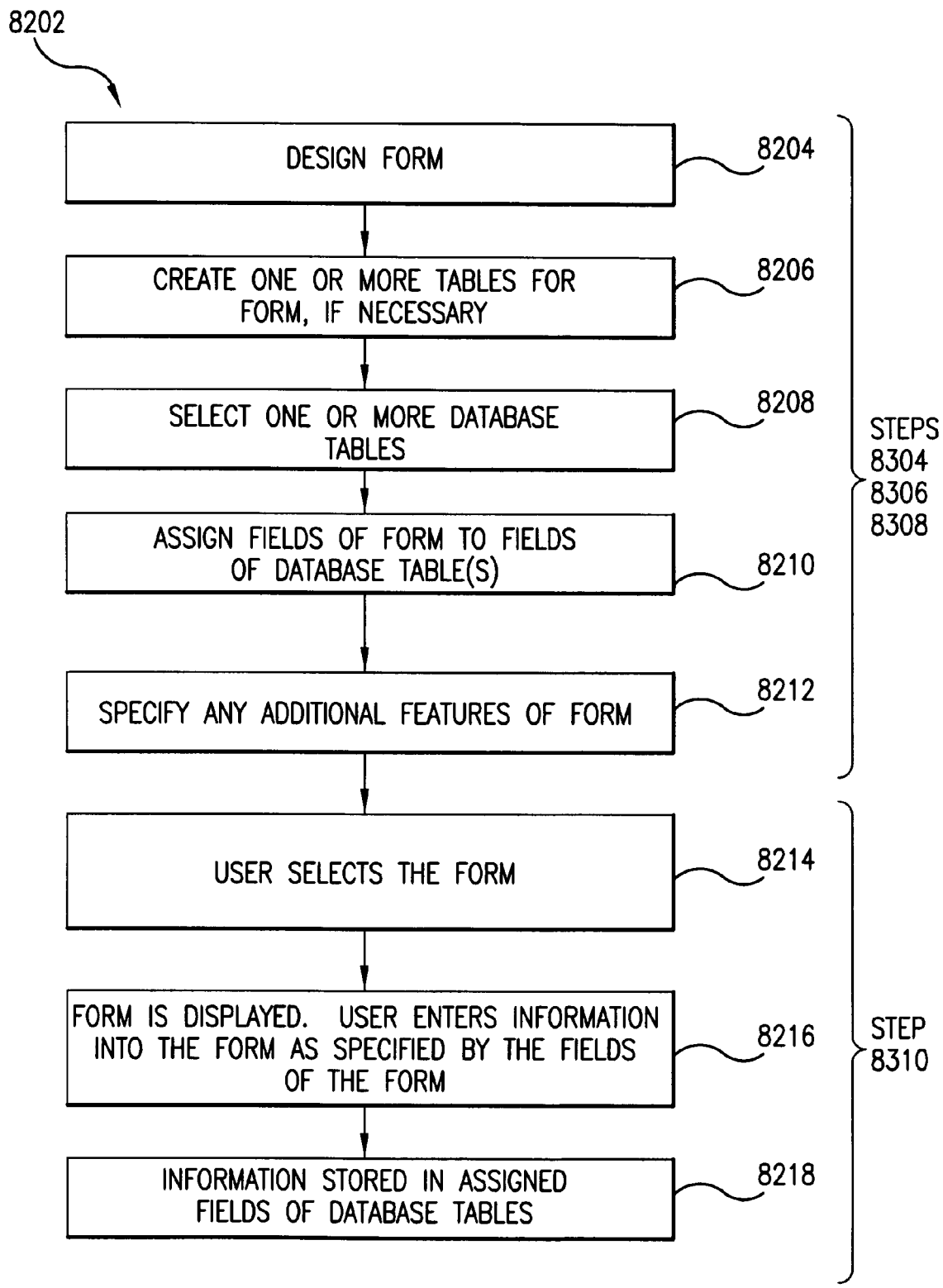

FIG. 82 illustrates a flow chart 8202 that represents the operation of the form-based annotation system according to an embodiment of the invention.

In step 8204, a form creator creates a form, such as the screening form 7902 or the comments form 8002. The form creator is any user who has been designated as a person capable of creating and editing forms.

In step 8206, one or more relational database tables are created for the form, if necessary. Information entered into the form created in step 8204 will be stored in these database tables. These database tables may be created by the form creator or by some other user, such as but not limited to a system administrator.

In step 8208, the form creator selects one or more relational database tables for storing the information that is to be entered into the form. The selected database tables may include, for example, one or more of the tables created in step 8206, and/or other database tables created at other times.

In step 8210, the form creator assigns one or more fields (columns) from the selected relational database tables to each of the fields of the form. Data entered into the fields of the form are stored in the selected database table fields.

In step 8212, the form creator specifies and defines any additional features of the form. For example, the form creator can specify processing associated with any of the fields of the form. Considering FIG. 79, for example, the name field 7904 involves processing 7914 to check name information against a company directory to ensure that the name information was entered correctly into the name field 7904. The screening form 7902 also includes processing 7916 associated with the when field 7910 that involves confirming that the date entered into the when field 7910 is a valid date. The when field 7910 includes further processing 7920 associated with comparing the date entered into the when field 7910 with a projected IDS (information disclosure statement) filing date 7918 to identify issues associated with submitting references to the U.S. Patent Office. For example, if the projected IDS filing date 7918 is greater than 3 months after the date entered into the when field 7910, then a flag is set in database field 7934. The flag indicates that there may be an issue relating to whether or not the reference can be cited with the U.S. Patent Office in satisfaction of the duty of disclosure for a pending U.S. patent application. Other form features that can be specified in step 8212 is further described below.

After step 8212 is completed, the design of the form is complete. Steps 8214, 8216, and 8218 involve the manner in which an annotation creator uses a form.

In step 8214, the annotation creator selects a form. The form is tied to a specific pen (or some other annotation invocation mechanism, such as an option on a menu). The annotation creator selects the pen for the form, thereby informing the system which form to invoke, how to collect/store the data, etc.

In step 8216, the selected form is displayed. The annotation creator enters information into the form as specified by the fields of the form.

In step 8218, information entered into the fields of the form is stored in the associated relational database fields as defined by step 8210.

The operation of the form-based annotation system of the present invention is further described with reference to a flow chart 8302 shown in FIGS. 83A and 83B. Steps 8304, 8306, and 8308 of flow chart 8302 generally correspond to steps 8204, 8206, 8208, 8210, and 8212 of flowchart 8202 of FIG. 82. Step 8310 of flowchart 8302 generally corresponds to steps 8214, 8216, and 8218 of flowchart 8202 of FIG. 82.

In step 8304, preferably the system administrator authorizes a given user (the form creator) to create forms. In other words, the ability to create, modify, edit, and otherwise operate with forms is preferably a secured operation. This is because the creation of the form includes appropriate provisions for storing the data acquired for the use of the form in relational database(s) for backend statistical processing, as well as other processing.

In step 8306, the form creator logs into the system and creates a form to capture the data he is interested in capturing.

The invention supports all known input widgets, including radio buttons, text input fields, check boxes, etc. The form creator explicitly or implicitly associates input widgets with back end database tables. Even the meta content of the tables may be stored with the form allowing for the use of sophisticated data mining applications of the form and the data. It is also possible to associate programmic operations with the form. Examples of such operations include edit checks on input fields, processing based on data entered into fields, invocation of other applications based on information entered into fields, etc.

In step 8308, the form creator associates the form with a pen (such as one of the annotation pens 7804 as shown in FIG. 78A) or other annotation mechanism (such as a pull down menu). This is part of a publishing process in which the form creator also specifies appropriate identifying characteristics of the form (such as a name of the form) and the storage locations of the data that is to be captured by form (that is, the relational database table fields in which the data entered into the form is stored).

The publishing process also allows the form creator to specify which user or groups of users should be allowed access to the form. Users are preferably identified by either their log in I.D. (identification) or by a role I.D. that specifies the role that they are assuming with respect to the operation of the system. In this way, the form creator can customize the operation and presentation of a given form-based on the user's role. For example, for a particular form, some fields are shown to marketing people, whereas other fields are shown to engineering people. Some fields may be shown to both marketing and engineering people. Further, some processing may be performed when the user has a marketing role, and other processing may be performed when the user has an engineering role. Some processing may be shown to both engineering and marketing people.

In an embodiment, the role based process described above allows a person to play multiple roles at the same time. Thus, a marketing/engineering role would see both marketing and engineering forms.

The form creator can also associate multiple forms with a single annotation mechanism. The form creator can further decide if they want the system to route the form to specific users and, if so, the manner of routing.

After completion of step 8308, design of the form is complete. In step 8310, the annotation creator uses the form to create an annotation. In particular, the annotation creator creates a new annotation by possibly using a pen, as described above. The system invokes the form associated with the pen and presents it to the user. In a case that multiple forms have been associated with a single annotation mechanism, the system presents a choice of forms to the user for selection (e.g., through a pull down menu, or pick list). Alternatively, the system sequences through the forms associated with the annotation mechanism. The user enters the information called for by the form, and the system stores this information in the appropriate relational database locations (and potentially other non-relational database locations) as specified when the form was being designed.

The form-based annotation system will now be further described by considering a number of examples.

Medical Example As noted above, form-based annotations can be used to better ensure that specific and desired information is collected from the user. Consider a doctor who has asked a colleague to review an X-ray to determine if a specific medical condition is present. The colleague may not fully understand the request, and enter irrelevant information as an observation if they are using a text field for annotations, as with the "free-text" annotation system of FIGS. 78A and 78B. However, the doctor could create a form that asks specific medical questions. In this case, when their colleague makes an annotation, he would be prompted for the desired medical input.

Legal Example

A lawyer may wish to have an engineer comment on one or more claims of a patent, but would like to control the specific commentary that can be entered by the engineer. With free-text annotations, the engineer could inadvertently enter inappropriate information. With form-based annotations, the lawyer could limit the amount and kind of information that an engineer could enter.

Figure 81:
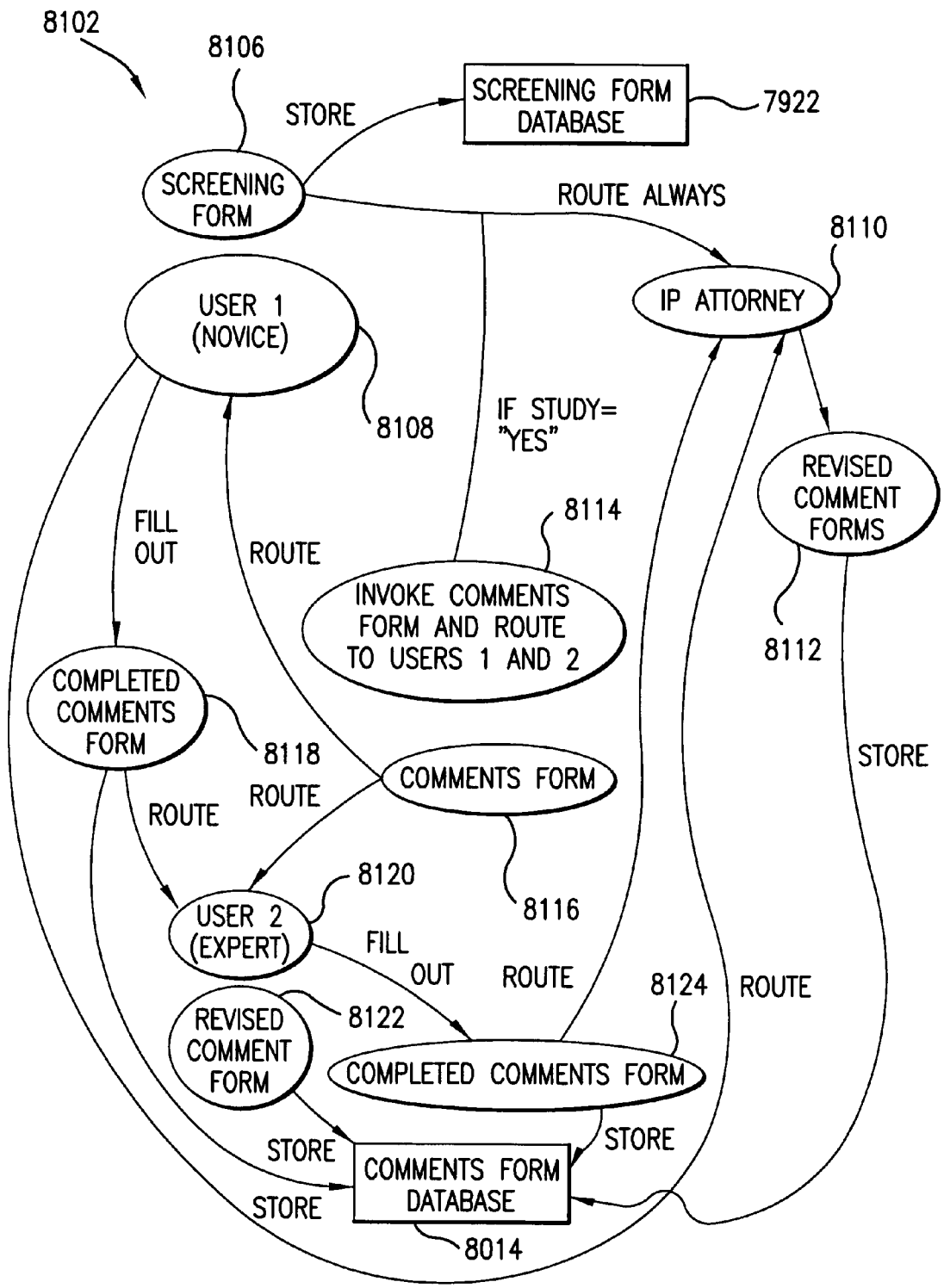
FIG. 81 is a data flow diagram used to describe form-based annotations according to embodiments of the invention.

For example, consider the scenario shown in FIG. 81. A novice user 8108 fills out a screening form 8106 (see FIG. 79), which is then stored in the screening form database 7922. The completed screening form 8106 is also automatically routed to the IP (intellectual property) attorney 8110 (this operation is programmed into the screening form). If, in completing the screening form 8106, the user 8108 checked the "Do you believe we should further study this patent?" field, then the comments form (FIG. 80) is routed to the novice user 8108 and an expert user 8120 to solicit their comments (this operation is programmed into the screening form).

The comments form is completed by both the novice user 8108 and the expert user 8120. Their completed comments forms 8118, 8124 are stored in the comments form database 8014. Also, the novice user's completed comments form 8118 is routed to the expert user 8120 for review (this is programmed into the comments form). The expert user 8120 may revise the novice user's completed comments form 8118. The revised comment form is indicated as 8122. The revised comment form 8122 is stored in the comments form database 8014.

Similarly, the completed comments forms 8118 and 8124 are routed to the IP attorney 8110, who may enter his own comments 8112, which are stored in the comments form database 8014 (this is programmed into the comments form).

Product Development Example

There are times when one user, who is an expert in one domain, wants specific opinions from one or more users whose expertise lies in different, but related, domains. In this case the first expert could annotate a specific portion of a data object. When another expert accesses this annotation the system will prompt them, through the use of a form-based annotation, for their opinion of the annotated data object. The system provides a wide variety of mechanisms to obtain feedback from expert users, as well as other selected users, including routing and multiple routing slips and time-based expirations.

Consider a product development example where a product marketing manager may want an engineer to provide a cost estimate on how much it would cost to manufacture a patented product to help determine long-term product strategy. In this case, the marketing manager would associate appropriate edit-checks on the input widgets of the form to ensure that the engineers are entering in numeric information in a reasonable range. Because a decision is needed quickly the marketing manager routes it through the company email system to all of "ENGINEERING" specifying a time-limit of 7 days. If an engineer does not respond within 7 days the system automatically removes the request from their "work queue".

Note that an engineer may annotate the patent several times, thereby providing multiple cost estimates, one for each annotated portion of the patent that would, in the opinion of the engineer, result in a component or portion of the product. In this case, the system would operate in a manner similar to free-text annotations, automatically creating sub-forms contained within a larger "form" (much like creating sub-notes in the context of a note). The form-creator would have to decide on the operation of these forms during the creation process (e.g., the form-creator would either allow or reject the use of multiple sub-forms within a form).

Additional Product Development Example

Form-based annotations enable the collection and storage of observations of users who make annotations in a way that these observations can be used for reliable reporting and other statistical data mining operations.

Consider the product development example discussed above. After 7 days the product marketing manager could run a report that produces the weighted average of the cost estimates from the engineers. The system could perform this report by querying specific database columns, and extracting data from specific database columns. For example, the system can execute a search in a Department column of the relational database to identify all rows of the database that correspond to annotations made by members of a given engineering department. The system can then extract data from the "Cost Estimate" column of the identified rows.

Accordingly, the form-based annotation system of the invention facilitates data mining, statistical processing, and other processing of the annotation data.

If, instead, a free text format was used, it would be necessary to parse the free-text to extract the desired information.

It is noted that the invention is not limited to only storing information in formally structured fields within a relational database. In fact, a form could contain a mixture of structured fields (such as dates, numbers, or Boolean) and unstructured text fields, as discussed above.

Medical Teaching Example

With free text annotations, for example, the user selects a portion of a data object and then describes why the selected portion is relevant. Sometimes this is exactly the opposite order of what is desired. Specifically, sometimes an expert user wants a different (and perhaps more novice) user to annotate a portion of a data object in response to what the expert user created.

For example, a teacher could create the contents of an annotation and ask students to "find the spot where the annotation is true". For example, a teacher could prepare a series of x-rays of difficult to diagnose fractures. The assignment could be: "Identify the location of the hairline fracture". Students would then annotate the data object where they thought the fracture was using a form-based annotation, possibly adding commentary on their selection in a new annotation window (or in the original). The teacher could then compare the work of the student to a known standard.

Searching

The invention supports a variety of types of data objects. For example, the invention supports patent related data objects, corporate documents (which, in some embodiments, constitute non-patent related data objects), etc. Such data objects are preferably stored in system databases, such as the IPAM databases 7614 and/or local databases 7612 (see FIG. 76). The invention also supports data objects that are not stored in system databases. For example, the invention supports data objects that are available from third parties. Such third parties include, but are not limited to, on-line data providers, such as LEXIS-NEXIS, Dialog, Westlaw, Derwent, etc. Third parties also include, but are not limited to, public or government databases, such as those associated with the SEC, FCC, FDA, Department of Motor Vehicles, Social Security, etc. With regard to such third party providers, the invention supports establishing a link with the third parties, and enabling users of the invention to interact with the third parties via the link. Such third party providers include well known interfaces or APIs (application programming interfaces). In embodiments, the invention interacts with such third parties via their respective interfaces or APIs.

Figure 34:
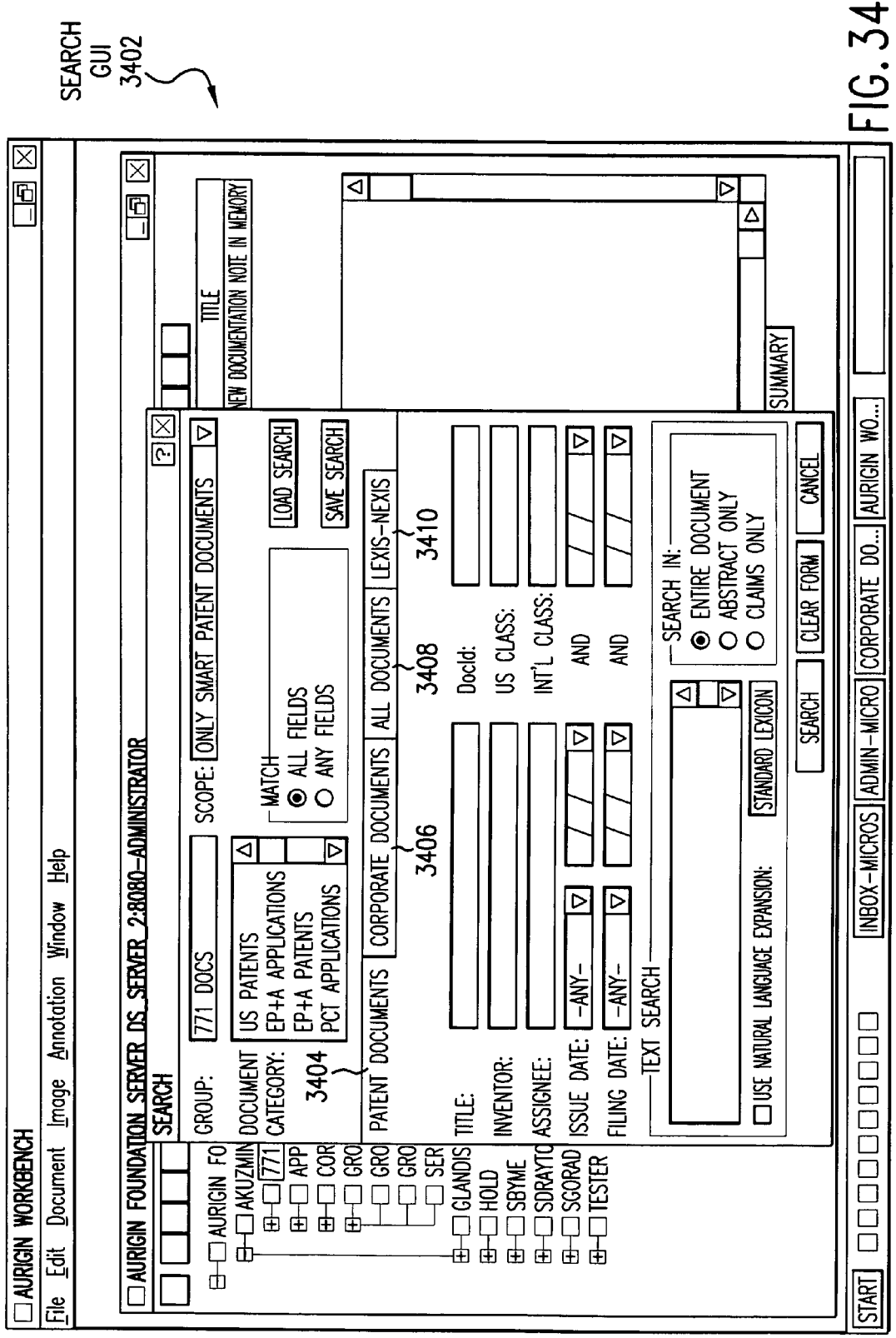

The invention includes functionality to enable users to conduct complex searches through the data objects that it supports. The invention provides detailed graphical user interfaces (GUI) to enable users to define their searches. FIG. 34 illustrates an example search GUI 3402. In the example of FIG. 34, the search GUI 3402 includes a variety of tabs associated with the data object types supported by the invention.

Figure 35:
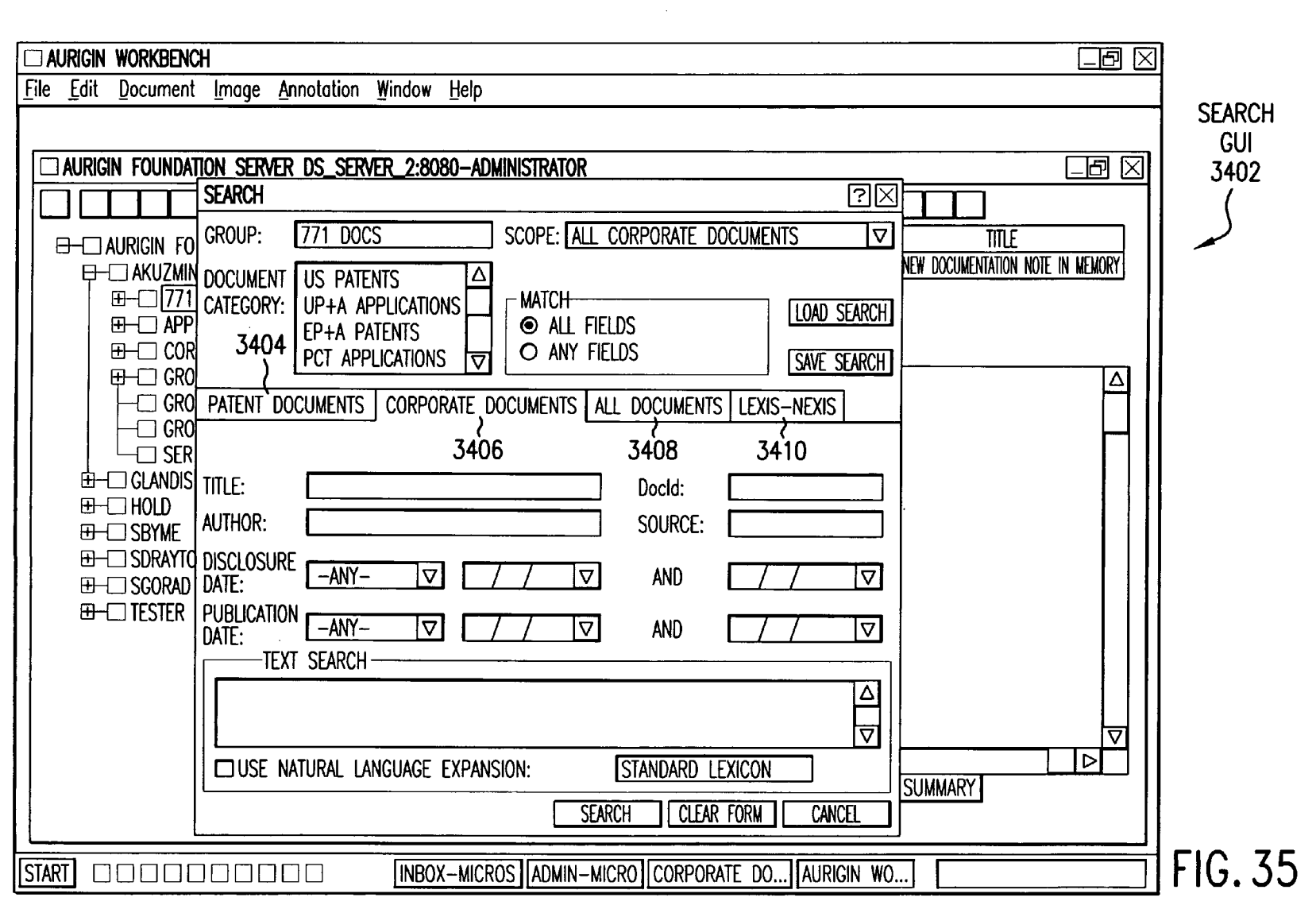
Figure 36:
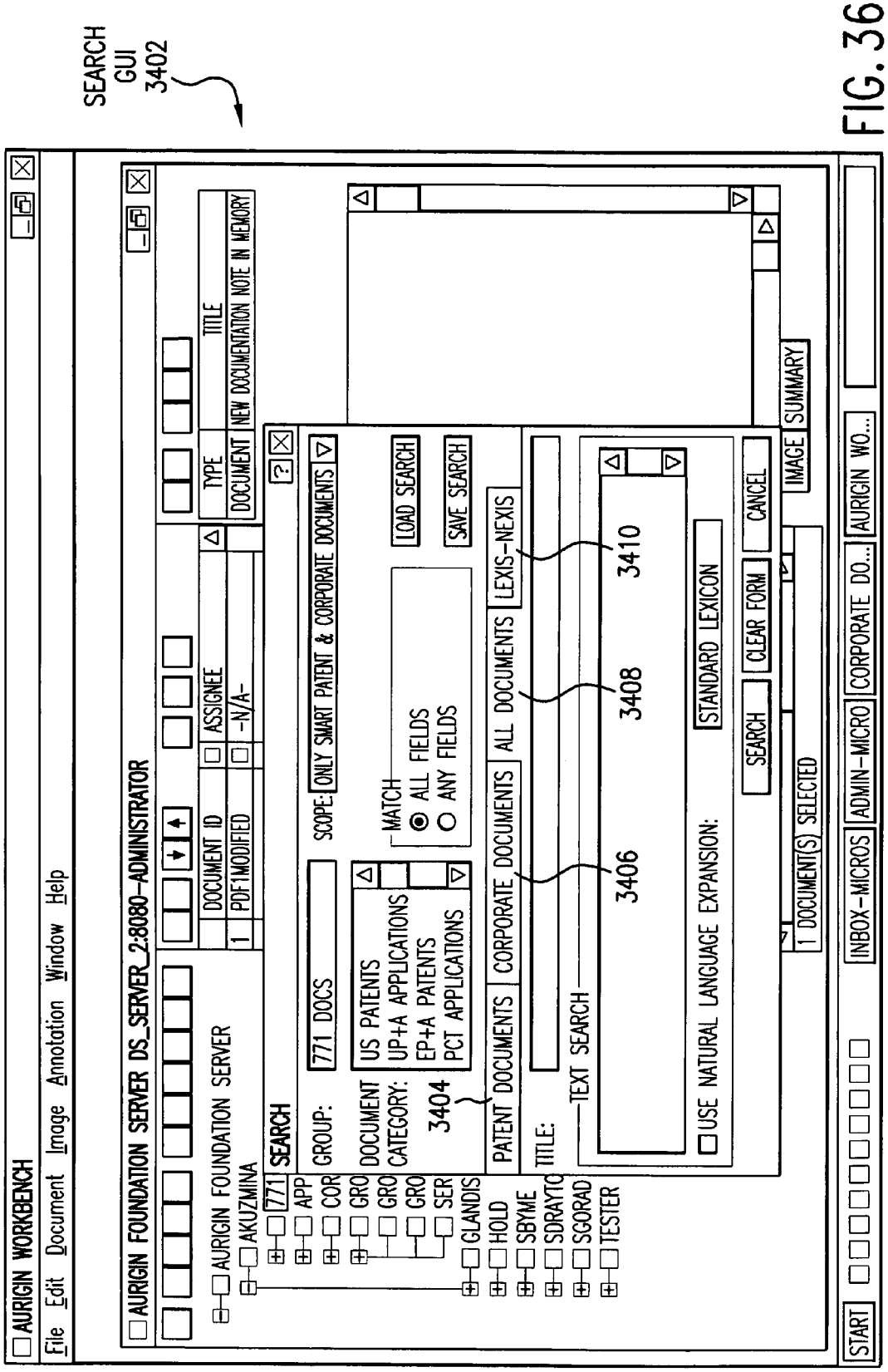

For example, the invention includes a patent documents tab 3404 for specifying a search among the patents stored in the system databases. The search GUI 3402 also includes a corporate documents tab 3406 for specifying a search among the corporate documents stored in the system (see FIG. 35). The search GUI 3402 also includes an all documents tab 3408 for specifying a search among all data objects stored in or supported by the system (see FIG. 36).

The search GUI 3402 further includes tabs for third party information providers supported by the system. For example, and without limitation, a LEXIS-NEXIS tab 3410 in the search GUI 3402 is selected to define a search to be performed by the LEXIS-NEXIS system: In an embodiment, upon providing such search criteria, a link is established with the third party information provider wherein the third party is instructed to perform the specified search. Search results are then returned to the system (i.e., the enterprise server 7604, the network client 7608, and/or the web client 7606). Such information is then treated as any other system information.

Further details pertaining to the searching capabilities of the invention are described in U.S. Patent Application "System, Method, and Computer Program Product for Patent-Centric and Group-Oriented Data Processing," Ser. No. 08/867,392, incorporated herein by reference in its entirety.

Data Presenting and Processing Using Visualization Technologies, Such as Hyperbolic Trees The invention supports the use of a variety of visualization technologies to present information to users. Such technologies include, but are not limited to, hyperbolic trees. Other technologies useful for presenting data to users are discussed in sections below.

A hyperbolic tree or a hyperbolic browser is a well known "focus plus context" technique for visualizing and manipulating data hierarchies, such as trees. A hyperbolic browser assigns for display a portion of a tree while still embedding in it the context of the entire tree. The essence of this scheme is to lay out the tree in a uniform way on a hyperbolic plane and map this plane onto a display region, such as but not limited to a circular display region (other display geometries are also possible). Thus, hyperbolic trees support a smooth blending between focus and content, as well as continuous redirection of the focus.

Figure 37:
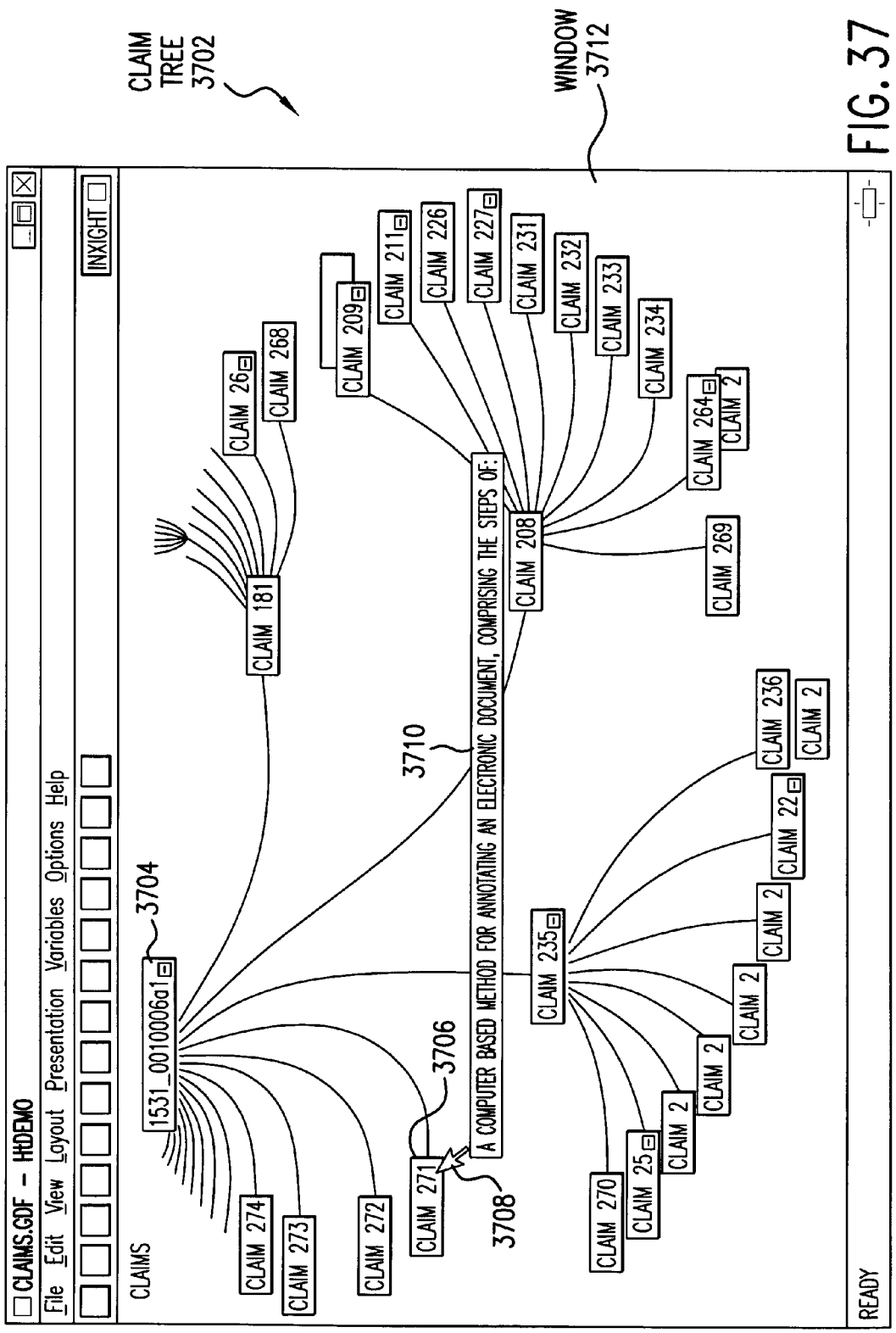
FIG. 37 illustrates an example claim tree.

An example hyperbolic tree 3702 is illustrated in FIG. 37. The hyperbolic tree 3702 includes a root node 3704 and a plurality of additional nodes connected either directly or indirectly to the root node 3704. Additional portions of the hyperbolic tree 3702 can be expanded and displayed in the window 3712 (that is, focus can be redirected to those portions) by traversing to the desired portions in the hyperbolic tree 3702. An operator traverses the hyperbolic tree 3702 using a pointing device, such as a mouse.

According to the invention, the hierarchical information represented in hyperbolic trees may come from any source, including but not limited to patent offices, corporate entities, public records, individual users, etc. In an embodiment, the hierarchical information is patent related, but the invention is not limited to this embodiment.

The invention provides a variety of functions to enable users to customize the display of hyperbolic trees. For example, embodiments of the invention store state information in each node of the hyperbolic tree.

Figure 42A:
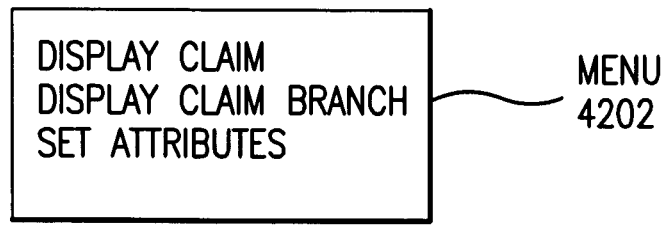
FIG. 42A depicts a menu applicable to claim trees.
Figure 42B:
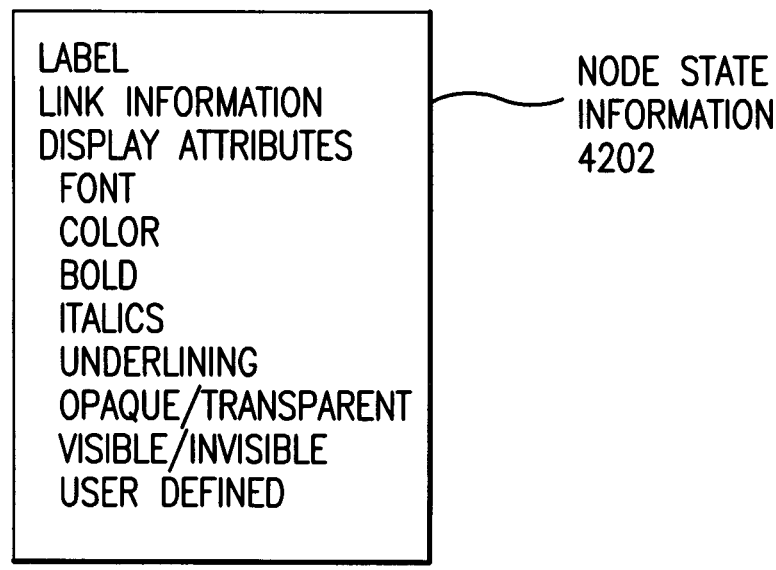
FIG. 42B illustrates node state information that is stored in nodes of hyperbolic trees according to an embodiment of the invention.

FIG. 42B illustrates example node state information 4202 which is stored in each node of the hyperbolic tree. The node state information 4202 includes the label that is displayed in the associated node. For example, the label of node 3706 in FIG. 37 is "claim 271".

The node state information 4202 also includes display attribute information that indicates the manner in which the node is to be displayed in the window 3712. Such display attributes include any attributes for displaying information on a computer screen, such as font, color, bold, italics, underlining, visible/invisible, etc. The display attributes also include user defined and custom attributes, which are entered by a user. The user defined attributes are useful to enable users to specify the display of nodes to meet their specific applications.

In some embodiments, the display attributes of a node are automatically set based on the information corresponding to the node. For example, when a hyperbolic tree is used to display a patent claim tree, the display attributes of nodes may depend on whether the nodes correspond to a patent or a claim, an independent claim or a dependent claim, a disclaimed claim, a valid claim, an invalid claim, an infringed claim, a non-infringed claim, a claim that has been annotated, etc.

In some embodiments, the display attributes may be set according to information entered into the user defined field. For example, if the user enters that a given claim is invalid, then the font and color display attributes may be set to preselected values corresponding to invalid claims. Therefore, the user defined field(s) and the display attributes portion of the node state information 4202 may specify actual display attributes (such as crosshatching), or state information that the system uses to automatically set the display attributes.

The node state information 4202 also includes link information that establishes a link between the node and associated information in the system databases (i.e., the IPAM databases 7614 and/or the local databases 7612 shown in FIG. 76). In the case of a claim tree 3702 in FIG. 37, the link information establishes a link between the node and the text of the claim associated with the node. Alternatively, such claim text can be stored in the node itself as part of the node state information 4202. In other embodiments, a portion of the claim text (such as the preamble or a portion thereof) is stored in the node as part of the node state information 4202, and the link information in the node state information 4202 establishes a link to all of or the remaining portion of the claim text.

The invention supports functions to edit the appearance of a hyperbolic tree. For example, the invention allows a user to prune a tree by removing nodes or branches. In embodiments of the invention, such pruning is accomplished by deleting the identified nodes and/or branches from the tree. In other embodiments of the invention, such pruning is accomplished by appropriate setting of the display attributes of the selected nodes and/or branches. Specifically, nodes corresponding to portions of the tree which a user has selected to delete are set to invisible or transparent.

Specific embodiments of hyperbolic trees supported by the invention are described below. It is noted that these embodiments are provided for illustrative purposes only, and are not limiting. Additional applications of hyperbolic trees will be apparent to persons skilled in the relevant art(s) based on the teachings contained herein.

Patent Claim Trees

As noted above, the invention includes a patent claim tree module that supports patent claim trees.

The patent claim tree module generates a graphically displayed claim tree from a collection of claims. The patent claim tree module works both as a standalone product, and as an add-on to IPAM.

The patent claim tree module includes a mechanism to elicit help from the user when it fails to understand enough about a claim to perform its function. Whenever the patent claim tree module experiences ambiguity or failure in the processing of a claim, it will produce a log entry containing the text of the claim, the claim properties inferred by the patent claim tree module, and any corrections brought about by the user.

The patent claim tree module preferably uses the graphical display of the tree to convey visually the properties of individual claims. These properties include, but are not limited to:
Root/Independent/Dependent
Claim type (Method, Composition of matter, Machine, . . . )
Other properties are described herein.

In some embodiments, the style of claims supported by the patent claim tree module is limited to the one prevalent in standard utility patents. As a result, the patent claim tree module covers claim sections contained in any document whose style is substantially identical to that of utility patents (e.g. Reissues, Statutory inventions). Alternative embodiments support other claim styles that are different (e.g. Design patents, Plant patents).

Figure 87:
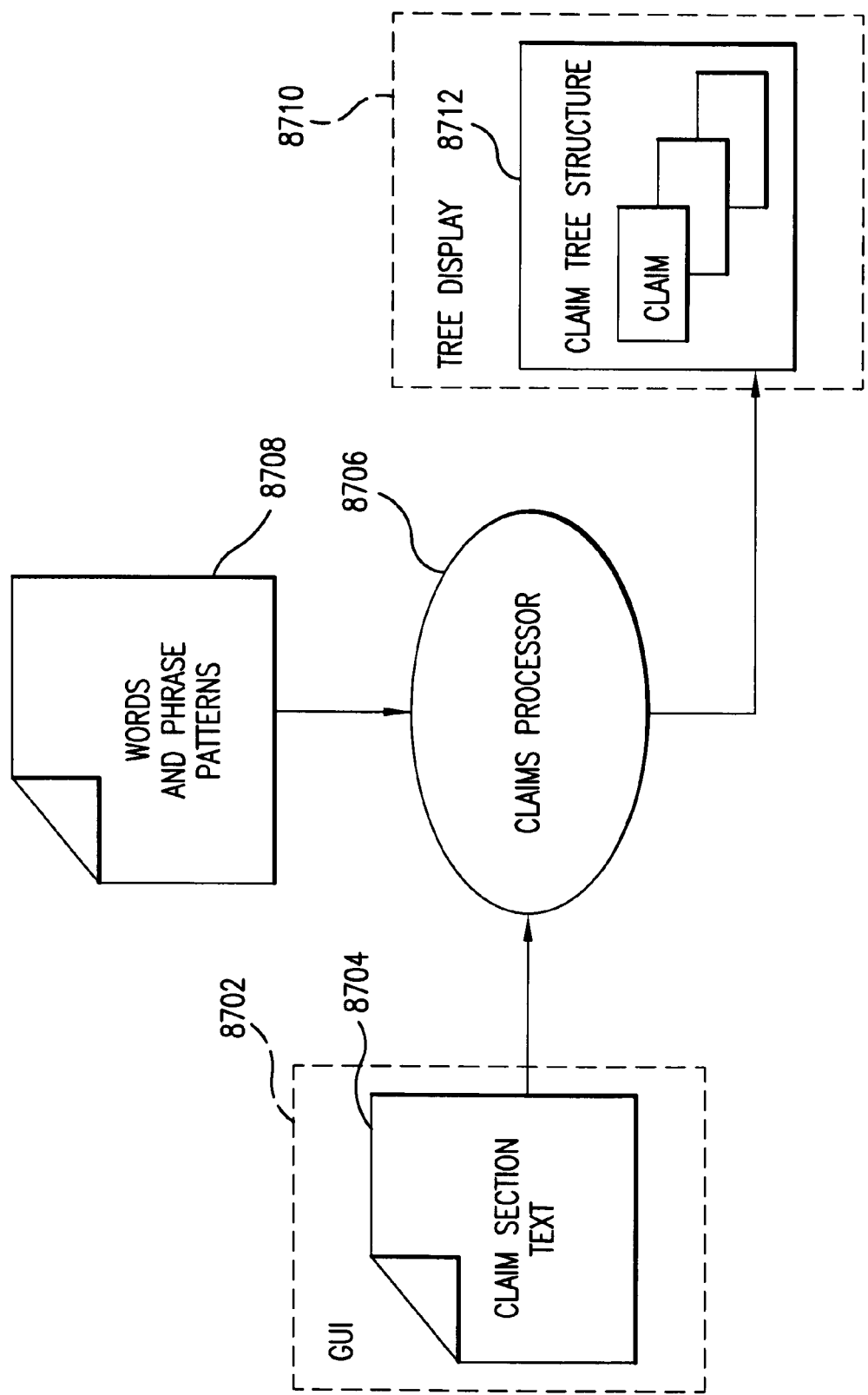
FIG. 87 illustrates an example patent claim tree module.

FIG. 87 illustrates an example patent claim tree module 8706, which is also herein called a claims processor. The patent claim tree module 8706 is composed of three main stages: A Preprocessor, an Aggregator, and a claim parser.

The responsibilities of the Preprocessor include:
Remove any leading or trailing text
Divide the text into a collection of claims
Turn the input character stream into a token stream that only contains the words that may be of use to the rest of the process.

The Aggregator further turns sets of tokens following certain patterns into single tokens.

The claim parser uses the token string corresponding to each claim to set the properties of that claim as well as its dependency relationships to other claims. Its final product is preferably a directed a-cyclic graph representing the claims of the collection, their properties, and their dependencies.

An example claim tree 3702 is shown in FIG. 37. In the claim tree 3702, the root node 3704 represents the patent or the patent application. In the example of FIG. 37, the claim tree 3762 corresponds to a patent application having Attorney Docket No. 1531_0010006.

The nodes directly connected to the root node 3704, such as the nodes corresponding to claims 181, 208, 235, 271, 272, 273, and 274, represent the independent claims in the patent or patent application. The nodes connected to these independent claim nodes represent the dependent claims of the respective independent claims. The links in the patent claim tree 3702 represent the dependencies between claims.

The invention supports a number of functions to facilitate the display and analysis of claims. For example, when the cursor is positioned proximate to or over a claim node, a portion of the claim is displayed (in other embodiments, the entire claim is displayed). In FIG. 37, for example, the cursor 3708 is displayed over node 3706 corresponding to claim 271. According to this embodiment of the invention, a portion of claim 271 is retrieved and displayed in window 3710. This portion of the claim can be retrieved from the node state information 4202, if available, or can be retrieved from a system database (such as the IPAM databases 7614 and/or the local databases 7612) by access to the link information in the node state information 4202.

The invention also supports a "display claim branch" function. As is well known, a dependent claim is construed to include the base independent claim and any intervening claims. When the user positions the cursor over a dependent claim and selects the "display claim branch" command, the system retrieves the text of the selected claim, its base independent claim, and any intervening claims between the selected claim and the base independent claim. Such retrieval can be accomplished, for example, by following the links in the claim tree 3702 from the selected claim to the associated independent claim. The invention then displays the retrieved claim language in the order of dependency. In an embodiment, the retrieved claim text is concatenated in order of the independent base claim, the intervening claims, and finally the selected dependent claim.

For example, assume that the user elected to perform a "display claim branch" function on claim 270 shown in FIG. 37 as being dependent on claim 235. The text of claim 270 is illustrated in window 4002 of FIG. 40. The text of claim 235 is illustrated in window 3902 of FIG. 39. Upon issuing the "display claim branch" command on claim 270, the invention retrieves the text of claims 270 and 235. The invention then concatenates the retrieved text in order of dependency. The concatenated text is then displayed in a window, for example, window 4102 of FIG. 41. Note that the information displayed in window 4102 has a portion 4104 corresponding to claim 235, and a portion 4106 corresponding to claim 270.

Other display formats for presenting and displaying the retrieved claim text will be apparent to persons skilled in the relevant arts based on the discussion contained herein.

Claim trees are useful for a number of applications, including but not limited to:
Automatically calculating claims fees for adding independent and dependent claims to a pending application or at the time a case is allowed.
Separating out "method" and "process" claims from preamble search criteria.
Identifying "system" claims from preamble search criteria.
Identifying "compound" and "chemical structure" claims from preamble search criteria.
Identifying "Jepson" type claims by searching for appropriate preamble language.
Showing "Once Amended", "Twice Amended" and similar distinctions in claims submitted by adding these terms to the search criteria immediately following the claim number.
Graphically showing claim dependency for ease of analysis.
Graphically showing claim dependency to determine claim scope and coverage.
Generating claim charts for presentations.

The claim tree functionality of the present invention supports performance of these tasks.

Figure 38:
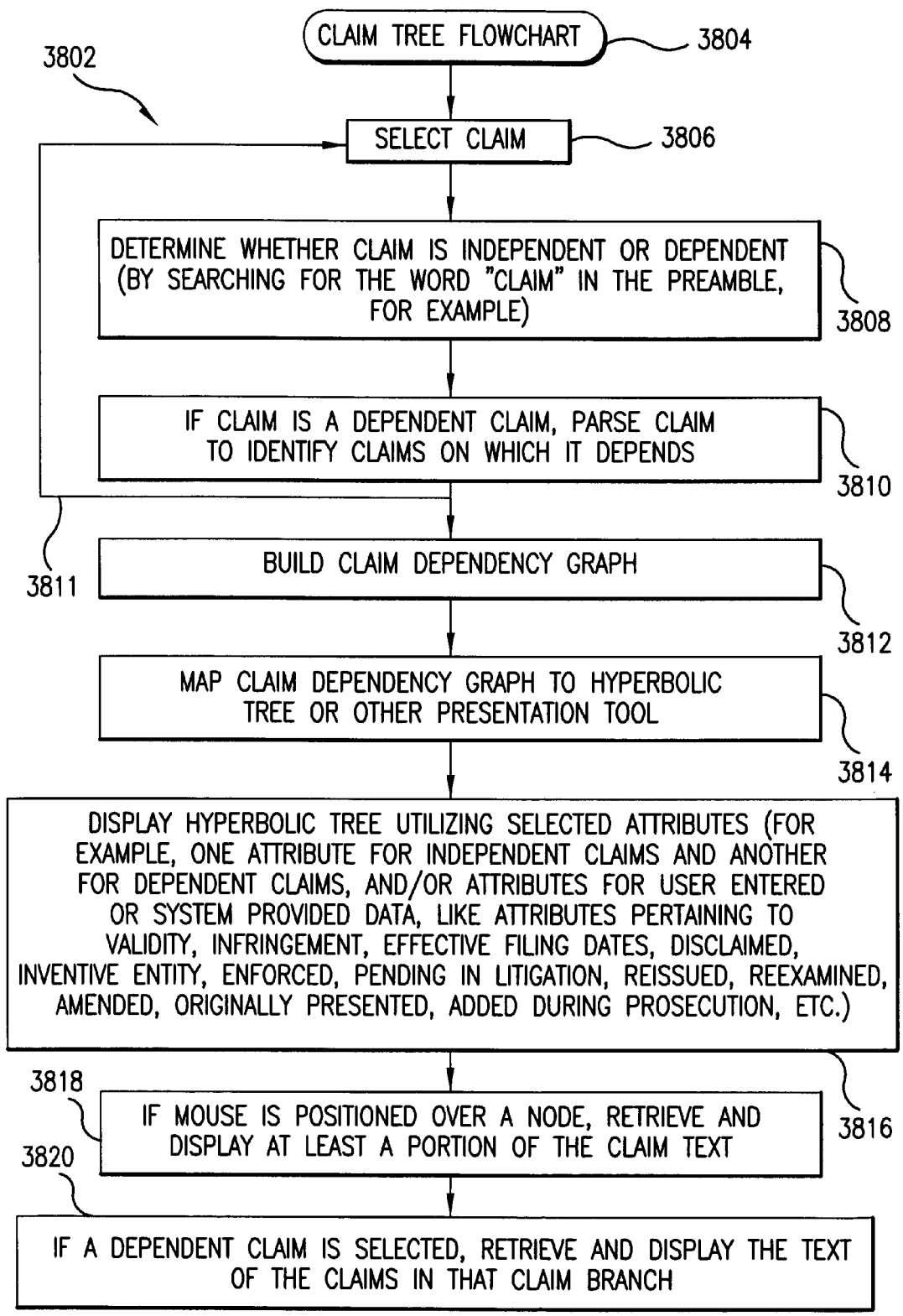
FIG. 38 illustrates a flowchart reflecting the operation of the invention when generating and utilizing a claim tree.

FIG. 38 includes a flowchart 3802 that represents the operation of the invention when generating and processing claim trees.

In step 3806, a claim is selected for processing. As noted above, the claim can be from a patent or a patent application, as long as the patent or patent application is stored in system databases.

In step 3808, the invention determines whether the selected claim is an independent or dependent claim. This is done by parsing the claim text to search for keywords that indicate whether the claim is independent or dependent. For example, the claim text may be parsed for the word "claim" in the preamble, which would indicate that the selected claim is a dependent claim.

If the claim is determined to be a dependent claim, then in step 3810 the claim text is parsed to identify the claim or claims on which it depends.

Accordingly, steps 3808 and 3810 correspond to parsing the claim language to identify claim properties and information used to generate the claim tree. Embodiments of the invention operate to recognize key words, phrases, and/or patterns in claims to identify such claim properties and information. The invention is flexible in this regard.

The need for flexibility in this area is motivated by the fact that, even though the language and structure of claims is constrained, claims are still expressed in natural language and present substantial variations in the terms and linguistic patterns used. This requires the patent claim tree module to be easily extensible to recognize new words and linguistic patterns that denote properties supported by the patent claim tree module.

Therefore, embodiments of the patent claim tree module include a configuration file. The configuration file includes information that:

enable specification of words and phrases that denote properties identified and supported by the patent claim tree module (for example, one of these items will be the claim type of Process, which can be denoted, for example, by either the word "method" or the word "process"); and enable specification of words and phrases the patent claim tree module must recognize to correctly segment the text into individual claims, and the claims into sections. Two such phrases are, for example, "as claimed in claim," "in accordance with claim", or "of claim," which introduce one or more claims a claim depends on.

The configuration file can be modified.

In particular, the invention allows the addition of new textual patterns.

Also, in some cases, the user is ask to specify a textual pattern that may help the patent claim tree module deal with a given situation in the future.

Steps 3806, 3808, and 3810 are performed for each claim in the patent and/or application, as indicated by control flow line 3811. Based on the information obtained from processing steps 3806, 3808, and 3810, a claim dependency graph is generated in step 3812.

In step 3814, the claim dependency graph is mapped to a hyperbolic tree or another presentation tool.

In step 3816, the hyperbolic tree is displayed. The display of the hyperbolic tree utilizes the attributes stored in the node state information 4202 of each node. As noted above, such attributes may have been automatically established and processed based on information stored in the system, or may be user defined. The user may enter user defined attribute information by selecting an appropriate menu command, as shown in menu 4202 of FIG. 42A.

In step 3818, if the mouse is positioned proximate to or over a node, at least a portion of the text of the claim corresponding to the node is retrieved and displayed. This capability of the invention is further described above.

In step 3820, if the user selects a dependent claim and selects the "display claim branch" command (see menu 4202 in FIG. 42A), then the "display claim branch" function for the selected claim is performed. The "display claim branch" function is described above.

A user can elect to display the full text and/or image of any claim in the tree. This is done by positioning the cursor proximate to or over the node corresponding to the claim, and then selecting the "display claim" command from menu 4202.

The invention supports other processing of patent claims. For example, the invention supports automatic processing to compare a claim to an arbitrary text description.

Such processing can be used to analyze a claim for infringement purposes. In this application, the claim is compared to a description of a device or process that is accused of infringing the claim. Possible infringement is indicated if there is a close similarity between the claim and the device/process description.

Such processing can also be used to analyze a claim for patentability/validity purposes. In this application, the claim is compared to a description of one or more publications and/or events that might possibly render the claim unpatentable. Possible unpatentability/invalidity is indicated if there is a close similarity between the claim and the publications/events description.

Such processing can also be used to analyze a claim to determine if sufficient support for the claim is contained in the patent specification. In this application, the claim is compared to the specification. Probable support for the claim is indicated if there is a close similarity between the claim and the specification.

In an embodiment, the automatic claim comparison process of the invention is performed by normalizing the claim language of the claim through an implementation dependent linguistic process. The description to which the claim is to be compared is then normalized through a corresponding (sometimes identical or similar) process. The normalized texts are then compared to identify similarities and differences. A conclusion is then reached based on the context of the analysis (i.e., whether it is for purposes of infringement, patentability, validity, support, etc.)

An example of such processing is described in U.S. Pat. No. 5,754,840, which is herein incorporated by reference in its entirety.

As noted above, the patent claim tree module is capable of working in a stand-alone mode. In this mode, an example use scenario is as follows:

1. The user invokes the patent claim tree module.
2. The patent claim tree module comes up. It includes a main input/output window.
3. The user pastes a claim collection into the patent claim tree module's main input window.
4. The user configures the patent claim tree module by adjusting any available options.
5. The user press the tree generation button.
6. The patent claim tree module produces a graphical representation of the claims tree within a special purpose window. Errors and warnings are output to the log window.

The patent claim tree module can also work with IPAM. In this mode, an example use scenario is as follows:

1. The user selects a document within IPAM.
2. The user applies the "view claim tree" command to it (e.g. available inside the right-click pop-up).

3. The command routine (within IPAM) opens the document, extracts the claim section, and invokes the patent claim tree module. The claim section is passed to the patent claim tree module which comes up and pastes in its input/output window.

4. The user configures the patent claim tree module by adjusting any available options.

5. The user press the tree generation button.

6. The patent claim tree module produces a graphical representation of the claims tree within a special purpose window. Errors and warnings are output to the log window.

These use scenarios are provided for purposes of illustration only. The invention is not limited to these use scenarios. Other use scenarios will be apparent to persons skilled in the relevant art(s) based on the herein teachings.

Patent Citation Trees (Patent and Non-patent Citations)

Figure 43:
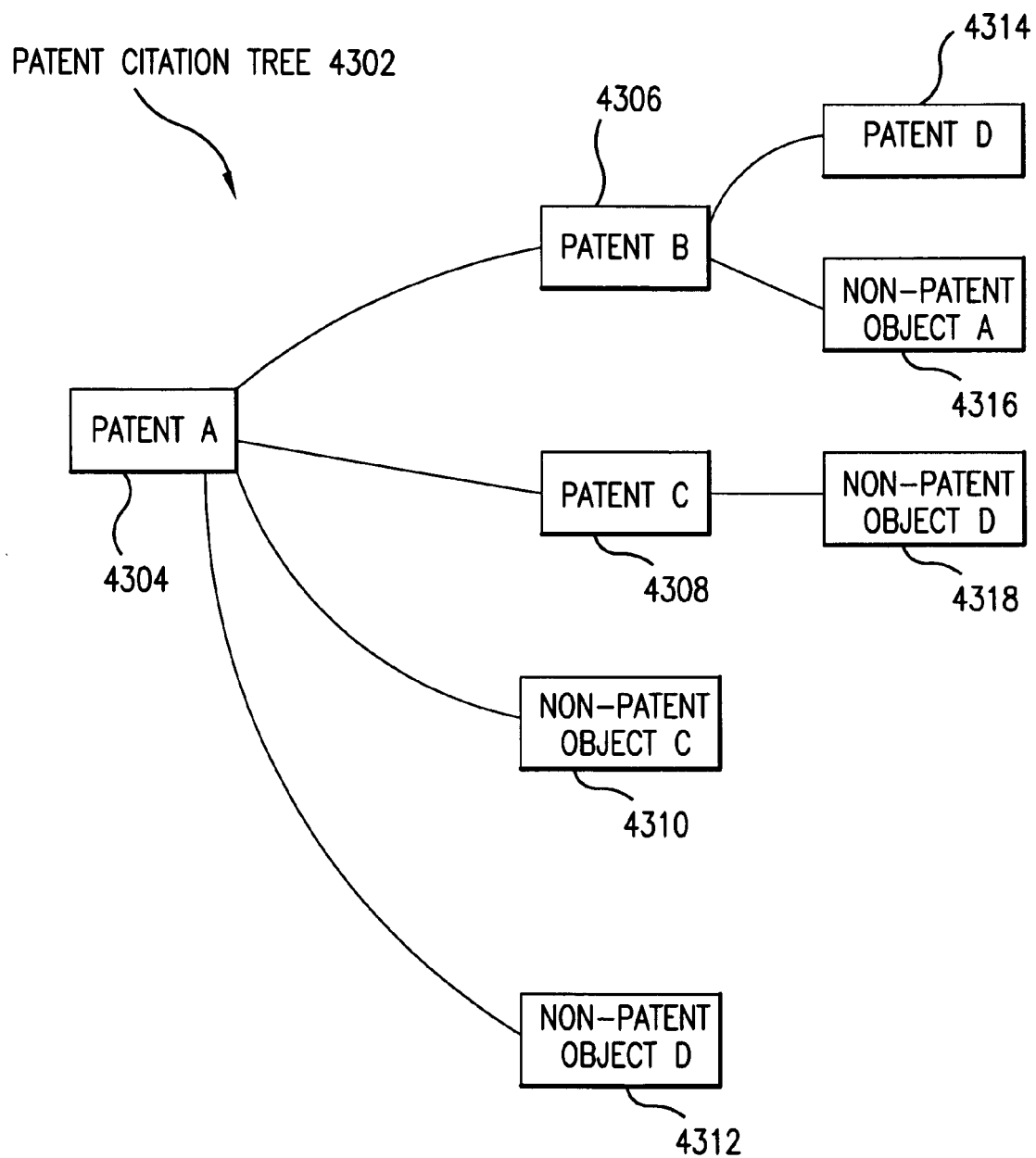
FIG. 43 illustrates an example patent citation tree.

The invention supports patent citation trees. An example citation tree 4302 is shown in FIG. 43. In the patent citation tree 4302, each node represents a patent, and each link represents a citation. When performing a forward patent citation function, the links going from the root node toward the children nodes or leaves represent the directed association "is cited in," as in "parent node is cited in child node." When performing a backward citation function, the links going from the root node toward the leaves represent the directed association "cites," as in "parent node cites child node."

The invention supports displaying a variety of labels in the nodes of the tree. The labels may be any information pertaining to the data objects that they represent. For example, in the case where the data object is a patent, the labels may be any bibliographic information of the patent, including but not limited to the patent number, inventors, assignee, claim language (or excerpt), specification (or excerpt), drawing information such as an image of a figure, class/subclass, patent examiner, law firm, etc. The label that is displayed is user selectable.

Both patents and non-patent documents and data objects may be cited in any given patent. According to the present invention, both patents and non-patent documents/data objects are represented in the patent citation tree 4302. For example, assume that the patent citation tree 4302 is a backwards patent citation. According to this example, patent B and patent C represented by nodes 4306 and 4308, respectively, are cited in patent A represented by node 4304. Non-patent documents or data objects C and D, represented by nodes 4310 and 4312, are also cited in patent A.

According to the invention, information pertaining to the data objects in nodes of a hyperbolic tree, whether a patent citation tree or otherwise, can be retrieved and displayed by selecting the node. Such functionality is accomplished by, for example, reference to the link information in the node state information 4202, or by reference to appropriate database tables.

The display attributes of nodes can be set according to information pertaining to the data objects that they represent. In the case where the data objects are patents, for example, the display attributes of nodes can be set according to any bibliographic information of the patent, including but not limited to the patent number, inventors, assignee, claim language (or excerpt), specification (or excerpt), drawing information such as an image of a figure, class/subclass, patent examiner, law firm, etc. For example, the user can indicate that patents assigned to company X be color coded blue, whereas patents assigned to company Y be color coded red. In response to this input, the system automatically color codes nodes based on their assignee information.

Alternatively, the user can manually set the display attributes of nodes.

It is noted that this aspect of the invention has been described in the context of patent citation trees. However, the invention is applicable to data objects of any type that cite or are cited by other data objects. Accordingly, more generally, the invention supports data object citation trees.

According to embodiments of the invention, citations in citation trees are not limited to data object references that appear in any particular location of the data object(s) in question. For example, a backward citation tree for a U.S. patent is not limited to citations that appear on the front page of the U.S. patent. Also, a citation tree for a technical article is not limited to citations contained in the bibliography of the article. Instead, citation trees can include citations to data objects that can be referenced anywhere in the data object(s) in question.

Preferably, in the case of patents, the invention includes data/text processing techniques for culling/identifying citation references to patents and non-patent documents that are contained within the specification but not listed on the first page bibliographic section. Parsing techniques to identify data in data objects are well known, and any can be used to implement this aspect of the invention. Such references can be included in patent citation trees (they could be displayed using different display attributes to denote their existence in the body of the specification, or can be displayed in different trees).

Example Databases

Databases for implementing the patent citation function of the present invention are illustrated in FIGS. 44 and 45. FIG. 44 illustrates a patent ref table 4402 that stores information on patents that were cited during the prosecution of a given patent. The patent ref table 4402 includes a record for each patent that was cited during the prosecution of a given patent application. Each record of the patent ref table 4402 includes a document_ID that identifies a base patent, and a refpatentno that identifies a reference patent (i.e., a patent that is cited in the base patent).

FIG. 45 illustrates a non-patent ref table 4404 that stores information on non-patent data objects that were cited during the prosecution of a given patent. The non-patent ref table 4404 includes a record for each non-patent data object that was cited during the prosecution of a given patent application. Each record of the non-patent ref table 4404 includes a document_ID that identifies a base patent, and a RefNo that identifies a non-patent data object that was cited in the base patent.

Information pertaining to other databases used by the invention is contained in U.S. patent applications "System, Method, and Computer Program Product for Patent-Centric and Group-Oriented Data Processing," Ser. No. 08/867,392, and "System, Method and Computer Program Product for Managing and Analyzing Intellectual Property (IP) Related Transactions," Ser. No. 09/138,368, incorporated herein by reference in their entireties.

The operation of the patent ref table 4402 and the non-patent ref table 4404 is illustrated in FIGS. 46 and 47. FIG. 46 presents an example patent ref table 4602 corresponding to the patent citation tree 4302 shown in FIG. 43. The patent ref table 4602 indicates that patents B and C are cited in patent A and patent D is cited in patent B.

FIG. 47 illustrates an example non-patent ref table 4702 that also corresponds to the patent citation tree 4302 in FIG. 43. The non-patent ref table 4702 indicates that non-patent data objects C and D are cited in patent A, non-patent data object A is cited in patent B, and non-patent data object D is cited in patent C.

Additional details regarding patent citation trees according to the invention are discussed in U.S. patent applications "System, Method, and Computer Program Product for Patent-Centric and Group-Oriented Data Processing," Ser. No. 08/867,392, and "Using Hyperbolic Trees to Visualize Data Generated by Patent-Centric and Group-Oriented Data Processing," Ser. No. 08/921,369, incorporated herein by reference in their entireties.

Data Object Family Trees

The present invention supports data object families. A data object family comprises a collection of data objects that are somehow related, and information pertaining to the relationships between the data objects in the family.

There are many types of families and family relationships. For example, the patent citation tree described above is an example data object family where the family includes a base patent and patents and non-patent data objects that are cited in or that are cited by the base patent.

According to the invention, data object families are contexts for organization, visualization, analysis, and other processing, as described above.

The invention supports the creation, generation, visualization, manipulation, and other processing of data object families. Data object families may be system defined or user defined.

Data object families are further described in the following sections.

Examples of Data Object Families

A number of the data object families supported by the present invention are described below. The invention is not limited to these examples. Additional data object families will be apparent to persons skilled in the relevant arts based on the discussion contained herein.

Figure 51:
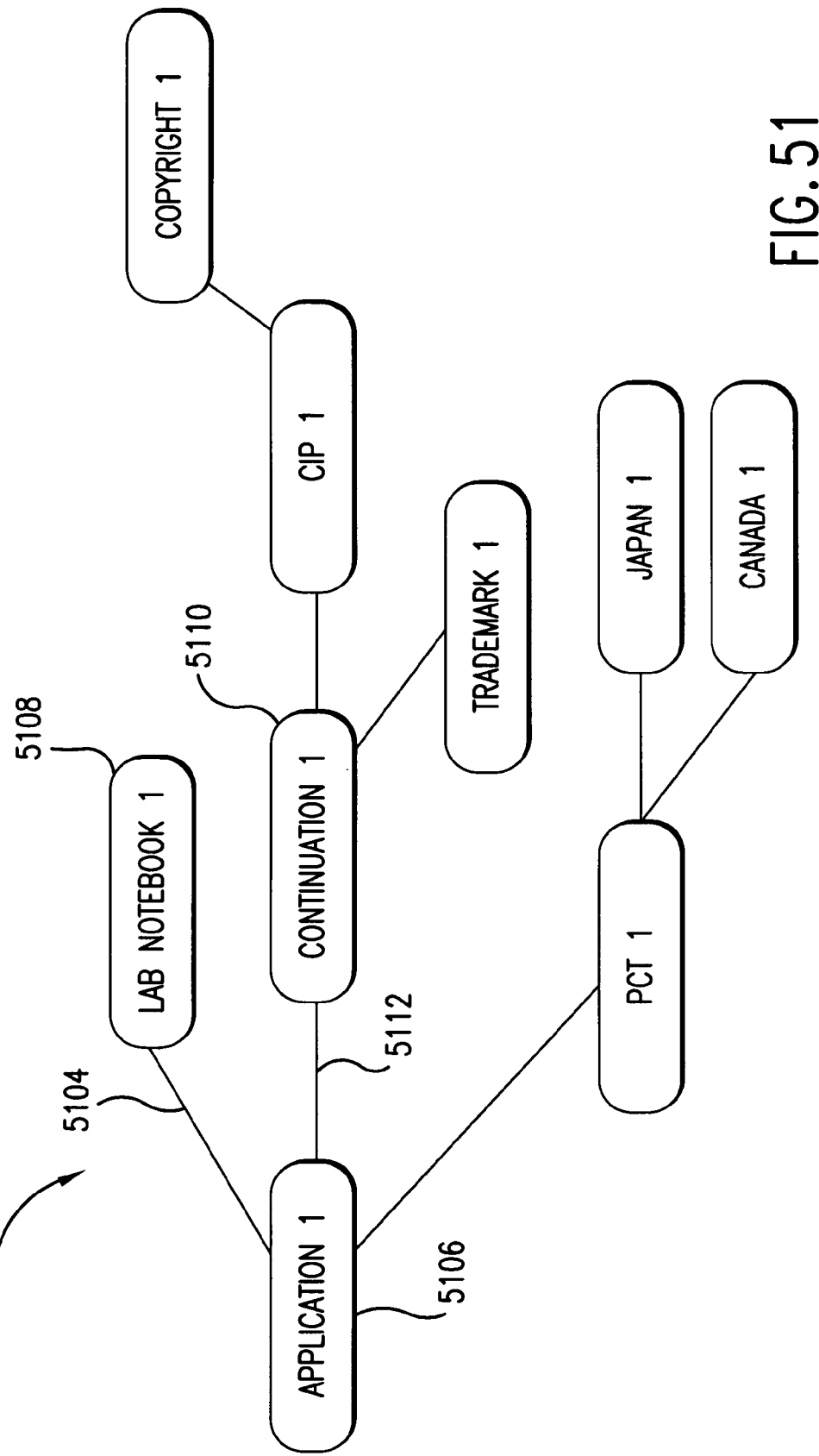
FIG. 51 illustrates an example patent family chronology.

FIG. 51 illustrates an example patent family chronology 5102, which is a type of a data object family. A patent family chronology 5102 includes patents, applications, and related data objects that stem from a base patent application. In the example of FIG. 51, the patent family chronology 5102 stems from application 1, which represents the base patent application. Application 1 spawned a continuation application (continuation 1), which spawned a continuation-in-part application (CIP 1). A trademark (trademark 1) is related to continuation 1, and a copyright (copyright 1) is related to CIP 1. Application 1 was developed from a lab notebook maintained by an inventor (lab notebook 1). Application 1 also spawned a patent cooperative treaty application (PCT 1), which was national filed in Japan (Japan 1) and Canada (Canada 1).

Figure 53:
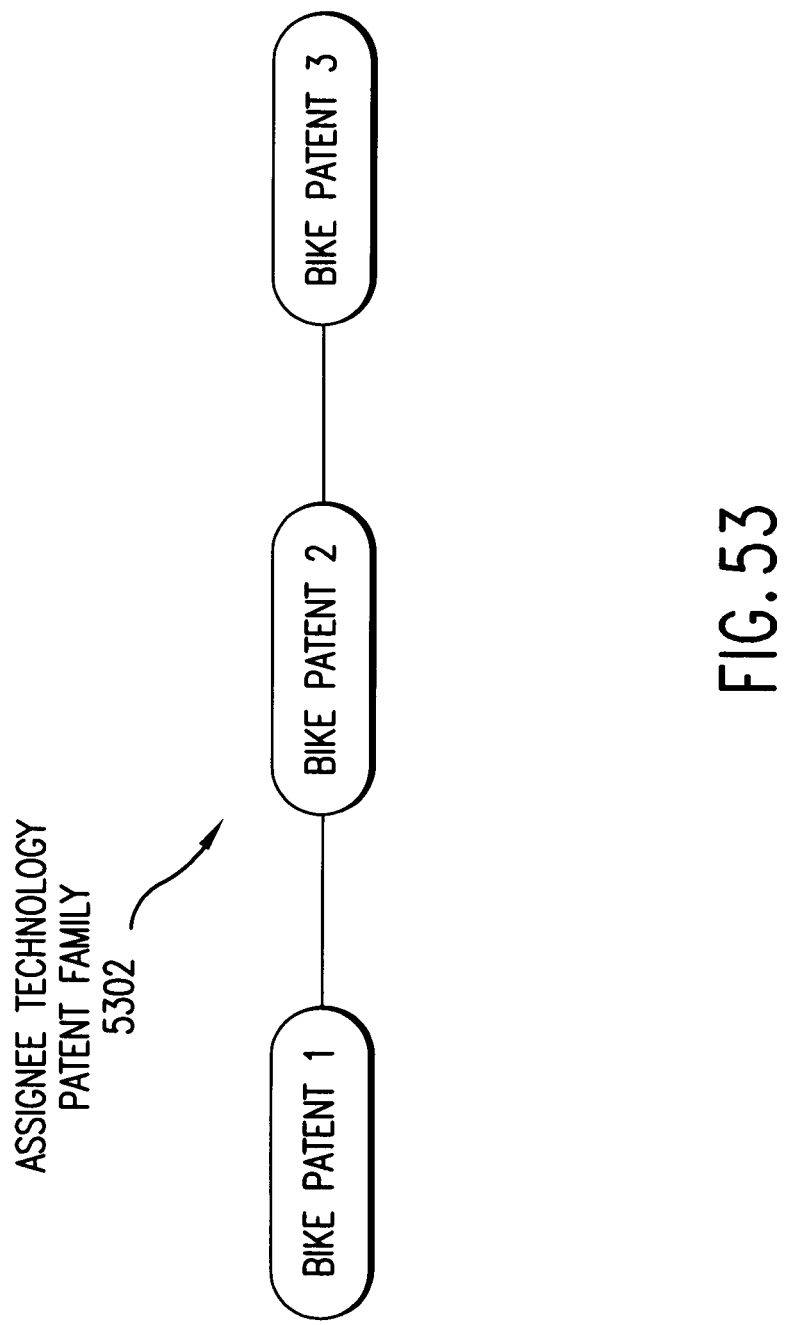
FIG. 53 illustrates an example assignee technology patent family.

FIG. 53 illustrates an example assignee technology patent family 5302, which is another type of data object family. An assignee technology patent family includes patents that are assigned to the same corporate entity, and that are technologically related. Relationships between patents may reflect, for example, improvements to the technology.

In the example of FIG. 53, the assignee technology patent family 5302 includes a bike patent 1, a bike patent 2, and a bike patent 3. Bike patent 1 is the assignee's first and base patent on bikes. Bike patent 2 is an improvement upon bike patent 1, and bike patent 3 is an improvement upon bike patent 2.

According to the invention, data object families are displayed using any well known visualization technology, including but not limited to hyperbolic trees. Techniques for generating hyperbolic trees from hierarchical organized data (such as data object families) is discussed in U.S. patent application "Using Hyperbolic Trees to Visualize Data Generated by Patent-Centric and Group-Oriented Data Processing," Ser. No. 08/921,369, incorporated herein by reference in its entirety.

The data object families described above, as well as additional data object family examples supported by the present invention, are further described below.

Patent Related Families

The invention supports a plurality of patent-specific families. Examples of such families are described below.

Assignee Patent Family Chronology (APFC)

This family depicts the relationship between related issued patents and pending applications (and possibly related data objects) of the same assignee. This includes, but is not limited to, U.S. and corresponding foreign applications. This includes the original application, divisions, continuations, CIPs, Reissues and Re-exams, Patent Extensions. The information to create these families could be found, for example, in the assignee's internal patent docket system.

This family would be used for understanding any company's particular family relating to a group of patents and applications that stem from the same original application. Such a family would show in a tree-type format the relationship between, for example all the patents and applications in a corporate entity's family. It helps a user see how a company has clustered improvement patents around newly developed technology. It could be useful to product planning, product development, and the business and legal people in charge of managing the company's portfolio.

Assignee Technology Patent Family (ATPF)

This family shows the relationship between patents and applications of the same assignee in the same area of technology but not necessarily limited to an Assignee Patent Family Chronology. This family would be a broader grouping that would relate patents and applications of an assignee across an entire technology. The information to create these families could be found, for example, in the assignee's internal patent docket systems and keyword searching on the assignee's patents and applications.

Technology Patent Family (TPF)

This family shows the relationship between patents in the same area of technology. This family is not limited by assignee. The information to create these families could be found, for example, by a combination of patent bibliographic and patent text searching. This family would be somewhat like a forward citation tree but more limited based on the culling and grouping criteria used by the person creating the family.

Claim Trees

These families focus on the relationship between claims in terms of dependency and dominance-subservience among claims.

Patent Claim Tree (PCT) and Application Claim Tree (ACT)

These trees show the relationship between claims in a single issued patent or a pending application. This tree is preferably created by searching at least the first line of all claims in a given patent or application for an indication of dependency, and/or subject matter and scope. This is useful in patent prosecution, licensing and litigation scenarios in graphically representing the dependency relationship among claims in a given patent or application. Patent claim trees are further described above.

Assignee Patent Family Chronology Claim Tree (APFCCT)

This tree shows the relationship between claims in an Assignee Patent Family Chronology. This tree would show the independent-dependent claim relationships within a given patent or application and dominant and subservient or improvement claims in an Assignee Patent Family Chronology. The information to create these trees could be found, for example, in the assignee's internal patent docket systems and keyword searching on the assignee's patent and application claim sets and the culling and grouping criteria used by the person creating the tree.

Assignee Technology Patent Family Claim Tree (AT-PFCT)

This family shows the relationship between claims in an Assignee Technology Patent Family. This would be similar to the Assignee Patent Family Chronology Claim Tree but would not be limited to a given Patent Family Chronology. This family covers the Assignee's entire related technology base. This family shows the claim relationships of dependency and dominant-subservient claims within an Assignee's Technology Patent Family Chronology. The information to create these trees could be found, for example, in the assignee's internal patent docket systems and keyword searching on the assignee's patent and application claim sets and the culling and grouping criteria used by the person creating the tree.

Technology Patent Family Claim Tree (TPFCT)

This family shows the relationship between claims in all patents in a Technology Patent Family. This would be similar to the Assignee Technology Patent Family Claim Tree but would not be limited to a given Patent Family Chronology but would cover the entire related technology base for all assignees. The information to create these families could be found, for example, by a combination of patent bibliographic and patent text searching and the culling and grouping criteria used by the person creating the tree.

Patent-trademark Relationship Trees

These families are trees that include both patent claims and trademarks used on the patented products covered by the particular patent claims. They are created in a similar way that the Patent Families and Trees would be created with the added dimension of including trademarks in the families and trees that correspond to the patents covering products sold using those trademarks.

Example Databases

Databases useful for implementing functions related to data object families are described in this section.

Figure 48:
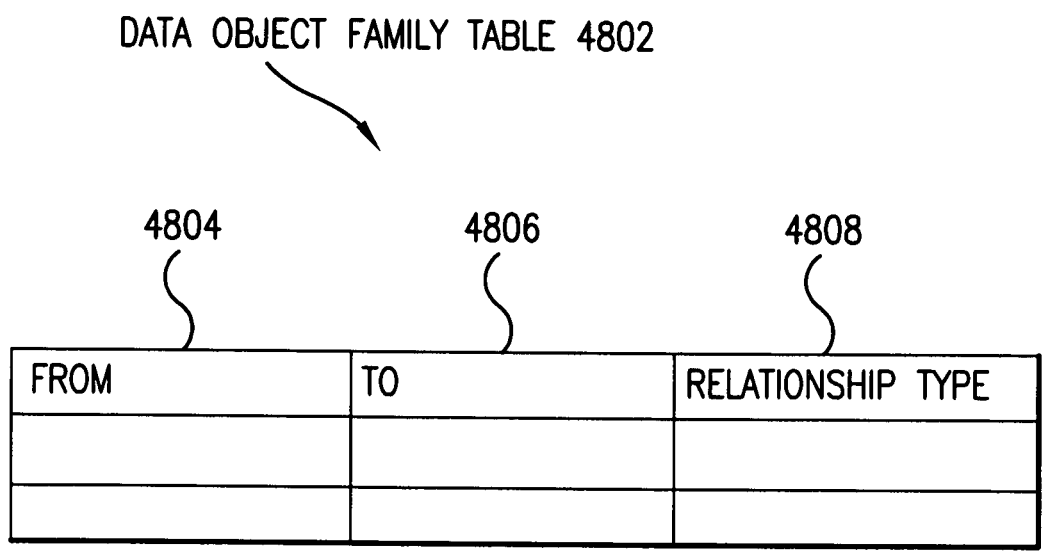
FIG. 48 illustrates a data object family table according to an embodiment of the invention.

FIG. 48 illustrates a data object family table 4802 according to an embodiment of the present invention. Relationships between pairs of data objects are specified in the data object family table 4802. More specifically, the data object family table 4802 includes a record for each pair of data objects of interest. Each record of the data object family table 4802 includes a "from" field to identify a first data object, a "to" field to identify a second data object, and a relationship type field that stores information indicating the relationship between the two data objects.

FIGS. 50A and 50B illustrate an example relationship type table 5002 that specifies relationship types supported by the invention. The relationship types indicated in FIGS. 50A and 50B are provided for illustrative purposes, and are not limiting. In general, the relationship type table 5002 stores all relationships of interest to the user. Additional relationships will be apparent to persons skilled in the relevant art(s).

Each row of the relationship type table 5002 includes a relationship type name, the unique identifier for the relationship, and a grouping ID. The grouping ID is used to aggregate relationship types for a given data object family. For example, grouping G1 generally corresponds to a patent family chronology. Grouping G3 generally corresponds to an assignee technology patent family.

The relationship type table 5002 includes relationships that are predefined (system defined), and relationships that are user defined. Accordingly, the invention allows users to define and/or modify relationships based on the needs of their particular applications. Additionally, the groupings contained in the relationship type table 5002 comprise both predefined groupings and user defined groupings. Accordingly, users can create and/or modify groupings based on their specific needs.

Figure 49:
FIG. 49 illustrates an example data object family table.

FIG. 49 illustrates an example data object family table 4902 corresponding to the patent citation tree 4302 shown in FIG. 43. The data object family table 4902 represents an alternative implementation of the patent citation tree 4302. Rows 4904-4916 all correspond to backward citation relationships, as indicated in the relationship type column. Specifically, rows 4904, 4906, 4908, and 4910 of the data object family table 4902 indicate that patent B, patent C, non-patent object C, and non-patent object D are referenced in patent A. Rows 4912 and 4914 of the data object family table indicate that patent D and non-patent data object A are referenced in patent B. Row 4916 of the data object family table 4902 indicates that non-patent data object D is referenced in patent C.

Rows 4918-4930 of the data object family table 4902 correspond to forward citation relationships, as indicated in the relationship type column. Specifically, row 4918 indicates that patent B is cited by patent A. Row 4920 indicates that patent D is cited by patent B. Row 4922 indicates that non-patent object A is cited by patent B. Row 4924 indicates that patent C is cited by patent A. Row 4926 indicates that non-patent data object D is cited by patent C. Row 4928 indicates that non-patent data object C is cited by patent A. Row 4930 indicates that non-patent data object D is cited by patent A.

Use of the data object family table is further illustrated in FIGS. 51 and 52. As discussed above, FIG. 51 illustrates an example patent family chronology 5102. FIG. 52 illustrates an example data object family table 5202 that corresponds to the patent family chronology 5102. Row 5204 of the data object family table 5202 indicates that lab notebook 1 represents invention disclosure materials used to generate application 1. Row 5206 indicates that continuation 1 is a continuation of application 1. Row 5208 indicates that CIP 1 is a continuation-in-part of continuation 1. Row 5210 indicates that copyright 1 is a copyright that is related to CIP 1. Row 5212 indicates that trademark 1 is a trademark that is related to continuation 1. Row 5214 indicates that PCT 1 is a PCT application from application 1. Row 5216 indicates that Japan 1 is a Japanese foreign national application from PCT 1. Row 5218 indicates that Canada 1 is a Canadian foreign national application from PCT 1.

In an embodiment, the patent family chronology 5102 of FIG. 51 is preferably generated by selecting grouping G1 from the relationship type table 5002. A data object family is then generated that includes the relationships within grouping G1. Further details regarding the generation of data object families is provided below.

Another example of the use of the data object family table is presented in FIGS. 53 and 54. As indicated above, FIG. 53 illustrates an example assignee technology patent family 5302. FIG. 54 illustrates a data object family table 5402 that corresponds to the assignee technology patent family 5302.

Row 5404 of the data object family table 5402 indicates that bike patent 2 is an improvement of bike patent 1. Row 5408 indicates that bike patent 3 is an improvement of bike patent 2. Additional information is contained in the data object family table 5402. For example, row 5406 indicates that bike patent 1 is technically related to bike patent 2, and is a base patent. Row 5410 indicates that the claims of bike patent 2 are subservient to the claims of bike patent 1. Row 5412 indicates that the claims of bike patent 2 are an improvement of the claims of bike patent 1. Row 5414 indicates that the claims of bike patent 1 are dominant over the claims of bike patent 2. Rows 5410-5414 are useful for generating an assignee patent family chronology claim tree, described above.

Operational Description

Figure 55:
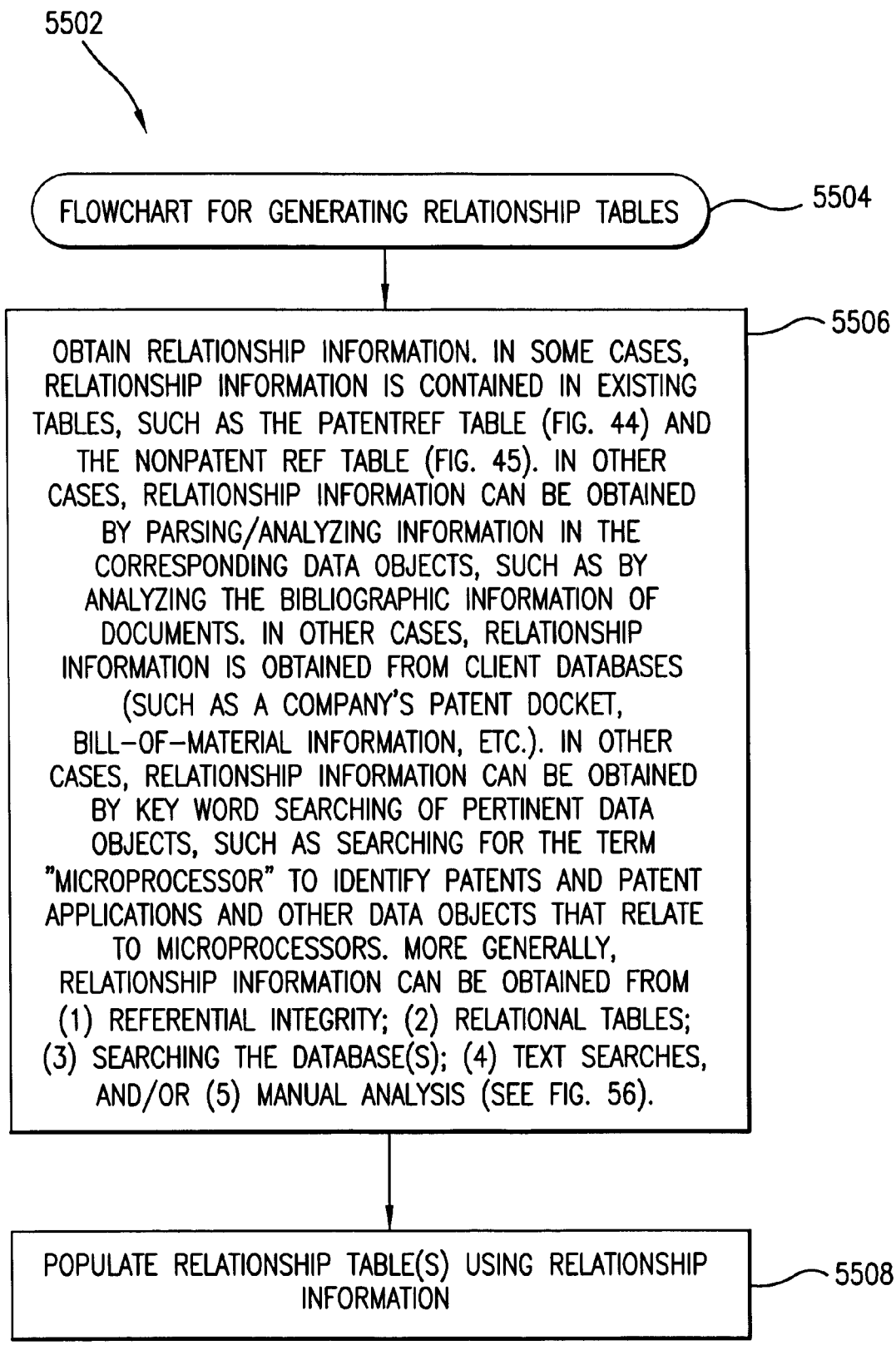
FIG. 55 illustrates a flowchart representing the operation of embodiments of the invention when generating relationship tables.

FIG. 55 illustrates a flowchart 5502 that represents the operation of the invention when generating data object family tables. Depending on the particular relationships of interest, the sources of relationship data, the extent of the families of interest, and other application dependent factors, the data object family tables may be manually generated, automatically generated, or combinations thereof In step 5506, relationship information is obtained. Preferably, relationship information is obtained in a pair wise fashion. In other words, pairs of data objects that are somehow related are first identified. Then, the relationships between the data object pairs are determined. Alternatively, relationship information is obtained and then converted into a pair wise format.

Figure 56:
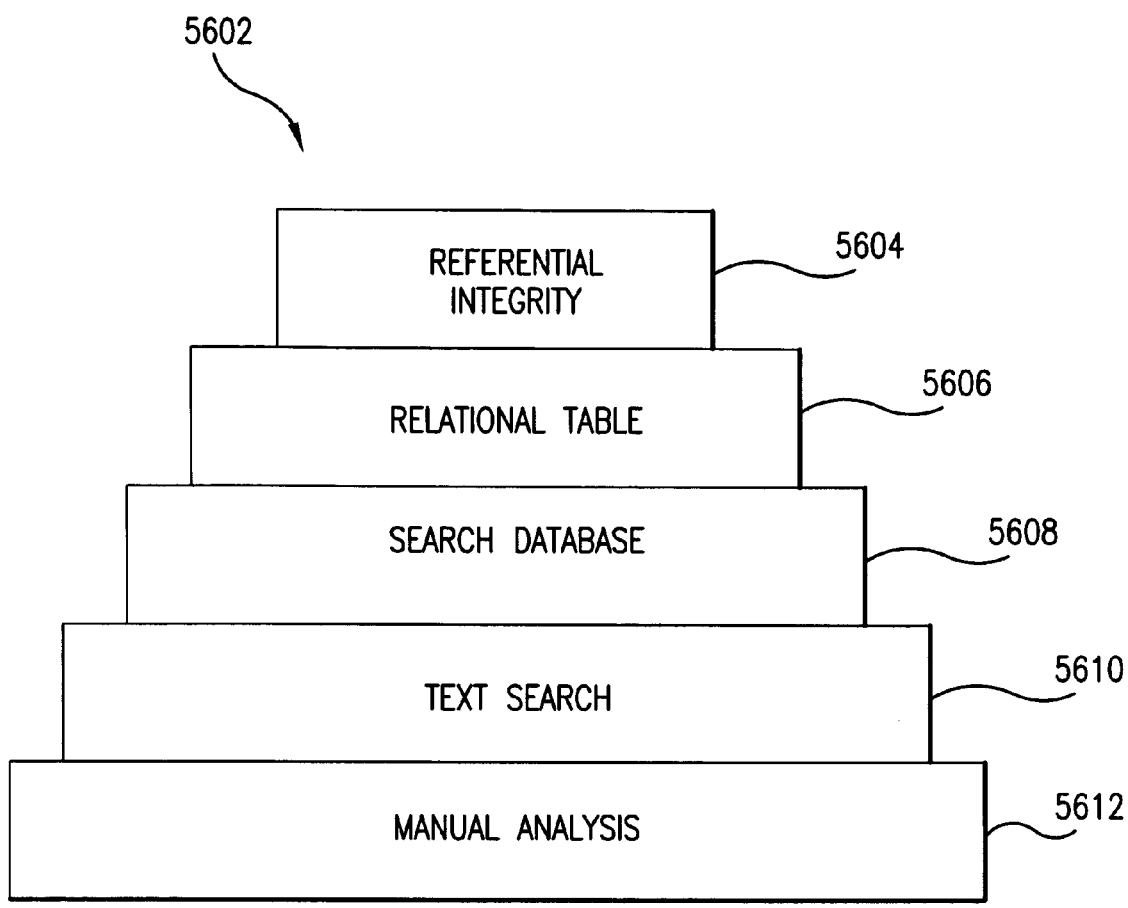
FIG. 56 is used to describe example sources of relationship data utilized by embodiments of the invention.

There are a variety of sources of relationship information. Some of these sources applicable with the present invention are illustrated in FIG. 56. It is noted that the invention is not limited by the sources depicted in FIG. 56. Relationship information may be available and obtained from other sources, including but not limited to data sources identified and/or provided by users.

One source of relationship information is data having referential integrity, as indicated by 5604. Referential integrity refers to information that directly indicates a relationship between data objects. For example, the information in the patent ref table 4402 of FIG. 44 has referential integrity because the information contained therein directly establishes citation relationships between patents. Similarly, the non-patent ref table 4404 in FIG. 45 has referential integrity because the information contained therein directly establishes citation relationships between patents and non-patent data objects.

Referring to FIG. 56, relationship information can also be obtained from relational database tables 5606. By definition, relational databases relate data objects to one another. Accordingly, the relationship represented in relational databases can be used to generate relationship tables and data object family tables.

Relationship information can also be obtained by searching database tables, as indicated by 5608 in FIG. 56. Such operations may include, for example, searching a "corporate entity" column of a database table for all occurrences of the name "Aurigin," to thereby identify all data objects that relate to the company Aurigin. This might result in identifying all patents that are assigned to Aurigin. This information is useful for generating patent family chronologies, for example.

Relationship information can also be obtained by performing text searches among data objects. Such operations may involve, for example, searching the text of documents for the word "microprocessor" to thereby identify data objects that potentially relate to the microprocessor field. This information is useful for generating technology patent families, for example. Searches could include more complex Boolean, proximity, natural language, and any types of linguistic analysis.

Additional relationship information may be obtained by performing manual acquisition and analysis of data, as indicated by 5612 in FIG. 56. Such operations may involve, for example, manually reviewing the claims of a collection of patents to determine those that are technically related, dominant and subservient relationships, base relationships, improvements, etc.

Further relationship information can be obtained by combinations of the techniques illustrated in FIG. 56.

Upon completing step 5506, data object pairs having some relationship of interest have been identified, and the relationships between such data object pairs have been determined. In step 5508, data object family tables are populated using the relationship information obtained in step 5506. For example, suppose that in the course of performing step 5506 it was determined that a particular Japanese application, called Japan 1, was filed from a particular PCT application, called PCT 1. In this case, a row in a data object family table corresponding to this pair wise relationship is created in step 5506. Such a row is shown, for example, as 5216 in FIG. 52.

Upon completing step 5508, one or more data object family tables have been created.

Figure 57A:
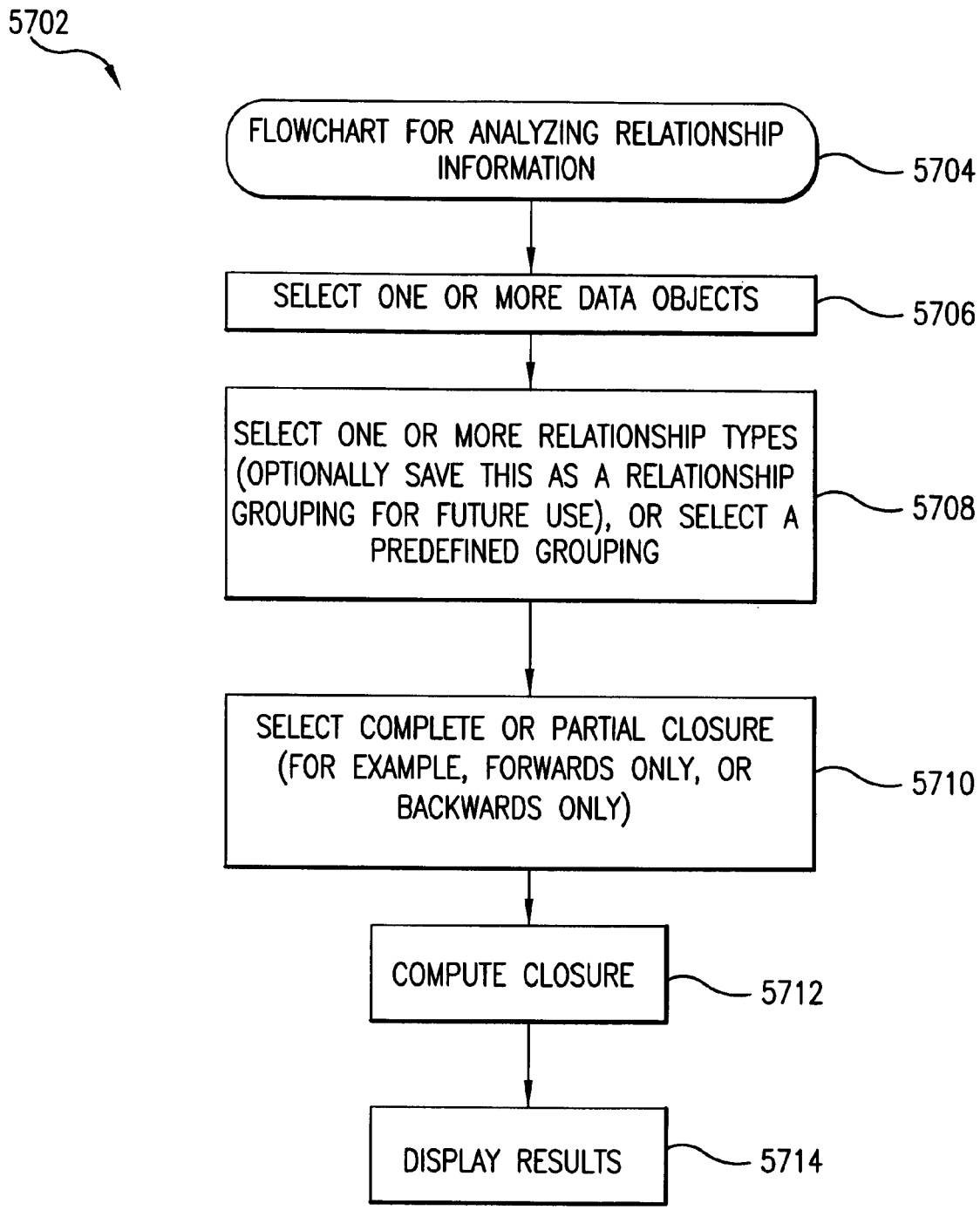
FIG. 57A is a flowchart representing the operation of the invention when analyzing relationship information.

FIG. 57A illustrates a flowchart 5702 for analyzing relationship information according to embodiments of the invention. For illustrative purposes, and without limitation, flowchart 5702 is described with reference to the example patent family chronology 5102 shown in FIG. 51, and the corresponding, data object family table 5202 shown in FIG. 52.

In step 5706, the user selects one or more data objects. The selected data objects represent the base data objects upon which the analysis is performed. In the example of FIG. 51, the user selects application 1, which is the base patent application for the patent family chronology 5102.

In step 5708, the user selects one ore more relationship types upon which the analysis is formed. In an embodiment, the user manually selects the relationship types of interest. In other embodiments, the user selects one or more grouping that contain the relationship types of interest. In the example of FIG. 51, the user selects grouping G1 (see FIGS. 50A and 50B), which contains all of the relationship types of interest for the patent family chronology (it is noted that grouping G1 can be modified as desired by the user to perform a custom patent family chronology analysis).

In step 5710, the user indicates whether complete or partial closure is required. If the user selects complete closure, then all relationships stemming from the data objects selected in step 5706 are identified. If the user selects partial closure, then only a portion of the relationships stemming from the selected data objects are identified (for example, perhaps only relationships moving forward or moving backward from the selected data objects are identified). Also in step 5710, if the user selects partial closure, then the user may be required to provide information regarding the scope of the desired analysis.

In step 5712, closure based on the selected data objects, the selected relationship types, and the scope of closure is computed. In other words, all relationships from the data object family tables that satisfy the information and commands provided in steps 5706, 5708, and 5710 are identified.

Figure 57B:
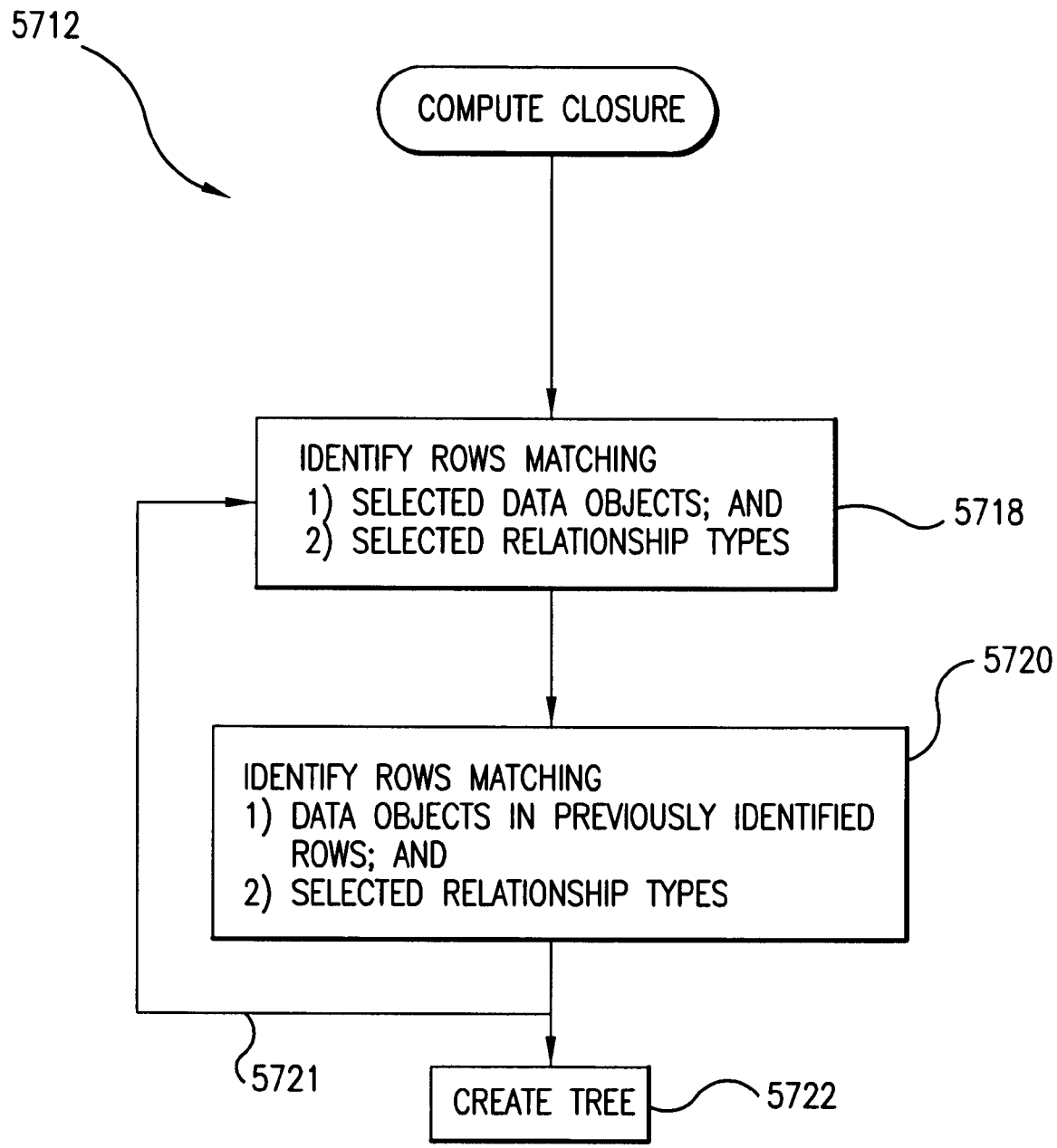
FIG. 57B is a flowchart representing the operation of the invention when computing closure of a data object family.

Preferably, step 5712 is performed as shown in the flowchart of FIG. 57B.

In step 5718, rows in the data object family tables that match the selected data objects and the selected relationship types are identified. A row matches a selected data object if either the "from" field or the "to" field of the row contains the selected data object. A row matches a selected relationship type if the relationship type field of the row contains one of the selected relationship types.

Step 5720 is optionally performed depending on the level of closure specified in step 5710. In step 5720, additional rows in the data object family tables that match data objects specified in rows identified in step 5718, and that also match one or more of the selected relationship types are identified. For example, in the data object table 5202 of FIG. 52, row 5206 is identified in step 5718 because application 1 (the data object selected in step 5706) is contained in the "from" field. Note that continuation 1 is contained in the "to" field. In step 5720, rows in the data object family tables that match continuation 1, and that also match one or more of the selected relationship types are identified. Thus, row 5212 is identified because continuation 1 from row 5206 is contained in the "from" field, and also the trademark relationship (which is part of selected group G1) is contained in the relationship type field.

Steps 5718 and 5720 are repeatedly performed until the level of closure specified in step 5710 is satisfied, as indicated by control flow line 5721.

Upon the completion of steps 5718 and 5720, data object pairs having relationships of interest have been identified. Also, the relationships between such data object pairs are identified. In step 5722, a tree of the data object pairs is generated. Preferably, the tree is generated by selecting a data object pair, adding the selected data object pair and its associate relationship to the tree, and then selecting a new data object pair. The process continues until each data object pair has been added to the tree.

For example, assume that steps 5718 and 5720 identified rows 5204-5218 in FIG. 52. In step 5722, the tree or graph is generated from rows 5204-5218. For example, processing of row 5204 results in creating nodes 5106 and 5108 and link 5104 in the tree (see FIG. 51). Processing of row 5206 results in adding node 5110 and link 5112 to the tree (FIG. 51). The other identified rows 5208-5218 are processed in a similar manner in step 5722.

Referring again to FIG. 57A, in step. 5714, the data object family is displayed. According to the invention, the tree generated in step 5722 (FIG. 57B) may be displayed using any visualization technology, including hyperbolic trees. Techniques for generating hyperbolic trees are discussed in U.S. patent application "Using Hyperbolic Trees to Visualize Data Generated by Patent-Centric and Group-Oriented Data Processing," Ser. No. 08/921,369, incorporated herein by reference in its entirety.

Plug-In Architecture

According to the invention, the enterprise server 7604 (FIG. 76) can interface with third party tools to enhance and extend its functionality. As used herein, the phrase "third party tools" refers to any hardware, software, or combination thereof that is external to the enterprise server 7604 or any of its component or associated modules, such as the web server 7610, the databases 7612 and 7614, the network client 7608, and the web client 7606. The third party tools are selected and integrated with the enterprise server 7604 on the basis of their ability to perform desired functionality not available internally (i.e., not performed by the enterprise server 7604 or any of its components or associated modules). Such functionality can pertain to data acquisition or storage, visualization, display, processing, and/or any other data processing.

Figure 59:
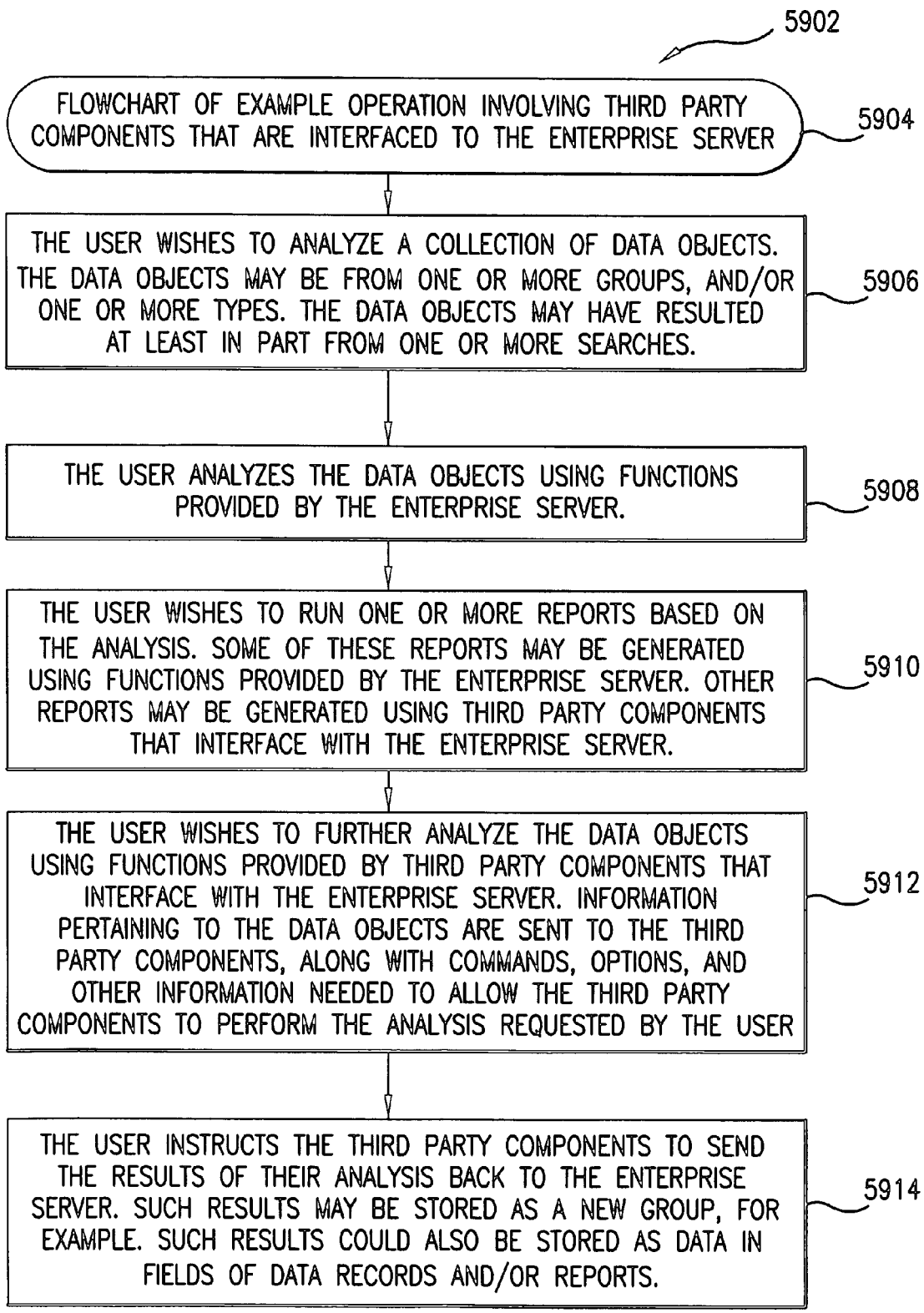
FIG. 59 is a flowchart illustrating the operation of the enterprise server when interacting with third party components/tools.

FIG. 59 illustrates a flowchart 5902 representing illustrative operation of the enterprise server 7604 when interacting with a third party component.

In step 5906, a user begins analyzing a collection of data objects. The data objects may be, for example, from one or more groups, and/or one or more data object types. Alternatively, the data objects may have resulted at least in part from processing performed by the enterprise server 7604, such as from conducting database searches.

In step 5908, the user analyzes the data objects using functions provided by the enterprise server 7604. Such functions are described above. Additional functions are described in U.S. patent applications "System, Method, and Computer Program Product for Patent-Centric and Group-Oriented Data Processing," Ser. No. 08/867,392, "Using Hyperbolic Trees to Visualize Data Generated by Patent-Centric and Group-Oriented Data Processing," Ser. No. 08/921,369, "System, Method and Computer Program Product for Managing and Analyzing Intellectual Property (IP) Related Transactions," Ser. No.09/138,368, incorporated herein by reference in their entireties.

In step 5910, the user wishes to run one or more reports based on the analysis performed in step 5908. Some of the reports may be generated using functions provided by the enterprise server 7604. Such reporting functions of the enterprise server 7604 are described herein, and are further described in the patent applications referenced above. Other reports may be generated using third party components that interface with the enterprise server 7604.

In step 5912, the user wishes to further analyze the data objects using functions provided by third party components that interface with the enterprise server 7604. Information pertaining to the data objects are sent to the third party components, along with commands, options, and other information needed to allow the third party components to perform the analysis requested by the user. The third party components perform the requested functions using the information received from the enterprise server 7604.

In step 5914, the user instructs the third party components to send the results of their respective processing back to the enterprise server 7604. Such results may be stored and utilized as a new group or data object type in the enterprise server, for example. Such results could also be processed alone or with other data, and/or could be stored as data in fields of data records and/or reports.

Figure 63:
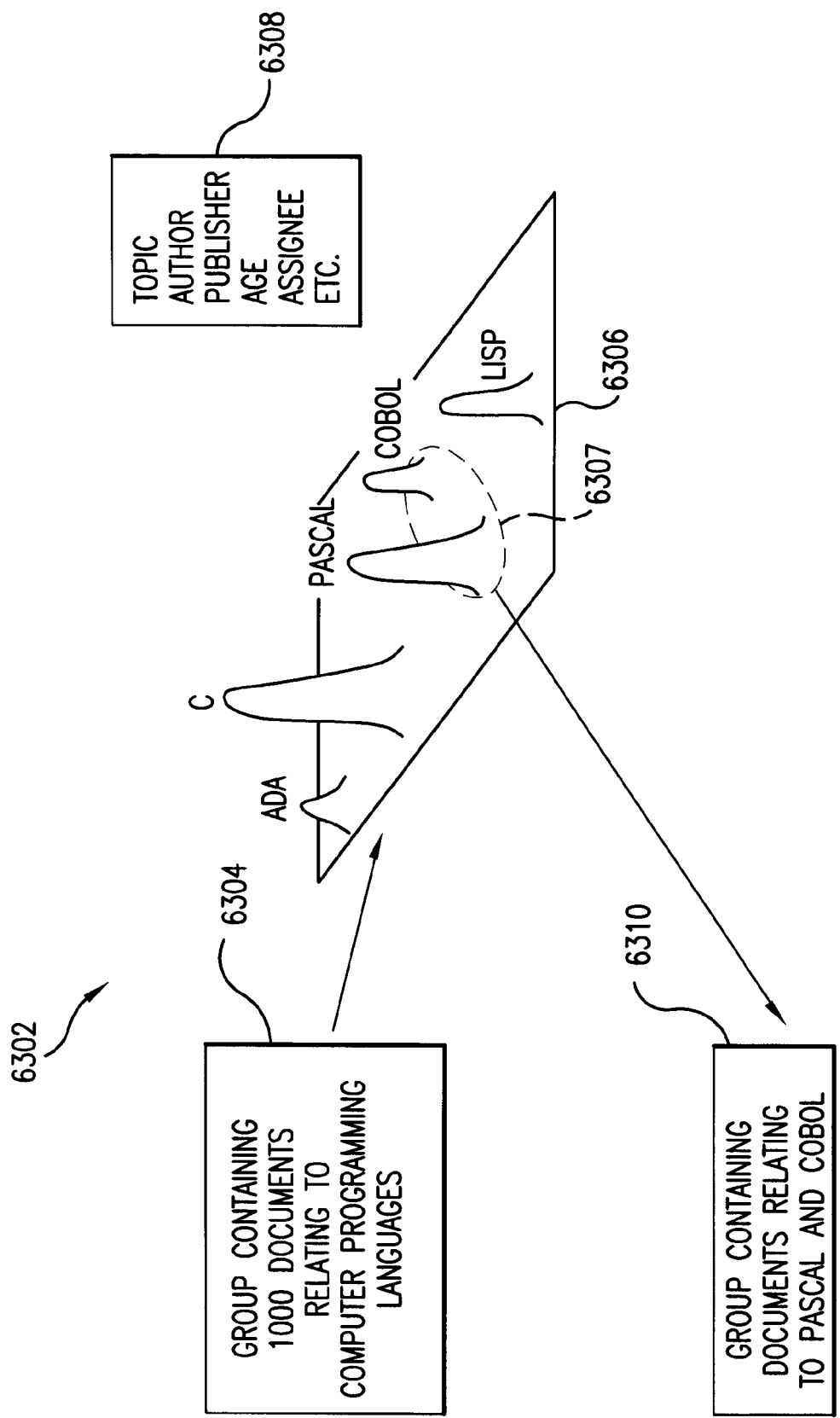
FIG. 63 is an example data flow diagram relating to the operation of the enterprise server when interacting with a third party component that represents data using landscapes or maps.
Figure 64:
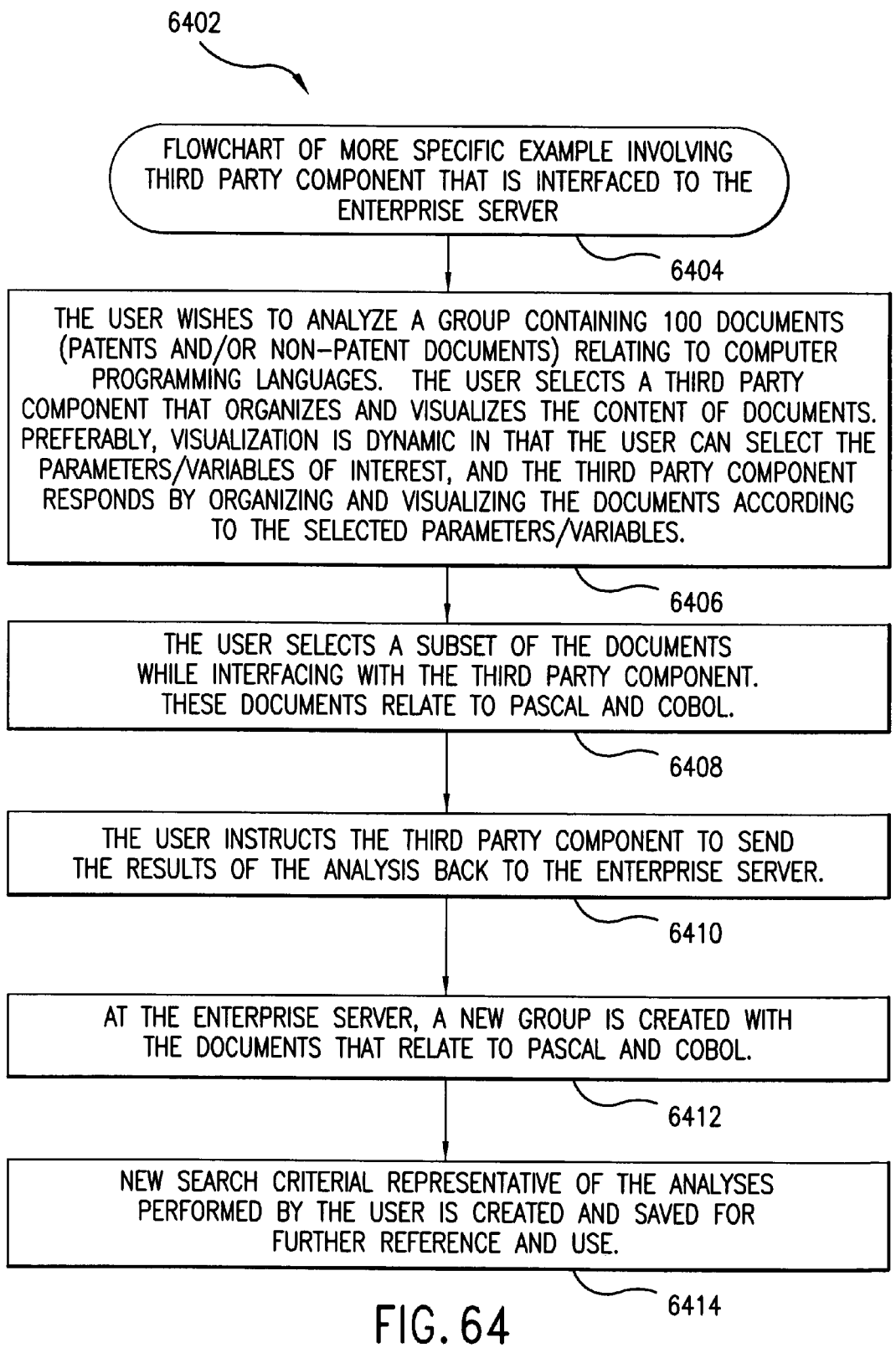
FIG. 64 is a flowchart representing an example operation of a third party component interacting with the enterprise server.

FIG. 64 is a flowchart 6402 further depicting the operation of the enterprise server 7604 when interacting with a third party component according to an example embodiment. FIG. 63 is an example data flow diagram used to explain the operation of the flowchart 6402 in FIG. 64.

In step 6406, the user wishes to analyze a group 6304 containing one thousand documents or other data objects. The documents include both patents and non-patent documents. The documents relate to computer programming languages.

The user in step 6406 selects a third party component to organize and visualize the content of the documents. The display generated by the selected third party component is shown as 6306 in FIG. 63. In display 6306, documents that are similar in content are represented as peaks in a landscape. The relative size of the peaks correspond to the number of documents that are directed to the subject matter associated with the peaks. Preferably, operation of the third party component is dynamic, such that the context of the landscape is dynamic. For example, the display 6306 shown in the example of FIG. 63 is based on the subject matter or topic of the documents in the group 6304. Preferably, the user can access a menu 6308 which allows the user to change the context of the display from topical to another attribute, such as author. If the user changes the context to author, then the peaks in the display 6306 would correspond to author, and the relative size of the peaks would indicate the number of documents that were by respective authors.

In step 6408, the user selects a subset of the 1,000 documents via use of the third party component. In the example of FIG. 63, the user has selected from the display 6306 the peaks corresponding to PASCAL and COBAL. This selection is indicated by 6307.

In step 6410, the user instructs the third party component to send the results of the analysis back to the enterprise server 7604. In the example of FIG. 63, the third party component sends back an indication of the selection 6307. For example, the third party component may send back a list of the documents corresponding to the selection 6307 (that is, a list of the books directed to PASCAL and COBAL).

In step 6412, the enterprise server 7604 creates a new group from the information received from the third party component. In this case, the new group contains the documents corresponding to the selection 6307 that pertain to PASCAL and COBAL.

In step 6414, the enterprise server generates and saves a search query corresponding to the analysis performed by the user using the third party component. In example of FIG. 63, the search query generated and saved by the enterprise server 7604 comprises a search for documents pertaining to PASCAL and COBAL. The search query is generated and saved so that it can be referred to and used in the future by the user.

The new group 6310 can then be used in the enterprise server 7604 just like any other group. Specifically, processing can be performed on the documents in the new group 6310 as described above, and as further described in U.S. patent applications "System, Method, and Computer Program Product for Patent-Centric and Group-Oriented Data Processing," Ser. No. 08/867,392, "Using Hyperbolic Trees to Visualize Data Generated by Patent-Centric and Group-Oriented Data Processing," Ser. No. 08/921,369, "System, Method and Computer Program Product for Managing and Analyzing Intellectual Property (IP) Related Transactions," Ser. No. 09/138,368, herein incorporated by reference in their entireties.

The examples discussed above illustrate the round trip functionality of the present invention. Specifically, the invention allows information to be transferred from the enterprise server 7604 to third party components. Also, the invention enables the transfer of information from third party components to the enterprise server 7604. In certain instances, depending on the functionality desired and the third party component being used, only one way interaction is involved. For example, often when working with a report generator, data flows only from the enterprise server 7604 to the report generator. Such data is sent to the report generator to enable the report generator to create a desired report. With some report generators, data does not flow back from the report generator to the enterprise server 7604 (although, with some report generators, data may flow back to the enterprise server 7604. For example, the report generator may send an electronic copy of the report back to the enterprise server 7604).

Plug-In Architecture

Figure 58:
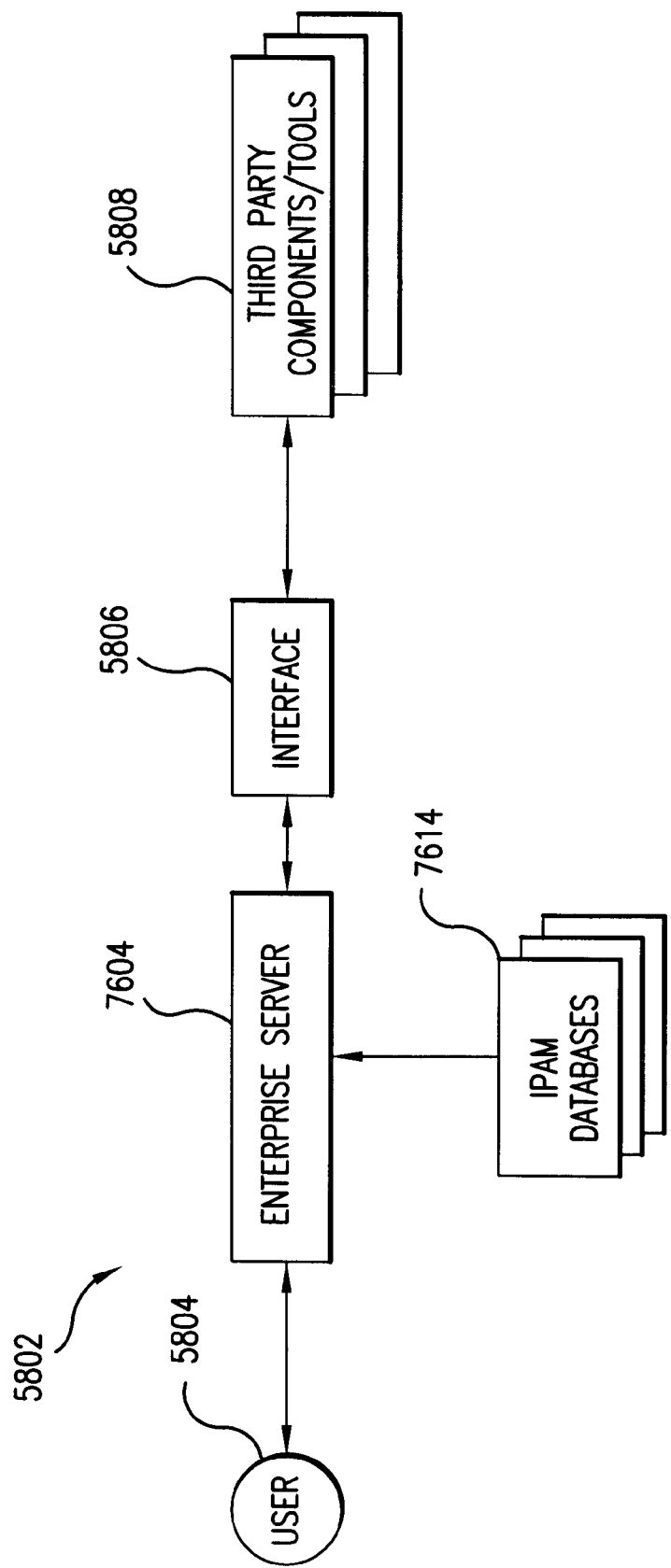
FIG. 58 is a diagram illustrating the operation of the enterprise server when interacting with third party components and tools.

FIG. 58 is a block diagram 5802 of the enterprise server 7604 when interacting with third party components/tools 5808. As indicated in FIG. 58, the enterprise server 7604 interacts with third party components/tools 5808 via an interface 5806.

Figure 60:
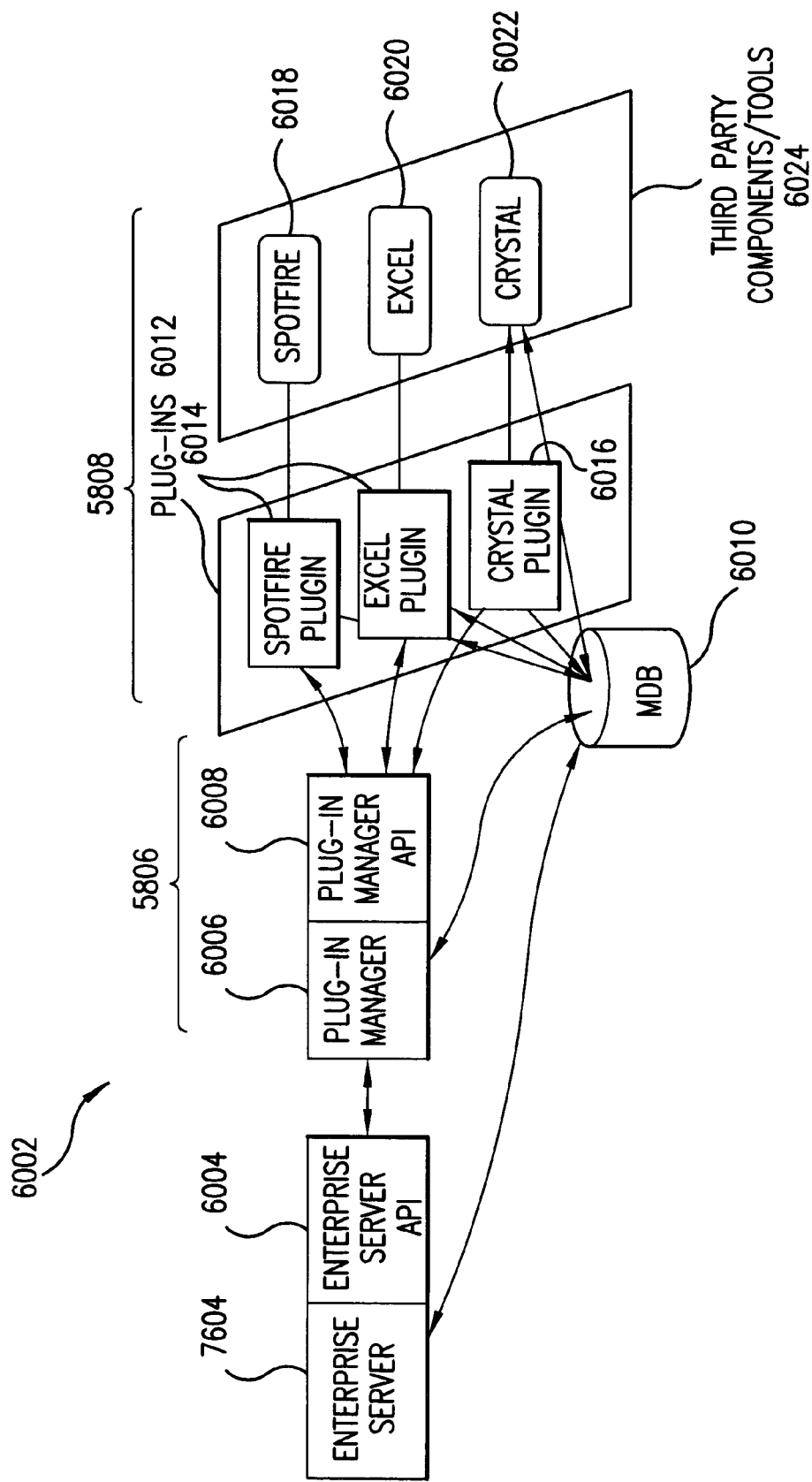
FIG. 60 is a more detailed block diagram of the enterprise server interacting with third party components/tools.

FIG. 60 illustrates a more detailed block diagram of the enterprise server 7604 when interacting with third party components/tools 5808.

The enterprise server 7604 includes an enterprise server API (application programming interface) 6004. Generally, the enterprise server API 6004 includes a collection of commands that the enterprise server 7604 understands. These commands instruct the enterprise server 7604 to perform specific functions. An entity external to the enterprise server 7604 interacts with the enterprise server 7604 by sending commands that conform to the enterprise server API 6004 to the enterprise server 7604. The enterprise server API 6004 is further described below. The enterprise server API 6004 is additionally described in U.S. patent application U.S. Patent Application "System, Method, and Computer Program Product for Patent-Centric and Group-Oriented Data Processing," Ser. No. 08/867,392, incorporated herein by reference in its entirety.

The interface 5806 is preferably represented by a plug-in manager 6006. The plug-in manager 6006 includes a plug-in manager API 6008. The plug-in manager API includes commands which the plug-in manager 6006 understands. These commands instruct the plug-in manager 6006 to perform specific functions. Entities external to the plug-in manager 6006 interact with the plug-in manager 6006 by sending commands that conform to the plug-in manager API 6008 to the plug-in manager 6006.

The third party components/tools 5808 are represented by plug-ins 6012 and third party components/tools 6024. The third party components/tools 6024 represent any hardware, software, or combination thereof that performs desired functionality. The third party components/tools 6024 each includes an API. Devices external to the third party components/tools 6024 interact with the third party components/tools 6024 via their respective APIs.

Preferably, a plug-in 6012 exists for each third party component/tool 6024. Alternatively, one or more third party components/tools 6024 may share a common plug-in 6012.

Generally, the plug-ins 6012 represent translation modules. Messages sent from the plug-in manager 6006 to a third party component/tool 6024 is translated from a format native to the plug-in manager 6006 to a format recognized by the API of the third party component/tool 6024. Similarly, a message that is send from a third party component/tool 6024 to the plug-in manager 6006 is translated by the plug-in 6012 from the native language of the third party component/tool 6024 to commands and/or messages that conform to the plug-in manager API 6008.

As indicated in FIG. 60, the enterprise server 7604, the plug-in manager 6006, the plug-ins 6012, and the third party component/tools 6024 interact with a database 6010, which may include, for example, the IPAM databases 7614.

The process of translating between the plug-in manager API 6008 and the API of any given third party component/tool 6024 will be apparent to persons skilled in the art based on the discussion of the plug-in manager API 6008 contained herein, and knowledge of the well known API of the third party component/tool 6024. Additionally, interaction with a third party component/tool 6024 via its API will be apparent to persons skilled in the relevant arts.

The plug-in architecture described herein is applicable to both the server and the client. In embodiments of the invention, the client plug-in architecture works in a manner substantially similar to the server plug-in architecture, a difference being in the type and kind of APIs supported/required by the client and the manner in which the client detects that plug-ins are present. Implementation of the server and client plug-in architectures will be apparent to persons skilled in the relevant art(s) based on the discussion contained herein.

Plug-In Operation

Figure 61:
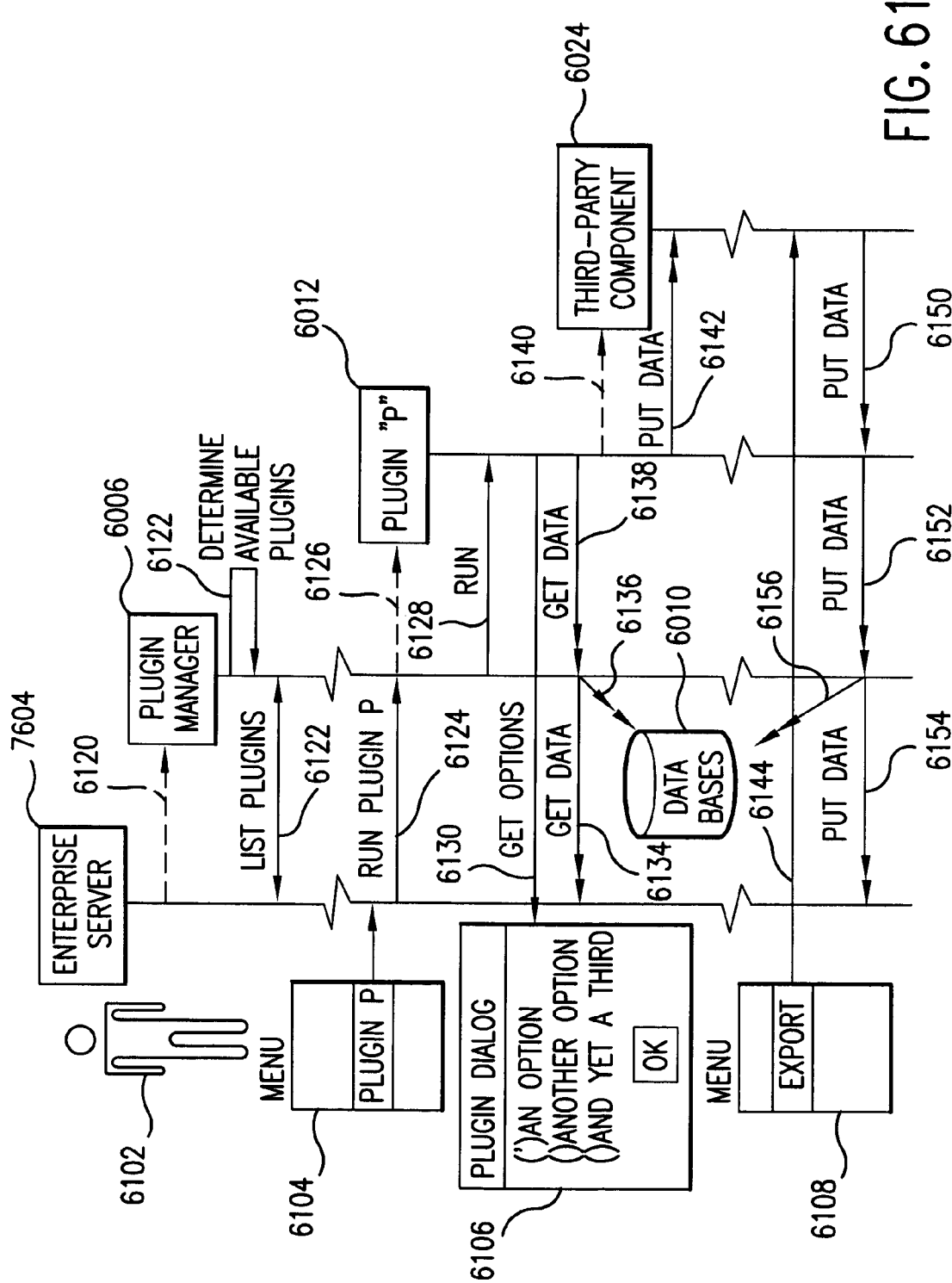
FIG. 61 is an event trace representing the operation of the enterprise server when interacting with third party components.
Figure 62A:
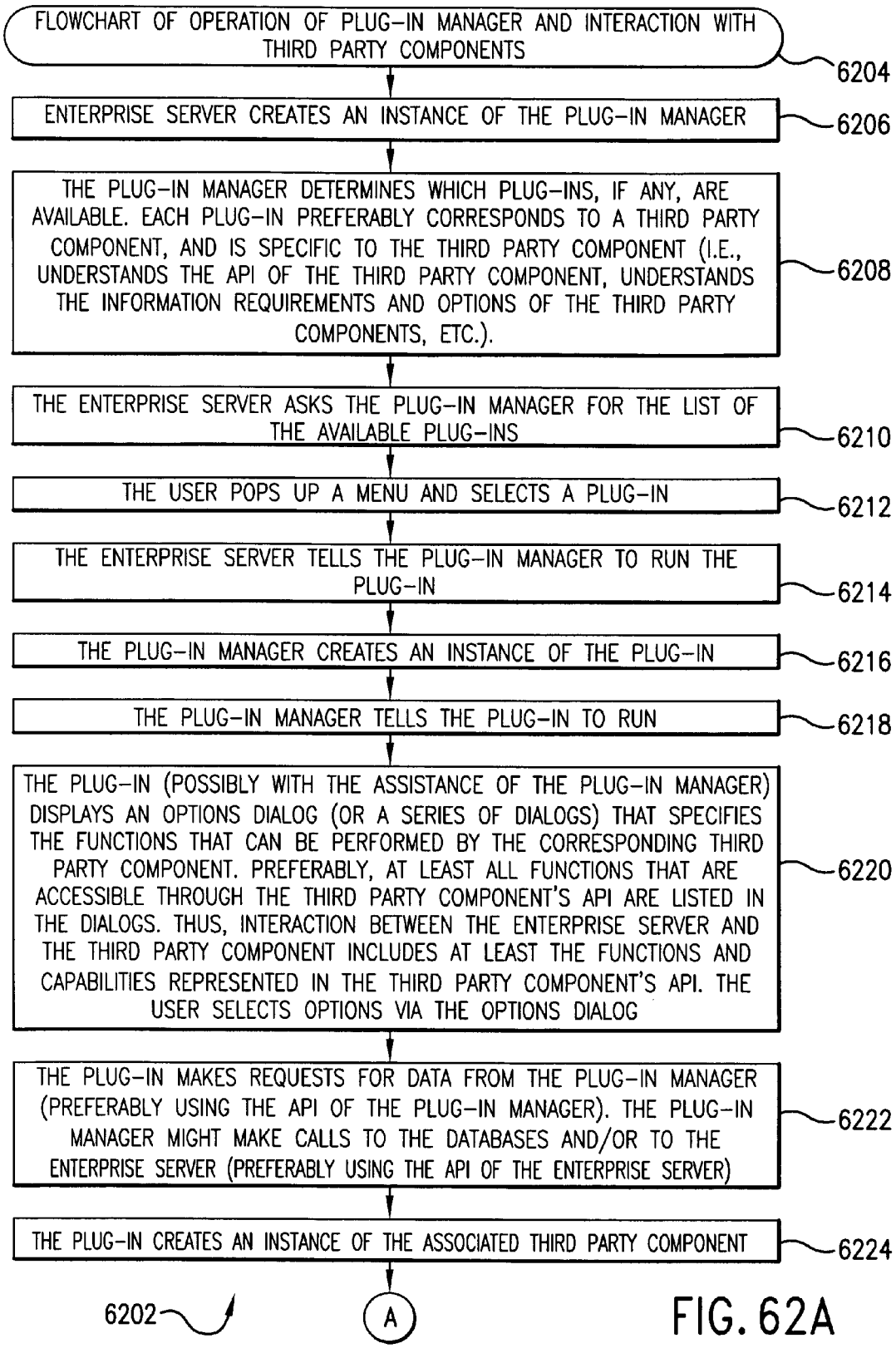
FIGS. 62A and 62B are a flowchart corresponding to the event trace diagram of FIG. 61.
Figure 62B:
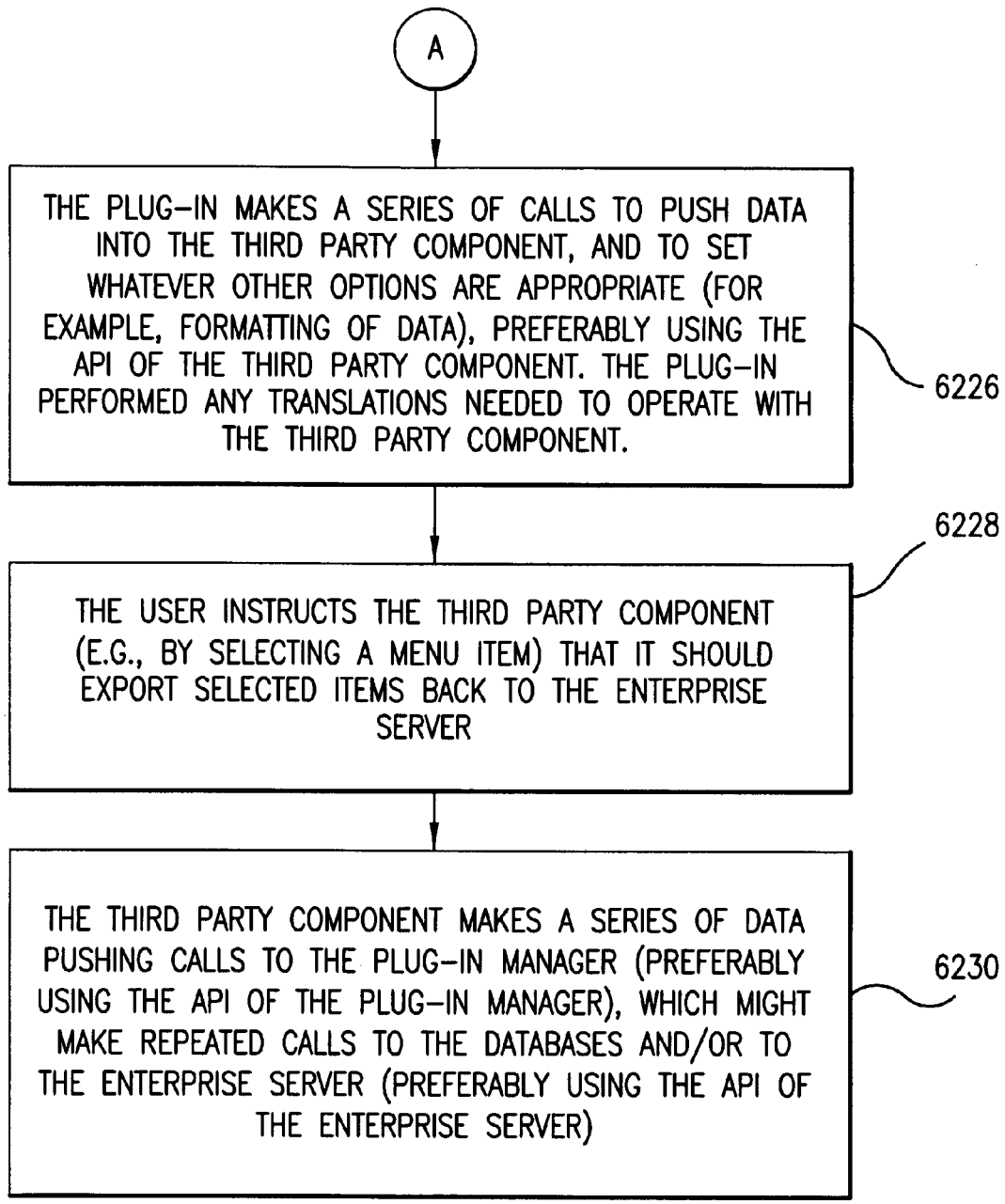

FIGS. 62A and 62B collectively illustrate a flowchart 6202 representing the operation of the plug-in manager 6006 when interacting with a third party component 6024 according to an embodiment of the invention. FIG. 61 illustrates an example event trace diagram corresponding to the flowchart of FIG. 62A and 62B.

In step 6206, the enterprise server 7604 creates an instance of the plug-in manager 6006. This is indicated as 6120 in FIG. 61.

In step 6208, the plug-in manager determines which plug-ins 6012, if any, are available. This is indicated as 6122 in FIG. 61. As noted above, each plug-in preferably corresponds to a third party component 6024, and understands the API, the information requirements, the options, etc., of the corresponding third party component 6024 (i.e., how to interact with the third party component).

In step 6210, the enterprise server receives from the plug-in manager 6006 a list of the available plug-ins 6012. This is indicated as 6122 in FIG. 61. This list indicates which third party components 6024 are available for use by the user.

In step 6212, the user pops up a plug-in menu 6104. The menu 6104 lists all plug-ins 6012 that are available based on the list obtained in step 6210. Further in step 6212, the user selects a plug-in from the plug-in menu 6104.

In step 6214, the enterprise server 7604 instructs the plug-in manager 6006 to run the selected plug-in. This is indicated by 6124 in FIG. 61.

In step 6218, the plug-in manager 6006 instructs the selected plug-in 6012 to run. This is indicated by 6128 in FIG. 61.

In step 6220, the plug-in 6012, possibly with the assistance of the plug-in manager 6006, displays an options dialog or a series of dialogs to the user. The dialogs specify the functions that can be performed by the corresponding third party component 6024. Preferably, at least all functions that are accessible through the third party component's API are listed in the dialogs. In other words, interaction between the enterprise server 7604 and the third party component 6024 includes at least the functions and capabilities represented in the API of the third party component 6024. The user selects desired options via the displayed options dialog. This interaction is represented by 6130 in FIG. 61.

In step 6222, the plug-in 6012 makes requests for data from the plug-in manager 6006. This is represented by 6138 in FIG. 61. In response to such requests, the plug-in manager 6006 may make calls to the enterprise server 7604 (represented by 6134 in FIG. 61), or may directly access the databases 6010 (this is represented by 6136 in FIG. 61).

In step 6224, the plug-in 6012 creates an instance of the associated third party component 6024. This instance is a software representation of the third party component. For example, if the third party component is a report generator, then in step 6224 the plug-in invokes the report generator. This is represented by 6140 in FIG. 61.

In step 6226, the plug-in transfers data to the third party component 6024. The plug-in performs any necessary data transformations. Additionally, the plug-in 6012 sends commands and options (from step 6220) to the third party component 6024, or alternatively controls the third party component 6024 based on the commands and options from step 6220. Preferably, the plug-in 6012 interacts with the third party component 6024 in this manner using the API of the third party component 6024. This operation of step 6226 is represented by 6142 in FIG. 61.

Also in step 6226, the user performs any real time interaction with the third party component 6024 via the plug-in manager 6006 and the plug-in 6012. An example of such interaction was described above with reference to FIGS. 63 and 64.

In step 6228, the user instructs the third party component 6024 to export the results of any processing performed by the third party component 6024. This is represented by 6144 in FIG. 61.

In step 6230, in response to the export command, the third party component 6024 transmits data to the enterprise server 7604 via the plug-in 6012 and the plug-in manager.6006. The plug-in 6012 and/or the plug-in manager 6006 perform any necessary data transformations. The enterprise server 7604 receives and processes the information as described above.

Interaction with third party components shall now be considered in greater detail.

Embodiments of the invention support a number of methods for integration with third party components. Two such integration methods are called "loose integration" and "tight integration." These are described below.

Loose Integration

With loose integration, interaction is via an intermediary, such as files. To export data from application 1 (such as IPAM) to application 2 (such as a third party tool), application 1 or an entity working on behalf of application 1 stores the data in a file (preferably in a format understandable by application 2; otherwise, data translations may be performed). The file is then read by application 2, or an entity working on behalf of application 2.

To import data to application 1, application 2 or an entity working on behalf of application 2 saves data in a file. The file is then read by application 1, or some entity working on behalf of application 1 (some data translation may be necessary). In embodiments of the invention, these write and read operations are manually initiated. That is, the user has to manually initiate the exportation and importation of data.

Generally, it is possible to utilize off-the-shelf versions of a third party component when loose integration is used.

Tight Integration

With tight integration, IPAM and a third party component interact with each other via the plug-in architecture described herein. Data is sent from IPAM to a third party component via the plug-in mechanism, and visa versa.

In an embodiment, IPAM (via the plug-in mechanism) sends a list of pointers to the third party component. The pointers point to data (i.e., data objects). In this manner, IPAM sends data to third party components. This same process is also used to send data from third party components to IPAM (via the plug-in mechanism). Alternatively, IPAM could send data to a third party component by storing the data in a file, and then sending a message to the third party component (via the plug-in mechanism) with the name of the file. This process could also be used to send data from third party components to IPAM. Alternatively, IPAM could send data to a third-party component by sending messages (containing the data) via the plug-in mechanism to the third party components. This process could also be used to send data from third party components to IPAM.

Figure 90:
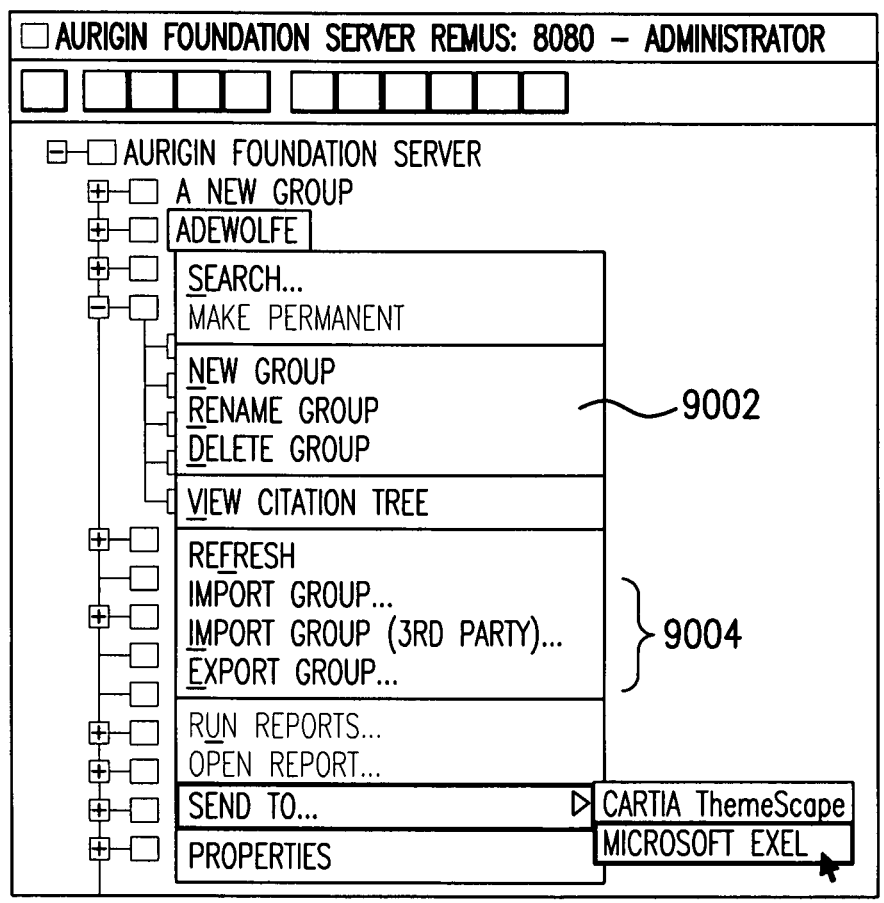
FIG. 90 illustrates an example export operation.
Figure 91:
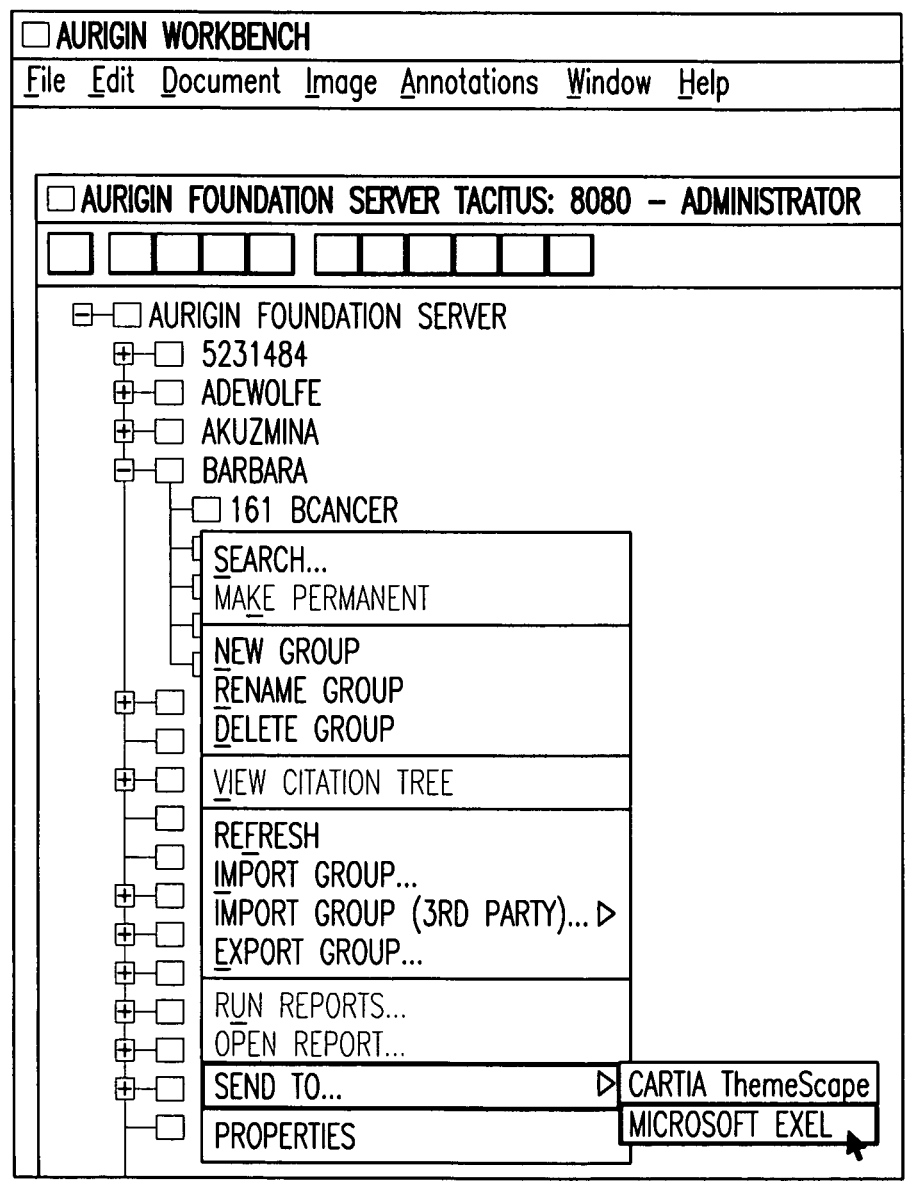
FIGS. 91-98 are used to illustrate an example plug-in operation of the invention with a third party tool.

Tight integration is a more automated process. The user need not explicitly store data in files, or manually initiate read and/or write operations. Instead, the user need only issue import or export commands. An example of the user issuing an export command is shown, for example, in FIG. 90. In the example of FIG. 90, the user is exporting the data objects in a group "adewolfe" to Microsoft Excel. The menu 9002 shown in FIG. 90 also illustrates other commands 9004 to import and export.

In order to perform tight integration, it is necessary that the API of the third party component include sufficient functionality to support the interactions described above. Alternatively, tight integration can be achieved using a version of a third party component that has been modified to support the interactions described above.

Query Creation and Retention

According to the invention, upon receipt of information from a third party component, the enterprise server 7604 creates a search query that corresponds to the analysis/processing performed by the user using the third party component. In an embodiment, the enterprise server 7604 generates the query by comparing the information sent to the third party component with the information received from the third party component.

Consider the example of FIG. 63, where 1000 documents pertaining to computer programming languages were sent to the third party component, and a subset of these documents pertaining to Pascal and Cobol were returned to the enterprise server 7604. According to an embodiment, the enterprise server 7604 compares what was sent with what was received to generate a search query limited to Pascal and Cobol.

In other embodiments, the third party component returns status information that the enterprise server 7604 uses to generate the search query. In other embodiments, the third party component returns the search query.

The query is saved for later reference and use by the user.

Plug-in Manager Application Program Interfaces (APIs)

The Plug-in Manager is preferably an ActiveX component that supports the addition of "plug-ins" (also preferably ActiveX components) that support interaction with third-party components. As noted above, plug-ins are used to export data to and import data from third-party visualization components (such as but not limited to Microsoft Excel, Cartia ThemeScape, and SpotFire).

The Plug-in Manager defines several APIs, described below, for use by various parts of the Plug-in facility. The Plug-in Manager also provides a local database, which provides "linked tables" (proxies) to tables in the IPAM SQL Server database.

When the IPAM is started, the IPAM queries the Plug-in manager for available Plug-ins, preferably creating a pull-right menu listing their names. (If no Plug-ins are available, the menu is not created, and access to Plug-ins is disabled in the IPAM.) In one embodiment, a user selects an IPAM group, then uses the Plug-in menu to cause the Plug-in Manager to invoke a specific Plug-in. Preferred protocols by which this happens are described below.

Additional APIs applicable with the invention are described in "System, Method, and Computer Program Product for Patent-Centric and Group-Oriented Data Processing," Ser. No. 07/867,392, filed Jun. 2, 1997, which is incorporated herein by reference in its entirety. Implementation of the APIs and commands described below will be apparent to persons skilled in the relevant art(s) based on the teachings contained herein.

It should be understood that the following APIs and commands are provided for illustrative purposes only, and are not limiting. Any other APIs or commands that achieve the functions and requirements described herein can also be used, as will be apparent to persons skilled in the relevant art(s) based on the herein teachings.

API: IPAM to Plug-in Manager

The Plug-in Manager exposes an API to the IPAM. This API allows the IPAM to obtain the number and names of available Plug-ins, and to invoke those Plug-ins, but preferably shields the IPAM from Plug-in-specific details.

In an example embodiment, plug-ins advertise their availability by way of a Windows Registry subkey under the key:

---

HKEY_LOCAL_MACHINE\Software\Aurigin Systems, Inc.\Aurigin Client\Plug-ins\

---

The name of the subkey is the OLE class name of the Plug-in (e.g., Aurigin. ExcelPlug-in).

If the default value of the subkey is "0", then the Plug-in is considered to be unavailable. Any other value indicates that the Plug-in is available. In other embodiments, the Plug-in Manager may automatically mark a Plug-in as being unavailable under certain circumstances. (For example, if a Plug-in fails some set number of times in succession).

The "Name" value of the subkey holds the name of the Plug-in, as it is to appear in IPAM menus.

The "Description" value of the subkey holds a string that provides additional information about the Plug-in. For example, to be used as a tooltip.

Various example commands/functions are described below.

Plug-inCount( ) As Integer

Returns the number of available Plug-ins.

The Plug-inManager queries the Registry to identify available Plug-ins, as described above.

Plug-in Name(Index As Integer)

Returns the name of the index'th Plug-in, where 0<=index<Plug-inCount( ).

Plug-inDescription(Index As Integer) As String

Returns the description of the index'th Plug-in, where 0<index<Plug-inCount( ).

SetGroup(Name, id As Sting)

Sets the name and database id of the group that will be the source of data for a Plug-in.

As a side-effect, the list of subgroups and the list of documents is cleared.

AddDocument(Name, id As String)

Adds the name and id of a document to the list of documents in the group. After the IPAM invokes SetGroup( ), the IPAM is required to invoke AddDocument( ) once for each document in the group.

SetAttribute(Name, Value As String)

Sets or resets a dictionary entry for "name" to be "value". The dictionary can be queried by a Plug-in using protocol described further below. The IPAM is required to set the following attributes UserId the ID of the logged-in user IPAMServer the name and port number of the IPAM server (e.g., "Romulus:8080")

SQLServer the name of the server on which SQL Server is running

RunPlug-in(Integer Index)

Run the index'th Plug-in, where 0<=index<Plug-inCount( ).

The Plug-in manager creates an instance of the ActiveX component for the Plug-in, and invokes it using the "Plug-in Manager to Plug-in" API, described below.

If the Plug-in "fails" (where conditions constituting failure are defined by the specific Plug-in), the Plug-in will raise an OLE exception. If no exception is raised, the Plug-in is assumed to have succeeded.

API: Plug-in Manager to Plug-in

Each Plug-in preferably implements this API, through which the Plug-in Manager invokes (runs) the Plug-in.

Various example commands/functions are described below.

Run(Object Manager)

Run the Plug-in. The "manager" object is a reference to the instance of the Plug-in Manager ActiveX component. The Plug-in uses the "Plug-in to Plug-in Manager" API, described below, to communicate with the Plug-in manager.

When run, a Plug-in preferably will do one or more of:

present a dialog to the user listing Plug-in-specific options query the Plug-in Manager for the selected group and its documents direct the Plug-in Manager to perform citation traces for documents query a local database for additional information about documents invoke a third-party API to communicate with a third-party application or component (e.g., Microsoft Excel, Cartia ThemePublisher, SpotFire, Insight Hyperbolic Tree)

insert new data into a local database invoke the IPAM "Plug-in to IPAM" API to create new groups of documents present one or more status of informational dialogs to the user If the Plug-in encounters an error, it communicates details back to the Plug-in Manager by raising an OLE exception, passing a description of the error in the exception.

API: Plug-in to Plug-in Manager

The Plug-in Manager implements this API for use by Plug-ins.

Various example commands/functions are described below.

GetAttribute(Name As String) As String

Get the value of an attribute, as set by SetAttribute( ). The Plug-in uses this function as necessary to obtain the id of the logged-in user, the name of the server name and port number of the IPAM server, etc.

Raises an exception if the name is unknown.

UnrollGroups(depth As Integer)

IPAM Groups form a hierarchy. UnrollGroup populates the bds_groups table in the local database with a trace of the group hierarchy from the source group for the given depth. (A depth of 0 means the source group only, 1 means to include the source group and one level of subgroups, and so on.)

The Plug-in then gains access through the GetDB( ) function, described below, and can issue SQL queries that join against the bds_groups table.

GroupCount( ) As Integer

Returns the number of source groups. In an embodiment, this always returns 1.

GetGroups(Name( ) As String, String id( ) As String)

Gets the names and ids of groups.

The Plug-in is responsible for sizing the name and id arrays to accommodate GroupCount( ) groups.

DocumentCount( ) As Integer

Returns the number of documents in the source group(s).

GetDocuments(name( ) As String, id( ) As String)

Gets the (long display) names and ids of documents in the source group(s).

The Plug-in is responsible for sizing the name and id arrays to accommodate DocumentCount( ) documents.

TraceCitations(Forward As Boolean, Depth As Integer)

Directs the Plug-in manager to trace citations for the source documents, writing the results into the bds_citations' table in the local database. Citations are traced either forward or backward, and to a given depth.

The Plug-in then gains access to the local database via GetDB( ), as described below, and can issue SQL queries that join against the bds_citations table.

GetDB( ) As Database

Return an ActiveX object that provides access to the local database. "Database" is an OLE Object type provided by Microsoft. It provides an API for interacting with JET databases. The database object has an API that supports SQL queries.

Through the local database, the Plug-in gains access to tables in the IPAM database, and optionally to third-party or customer-specific tables, allowing information to be merged for presentation.

API: Plug-in to IPAM

The IPAM exposes an API for creating new groups.

Various example commands/functions are described below.

CreateGroupFromGUIDs(Name, Description As String, Guid( ) As String)

Create a new group with the given name and description, populating it with documents.

Preferably, use of this API requires that:

1. a user be logged in to the IPAM
2. a group is selected in the group pane
3. the user has permission to create a new subgroup within the selected group If the guid( ) array contains ids that are not recognized, those ids are written to a log file.

Example Third Party Components

The enterprise server 7604 can interact with any third party component having functionality and capabilities of interest. As indicated above, the enterprise server 7604 interacts with a given third party component 6024 via the API of the third party component 6024. Alternatively, the enterprise server 7604 interacts with a third party component 6024 via a custom interface to the third party component 6024.

For illustrative purposes, and without limitation, example third party components 6024 are described below. It should be understood that the present invention is not limited to working with these third party components. The following discussion is provided solely to illustrate example operation of the enterprise server 7604 with third party components 6024, and is not limiting.

Graph-Based Visualization Tools

Figure 67:
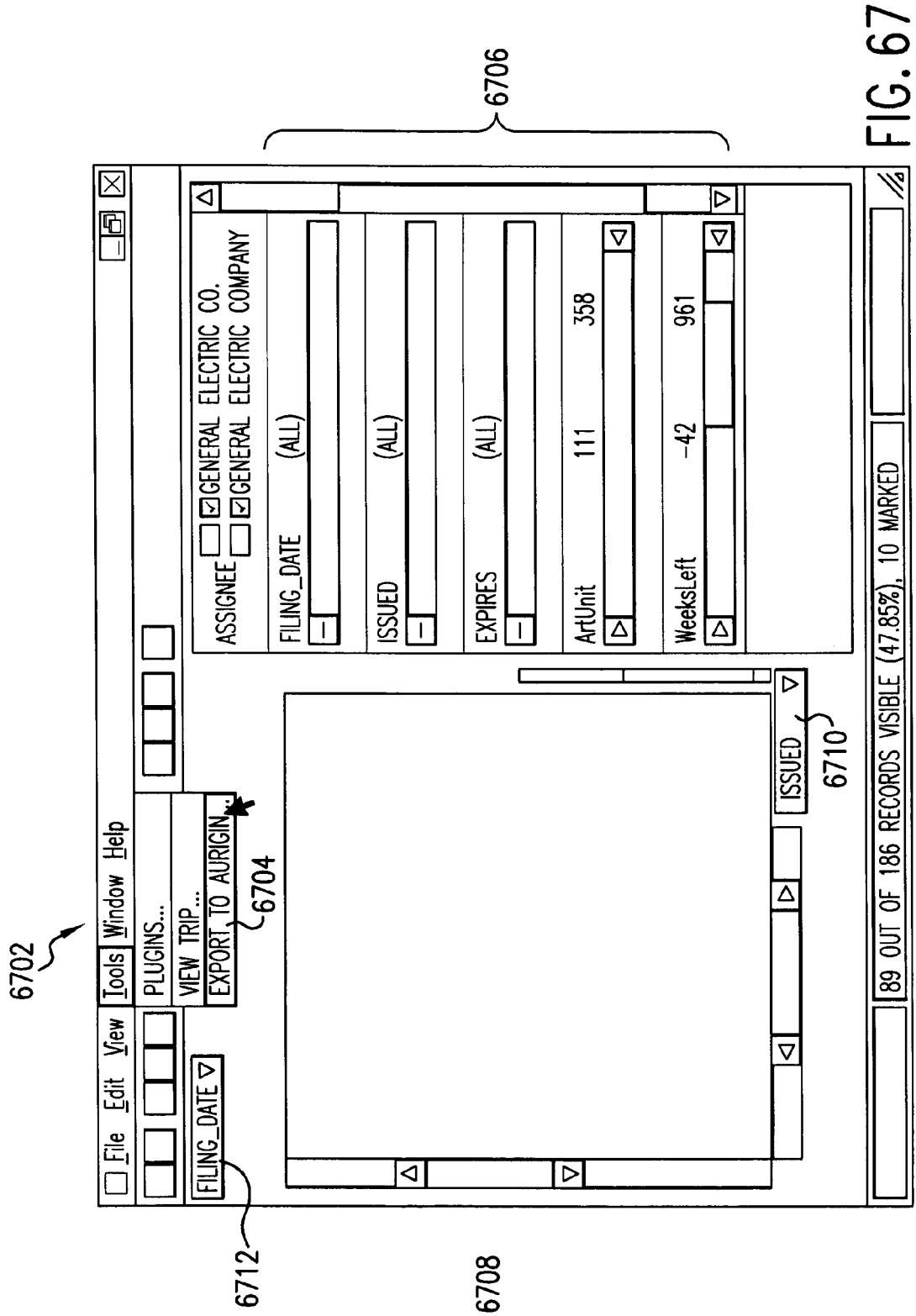
FIG. 67 is an example display of data represented using a graph with dynamically adjustable axis.

FIG. 67 illustrates an example display where data is represented in a graph. The example of FIG. 67 depicts a two-dimensional graph, but graphs of dimensions greater than two are within the scope and spirit of the invention.

In the example display 6702 of FIG. 67, each icon in the graph 6708 represents one or more patents. In an embodiment, information pertaining to a patent (such a bibliographic information, text information, image information, etc.) can be retrieved and displayed by selecting the icon associated with the patent.

The X-axis of the graph represents the issue date, and the Y-axis of the graph represents the filing date. The patent icons are positioned on the graph 6708 depending on their particular filing dates and issue dates. The display can be dynamically adjusted by selecting other criteria for the X-axis via a drop down menu 6710. Similarly, the display can be dynamically adjusted by selecting other criteria for the Y-axis via a drop down menu 6712.

The data represented in the graph 6708 can be filtered by selecting from attributes 6706. In example of FIG. 67, for example, the patents represented in the graph 6708 are limited to art units 111 through 358, and remaining pendency of 42 weeks to 961 weeks.

A variety of graph based visualization tools operable with the present invention are publicly available. For example, and without limitation, SPOTFIRE PRO is a commercial product available from SPOTFIRE, Boston, Mass. SPOTFIRE PRO enables the display of data in graphical form as shown in FIG. 67.

Landscape-based Visualization Tools

Figure 65:
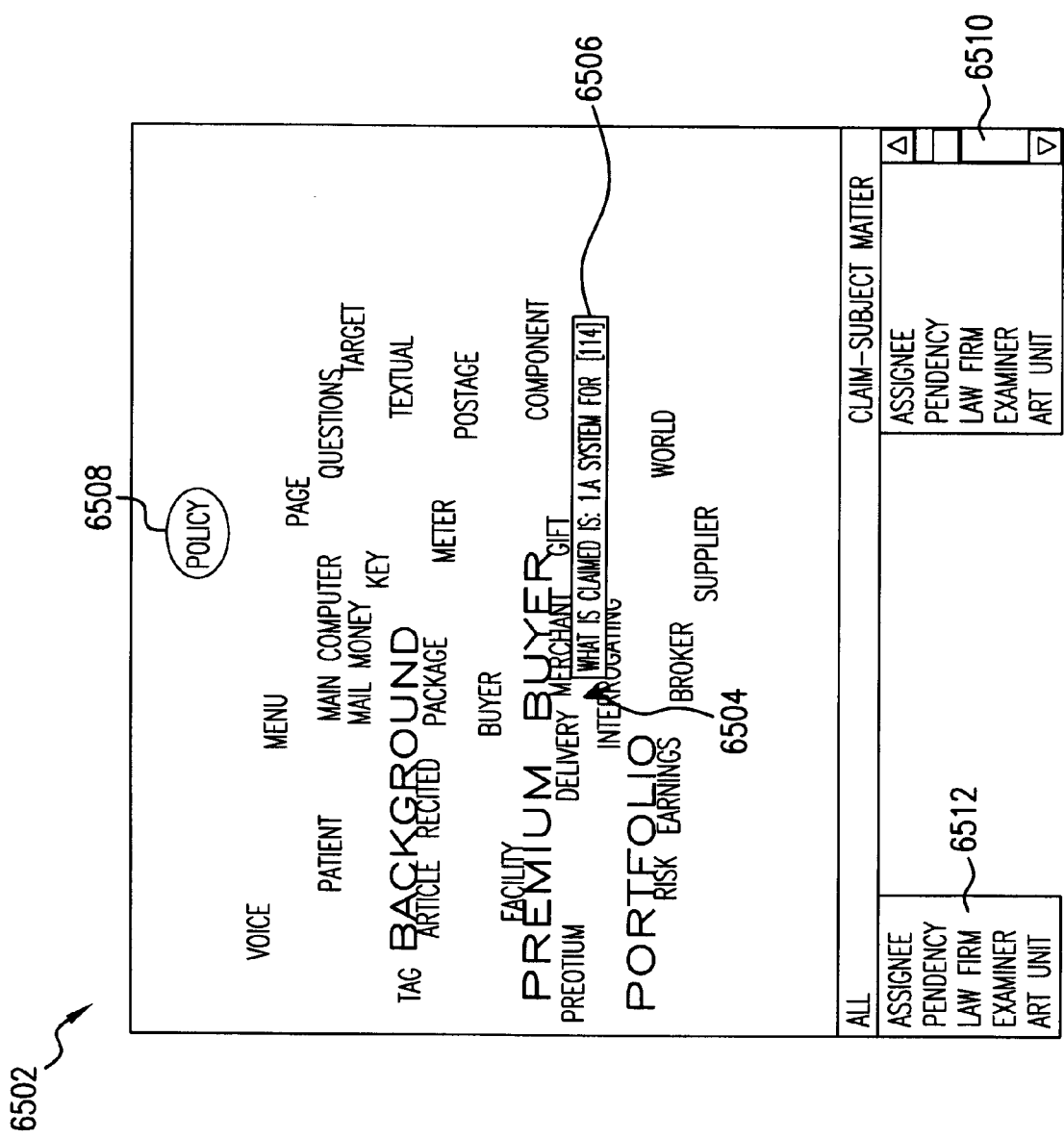
FIGS. 65 and 66 represent example displays of data represented as maps or landscapes.

FIG. 65 illustrates an example display 6502 wherein data is represented in a landscape or map. Peaks in the landscape correspond to data objects that have been aggregated according to user selected criteria. In the example of FIG. 65, the peaks correspond to claims from one or more patents that are directed to similar subject matter. For example, reference number 6508 identifies a peak that represents an aggregation of claims from one or more patents that are directed or related to "policy". The relative heights/size of the peaks indicate the number of claims corresponding to the respective subject matters of the peaks.

The display can be dynamically adjusted by selecting attributes from a menu 6510. For example, if the "assignee" attribute is selected, then the landscape would be adjusted so that the peaks would represent the number of patents assigned to corporate entities.

Information in the display can be limited by using filters from a filter menu 6512. For example, if an "assignee" attribute is selected, and "Aurigin" is entered in a pop-up dialog, then the landscape would be adjusted to only display patents assigned to "Aurigin."

According to the example shown in FIG. 65, when the cursor 6504 is positioned proximate to or above a peak, the text of a claim that corresponds to the peak is partially or fully displayed. This is illustrated by window 6506.

Figure 66:
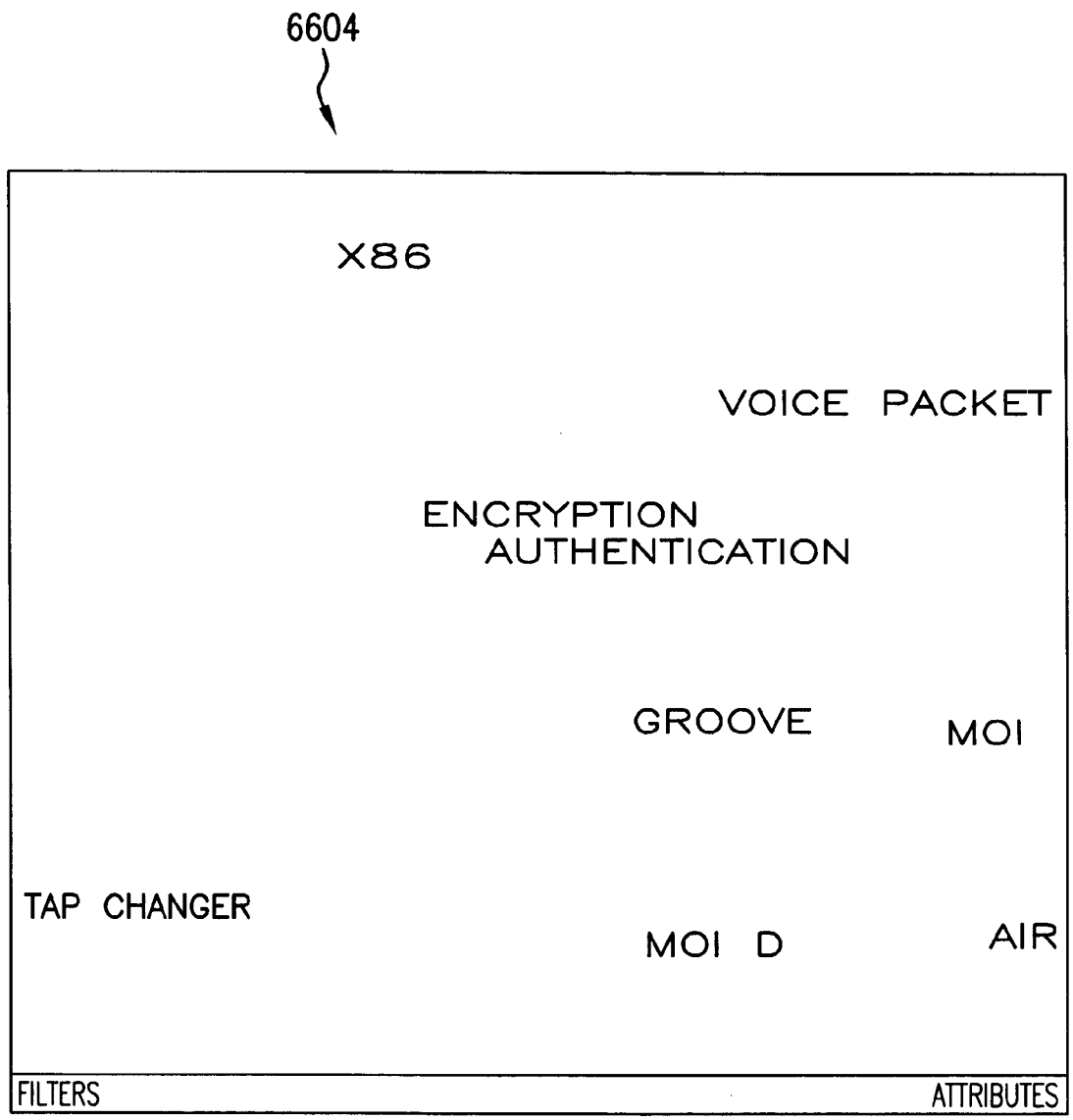

FIG. 66 illustrates a similar display 6604 that represents patent related data using a landscape approach.

FIG. 63, described above, is directed to another display 6306 wherein information is visualized using a landscape approach.

Figure 88:
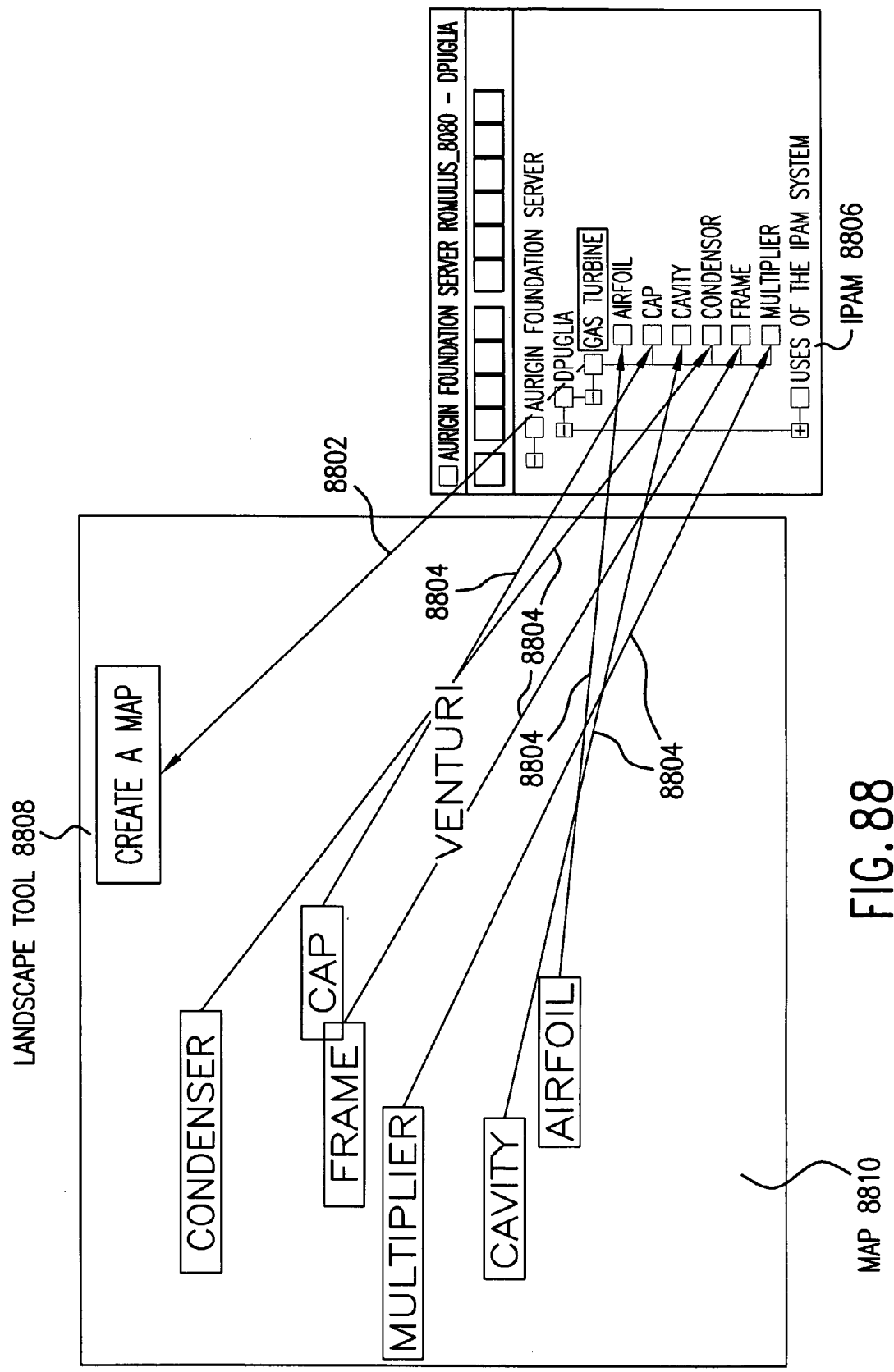
FIG. 88 illustrates an example landscape or map tool operable with embodiments of the invention.

As described above, and further illustrated in FIG. 88, information from IPAM 8806 can be exported to the landscape tool 8808. This is represented by data flow line 8802. The exported information is represented as a map 8810. The user can manipulate the map to select groups of data objects, which can then be imported to IPAM 8806. This is represented by data flow lines 8804. The imported data can be used to form new groups, as shown in FIG. 88.

Figure 68:
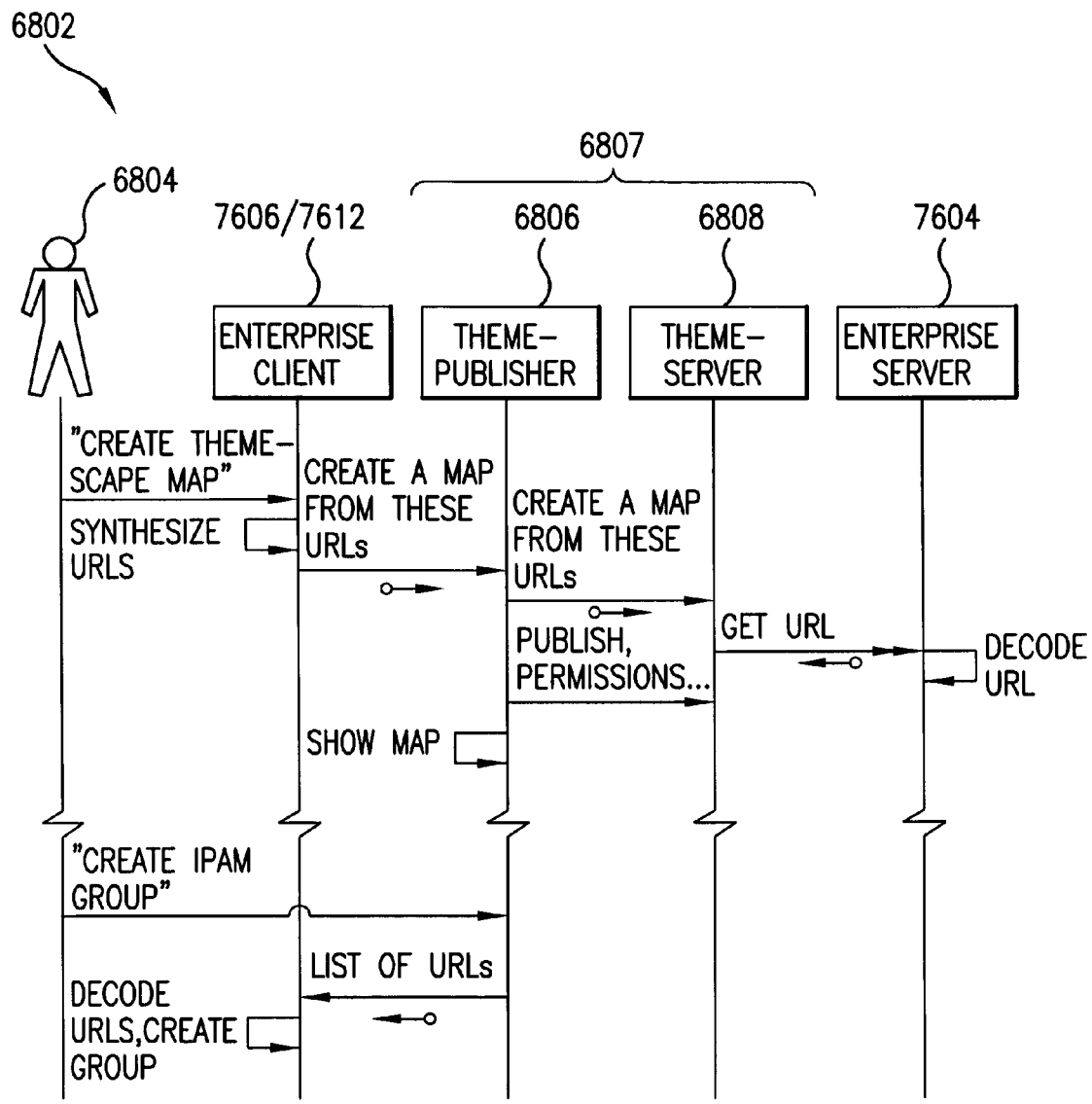
FIG. 68 is an event trace of the enterprise server operating with a specific third party component/tool.

An example product that utilizes a landscape approach to visualize data is THEMESCAPE from CARTIA, INC., Bellevue, Washington. FIG. 68 illustrates an event diagram 6802 representing the interaction between the enterprise server 7604, the enterprise client 7606 or 7612, and the third party THEMESCAPE product 6807 according to an embodiment of the invention. The invention is not limited to this example implementation.

Interaction with Cartia ThemeScape will be further illustrated by reference to an example scenario shown in FIGS. 91-98. This also further illustrates the round-trip capabilities of the invention.

First, an IPAM group is selected, and this is sent to Cartia ThemeScape. See FIG. 91.

Figure 92:
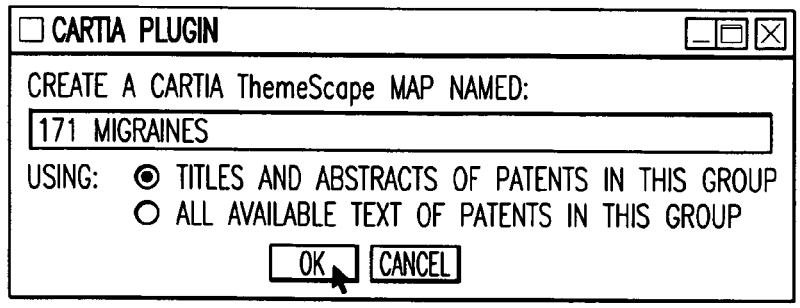
Figure 93:
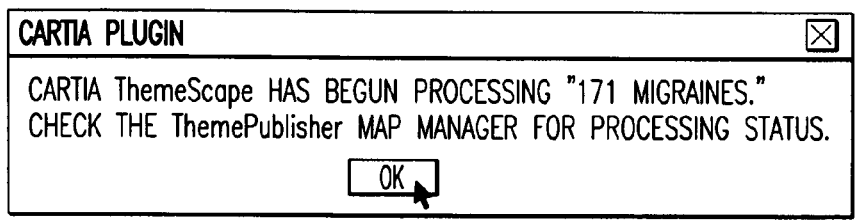
Figure 94:
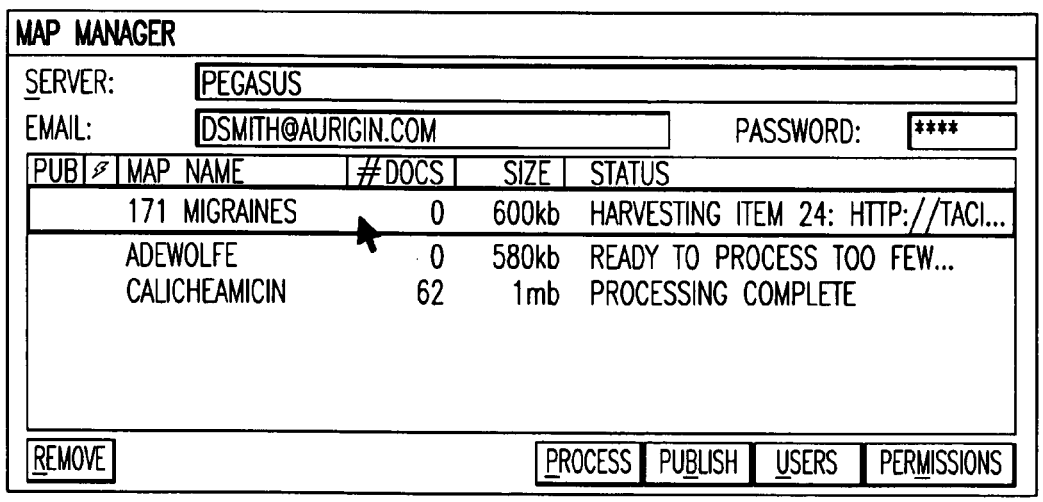
Figure 95:

Second, available options are chosen in the Cartia Plugin dialog (see FIG. 92). The dialog allows you to change the name of the map (the name of the IPAM Group is the default map name). The dialog also allows you to specify what portions of the patent documents in the group to use to build the map. Dialogs vary among third party tools.

Third, a notification is provided indicating that Cartia has begin processing the map. See FIG. 93.

Fourth, progress is indicated in the ThemePublisher's Map Manager dialog. See FIG. 94. When it has built the map, the status line will say "Processing Complete", or will indicate why the map could not be built.

Fifth, the map is displayed. See FIG. 95. The user uses ThemePublisher's tools to select a portion of the map.

Sixth, with a portion of the map selected, the ThemePublisher Document Viewer appears. See FIG. 96. The user clicks the Export button to export the data objects corresponding to the selected map portion to IPAM.

Figure 96:
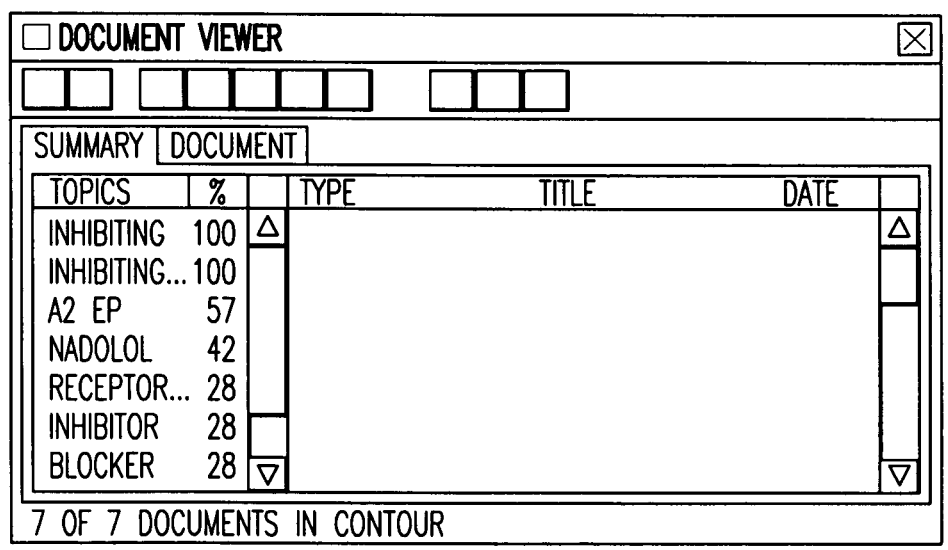
Figure 97:
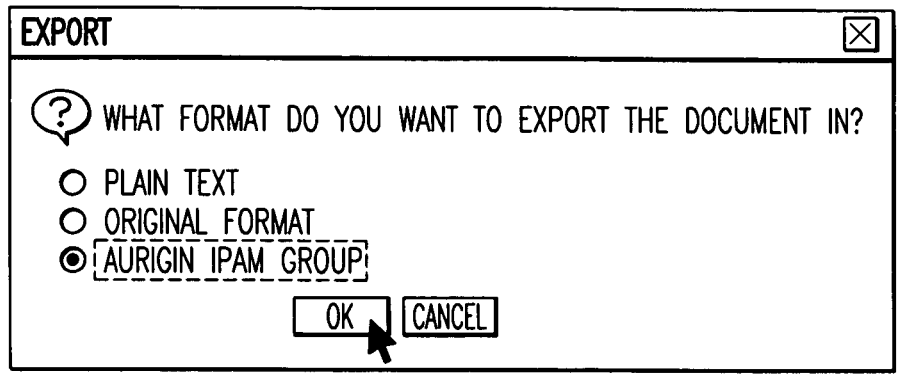
Figure 98:
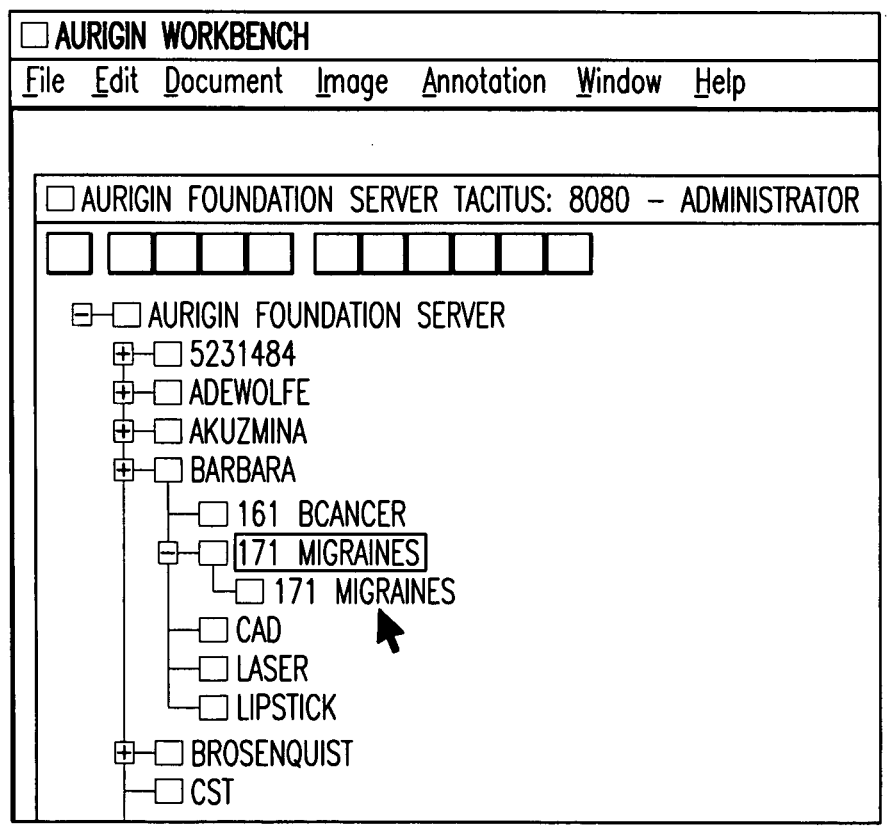

Seventh, an Export dialog is presented. See FIG. 96. In the example of FIG. 96, the "Aurigin IPAM Group" option is selected, and then the user clicks OK. In some embodiments, Cartia ThemePublisher displays a dialog that asks, "What should the Aurigin IPAM group be named?" with a field for the user to enter a name. It will contain a default value such as the map name.

Eighth, a new group is created as the child of whatever group is selected.

This example has been provided for purposes of illustration, not limitation. The example is applicable to other third party tools. Accordingly, given the herein teachings, persons skilled in the relevant art(s) could integrate other third party tools with IPAM. The invention is directed to such other combinations.

Data Object Searching Tools

The invention is operable with third party tools for identifying collections of data objects. Such data objects can be imported into IPAM for processing. For example, one or more new groups may be formed from the imported data objects.

Figure 89:
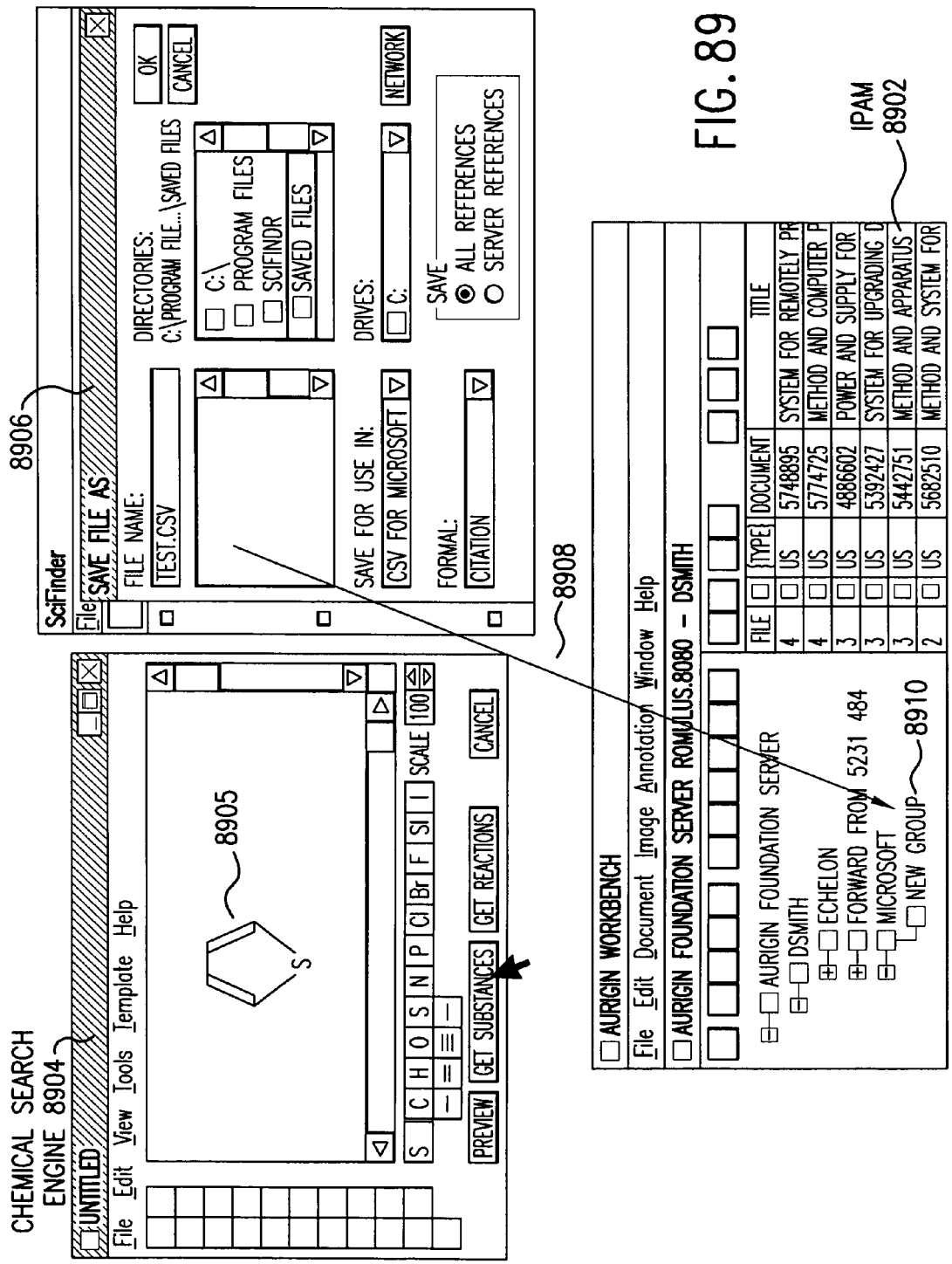
FIG. 89 illustrates an example search tool operable with embodiments of the invention.

For example, FIG. 89 illustrates a chemical search engine 8904. (The chemical search engine 8904 is herein described for illustrative purposes only. The invention is not limited to this embodiment.) The user defines a chemical structure 8905 in the chemical search engine 8904. The chemical search engine 8904 then searches for chemicals that are related to the chemical structure 8905. A variety of chemical search engines are publicly available and operable with the invention, such as CAS SciFinder.

The results of the search are stored via a save dialog 8906. In the example of FIG. 89, the search results are saved in file "test.csv." The search results comprise one or more chemicals that were found during the search. Generally, each chemical represents a data object.

In IPAM 8902, the user imports the file "test.csv," as indicated by arrow 8908. The contents of "test.csv" (i.e., the chemicals located during the search) are stored in a group 8910.

An example use scenario is as follows.

A user working in IPAM 8902 is studying a group comprising a multitude of chemical compounds (each compound may be represented by a corporate document, for example). The user wishes to identify chemical compounds in this group that have a particular sub-structure.

The user instructs IPAM 8902 to invoke the chemical search engine 8904, and export the group to the chemical search engine 8904. Accordingly, the plug-in manager interacts with the plug-in for the chemical search engine 8904 to (1) invoke the chemical search engine 8904, and (2) export the group to the chemical search engine 8904. The plug-in interacts with the chemical search engine 8904 using the API of the chemical search engine 8904. The plug-in performs any necessary data/format translations to export the group to the chemical search engine 8904.

The user interacts with the chemical search engine 8904 to conduct a search for compounds related to a particular structure 8905, as described above. This search is limited to the compounds in the group that was exported to the chemical search engine 8904.

After completion of the search, the plug-in associated with the chemical search engine 8904 accesses the search results (possibly from file "test.csv") and imports the search results to IPAM 8902 via the plug-in manager. In doing so, the plug-in performs any needed data/format translations consistent with the API of the plug-in manager.

IPAM 8902, upon receiving the search results, may create a new sub-group of the original group, and store the search results in the new sub-group. Other processing by IPAM 8902 is possible, as will be apparent to persons skilled in the relevant art(s) based on the teachings contained herein.

Other

Additional third party components applicable for use with the enterprise server 7604 include, but are not limited to, CRYSTAL REPORTS from SEAGATE, EXCEL from MICROSOFT, TABLE LENS from INXIGHT, and PERSPECTA from PERSPECTA, INC.

Hybrid Models

The invention supports a variety of configurations of its components. Additionally, the invention supports a variety of functional configurations and distributions.

Figure 69:
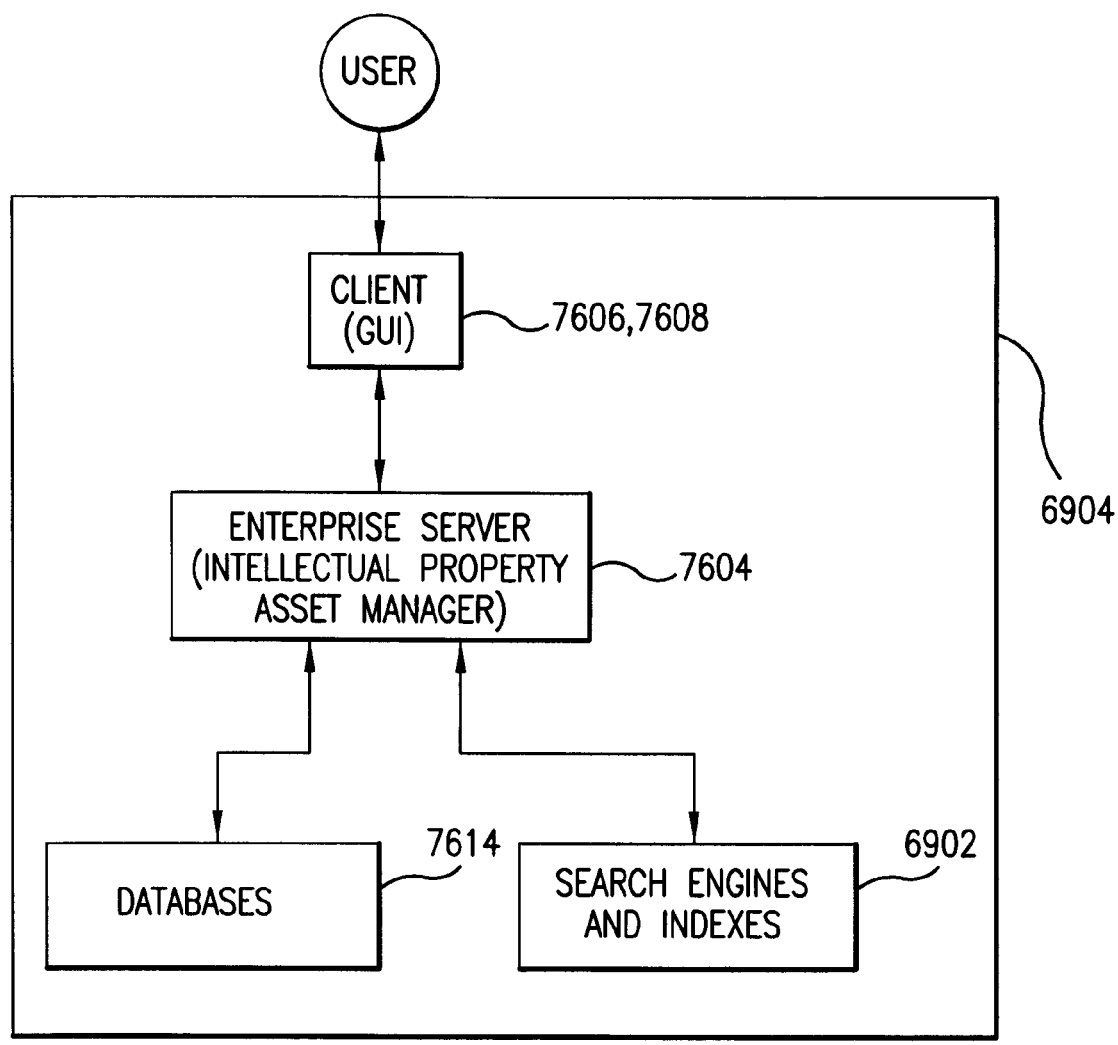
FIGS. 69-73 depict various configurations and distributions of components and functionality supported by the present invention.

For example, FIG. 69 illustrates a configuration where all primary components and functions are positioned at a single location 6904.

Figure 70:
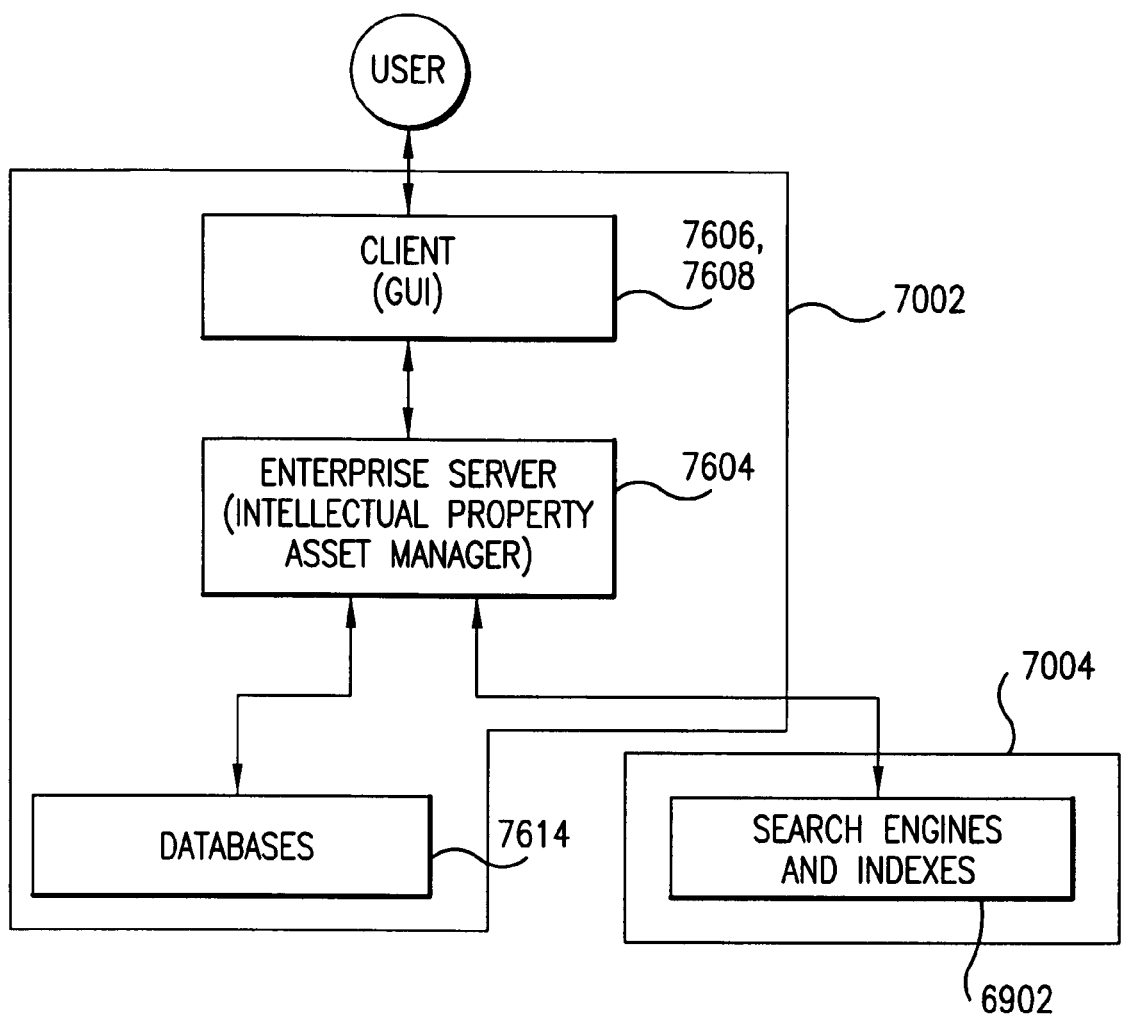

FIG. 70 illustrates a configuration where components and functionality are distributed among a first location 7002 and a second location 7004. The enterprise server 7604, the client 7606, 7608, and the IPAM databases 7614, and functions performed by these components, are positioned at the first location 7002. The search engines and indexes 6902, and the functions performed by the search engines and indexes 6902, are positioned at a second location 7004. To perform a search specified by the user, the enterprise server 7604 accesses the remote search engines and indexes 6902 at the second location 7004. It is noted that such search engines and indexes 6902 may include third party components, such as LEXIS-NEXIS, Westlaw, Dialog, Derwent, etc., as described above.

Figure 71:
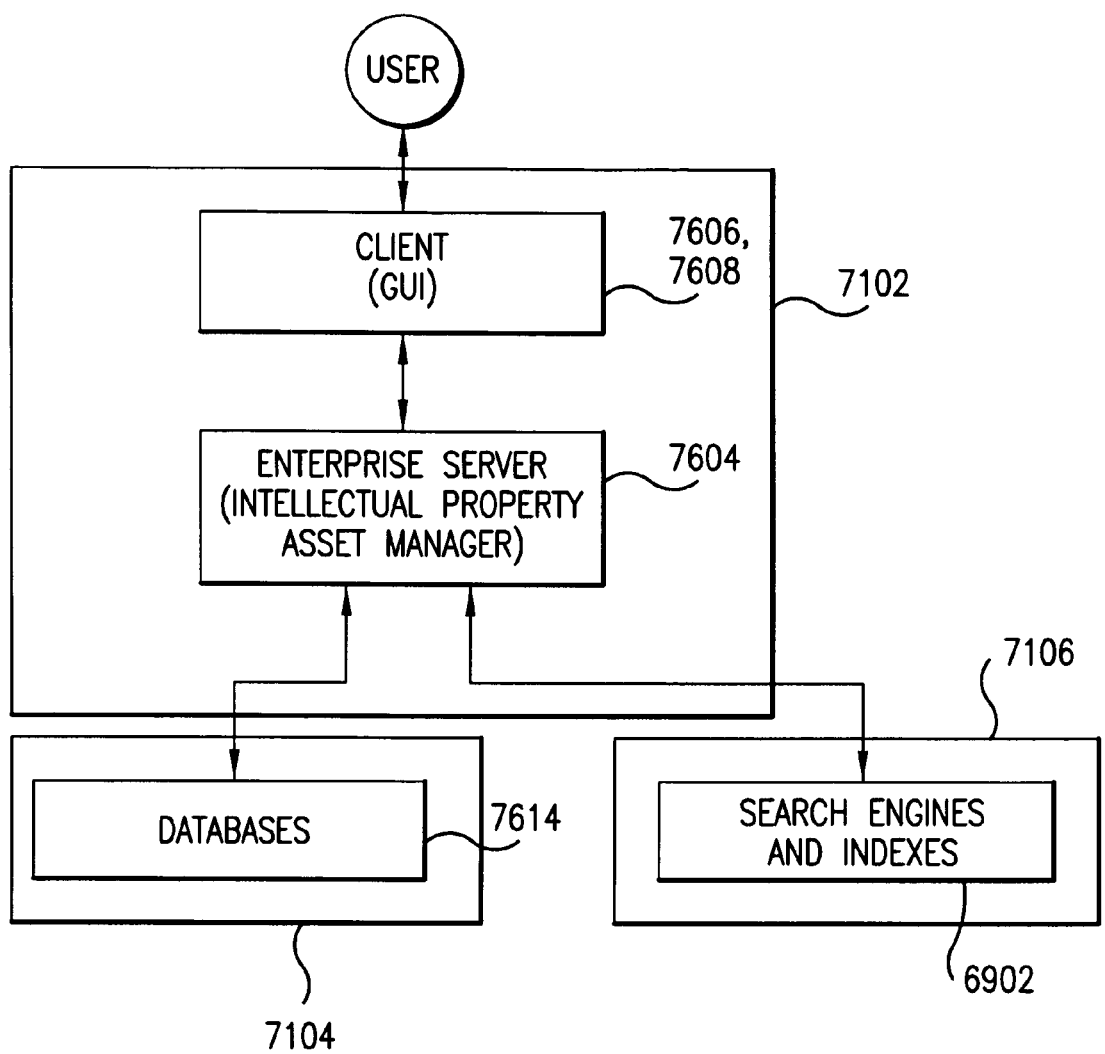

FIG. 71 illustrates a configuration where components and functionality are distributed among a first location 7102, a second location 7104, and a third location 7106.

Figure 72:
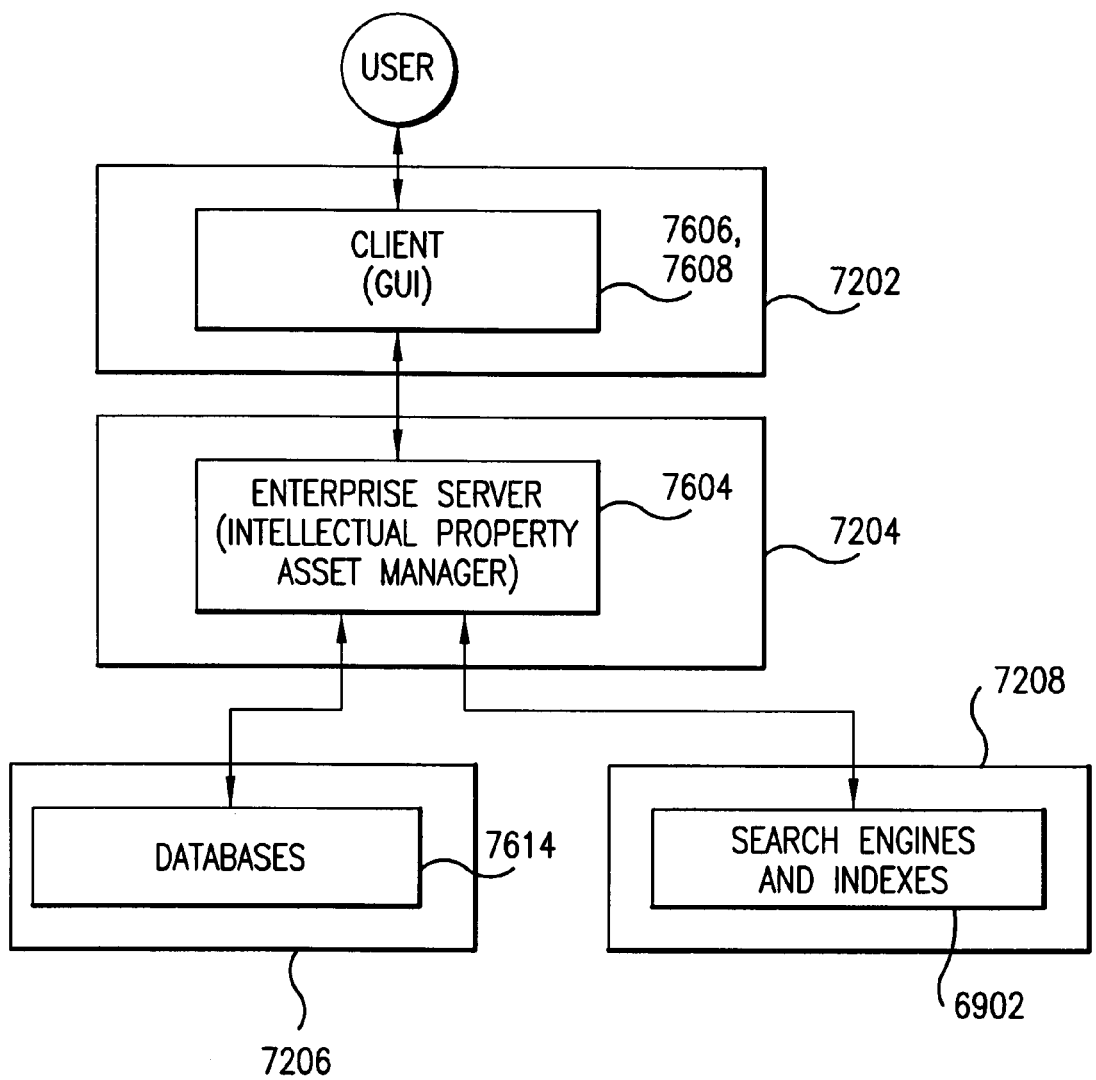

FIG. 72 illustrates a configuration where components and functionality are distributed among a first location 7202, a second location 7204, a third location 7206, and a fourth location 7208.

As indicated by the example configurations illustrated in FIGS. 69-72, the present invention includes a variety of configurations and distributions of its components and functionality. The examples of FIG. 69-72 are presented for purposes of example only and are not limiting. Other configurations of components and functionality will be apparent to persons skilled in the relevant arts based on the discussion contained herein.

Figure 73:
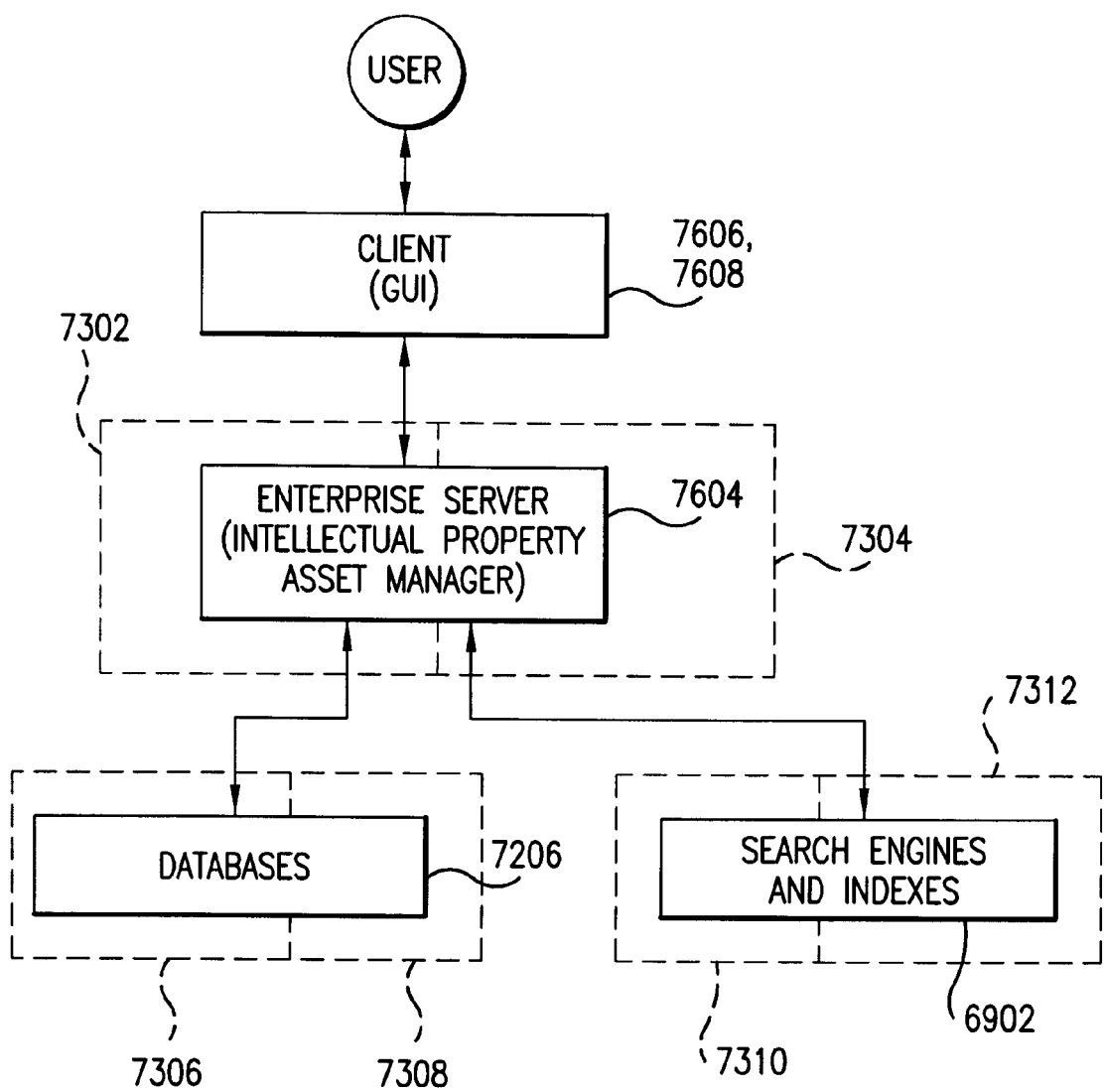

For example, a given component and/or functionality can be distributed among multiple locations. This is illustrated in FIG. 73, where the enterprise server 7604 is distributed among a first location 7302 and a second location 7304. Additionally, databases 7206 are distributed among location 7306 and 7308. Also, search engines and indexes 6902 are distributed among locations 7310 and 7312. Third party components/tools (described above) may also be local or distributed.

It is noted that the locations described in FIGS. 69-73 may be owned by and/or under the control of a single corporate entity, or owned and/or under the control of multiple corporate entities. Also, the locations depicted in FIGS. 69-73 may be local to one another, or may be very remote from one another, or may be combinations thereof The invention supports a number of economic models for using the system. For example, the system supports a pay-for-use service, where usage of the system is metered and billed accordingly. The invention also includes other economic models, such as but not limited to an unlimited service plan, where for a given fee the user can download any number of documents and have unlimited use of the system, and a hybrid plan where for a fee the user can download a given number of documents and use the system for a given amount of time or transactions (or some other metric). Once these limits are exceeded, the user pays on a per-use rate.

The invention also supports a model whereby meta-data version (v1) can be distributed to the client at time (t1). Later, an updated version of the meta-data (v2) can be distributed at time (t2). This is extremely valuable because certain aspects of the meta-data associated with a patent are mutable (e.g., assignee and U.S. classification). By providing these version numbers in the database, the host system can automatically provide meta-data updates to the remote system. Charges for these updates can be included within the user's existing economic model (above), or via a separate economic model.

The invention also supports electronic ordering of data objects (such as patents), and automatic downloading and installing of such data objects. In this embodiment, a user can electronically place an order for data objects, such as but not limited to via modem or over the Internet. An automated process takes the order, performs any necessary financial accounting and billing, retrieves the requested data items from a database, and downloads the retrieved data items/objects to the requestor via the Internet, for example. At the user computer, the received data objects are automatically decrypted (if necessary), unpacked (if necessary), unzipped (if necessary), installed in the proper directories, noted in the computer registry, and/or other tasks to automatically install the received data objects for use at the user site.

Assignee Processing

The invention supports processing related to corporate entities. For example, the invention includes functionality to identify and process patents assigned to a particular corporate entity.

To achieve effective corporate entity related processing, it is important that references to a given corporate entity in a data set be consistent throughout the data set. For example, if the user wishes to identify all patents assigned to Aurigin, Inc., then it is important that all references to Aurigin in the database utilize the same name, such as "Aurigin, Inc.". Processing conducted by the invention will not be as effective if different representations are used to represent a given corporate entity, such as "Origin" and "Aurigin, Incorporated" to represent Aurigin.

As noted above, the invention preferably receives patent data (herein called "raw data") from national patent offices. Such patent data often includes different representations of a given corporate entity. Accordingly, corporate entity related processing over such data is not entirely effective.

The invention solves this problem by processing assignee data contained in patent raw data. Such processing, called assignee name processing, is depicted in a flowchart 7402 of FIG. 74.

In step 7406, a normalized assignee name is selected for an entity. For example, the name "Aurigin" may be selected as a normalized assignee name for the corporate entity "Aurigin, Inc.".

In step 7408, the patent raw data is analyzed to identify all name representations for the corporate entity being considered. For example, in reviewing the data set, the following representations for Aurigin, Inc. may be identified:

Aurigin
Origin
Aurigin, Inc.
Aurigin, Incorporated
Origin, Inc.
Origin, Incorporated Step 7408 may be performed manually, automatically, or a combination thereof A variety of factors are considered to determine whether or not two representations refer to the same company or two independent and unrelated companies, such as but not limited to company name, company address, etc.

In step 7410, the normalized assignee name selected in step 7406 is linked to the name representations identified in step 7408.

Preferably, step 7410 is performed by replacing instances of the name representations appearing in database tables with the normalized assignee name. Preferably, the patent raw data is not modified.

Figure 74:
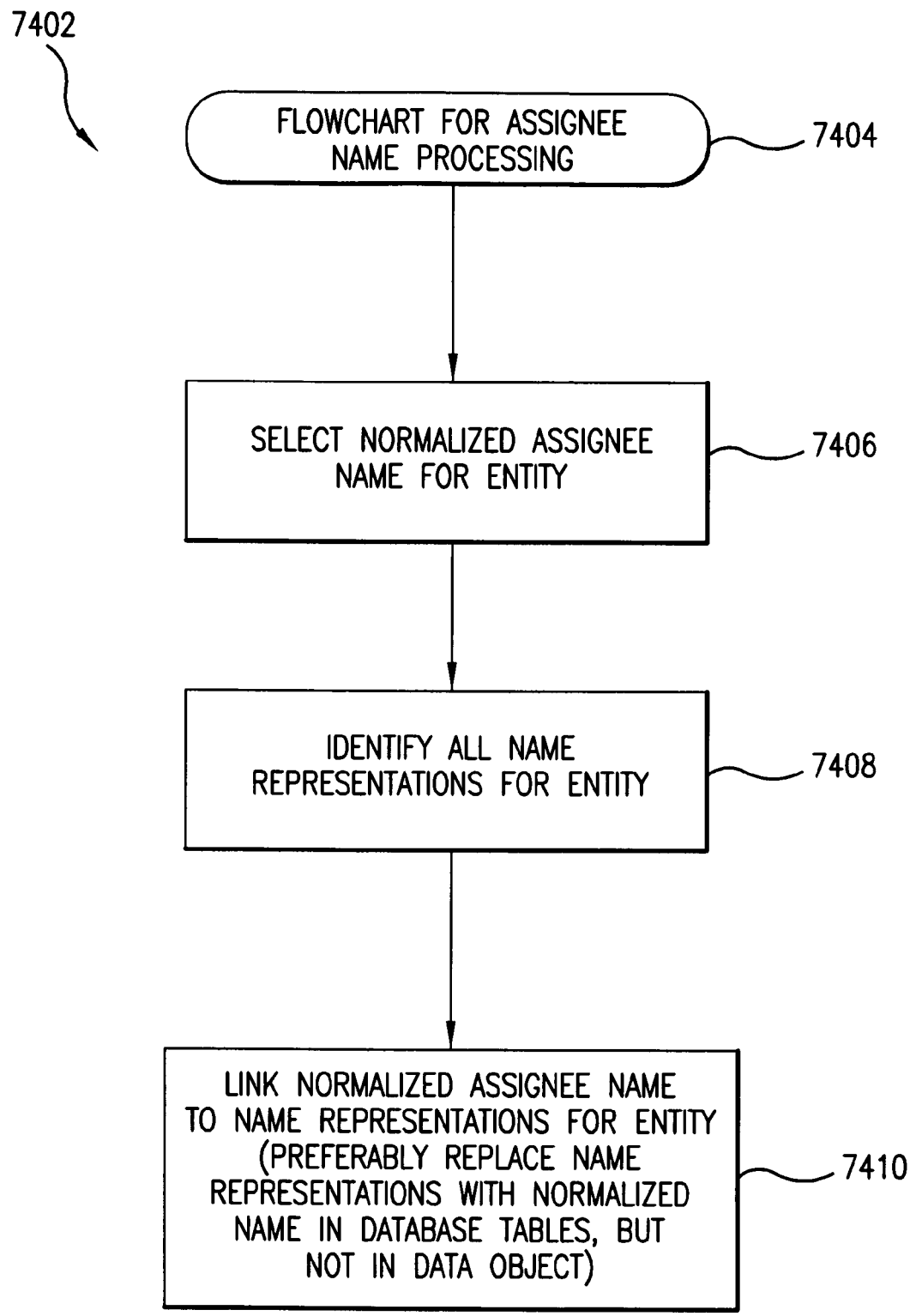
FIG. 74 is a flowchart representing the operation of embodiments of the invention when performing assignee name processing.

The processing depicted in FIG. 74 is not limited to assignee name processing, but is instead applicable whenever there is a need that representations of a given object be consistent throughout a data set. For example, with regard to patents, for example, the processing of FIG. 74 can be applied to inventor names, law firms, patent examiners, classes and subclasses (that change over time), any other bibliographic data, etc.

Input of Arbitrary and Potentially Diverse Data Objects

The present invention enables the automatic or semi-automatic input into the system of data objects of any format and/or content. Such data objects are stored in databases of the system. The invention allows the display and annotation of the data objects. The data objects can also be searched. The invention supports other processing of the data objects, as described herein, and as also described in "System, Method, and Computer Program Product for Managing and Analyzing Intellectual Property (IP) Related Transactions," Ser. No. 09/138,368, filed Aug. 21, 1998; "Using Hyperbolic Trees to Visualize Data. Generated By Patent-Centric and Group-Oriented Data Processing," Ser. No. 08/921,369, filed Aug. 29, 1997; and "System, Method, and Computer Program Product for Patent-Centric and Group-Oriented Data Processing," Ser. No. 08/867,392, filed Jun. 2, 1997, all of which are incorporated herein by reference in their entireties.

In embodiments of the invention, information is extracted from the data objects. The extracted information is also stored. Preferably, the extracted information is stored in relational databases, data mining databases, or other types of databases. This is similar to storing bibliographic and other information from patents in relational databases, as described above, and as further described in U.S. Patent Application "System, Method and Computer Program Product for Patent-Centric and Group-Oriented Data Processing," Ser. No. 08/867,392, filed Jun. 2, 1997, which is herein incorporated by reference in its entirety. The extracted data that is stored in the relational or other databases can be used for sophisticated data mining and other processing related to the underlining data objects, as described herein.

Preferably, the format of data objects that are input into the system is at least partially regular and consistent. By this, it is meant that for a given data object type, a given piece of information (such as the document title) is always located at substantially the same position in data objects of the data object type. The invention makes use of the regular and consistent arrangement of data in data objects to extract data from the data objects. The extracted data is stored in relational databases, data mining databases, or other types of databases.

Figure 84:
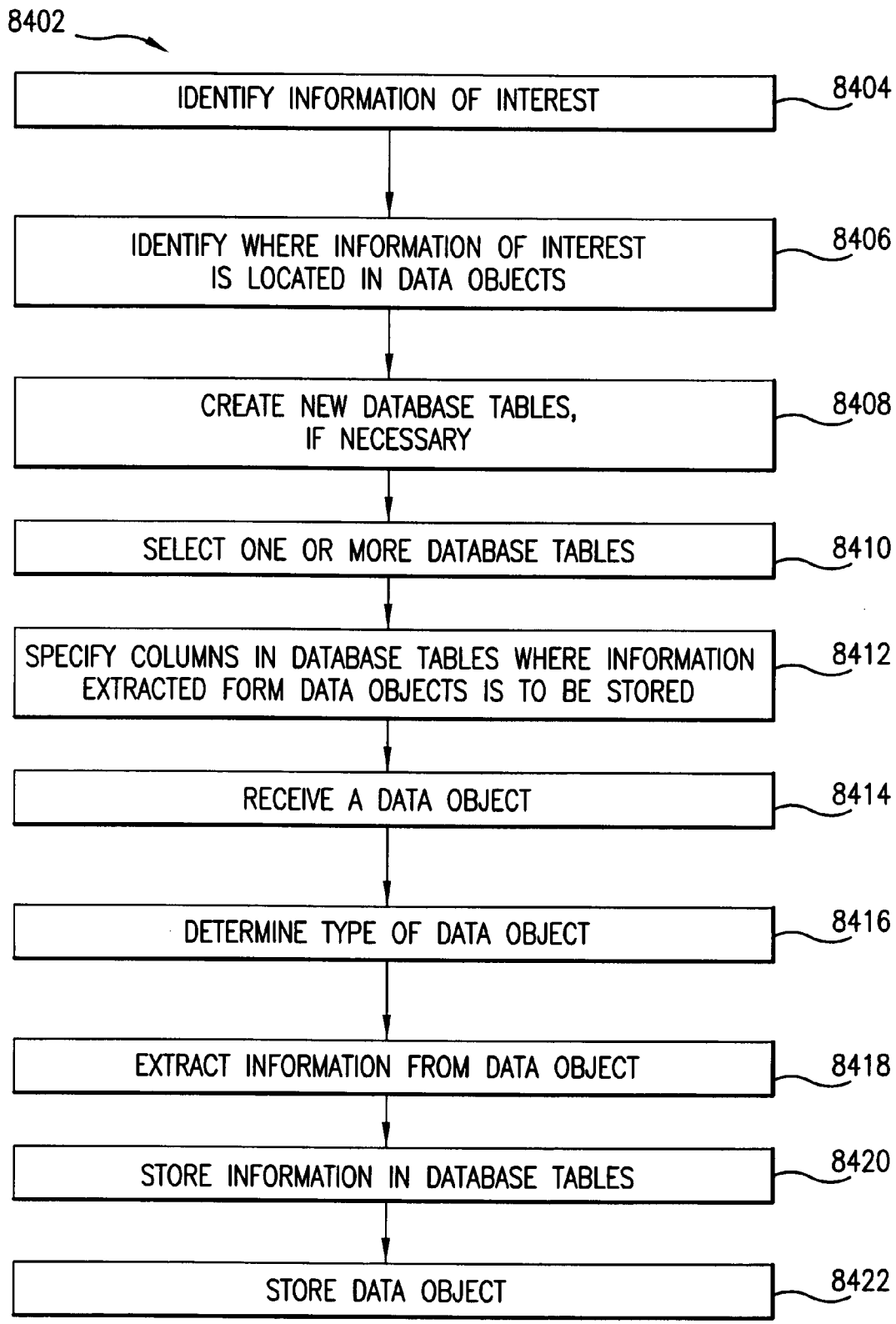
FIG. 84 is a flow chart representing the operation of the invention when inputting an arbitrary data object.

This operation of the invention is represented by a flow chart 8402 in FIG. 84. It is noted that the steps of flowchart 8402 are performed for a particular data object type, which shall herein be referred to as the "current data object type" for reference purposes.

In step 8404, the current data object type is analyzed to identify information of interest 8506 contained in data objects of the current data object type. The identified information of interest 8506 represents information that it is be extracted from data objects of the current data object. For example, if the current data object type is U.S. patents, then the information of interest 8506 identified in step 8404 may include the patent number, the inventors, the assignee, the cited references, the number of claims, the number of figures, etc.

Figure 85:
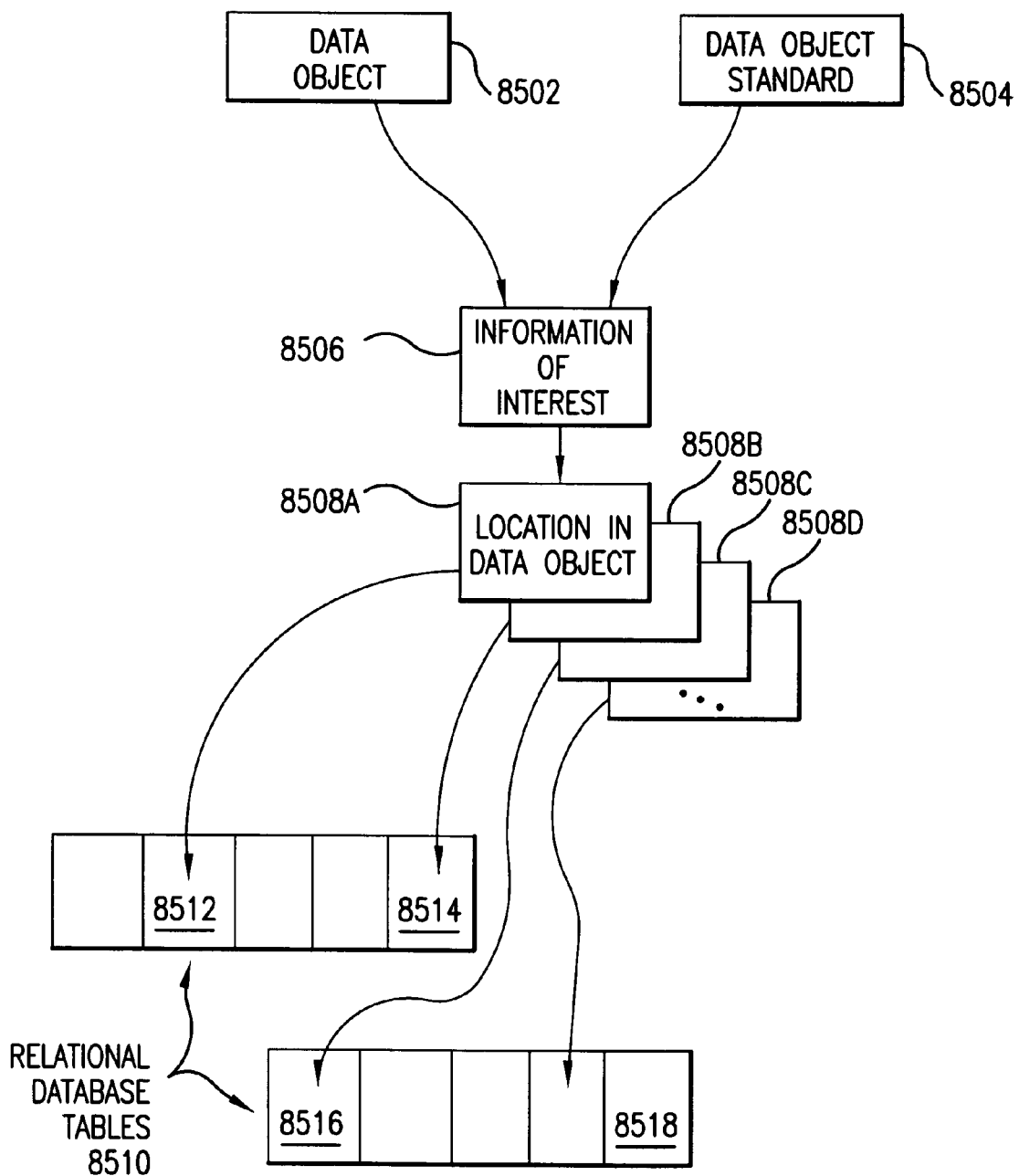
FIG. 85 is a data flow diagram supporting the flow chart of FIG. 84.

The information of interest 8506 of the current data object type can be identified in step 8404 by a review of an example data object 8502 of the current data object type (see FIG. 85). Alternatively, the information of interest 8506 can be identified in step 8404 by other means. For example, a data object standard 8504 that characterizes/defines/describes the current data object type, and that specifies the data content and the locations of the data content in data objects of the current data object type, can be reviewed to identify the information of interest in step 8404.

In step 8406, the system identifies where the information of interest 8506 (identified in step 8404) is located in data objects of the current data object type. Again, step 8406 can be performed by a review of an example data object 8502 of the current data object, or by review of a data object standard 8504 that characterizes the current data object type.

In step 8408, one or more new database tables are created, if necessary, to store the data that it to be extracted from data objects of the current data object type. It is noted that step 8408 is optional, in that database tables for storing the extracted information may already exist.

In step 8410, one or more database tables 8510 (one or more of which may have been created in 8408) are selected. The selected database tables 8510 will store the information extracted from data objects of the current data object type. The database tables 8510 selected in step 8410 are represented, for example, as relational database tables 8510 in FIG. 85.

In step 8412, the columns (fields) in the selected database tables 8510 where the information extracted from the data objects of the current data object type is to be stored are selected. This is represented in FIG. 85, for example, where it is specified that data in location 8508A is stored in column 8512 of relational database 8510. Similarly, data in locations 8508B, 8508C and 8508D of the data objects of the current data object type are stored in columns 8514, 8516 and 8518, respectively, of the relational database tables 8510.

After completion of step 8412, the system is prepared to receive and extract data from data objects of the current data object type. Accordingly, in step 8414, a data object of the current data object type is received.

In step 8416, the system determines the type of the received data object. In particular, the system in step 8416 determines that the received data object is of the current data object type. The system can determine the type by reviewing information that accompanied the data object when it was received in step 8414. In particular, in step 8414, an indication of the type of the data object may also have been provided to the system. Alternatively, the system can analyze the received data object to determine its type.

In step 8418, the system extracts information from the received data object in accordance with the data object's type. Preferably, this extraction operation does not change or otherwise affect the received data object. The system knows where to extract information of interest 8506 by reference to the locations 8508 identified in step 8406.

In step 8420, the system stores the extracted information in columns of the database tables 8510 associated with the current database type, as determined in steps 8410 and 8412.

In step 8422, the system stores the data object itself

Tool Box Embodiments

A variety of widgets (components) of the invention are described herein. The invention is directed to tool box embodiments where any number of these widgets are packaged as separately accessible components that can be added to other applications, or used to customize the system described herein. For example, and without limitation, an extension of the user interface includes the ability to "mix and match" specific widgets or components associated with the user interface. Consider FIGS. 16 and 75, and the "kind pane" (7504). These could be packaged as separately accessible components of the API and made available as a "toolkit". The same is true with all other components of the invention. Users could build their own user interface or other applications—perhaps by embedding the context browser into other applications, such as a spreadsheet in Microsoft Excel.

Example Implementation

Figure 86:
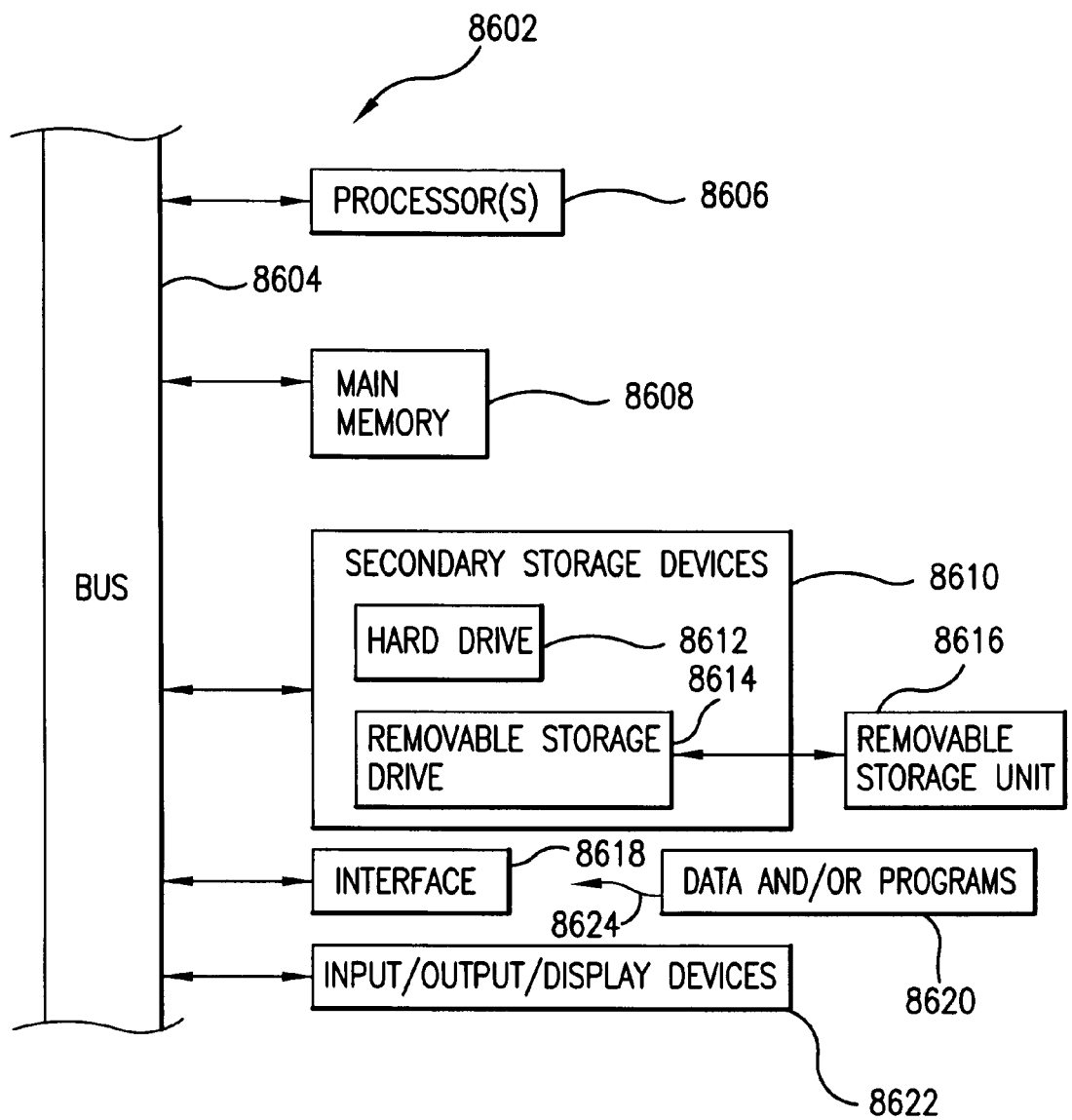
FIG. 86 is a block diagram of an example computer system useful for implementing modules of the invention.

In an embodiment of the present invention, the system and components of the present invention described herein are implemented using well known computers, such as a computer 8602 shown in FIG. 86. The computer 8602 can be any commercially available and well known computer capable of performing the functions described herein, such as computers available from International Business Machines, Apple, Silicon Graphics Inc., Sun, HP, Dell, Compaq, Digital, Cray, etc.

The computer 8602 includes one or more processors (also called central processing units, or CPUs), such as a processor 8606. The processor 8606 is connected to a communication bus 8604. The computer 8602 also includes a main or primary memory 8608, preferably random access memory (RAM). The primary memory 8608 has stored therein control logic (computer software), and data.

The computer 8602 also includes one or more secondary storage devices 8610. The secondary storage devices 8610 include, for example, a hard disk drive 8612 and/or a removable storage device or drive 8614. The removable storage drive 8614 represents a floppy disk drive, a magnetic tape drive, a compact disk drive, an optical storage device, tape backup, ZIP drive, JAZZ drive, etc.

The removable storage drive 8614 interacts with a removable storage unit 8616. As will be appreciated, the removable storage unit 8616 includes a computer usable or readable storage medium having stored therein computer software (control logic) and/or data. The removable storage drive 8614 reads from and/or writes to the removable storage unit 8616 in a well known manner.

Removable storage unit 8616, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables the computer 8602 to perform any combination of the functions described herein.

Computer programs (also called computer control logic) are stored in main memory 8608 and/or the secondary storage devices 8610. Such computer programs, when executed, enable the computer 8602 to perform the functions of the present invention as discussed herein. In particular, the computer programs, when executed, enable the processor 8606 to perform the functions of the present invention. Accordingly, such computer programs represent controllers of the computer 8602.

The computer 8602 also input/output/display devices 8622, such as monitors, keyboards, pointing devices, etc.

The computer 8602 further includes a communication or network interface 8618. The network interface 8618 enables the computer 8602 to communicate with remote devices. For example, the network interface 8618 allows the computer 8602 to communicate over communication networks, such as LANs, WANs, the Internet, etc. The network interface 8618 may interface with remote sites or networks via wired or wireless connections. The computer 8602 receives data and/or computer programs 8620 via the network interface 8618. The electrical/magnetic signals having contained therein data and/or computer programs 8620 received or transmitted by the computer 8602 via interface 8618 also represent computer program product(s).

The invention can work with software, hardware, and operating system implementations other than those described herein. Any software, hardware, and operating system implementations suitable for performing the functions described herein can be used.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer implemented method of enabling review of patents in a group of patents, comprising:
    generating a group of patents comprising a plurality of electronic patent documents;
    displaying a list of patents in said group of patents;
    searching a local database to determine whether requested information for a patent from the list of patents is locally available, the requested information comprising image data representative of at least a portion of the patent;
    previewing a subset of the requested information from another database in response to the requested information being unavailable locally;
    requesting the requested information from the another database in response to the previewing;
    displaying the image data representative of at least a portion of the patent;
    in response to a received command to view a next patent from the list of patents, retrieving and displaying at least image data representative of at least a portion of the next patent;
    in response to a received command to perform a patent citation function with respect to a selected patent in the group, linking patents and patent related documents that:
        are cited by the selected patent; and/or
        cite the selected patent;
    in response to a received command, creating a new temporary group as a subset of the plurality of electronic patent documents; and
    in response to a received command, converting the new temporary group to a permanent group.

2. The method of claim 1, wherein the previewing further comprises:
    retrieving and displaying the subset of the requested information from a remote database.

3. A method of enabling review of patent-related data objects comprising:

aggregating a set of patent-related data objects;
displaying a list of patent-related data objects in the aggregated set;
searching a local database to determine whether requested information for a patent-related data object from the list is locally available, the requested information comprising at least image data representing at least a portion of a patent-related data object;
previewing a subset of the requested information from another database in response to the requested information being unavailable locally;
requesting the requested information from the another database in response to the previewing;
displaying image data representing at least a portion of the patent-related data object from the aggregated set;
in response to commands received from a set of navigation tools, providing access to respective patent-related data objects within the aggregated set;
in response to a received command to perform a patent citation function with respect to a selected patent-related data object from the aggregated set, linking patents and patent related documents that:
are cited by the selected patent-related data object; and/or
cite the selected patent-related data object;
in response to commands received from a set of classification tools, creating new temporary groups from subsets of the aggregated set; and
in response to a command, converting one or more of the new temporary groups to a permanent group.

4. The method of claim 3, wherein the previewing further comprises:
retrieving and displaying the subset of the patent-related data object from a remote database.

5. The method of claim 4, further comprising:
generating a data object family tree comprising a plurality of patent-related data objects and indicative of relationships between the patent-related data objects; and
displaying the data object family tree.

6. The method of claim 5, wherein the displaying the data object family tree comprises displaying the data object family tree as a hyperbolic tree.

7. The method according to claim 3, wherein the method is computer implemented, and patent-related data objects comprise patents, and the aggregated set comprises a group of patents, wherein
the aggregating causes generation of a group of patents comprising a plurality of electronic patent documents;
the displaying a list of data objects displays a list of patents in the group of patents; and
the responding to a set of set navigation tools comprises in response to a received command to view a next patent retrieving and displaying at least image data representative of at least a portion of the next patent.

8. The method of claim 3, further comprising performing patent-centric processing of the patent-related data objects.

9. The method of claim 8, wherein the patent-centric processing comprises generating:
a backward patent citation tree comprising patents and non-patent data objects that are cited by a base patent; and
a forward patent citation tree comprising patents and non-patent data objects that cite a base patent.

10. The method of claim 9, further comprising visualizing the patent citation tree as a hyperbolic tree.

11. The method of claim 10, wherein individual nodes of the hyperbolic tree comprise state information including display attribute information.

12. The method of claim 8, wherein patent-centric processing comprises generating a patent claim tree comprising nodes corresponding to claims in one of the patents, and links between the nodes indicative of dependencies among the claims.

13. The method of claim 12, further comprising displaying at least a portion of a claim corresponding to one of the nodes when a selection device is positioned proximate to the one of the nodes.

14. The method of claim 8, wherein the patent-centric processing comprises generating a patent citation tree comprising patents and non-patent data objects that (i) are cited by a base patent, and/or (ii) cite a base patent.

15. The method of claim 3, further comprising generating at least one annotation and associating the annotation with a respective patent-related data object.

16. The method of claim 15, wherein the generating an annotation is linked to a portion of at least one of the patent-related data objects.

17. The method of claim 3, wherein a patent-related data object comprises image data, further comprising generating at least one annotation and associating the annotation with image data of a respective patent-related data object.

18. The method of claim 3, further comprising determining an authorization of a user prior to displaying patent-related data objects thereto.

19. The method of claim 3, further comprising graphing information relating to at least one patent-related data object.

20. The method of claim 3, further comprising displaying a map of information relating to at least one patent-related data object.

21. The method of claim 3, further comprising providing a plug-in manager having an application programming interface (API) for permitting external applications to operate on patent-related data objects.

22. The method of claim 3, further comprising providing at least two distinct application programming interfaces (APIs) for permitting applications to operate on patent-related data objects.

23. The method of claim 3, further comprising:
providing a plug-in manager for permitting plug-in applications to access patent-related data objects;
translating messages from the plug-in manager to the plug-in applications to a format conforming to a first application programming interface (API); and
translating messages from the plug-in applications to the plug-in manager to a format conforming to a second application programming interface (API).

24. The method of claim 3, wherein patent-related data objects comprise patent-related information, further comprising:
accessing databases of patent and patent bibliographic information;
accessing one or more contexts, each of the one or more contexts or groups comprising any number of patents represented in the databases; and
automatically performing patent centric and context oriented processing of at least some of the patents in at least one of the one or more contexts or groups.

25. The method of claim 24, further comprising annotating a patent represented in the databases.

26. The method of claim 25, wherein the annotating comprises annotating the patent using an annotation form.

27. The method of claim 3, further comprising:
automatically processing at least one of the patent-related data objects;
in response to a received command, creating a new temporary group as a subset of the aggregated set; and
in response to a received command, converting the new temporary group to a permanent group.

28. The method of claim 27, wherein at least one of the patent-related data objects is related to one or more of patents, contracts, licenses, leases, notes, commercial papers, legal papers and financial papers.

29. The method of claim 3, further comprising:
maintaining a group of a permanent type, wherein the permanent type can be either system defined or user defined, wherein the group of permanent type is comprised of any number of patent-related data objects;
generating a group of a temporary type during processing of a command by automatically processing one or more of the patent-related data objects in the group of permanent type in conjunction with information from at least one database; and
allowing conversion of the group of temporary type to a group of permanent type.

30. A system for enabling review of patent-related data objects comprising:
a memory configured to store:
a set of aggregated patent-related data objects;
a search module configured to search a local database to determine whether requested information for a patent-related data object in a list of data objects in the aggregated set is locally available;
a display module configured to present the list of data objects, preview a subset of the requested information from another database in response to the requested information being unavailable locally, and request the requested information from the another database in response to the preview, the display module displaying the image data representative of at least a portion of the patent-related data object;
a navigation tool module comprising a set of navigation tools to provide user access to respective patent-related data objects within the aggregated set;
a linking module configured, in response to a received command to perform a patent citation function with respect to a selected patent-related data object from the aggregated set, to link patents and patent related documents that:
are cited by the selected patent-related data object; and/or
cite the selected patent-related data object;
a group creation module configured, in response to commands received from a set of classification tools, to create new temporary groups from subsets of the aggregated set; and
a conversion module configured, in response to a command, to convert one or more of the new temporary groups to a permanent group; and
a processor configured to process the modules.

31. The system of claim 30, wherein the search module is further configured to retrieve and display the subset of the patent-related data object from a remote database.

32. The system according to claim 30, wherein the system comprises a computer, and wherein:
the set of patent-related data objects comprises the group of patents comprising a plurality of electronic patent documents; and
the display displays image data representative of at least a portion of a patent from the group of patents.

33. The system according to claim 32, wherein the set of navigation tools comprises a command to view a previous patent, retrieval and display of at least image data representative of at least a portion of the previous patent.

34. A method of context data processing, comprising:
accessing databases of patents and patent bibliographic information;
accessing one or more contexts, each of the one or more contexts comprising any number of patents represented in the databases;
searching a local database from among the databases to determine whether requested information for a patent from the number of patents is locally available, the requested information comprising image data representative of at least a portion of the patent;
previewing a subset of the requested information from another database in response to the requested information being unavailable locally;
requesting the requested information from the another database in response to the preview;
displaying the image data representative of at least a portion of the patent;
automatically performing patent centric and context oriented processing of at least some of the patents in at least one of the one or more contexts, wherein the patent centric processing comprises performing a patent citation function with respect to one or more selected patents from the databases of patents by linking patents and patent related documents that:
are cited by the one or more selected patents; and/or
cite the one or more selected patents;
in response to a command, creating a new temporary group as a subset of the one or more contexts; and
in response to a command, converting the new temporary group to a permanent group.

35. The method of claim 34, further comprising:
annotating a patent represented in the databases.

36. The method of claim 35, wherein the annotating comprises:
annotating the patent using an annotation form.

37. The method of claim 34, wherein the patent centric and context oriented processing comprises:
generating and displaying data object families.

38. A system for processing data, comprising:
an intellectual property asset manager (IPAM);
a plug-in manager coupled to the IPAM;
at least one plug-in coupled to the plug-in manager;
a module operable to access, using the IPAM, a local database of electronic patent documents;
a module operable to search the local database to determine whether requested information for a patent from the local database is locally available, the requested information comprising image data representative of at least a portion of the patent;
a module operable to preview a subset of the requested information from another database in response to the requested information being unavailable locally;
a module operable to request the requested information from the other database in response to the preview;
a module operable to display the image data representative of at least a portion of the patent;
a module operable to perform, using the IPAM, in response to a received command, a patent citation function with respect to a selected electronic patent document from the local database of electronic patent documents by linking patents and patent related documents that:
are cited by the selected electronic patent document; and/or cite the selected electronic patent document;
a module operable to create, in response to a received command, a new temporary group comprising one or more electronic patent documents represented in the database; and
a module operable to convert, in response to a received command, the new temporary group to a permanent group; and
a processor configured to process the modules.

39. The system of claim 38, further comprising:
at least one external data processing component coupled to the plug-in.

40. The system of claim 39, wherein the external data processing component displays data using at least graphs, and wherein the graphs include at least a patent citation tree.

41. The system of claim 39, wherein the external data processing component displays data using at least maps, and wherein the maps include at least a patent citation map.

42. The system of claim 39, wherein the plug-in manager has a first application programming interface (API), and the external data processing component has a second API.

43. The system of claim 42, wherein the plug-in is configured to:
translate messages from the plug-in manager to the external data processing component to a format conforming to the second API; and
translate messages from the external data processing component to the plug-in manager to a format conforming to the first API.

44. A method of processing data, comprising:
accessing at least one local database of information representative of patents and patent-related documents;
accessing one or more groups, each of the one or more groups comprising any number of the documents represented in the at least one local database;
searching the at least one local database to determine whether requested information for a document from the documents is locally available, the requested information comprising image data representative of at least a portion of the document;
previewing the requested information when the requested information is not locally available;
requesting the requested information from another database in response to the previewing;
displaying the image data representative of at least a portion of the document;
automatically processing at least one of the documents in at least one of the one or more groups, wherein the automatic processing comprises performing a patent citation function with respect to a selected document from one or more groups by linking patents and patent related documents that:
are cited by the selected document; and/or
cite the selected document;
automatically creating a new temporary group during processing of a command; and
in response to a received command, converting the new temporary group to a permanent group.

45. The method of claim 44, wherein at least one of the patent-related documents is related to one or more of contracts, licenses, leases, notes, commercial papers, legal papers and financial papers.

46. A method of maintaining groups to facilitate in processing and presenting data, comprising:
maintaining a group of a permanent type, wherein the permanent type is user defined, wherein the group of permanent type is comprised of any number of patents and patent-related documents from at least one local database;
searching the at least one local database to determine whether requested information for a patent from the at least one local database is locally available, the requested information comprising image data representative of at least a portion of the patent;
previewing a subset of the requested information in response to the requested information being unavailable locally;
requesting the requested information from another database in response to the previewing;
displaying the image data representative of at least a portion of the patent;
in response to a received command to perform a patent citation function with respect to one or more selected patents from the at least one local database, linking patents and patent related documents that:
are cited by the selected one or more patents; and/or
cite the selected one or more patents;
generating a group of a temporary type during processing of a command by automatically processing one or more of the documents in the group of permanent type in conjunction with information from at least one second database; and
allowing a user to convert the group of temporary type to a group of permanent type.

47. The method of claim 46, wherein one or more of the patent-related documents is related to one or more of contracts, licenses, leases, notes, commercial papers, legal papers and financial papers.

* * * * *